US009928054B2

(12) United States Patent
Phipps

(10) Patent No.: US 9,928,054 B2
(45) Date of Patent: Mar. 27, 2018

(54) SYSTEMS AND METHODS FOR DOCUMENTING, ANALYZING, AND SUPPORTING INFORMATION TECHNOLOGY INFRASTRUCTURE

(71) Applicant: ConnectWise Inc., Tampa, FL (US)

(72) Inventor: Ricky D. Phipps, Chicago, IL (US)

(73) Assignee: Connectwise, Inc., Tampa, FL (US)

( * ) Notice: Subject to any disclaimer, the term of this patent is extended or adjusted under 35 U.S.C. 154(b) by 0 days.

(21) Appl. No.: 14/919,286

(22) Filed: Oct. 21, 2015

(65) Prior Publication Data

US 2016/0266891 A1 Sep. 15, 2016

Related U.S. Application Data

(63) Continuation of application No. 14/640,997, filed on Mar. 6, 2015, now Pat. No. 9,201,933.

(60) Provisional application No. 61/973,388, filed on Apr. 1, 2014.

(51) Int. Cl.

| | |
|---|---|
| ***G06F 9/445*** | (2018.01) |
| ***G06Q 10/06*** | (2012.01) |
| ***G06F 17/30*** | (2006.01) |
| ***G06F 9/44*** | (2018.01) |

(Continued)

(52) U.S. Cl.

CPC .................. *G06F 8/65* (2013.01); *G06F 8/71* (2013.01); *G06F 17/3053* (2013.01); *G06F 17/30336* (2013.01); *G06F 17/30368* (2013.01); *G06F 17/30864* (2013.01); *G06F 17/30867* (2013.01); *G06Q 10/0635* (2013.01);

(Continued)

(58) Field of Classification Search

CPC ..................................... G06F 8/65; G06F 8/71

See application file for complete search history.

(56) References Cited

U.S. PATENT DOCUMENTS 7,356,679 B1 * 4/2008 Le ..................... G06F 17/30067 707/E17.01

7,627,388 B2 12/2009 August et al.

(Continued)

OTHER PUBLICATIONS

BMC Software, Automated IT Asset Management, white paper, document 301754, Oct. 2012, Houston, Texas.

(Continued)

*Primary Examiner* — Alicia Willoughby

(74) *Attorney, Agent, or Firm* — Foley & Lardner LLP

(57) ABSTRACT

Systems and methods of the present disclosure facilitate managing information technology (IT) infrastructure. The system can include a server configured to retrieve data records for first and second IT assets, each asset comprising at least one of a computing device, a software application, an end user, a business unit, a piece of networking hardware, or an agreement for an IT service. The server can select a template comprising a relationship between the first and second data records. The system can include a link generator configured to generate a different relationship, absent from the template, between the first and second data records. The system can include a search engine configured to identify third and fourth IT assets that satisfy the second relationship, determine an indices of completeness for the third and fourth IT assets, and rank the third and fourth IT assets based on the indices to generate an ordered list.

20 Claims, 124 Drawing Sheets

(51) Int. Cl.
*H04L 12/26* (2006.01)
*H04L 29/08* (2006.01)

(52) U.S. Cl.
CPC ......... *G06Q 10/0637* (2013.01); *H04L 43/12* (2013.01); *H04L 67/34* (2013.01)

(56) References Cited

U.S. PATENT DOCUMENTS

| | | | | |
|---|---|---|---|---|
| 7,934,210 | B1* | 4/2011 | Stampfli | G06F 8/61 709/220 |
| 8,037,106 | B2 | 10/2011 | Barrenechea | |
| 8,051,106 | B2 | 11/2011 | Bird | |
| 8,285,578 | B2 | 10/2012 | Sheppard | |
| 8,543,916 | B2 | 9/2013 | Anderson et al. | |
| 2004/0024662 | A1 | 2/2004 | Gray et al. | |
| 2005/0022176 | A1* | 1/2005 | Ramachandran | G06F 8/65 717/170 |
| 2005/0033767 | A1* | 2/2005 | Kamentz | G06F 9/44536 |
| 2005/0155040 | A1* | 7/2005 | Doshi | G06F 9/546 719/313 |
| 2005/0159969 | A1 | 7/2005 | Sheppard | |
| 2005/0288956 | A1 | 12/2005 | Speicher | |
| 2006/0161879 | A1 | 7/2006 | Lubrecht et al. | |
| 2007/0074201 | A1* | 3/2007 | Lee | G06F 8/65 717/173 |
| 2007/0239610 | A1 | 10/2007 | Lemelson | |
| 2008/0052719 | A1 | 2/2008 | Briscoe et al. | |
| 2008/0114700 | A1 | 5/2008 | Moore et al. | |
| 2008/0320460 | A1* | 12/2008 | Miller | G06F 8/71 717/162 |
| 2009/0171708 | A1 | 7/2009 | Bobak et al. | |
| 2009/0327000 | A1 | 12/2009 | Davis et al. | |
| 2010/0318343 | A1 | 12/2010 | Wei et al. | |
| 2011/0214112 | A1* | 9/2011 | Vidal | G06F 8/65 717/168 |
| 2011/0313812 | A1 | 12/2011 | Duvvoori et al. | |
| 2012/0232948 | A1 | 9/2012 | Wolf et al. | |
| 2013/0006679 | A1 | 1/2013 | Ruparelia et al. | |
| 2013/0046798 | A1 | 2/2013 | Mankovskii et al. | |
| 2013/0204837 | A1 | 8/2013 | Sabharwal | |
| 2013/0318517 | A1* | 11/2013 | Davey | G06F 8/65 717/170 |
| 2014/0181262 | A1* | 6/2014 | Goswami | H04L 67/02 709/219 |
| 2014/0337825 | A1* | 11/2014 | Challa | G06F 8/65 717/168 |
| 2015/0120359 | A1 | 4/2015 | Dongieux | |
| 2015/0363186 | A1* | 12/2015 | Judge | G06F 8/65 717/170 |

OTHER PUBLICATIONS

BMC Software, BMC Track-It!, product solution datasheet, document 443428, Aug. 2013, Houston, Texas.

Cuthbertson, David, Square Mile Systems, Is Automated Infrastructure Documentation Practical?, white paper, Dec. 2007, Gloucestershire, United Kingdom.

Hewlett-Packard Development Company L.P., Getting More from ServiceNow, business white paper, document 4AA4-48511ENW, Feb. 2013, Palo Alto, California.

IBM Corporation, Bridging the chasm between development and operations, document G507-1009-00, Jun. 2004, Somers, New York.

IBM Corporation, IBM Tivoli Configuration Manager, downloaded from web site, Jan. 27, 2014, Armonk, New York.

IT Glue, web site, downloaded Dec. 23, 2013, Vancouver, BC, Canada.

Notice of Allowance on U.S. Appl. No. 14/640,997 dated Jul. 31, 2015 (BIZ-001 US).

Qondoc, Application Management—document the relationships and links between applications and systems, product data downloaded from web site, Jan. 27, 2014, Gothenburg, Sweden.

Qondoc, CMDB—configuration management database, product data downloaded from web site, Jan. 27, 2014, Gothenburg, Sweden.

Qondoc, Contract Management—keep track of your license agreements, product data downloaded from web site, Feb. 13, 2014, Gothenburg, Sweden.

Qondoc, Finance Management—for more efficient internal debiting, product data downloaded from web site, Feb. 13, 2014, Gothenburg, Sweden.

Qondoc, Infrastructure Management—automated documentation and inventory of complex IT environments, product data downloaded from web site, Jan. 27, 2014, Gothenburg, Sweden.

Qondoc, License Management, product data downloaded from web site, Jan. 27, 2014, Gothenburg, Sweden.

Qondoc, screen shots of Clearpulse product downloaded from web site, Feb. 13, 2014, Gothenburg, Sweden.

Qondoc, Software Asset Management—measure and document license agreements, product data downloaded from web site, Feb. 13, 2014, Gothenburg, Sweden.

Qondoc, Tablet PCs and mobile phones, product data downloaded from web site, Feb. 13, 2014, Gothenburg, Sweden.

ServiceNow, Inc., Advanced High Availability Architecture, white paper, document SN-WP-AHA-042013, Apr. 2013, Santa Clara, California.

ServiceNow, Inc., ServiceNow Configuration Management, product data sheet, document SN-DS-CMDB-062013, Jun. 2013, Santa Clara, California.

Silect Software Inc., ConfigWise for Microsoft System Center Configuration Management Reporting, product data sheet, Aug. 2012, Manotick, ON, Canada.

Silect Software Inc., screen shots of ConfigWise product downloaded from web site, Jan. 27, 2014, Manotick, ON, Canada.

Veeam Software AG, Veeam ONE for VMware and Hyper-V, product overview, document 11132013, Nov. 2013, Linden Park, Switzerland.

Veeam Software AG, Veeam ONE What's new in v7, product documentation, document 11142013, Nov. 2013, Linden Park, Switzerland.

* cited by examiner 681a 681b 681c

Roles Filter Add

| | | Name | Applications | Host | Risk | Note | Needs Work | |
|---|---|---|---|---|---|---|---|---|
| 682→ | | | | | | | | |
| 683a→ | | Database Server | Case Logistix | sql02 | | | | |
| 683b→ | | Database Server (BES) | BES | app02 | | | | |
| 683c→ | | Database Server (Tabs) | Tabs | app02 | | | | |
| 683d→ | DNS | DNS Made Easy | largelawfirm.com<br>largefirm.com<br>largelaw.com | | | | | |
| 683e→ | | File Server | Archive | fs01 | | | | |
| 683f→ | | File Server | QB | app01 | | | | |
| 683g→ | | File Server | Tabs | app02 | | | | |
| 683h→ | | File Server | Backups | NAS01 | | | | |
| 683i→ | | File Server | Group<br>Users | fs02 | | | | |
| 683j→ | | File Server | CaseData | fs03 | | | | |
| 683k→ | | GoDaddy Hosted | www.largelaw.com | | | | | |
| 683l→ | | Print Server | General<br>HR<br>Accounting | app01 | | | | |
| 683m→ | | SMTP | Email<br>Email | ex01 | | | | |
| 683n→ | | SMTP Server | | ex01 | | | | |
| 683o→ | | Web Server | Email | ex01 | | | | |

Yoyodyne Propulsion Systems
Risk analysis

2372a → Summary - hourly cost

| | | |
|---|---|---|
| 2373a → Total labor cost: | $ | 2,560 |
| 2373b → Stoppage risk cost: | $ | 1,380 |
| 2373c → Impairment risk cost: | $ | 880 |

2372b → Business unit breakdown

| | | |
|---|---|---|
| 2374a → Research | $ | 500 |
| 2374b → Development | $ | 300 |
| 2374c → Executive | $ | 255 |
| 2374d → Finance | $ | 130 |
| 2374e → Facilities | $ | 126 |
| 2374f → Reception | $ | 69 |

2372c → Key risks

| | | |
|---|---|---|
| 2375a → Linksys switch | $ | 1,055 |
| 2375b → Email application | $ | 430 |

FIG. 23G

2421a → Configuration Details

| | |
|---|---|
| 2421b → Configuration Type: | Server |
| 2421c → Name: | File & Print Server |
| 2421d → Purchase Date: | Tue 03/12/2002 |
| 2421e → Warranty Expiration: | Sun 03/23/2014 |
| 2421f → Installation Date: | Wed 03/20/2002 |
| 2421g → Installed By: | Greg Lassiter |
| 2421h → Location: | Tampa |
| 2421i → Department: | Systems Integration |
| 2421j → Status: | Active |
| 2421k → Vendor: | Compaq |
| 2421l → Manufacturer: | Quantum |
| 2421m → Model Number: | ml350 |
| 2421n → Serial Number: | sn44678231196b |
| 2421o → Tag Number: | a4332 |
| 2421p → Bill Customer? | ☑ |

2422a → Company/Contact Details

| | |
|---|---|
| 2422b → Company: | Chris Craft Boats |
| 2422c → Contact: | Jeff Star |
| 2422d → Address: | 8161 15th St E |
| | Building A |
| 2422e → City: | Sarasota |
| 2422f → State: | FL |
| 2422g → Zip: | 34243 |
| 2422h → Country: | |

| | |
|---|---|
| 2423 → Vendor Notes: | |
| 2424 → Notes: | DISKS: 36G redundant and 136G, not redundant<br>DC DNS GC<br>RAM: 640M, 2x86 Family 6 Model 8 Stepping 6 |

2425a → Configuration Questions

| | |
|---|---|
| 2425b → *1. Server Role: | File & Print Server |
| 2425c → *2. Operating System: | Win 2003 Std Serv |

| | Name | Install Date | Size (MB) | Version |
|---|---|---|---|---|
| 2433a | Adobe Reader X | 2/22/2012 | 111 | 10.0.1 |
| 2433b | Crystal Reports 2008 | 2/17/2012 | 205 | 12.2.0.290 |
| 2433c | LabTech 2012 | 2/17/2012 | 664 | 5.0.0147 |
| 2433d | Microsoft Visual C++ | 2/18/2012 | 536 | 8.0.56336 |
| 2433e | MySQL Connector | 2/16/2012 | 8 | 3.51.26 |
| 2433f | Oracle VM Virtual Box | 2/19/2012 | 312 | 4.1.0.0 |
| 2433g | SQLYog Community | 2/17/2012 | 14 | 9.30 |

2434 2431b

| | Name | PID | CPU | Mem (KB) | Title |
|---|---|---|---|---|---|
| 2435a | qbw32 | 6413 | 35 | 65,167 | QuickBooks |
| 2435b | explorer | 6217 | 15 | 4,127 | Windows Explorer |
| 2435c | firefox | 5763 | 3 | 470,148 | Firefox Browser |
| 2435d | itunes | 4869 | 0 | 6,134 | iTunes |
| 2435e | act64 | 6349 | 4 | 378,265 | ACT! Accounting |

Yoyodyne Propulsion Systems
Quote

| | | | | |
|---|---|---|---|---|
| 2612a → **Services** | | | | |
| 2613 → **Description** | **Qty** | **Price** | **Ext Price** | |
| 2614a → Installation | 2 | $ 100.00 | $ | 200.00 |
| 2614b → Setup | 1 | $ 100.00 | $ | 100.00 |
| 2614c → **Services total** | | | **$** | **300.00** |
| 2612b → **Hardware** | | | | |
| 2615 → **Description** | **Qty** | **Price** | **Ext Price** | |
| 2616a → Linksys router | 1 | $ 200.00 | $ | 200.00 |
| 2616b → **Hardware total** | | | **$** | **200.00** |
| 2612c → **Quote total** | | | **$** | **500.00** |

FIG. 26B

SYSTEMS AND METHODS FOR DOCUMENTING, ANALYZING, AND SUPPORTING INFORMATION TECHNOLOGY INFRASTRUCTURE

CROSS-REFERENCE TO RELATED APPLICATIONS

This application claims the benefit of and priority to U.S. patent application Ser. No. 14/640,997, titled "SYSTEMS AND METHODS FOR DOCUMENTING, ANALYZING, AND SUPPORTING INFORMATION TECHNOLOGY INFRASTRUCTURE", and filed on Mar. 6, 2015, which claims priority under 35 U.S.C. § 119 to U.S. Provisional Patent Application No. 61/973,388, filed Apr. 1, 2014, both of which are hereby incorporated by reference in their entirety.

FIELD OF THE DISCLOSURE

The present disclosure generally relates to information technology (IT) infrastructure. More specifically, the present disclosure relates to documenting IT infrastructure, and using the documentation to analyze and support the IT infrastructure.

BACKGROUND

Organizations that use IT systems can invest in building an infrastructure of IT hardware and software to support those IT systems. The organizations may wish to document the components and connectivity of that IT infrastructure. The resulting documentation of the IT infrastructure may be useful when analyzing the behavior of the IT infrastructure, and may also be useful when supporting the functions of the IT infrastructure.

BRIEF SUMMARY OF THE DISCLOSURE

Complete and accurate documentation of IT infrastructure can be of value. Good documentation can make it easier to diagnose issues, find resources for solving issues, locate the components of the IT infrastructure that are involved with the issue, and apply solutions to those components. Good documentation can make it easier make decisions about changes in the IT infrastructure, by making it simpler to predict the results of those changes, and trade off costs of the changes versus their economic benefits. Good documentation can also make it easier to implement the decisions about changes to the IT infrastructure, by helping to discover the components that may be affected by the planned changes.

Documentation of IT infrastructure may be inadequate. The documentation may be incomplete, inaccurate, or out of date. Some systems exist to facilitate automatic creation of documentation using the IT infrastructure itself, but these systems usually focus on one aspect of the documentation, resulting in documentation that is still incomplete. Other systems may only work in one type of environment, resulting in documentation that omits sections of the IT infrastructure that are not part of that environment. It may be that automated documentation systems can help improve the quality of the documentation, but not really provide sufficient documentation for everyday use.

A company may want to know the systems that the company is using, the applications (like email) that the company is using, the employees that are using the applications, the organization of the business units in the company, the networking hardware that connects these components, and the contracts with suppliers for services that the company uses. An IT services company that provides outsourced IT services to multiple clients may want to know this information for some or all of their clients.

Keeping this information as paper documents may make it difficult for multiple people to access the information at the same time, or to access the information remotely, which may make it difficult for field service technicians to use the data.

A company may use an electronic form of these paper documents, in the form of spreadsheets and word processor documents. This methodology provides no way to cross reference information from one document to another, and no way to do analysis on the information in multiple documents. By contrast, a set of structured documents that are specifically designed to represent the information about the IT assets of a company can allow this cross-referencing and analysis.

In an illustrative example, an IT support organization may get a call reporting that email is not working at a customer. Using a set of structured documents that can represent the information about the IT assets of the customer, the support organization can look at what servers, network equipment, service providers, and other applications are associated with the failing application, and can limit the diagnosis to the components that might be causing the problem. The IT support organization may not need to explicitly indicate all the associations with the failing application. For example, the structured documentation may indicate that a database is installed on a specific database server, and the system may use the fact that the email application depends on the database to determine that the email application is associated with the database server. The system may be able to determine the dependency of the email application on the database by using a table of dependencies of known applications, or it may be able to automatically determine this dependency by observing the behavior of the email application over time. The IT support organization may also have access to the documentation about access credentials (usernames and passwords) to get to the potentially failing components, as well as phone numbers and service contracts for contacting service providers that might be involved. The IT support organization can also see how many departments and employees are potentially affected by the outage, and can triage the issue based on that. The access to structured documentation can improve the responsiveness and efficiency of the support organization. The structured documentation may also help to make estimates on the risks and costs associated with failures of IT assets. The risk for one failed asset can be estimated by following the links to some or all of the associated applications that might be affected. The structured documentation may not explicitly represent the links between the failing component and all of the affected applications. For example, the structured documentation may indicate the dependency of an application on the failing component, and the system may determine a cost contributed by that dependency based on a representation of the cost impact of the failure of the application. The system may determine this cost impact using estimates of the criticality of the application, the labor costs of the individuals using the application, or the job functions of the individuals using the application. For example, a critical application like a schedule manager may have a higher failure cost associated with it than a less critical application like an application for monitoring coffee usage in the office. Similarly, an application that is used by an entire department may have a higher failure cost associated with it than an application that is used by two engineers. In the same vein, an application that is used by attorneys may have a higher failure cost associated with it than an application that is used by administrative support staff. These estimates may be stored in another area in the structured documentation itself, or they may come from an external table of failure cost estimates. The system may determine or improve the failure cost estimates by observing the behavior and usage of applications over time. The links from the affected applications can also be used to remove risks that have been mitigated by using redundancy. The links from affected applications can be followed to people to determine how many people will be affected by an outage. The structured information may indicate information about the critical nature of an application to a person, so the impact of an outage may also be estimated. The structured information may also include salary information, either for individuals or as averages for a business unit, so the risks can be computed as hourly costs. The structured information may also store information about external operations management systems, which may enable the externalized costs of a failed component to be estimated.

Knowing the costs of failure of an IT asset may help in making informed decisions about changes to mitigate the risk. An IT support organization may be able to show the estimated cost of failure of a component, and compare that to the cost of mitigating the risk by adding redundancy. In the same way, the IT support organization may be able to demonstrate cases where added redundancy may not be advised because the savings associated with the reduced risk may not be large enough to justify the expense. The structured information may facilitate making a cost estimate or quote. Upgrading or changing hardware or application can affect other applications and hardware. In an illustrative example, a change to one item of hardware or one application may require an upgrade to a new version in connected hardware or associated applications. The system may be able to discover the requirement to upgrade the connected hardware or associated applications without the upgrade requirement being explicitly present in the structured documentation. For example, the structured documentation may contain versions for the hardware or application being upgraded, and also for connected hardware and applications. The system may be able to use an incompatibility between two versions to determine that the connected hardware or application must be upgraded. For example, the system may discover that an upgrade to the database software will bring the database application to a version that is not compatible with the current version of the email application, and will then determine that the email application will also need to be upgraded. The system may be able to find the incompatibility information in a support database that lists known incompatibilities and indexes them using versions. Discovering a dependency such as this while the upgrade is in process can lead to cost overruns. The structured documentation may be able to reveal these dependencies in advance, facilitating the creation of accurate quotes for the parts and labor involved in an upgrade.

The system includes manual input of data. When data is automatically gathered, there may be dependencies that cannot be determined automatically. In an illustrative example, some or all of the email traffic may be routed through a specific connection for security reasons, but this fact may not be easy to discover automatically.

The system can include template-based structures for data. Templates can facilitate manual input of data by serving as guides for entering the data. These templates can be specific to the IT asset, or the templates can be more general. In an illustrative example, there can be one template that guides the collection of some or all of the parameters for Microsoft Exchange Server, and there can be another template that guides the collection of parameters for a general email server. In a similar fashion, templates may be specific to a single piece of hardware, or may apply more generally to a class of hardware. A template can contain data fields that are related to information about one of the IT assets. The information can be characteristics or parameters associated with the asset. The information can be read only (not editable) or read write (editable). The template can be selected for an IT asset based on information about the asset, such as a product type, product name, version number, classification, or configuration. More than one template can apply to a particular asset, and one template can be a more specific version of a parent template, forming a hierarchy. For example, one template could apply to any email application, and another template could apply to Microsoft Exchange, and still another template could apply to Microsoft Exchange Server 2007. All three templates may have information about the incoming mail server and outgoing mail server. The Microsoft Exchange and Microsoft Exchange Server 2007 templates may additionally have information about the installation directory of the application. The Microsoft Exchange Server 2007 template may include IPV6 addresses for the mail servers. The system may choose the most specific template available for an asset, or it may allow an end user to choose a specific template.

The system can include an index of documentation completeness. Templates that indicate what information should be gathered for various IT assets can facilitate a measure of how much information has been filled in, and how much is missing. This measure can provide a reasonable estimate of the completeness of the documentation, and can facilitate estimating the accuracy of other derived metrics, such as risks and costs.

The system can include organization of information around business units, with a facility for associating people, applications, and equipment directly with business units. This organization can facilitate generating risk and cost estimates directly for the business units, rather than generating the estimates individually for people, applications, and equipment, and then consolidating these individual estimates into estimates for business units.

The system can include risk analysis based on labor cost and job function. This analysis can facilitate more accurate estimates using information about the actual salaries of the people using the IT assets, and a measure of how critical their job is to the operation of the company.

At least one aspect of the present disclosure is directed to systems and methods for documenting IT infrastructure that combine automated documentation with guided manual documentation. At least one aspect of the present disclosure is directed to systems and methods for storing IT infrastructure documentation in a structured format to make it particularly useful for diagnosis, troubleshooting, risk management, and planning. At least one aspect of the present disclosure is directed to systems and methods for displaying IT infrastructure documentation as it relates to the operation of external operations management systems. At least one aspect of the present disclosure is directed to systems and methods for providing an accurate assessment of the current completeness of IT infrastructure documentation. At least one aspect of the present disclosure is directed to systems and methods for facilitating the improvement of IT infrastructure documentation by providing indications of where the documentation may be inaccurate or incomplete. At least one aspect of the present disclosure is directed to systems and methods for using IT infrastructure documentation to accurately analyze the risks and costs of failures of components of the IT infrastructure. At least one aspect of the present disclosure is directed to systems and methods for using IT infrastructure documentation to facilitate the sales process by providing accurate estimates of the costs, benefits, and priorities of making changes. At least one aspect of the present disclosure is directed to systems and methods for facilitating the planning process for changes to IT infrastructure by using documentation to provide accurate assessments of the components that will be affected by the changes. At least one aspect of the present disclosure is directed to systems and methods for integrating IT infrastructure documentation with databases of external operations management systems to facilitate the same benefits in diagnosis, troubleshooting, risk management, and planning for operations management functions such as payroll, customer onboarding, and hiring.

At least one aspect of the present disclosure is directed to a system for managing information technology infrastructure. In some embodiments, the system includes a server including a processor and memory, a link generator executing on the server, and a search engine executing on the server. The server retrieves, from a database stored in the memory, a first data record for a first information technology asset and a second data record for a second technology asset, the first and the second information technology assets each comprising at least one of a computing device, a software application, an end user, a business unit, a piece of networking hardware, or an agreement for an information technology service. The server selects a first template for the first data record, the first template comprising a first relationship between the first data record and the second data record. The link generator generates, responsive to an update to the first data record via the first template, a second relationship between the first data record and the second data record, the second relationship different from the first relationship, the second relationship absent from the first template. The search engine identifies a third information technology asset and a fourth information technology asset that each satisfy the second relationship generated responsive to the update to the first data record, the third information technology asset associated with a third template and the fourth information technology asset associated with a fourth template. The search engine determines a first index of completeness for the third information technology asset, the first index of completeness based on a ratio between a number of complete fields of the third template and a total number of fields of the third template. The search engine determines, using the fourth template, a second index of completeness for the fourth information technology asset, the second index of completeness different from the first index of completeness. The search engine ranks the third information technology asset and the fourth information technology asset based on the first index of completeness and the second index of completeness to generate an ordered list of information technology assets that satisfy the second relationship. The server provides, via a network, the ordered list for display on a display device.

In some embodiments, the selecting of the first template is based on at least one of an identifier associated with the first information technology asset, a category of the first information technology asset, a product name associated with the first information technology asset, or an indication from a user interface generated by the server responsive based on the first information technology asset.

In some embodiments, the server is further configured to select a fifth template for the first data record, the fifth template comprising a first set of data fields. The server can be configure to select, responsive to an update to the first data record via the fifth template, a sixth template for the first data record, the sixth template comprising the first set of data fields and a second set of fields different from the first set of data fields.

In some embodiments, the first information technology asset comprises a software application. The second information technology asset comprises a computing device. The first relationship between the first data record and the second data record indicates that the first information technology asset is installed on the second information technology asset. The second relationship between the first data record and the second data record indicates that the first information technology asset requires the use of the second information technology asset in order to operate. The generating of the second relationship by the link generator is based on an indication that the first technology asset requires the use of a fifth information technology asset. The fifth information technology asset comprises a software application and the fifth information technology asset is installed on the second information technology asset.

In some embodiments, the first relationship between the first data record and the second data record indicates a first version identifier of the first information technology asset and a second version identifier of the second information technology asset. The second relationship between the first data record and the second data record indicates that the first information technology asset is incompatible with the second information technology asset. The generating of the second relationship by the link generator is based on a table of known incompatibilities indexed by the first version identifier and the second version identifier.

In some embodiments, the first information technology asset comprises a software application. The first relationship between the first data record and the second data record indicates that the first information technology asset requires the use of the second information technology asset in order to operate. The second relationship between the first data record and the second data record indicates a cost associated with a failure of the second information technology asset. The generating of the second relationship by the link generator is based on an indication of the criticality of the second information technology asset to the operation of the first information technology asset.

In some embodiments, the first index of completeness is larger than the second index of completeness. The ordered list ranks the second information technology asset lower than the first information technology asset.

In some embodiments, the search engine is further configured to generate, based on the first index of completeness, a notification. The server is further configured to notify an end user with the notification.

In some embodiments, the search engine is further configured to generate, responsive to identifying the third information technology asset, a notification. The server is further configured to notify an end user with the notification.

In some embodiments, the first information technology asset comprises an end user. The first relationship between the first data record and the second data record indicates that the first information technology asset utilizes the second information technology asset. The second relationship between the first data record and the second data record indicates a cost associated with a failure of the second information technology asset. The generating of the second relationship by the link generator is based on an indication at least one of the criticality of the second information technology asset to the first information technology asset, the salary of the first information technology asset, or the job function of the first information technology asset.

In some embodiments, the first relationship between the first data record and the second data record indicates that a first upgrade to the first information technology asset requires a second upgrade to the second information technology asset. The second relationship between the first data record and the second data record indicates a cost of the first upgrade. The generating of the second relationship by the link generator is based on the sum of a cost of a third upgrade of the first information technology asset and the cost of the second upgrade.

In some embodiments, the system further comprises a quoting engine executing on the server, the quoting engine configured to create a quote comprising the cost of the first upgrade. The server is further configured to provide, via a network, the quote for display on a second display device.

Another aspect of the present disclosure is directed to a method of managing information technology infrastructure. The method includes retrieving, by a processor of a server, from a database in memory, a first data record for a first information technology asset and a second data record for a second technology asset, the first and the second information technology assets each comprising at least one of a computing device, a software application, an end user, a business unit, a piece of networking hardware, or an agreement for an information technology service. The method includes selecting, by the server, a first template for the first data record, the first template comprising a first relationship between the first data record and the second data record. The method includes generating, by a link generator executing on the server, responsive to an update to the first data record via the first template, a second relationship between the first data record and the second data record, the second relationship different from the first relationship, the second relationship absent from the first template. The method includes identifying, by a search engine executing on the server, a third information technology asset and a fourth information technology asset that each satisfy the second relationship generated responsive to the update to the first data record, the third information technology asset associated with a third template and the fourth information technology asset associated with a fourth template. The method includes determining, by the search engine using the third template, a first index of completeness for the third information technology asset, the first index of completeness based on a ratio between a number of complete fields of the third template and a total number of fields of the third template. The method includes determining, by the search engine using the fourth template, a second index of completeness for the fourth information technology asset, the second index of completeness different from the first index of completeness. The method includes ranking, by the search engine, the third information technology asset and the fourth information technology asset based on the first index of completeness and the second index of completeness to generate an ordered list of information technology assets that satisfy the second relationship. The method includes providing, by the server via a network, the ordered list for display on a display device.

Yet another aspect of the present disclosure is directed to a non-transitory computer readable medium storing instructions that, when executed by one or more processors, facilitate managing information technology infrastructure. The instructions include instructions to retrieve, by a processor of a server, from a database in memory, a first data record for a first information technology asset and a second data record for a second technology asset, the first and the second information technology assets each comprising at least one of a computing device, a software application, an end user, a business unit, a piece of networking hardware, or an agreement for an information technology service. The instructions include instructions to select, by the server, a first template for the first data record, the first template comprising a first relationship between the first data record and the second data record. The instructions include instructions to generate, by a link generator executing on the server, responsive to an update to the first data record via the first template, a second relationship between the first data record and the second data record, the second relationship different from the first relationship, the second relationship absent from the first template. The instructions include instructions to identify, by a search engine executing on the server, a third information technology asset and a fourth information technology asset that each satisfy the second relationship generated responsive to the update to the first data record, the third information technology asset associated with a third template and the fourth information technology asset associated with a fourth template. The instructions include instructions to determine, by the search engine using the third template, a first index of completeness for the third information technology asset, the first index of completeness based on a ratio between a number of complete fields of the third template and a total number of fields of the third template. The instructions include instructions to determine, by the search engine using the fourth template, a second index of completeness for the fourth information technology asset, the second index of completeness different from the first index of completeness. The instructions include instructions to rank, by the search engine, the third information technology asset and the fourth information technology asset based on the first index of completeness and the second index of completeness to generate an ordered list of information technology assets that satisfy the second relationship. The instructions include instructions to provide, by the server via a network, the ordered list for display on a display device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 6G is an illustrative example of an embodiment of a user interface for viewing and managing a list of the roles played by components of a network in a company.

FIG. 23G is an illustrative example of an embodiment of a report for displaying information on documentation about a company.

FIG. 24B is an illustrative example of an embodiment of a user interface for viewing and updating configuration information for a network component on a professional services automation (PSA) system.

FIG. 24C is an illustrative example of an embodiment of a user interface for viewing information about applications and processes on a remote monitoring and management (RMM) system.

FIG. 26B is an illustrative example of an embodiment of a quote created for a company using a system for documenting, analyzing, and supporting information technology infrastructure.

Like reference numbers and designations in the various drawings indicate like elements.

DETAILED DESCRIPTION

Figure 1A:
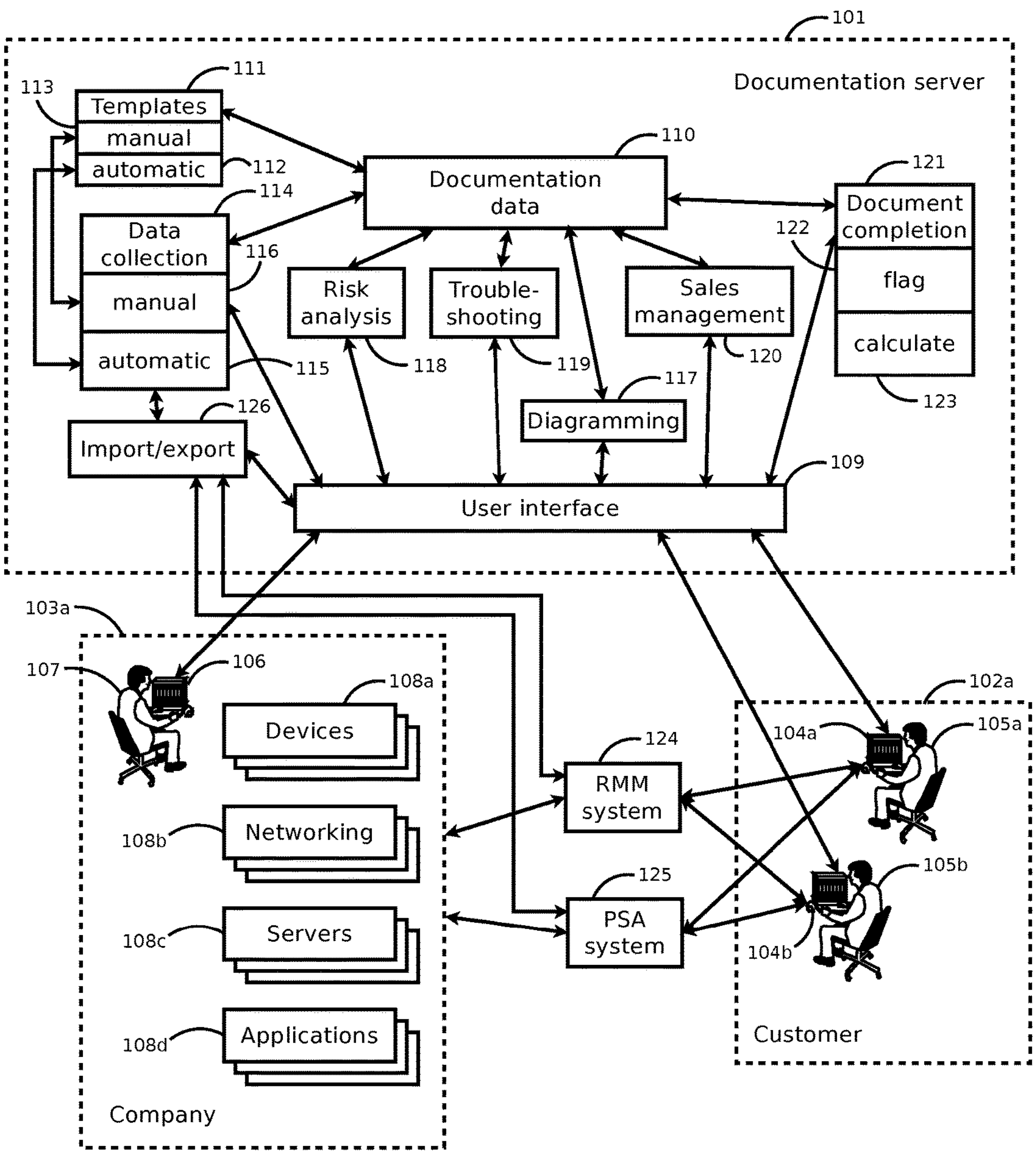
FIG. 1A is an illustrative block diagram of a system for documenting, analyzing, and supporting information technology infrastructure.

The system can support multiple IT administrators using multiple distinct accounts. Each account can be a user account, which can allow its user to manage the documentation of the IT infrastructure of multiple companies. An account can be an administrative account, which can also allow maintenance of the system itself.

The documentation for a company can include information about the company, for example, the company name, contact information, logo, and the service plan for the company. Each company can have documentation for its components, for example, business units, people, applications, and networks.

The documentation for business units can include information about business units in the company, for example, accounting, sales, marketing, support, development, executive, and administration. The information about business units can include, for example, the people in the business unit, the applications used by the business unit, and the relative importance of the applications used by the business unit.

The documentation for people can include information about people that are associated with the company, for example, employees, consultants, and board members. The information about people can include, for example, contact information, salaries, schedules, reporting relationships, and titles.

The documentation for applications can include information about software applications that are used by the company, for example, communications and messaging (such as email and instant messaging), phone system, general business and vertical, file sharing, print sharing, terminal services, remote access, websites, public domain names, file transfer protocol (FTP) services, email filtering, email security, email archiving, backup/disaster recovery, and anti-virus/anti-malware. The information about software applications can include, for example, business units using the application, identification, custom application information, backup locations, backup policies, client application details, support contract details, application roles, firewall rules, associated applications, general notes, highlighted risks, photographs and recordings, and associated files. The application roles can be customized per application, and can include identification, role type, and the host server on which the application runs.

The documentation for roles can include, for example information about roles played for the company by devices, applications, servers, and external services. The roles can be functions that may be required by applications. Each role can be a standalone role, which can serve as a function for one application. Each role can be a shared role, which can serve as a function for one or more applications. The information about roles played by applications for the company can include, for example, email applications and web application frameworks. The information about roles played by servers for the company can include, for example, database servers, fax servers, file servers, file transfer protocol (FTP) servers, print servers, simple message transfer protocol (SMTP) servers, web servers, and domain name service (DNS) servers. The information about roles played by external services for the company can include, for example, domain registration services and SMTP services.

The documentation for networks can include, for example, information about network segments that are used by the company. The information about network segments can include, for example, contact information for emergency support, servers in the network, networking equipment used by the network, and devices in the network.

The documentation for servers in the network can include, for example, information about physical servers and virtual servers. The information about physical servers can include, for example, identification, access credentials, network interfaces, operating system, backup locations, backup policies, hardware details, physical location, support and warranty, associated applications, roles for the server, general notes, highlighted risks, photographs and recordings, and associated files. The information about virtual servers can include, for example, identification, access credentials, virtual network interfaces, operating system, backup locations, backup policies, associated applications, roles for the virtual server, hardware details of the host physical server, physical location of the host physical server, support and warranty for the host physical server, general notes, highlighted risks, photographs and recordings, and associated files.

The documentation for networking equipment used by the network can include, for example, information about switches, firewalls, external network connections, wireless access points, and core network services used by the network.

The information about switches can include, for example, identification, access credentials, switch port and speed details, virtual local area network (VLAN) details, software and hardware configuration, backup locations, backup policies, hardware details, physical location, support and warranty, associated applications, associated roles, general notes, highlighted risks, photographs and recordings, associated files, and port information. The port information can include, for each port on the switch, the device or server connected to the port, the port number, the port speed, the VLAN, and the address.

The information about firewalls can include, for example, identification, access credentials, internal interfaces, demilitarized zone (DMZ) interfaces, external interfaces, configuration, backup locations, backup policies, firewall rules, hardware details, physical location, support and warranty, associated applications, associated roles, general notes, highlighted risks, photographs and recordings, and associated files.

The information about external network connections can include, for example, identification, access credentials, provider, circuit, type, speed, backup locations, backup policies, customer premise equipment details, physical location, support and warranty, associated applications, associated roles, general notes, highlighted risks, photographs and recordings, and associated files.

The information about wireless access points can include, for example, identification, access credentials, network details, wireless details, backup locations, backup policies, hardware details, physical location, support and warranty, general notes, highlighted risks, photographs and recordings, and associated files.

The information about core network services used by the network can include, for example, information about domain name service (DNS) servers, active directory (AD) servers, and dynamic host control protocol (DHCP) servers. One or more of these can include, for example, identification, associated addresses, associated domain names, backup locations, backup policies, the server hosting the service, associated applications, general notes, highlighted risks, photographs and recordings, and associated files.

The documentation for devices in the network can include, for example, information about printers, scanners, copiers, network attached storage (NAS) units, storage area networks (SANs), direct attached storage (DAS) units, external drives, uninterruptible power supply (UPS) units, power distribution units (PDUs), fax modems, digital video recorders (DVRs), and private business exchange (PBX) units.

The information about devices can include, for example, identification, access credentials, driver information, network information, backup locations, backup policies, hardware details, physical location, support and warranty, associated applications, associated roles, general notes, highlighted risks, photographs and recordings, and associated files.

In an illustrative example, an IT administrator may receive an urgent call from an employee at a company, indicating that the email system is not working. The IT administrator can look at the documentation for the affected company and quickly find the email application. The documentation on the email application can show some or all of the servers that could be involved, the other applications that could be involved, the devices that could be involved, and the networking equipment that could be involved. The documentation may not need to explicitly indicate all the associations with the email application. For example, the documentation may indicate that a database is installed on a specific database server, and the system may use the fact that the email application depends on the database to determine that the email application is associated with the database server. The system may be able to determine the dependency of the email application on the database by using a table of dependencies of known applications, or it may be able to automatically determine this dependency by observing the behavior of the email application over time. The documentation can quickly provide the credentials used to access the involved servers, devices, and networking equipment. The documentation can give quick access to the support and warranty information in case it is necessary to obtain customer support on the involved applications. The documentation can also provide known risks and notes on one or more of the involved components, as well as convenient access to additional documentation on the components. Having some or all of this information in one convenient place can facilitate the speed and efficiency of diagnosing, troubleshooting, and resolving the email problem, which can increase customer satisfaction and reduce down time.

In another illustrative example, an IT administrator can use the failure analysis provided by the documentation in order to review the potential cost of failures in the infrastructure, based on the impact on the people in the company who would be affected by each failure. The documentation may not explicitly represent the costs of the potential failing component. For example, the documentation may indicate the dependency of an application on the failing component, and the system may determine a cost contributed by that dependency based on the cost impact of the failure of the application. The system may determine this cost impact using estimates of the criticality of the application, the labor costs of the individuals using the application, or the job functions of the individuals using the application. For example, a critical application like a schedule manager may have a higher failure cost associated with it than a less critical application like an application for monitoring coffee usage in the office. Similarly, an application that is used by an entire department may have a higher failure cost associated with it than an application that is used by two engineers. In the same vein, an application that is used by attorneys may have a higher failure cost associated with it than an application that is used by administrative support staff. These estimates may be stored in another area in the structured documentation itself, or they may come from an external table of failure cost estimates. The system may determine or improve the failure cost estimates by observing the behavior and usage of applications over time. After identifying the failures with the greatest potential cost, the IT administrator can review the documentation for the components involved in the high-cost failures to understand what changes may be necessary to mitigate the failures, and to arrive at a cost estimate for implementing those changes. The customer may then be persuaded to hire the IT administrator to implement those changes, upon seeing the cost savings involved in preventing the costly failures.

In still another illustrative example, the IT administrator may want to change or update a component in the IT infrastructure. For example, the component may require an update to work with other components in the infrastructure, or the customer may desire a change in order to use a new feature of the component, or the component may require a change to mitigate a security issue. The IT administrator can use the documentation to facilitate the understanding of what other components may be affected by the change of this component, and can accurately predict the work that will be involved in the change. The system may be able to discover the requirement to upgrade the connected hardware or associated applications without the upgrade requirement being explicitly present in the documentation. For example, the documentation may contain versions for the component being upgraded, and also for connected components. The system may be able to use an incompatibility between two versions to determine that the connected components must be upgraded. For example, the system may discover that an upgrade to the database software will bring the database application to a version that is not compatible with the current version of the email application, and will then determine that the email application will also need to be upgraded. The system may be able to find the incompatibility information in a support database that lists known incompatibilities and indexes them using versions. In this way, the IT administrator can avoid the situation where the change may cause an unexpected failure in another part of the IT infrastructure, and therefore may cause unexpected cost and delay for the customer. The result may be to increase customer confidence and satisfaction in the service provided by the IT administrator.

FIG. 1A is an illustrative block diagram of a system for documenting, analyzing, and supporting information technology infrastructure. A documentation server 101 can be used to store documentation data 110 about a company 103*a*. The documentation data 110 can represent information about the network components 108*a*-108*d* at the company 103*a*. The network components 108*a*-108*d* can include, for example, devices 108*a*, networking components 108*b*, servers 108*c*, and applications 108*d*. Technicians 105*a*-105*b* at a customer 102*a* can use devices 104*a*-104*b* to access a user interface module 109 on the documentation server 101 to update data, initiate actions, and view results. An individual 107 at the company 103*a* can use a device 106 to access a user interface module 109 on the documentation server 101 to update data, initiate actions, and view results. The customer 102*a* may use a remote monitoring and management (RMM) system 124 to facilitate monitoring and managing the network components at the company 103*a*. The customer 102*a* may use a professional services automation (PSA) system 125 to facilitate managing operations management for the company 103*a*.

A data collection module 114 can collect information about the company 103*a* and store the information in the documentation data 110. A manual data collection module 116 can collect information from the user interface module 109, and an automatic data collection module 115 can use the import/export module 126 to collect information from an RMM system 124 and a PSA system 125. The data collection module 114 may use a template module 111 to facilitate data collection. The template module 111 may contain manual templates 113 that can facilitate the collection of documentation through the user interface module 109 by technicians 105*a*-105*b* and by an individual 107 at the company 103*a*. The template module 111 may contain automatic templates 112 that can facilitate the collection of documentation by an RMM system 124 and a PSA system 125 using the import/export module 126. The automatic templates 112 may be scripts that can run on an RMM system 124 and a PSA system 125.

A documentation completion module 121 can determine the state of completion of the documentation data 110. The documentation completion module 121 can contain a flag component 122 that may be controlled by the user interface 109 or by the documentation data 110 and can indicate that an item of documentation is incomplete. The documentation completion module 121 can contain a calculation component 123 that can respond to queries about the completion status of the documentation data 110, such as the percentage complete for the documentation data 110 or specified subsets of the documentation data 110.

A diagramming module 117 can use the documentation data 110 to provide displays of the documentation data 110 through the user interface 109. A risk analysis module 118 can analyze the documentation data 110 for data on risk factors in the documentation data 110, such as the monetary value of lost work that would be caused by the failure of a network component at the company 103*a*, and present the results of the risk analysis through the user interface module 109. A troubleshooting module 119 can analyze the documentation data 110 for cause-effect relationships that may facilitate the technicians 105*a*-105*b* or the individual 107 at the company 103*a* to find the causes for problems at the company 103*a*, and present the results of the troubleshooting analysis through the user interface module 109. A sales management module 120 can analyze the documentation data 110 for recommendations about services and products for the company 103*a*, and present the results of the sales analysis through the user interface module 109.

The network can include a local-area network (LAN), such as a company Intranet, a metropolitan area network (MAN), or a wide area network (WAN), such as the Internet or the World Wide Web. In some embodiments, there are multiple networks between the devices and the servers. In one of these embodiments, the network may be a public network, a private network, or may include combinations of public and private networks.

The network may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network may include a wireless link, such as an infrared channel or satellite band. The topology of the network may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some embodiments, different types of data may be transmitted via different protocols. In other embodiments, the same types of data may be transmitted via different protocols.

The one or more servers associated with the documentation server system 101, RMM system 124, PSA system 125, customer devices 104*a*-104*b*, company device 106, devices 108*a*, networking equipment 108*b*, or servers 108*c* do not need to be physically proximate to each other or in the same machine farm. Thus, the servers logically grouped as a machine farm may be interconnected using a wide-area network (WAN) connection or a metropolitan-area network (MAN) connection. For example, a machine farm may include servers physically located in different continents or different regions of a continent, country, state, city, campus, or room. Data transmission speeds between servers in the machine farm can be increased if the servers are connected using a local-area network (LAN) connection or some form of direct connection.

Management of the servers may be de-centralized. For example, one or more servers may comprise components, subsystems and circuits to support one or more management services. In one of these embodiments, one or more servers provide functionality for management of dynamic data, including techniques for handling failover, data replication, and increasing robustness. Each server may communicate with a persistent store and, in some embodiments, with a dynamic store.

A server may include a file server, application server, web server, proxy server, appliance, network appliance, gateway, gateway, gateway server, virtualization server, deployment server, secure sockets layer virtual private network ("SSL VPN") server, or firewall. In one embodiment, the server may be referred to as a remote machine or a node. In one embodiment, the server may be referred to as a cloud.

The system and its components, such as a documentation server system 101, RMM system 124, PSA system 125, customer devices 104*a*-104*b*, company device 106, devices 108*a*, networking equipment 108*b*, servers 108*c*, applications 108*d*, and modules 109, 110, 111, 114, 117, 118, 119, 120, 121, 126, may include hardware elements, such as one or more processors, logic devices, or circuits. For example, the system and its components may include a bus or other communication component for communicating information and a processor or processing circuit coupled to the bus for processing information. The hardware elements can also include one or more processors or processing circuits coupled to the bus for processing information. The system also includes main memory, such as a random access memory (RAM) or other dynamic storage device, coupled to the bus for storing information, and instructions to be executed by the processor. Main memory can also be used for storing position information, temporary variables, or other intermediate information during execution of instructions by the processor. The system may further include a read only memory (ROM) or other static storage device coupled to the bus for storing static information and instructions for the processor. A storage device, such as a solid-state device, magnetic disk or optical disk, can be coupled to the bus for persistently storing information and instructions.

The system and its components, such as a documentation server system 101, RMM system 122, PSA system 123, customer devices 104*a*-104*b*, company device 106, devices 108*a*, networking equipment 108*b*, servers 108*c*, applications 108*d*, and modules 109, 110, 111, 114, 117, 118, 119, 120, 121, 126, may include, e.g., computing devices, desktop computers, laptop computers, notebook computers, mobile or portable computing devices, tablet computers, smartphones, personal digital assistants, or any other computing device.

According to various embodiments, the processes described herein can be implemented by the system or hardware components in response to the one or more processors executing an arrangement of instructions contained in memory. Such instructions can be read into memory from another computer-readable medium, such as a storage device. Execution of the arrangement of instructions contained in memory causes the system to perform the illustrative processes described herein. One or more processors in a multi-processing arrangement may also be employed to execute the instructions contained in memory. In alternative embodiments, hard-wired circuitry may be used in place of or in combination with software instructions to effect illustrative embodiments. Thus, embodiments are not limited to any specific combination of hardware circuitry and software. To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Figure 1B:
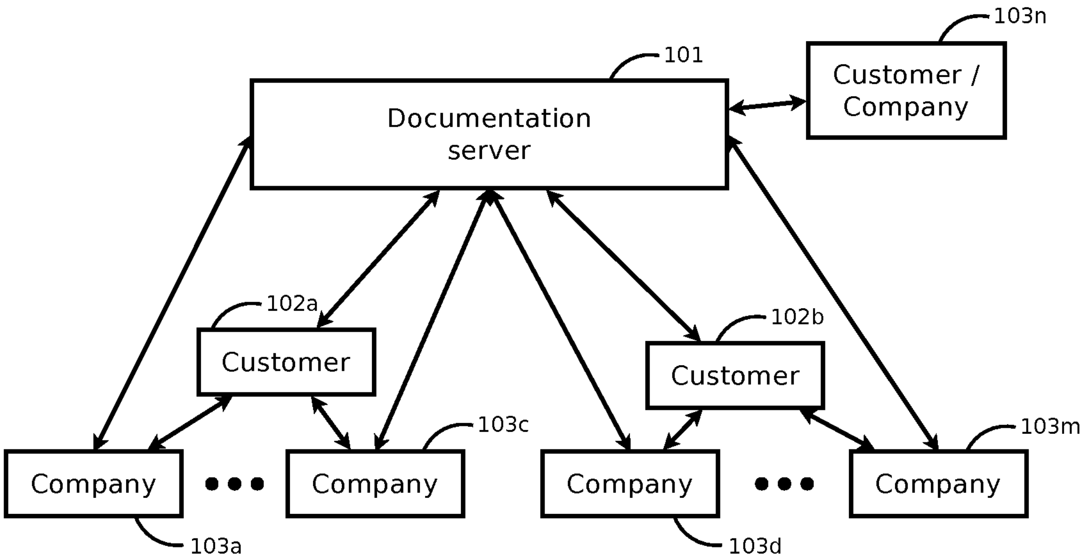
FIG. 1B is an illustrative block diagram of a system for documenting, analyzing, and supporting information technology infrastructure for multiple companies, using support services from multiple customers.

FIG. 1B is an illustrative block diagram of a system for documenting, analyzing, and supporting information technology infrastructure for multiple companies, using support services from multiple customers. A documentation server 101 can be used by a customer 102*a* as described with respect to FIG. 1A, and another customer 102*b* can use the documentation server 101 in the same way as described with respect to FIG. 1A. The customer 102*a* can support a company 103*a* as described with respect to FIG. 1A, and can use the documentation server 101 to support additional companies such as 103*c* in the same way as described with respect to FIG. 1A. The customer 102*b* can use the documentation server 101 to support companies such as 103*d*-103*m*. In this way, multiple customers 102*a*-102*b* can use a documentation server 101 to support multiple companies 103*a*-103*m*. In addition, a company 103*n* may also be a customer 103*n* and can use a documentation server 101 to support itself as a customer.

Figure 1C:
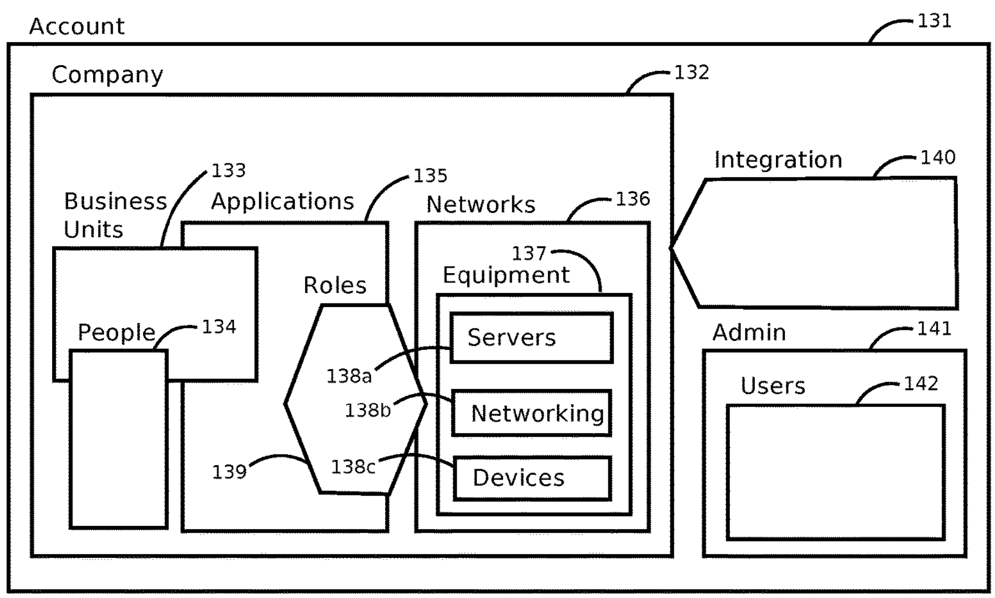
FIG. 1C is an illustrative block diagram of the data components of a system for documenting, analyzing, and supporting information technology infrastructure; and the relationships between the data components.

FIG. 1C is an illustrative block diagram of the data components of a system for documenting, analyzing, and supporting information technology infrastructure, and the relationships between the data components. An account 131 can represent the data available to a customer 102*a* or other individual 107 using the system, as described with respect to FIG. 1A. A company 132 can be the collection of some or all of the documentation for a company 103*a*, as described with respect to FIG. 1A. A customer 102*a*, as described with respect to FIG. 1A, may have access to more than one company 132. An individual 107, as described with respect to FIG. 1A, may only have access to one company 132. A business unit 133 can represent a logical division of a company 132. For example, a business unit 133 can be a department in a company 132, or a geographic location of the company 132. People 134 can represent individuals who are associated with a company 132, for example, employees, contractors, consultants, and so on. People 134 may or may not be associated with a business unit 133 in a company 132.

Applications 135 can be software solutions that people 134 can access directly, and can have multiple back-end components that make the applications work. Applications 135 can be identified by three primary pieces of information: name, platform, and version. Name can be what the application 135 is commonly called by people 134. Platform can be the core of the application 135, which may the server software or cloud service running the application 135. Version can be the version number or other identification for the platform. For example, an email solution may have the name "Email", the platform "EXCHANGE", and the version "2013". Applications 135 may fall into categories, which may include communications and messaging (email, instant messaging, etc.), phone system, general business and vertical, file sharing, print sharing, terminal services, remote access, websites, public domain names, file transfer protocol (FTP) services, email filtering, email security, email archiving, backup/disaster recovery, and antivirus/antimalware.

Networks 136 can be a collection of equipment 137, core networking services such as domain name service (DNS) services, dynamic host control protocol (DHCP) services, and Active Directory (AD) services, and the connectivity that connects the equipment and core networking services together. A company 132 may have multiple networks 136. Equipment 137 can be a collection of servers 138*a*, networking devices 138*b*, and other devices 138*c*. Servers 138*a* can be general purpose computing devices that may be used by multiple people 134 and multiple applications 135. Networking equipment 138*b* can be computing devices that are designed for facilitating connecting together multiple types of computing devices in a computer network. Devices

138*c* can be equipment other than servers and networking devices that are used by a company 132. For example, devices 138*c* may include printers, scanners, copiers, network attached storage (NAS) devices, storage area network (SAN) devices, direct attached storage (DAS) devices, external drives, uninterruptible power supply (UPS) devices, power distribution unit (PDU) devices, fax modems, digital video recorder (DVR) devices, and private branch exchange (PBX) devices.

Roles 139 can be components that make up an application 135, and can serve to describe the relationship of an application 135 to the equipment 137 that the application runs on. A role 139 can be stand-alone, shared, or another application 135. A stand-alone role 139 can be a component of an application 135 that is only part of that one application 135, for example, a MICROSOFT EXCHANGE mailbox server. A stand-alone role 139 may be hosted by a local server 138*a*. A shared role 139 may make be a component that is used by more than one application 135 at the same time; for example, a MICROSOFT EXCHANGE front-end server uses the web server internet information service (IIS), which may be used by other web-based applications 135 at the same time. In this example, the role 139 may be called "front end server". Continuing the example, the web server IIS can be called an infrastructure role 139, and the infrastructure role 139 "IIS" is playing the role 139 of "front end server". An infrastructure role 139 may be hosted by a local server 138*a*, or the infrastructure role 139 may be hosted outside the company 132. An application 135 may make use of another application 135, for example, an application 135 may make use of file sharing, which is another application 135, or an application 135 may make use of email, which is another application 135.

Integration 140 may be used to interface external sources of information, for example, an RMM system 124 or a PSA system 125 as described with respect to FIG. 1A. The integration 140 may be done in such a way as to allow updates from the external sources when the updates are available, without additional manual intervention.

The users 142 can represent end users who may have access to the documentation server 101, for example, the technicians 105*a*-105*b* and the individual 107 at the company 103*a* as described with respect to FIG. 1A. The administrative users 141 can have additional capabilities for setting up and maintaining the documentation server 101.

Figure 1D:
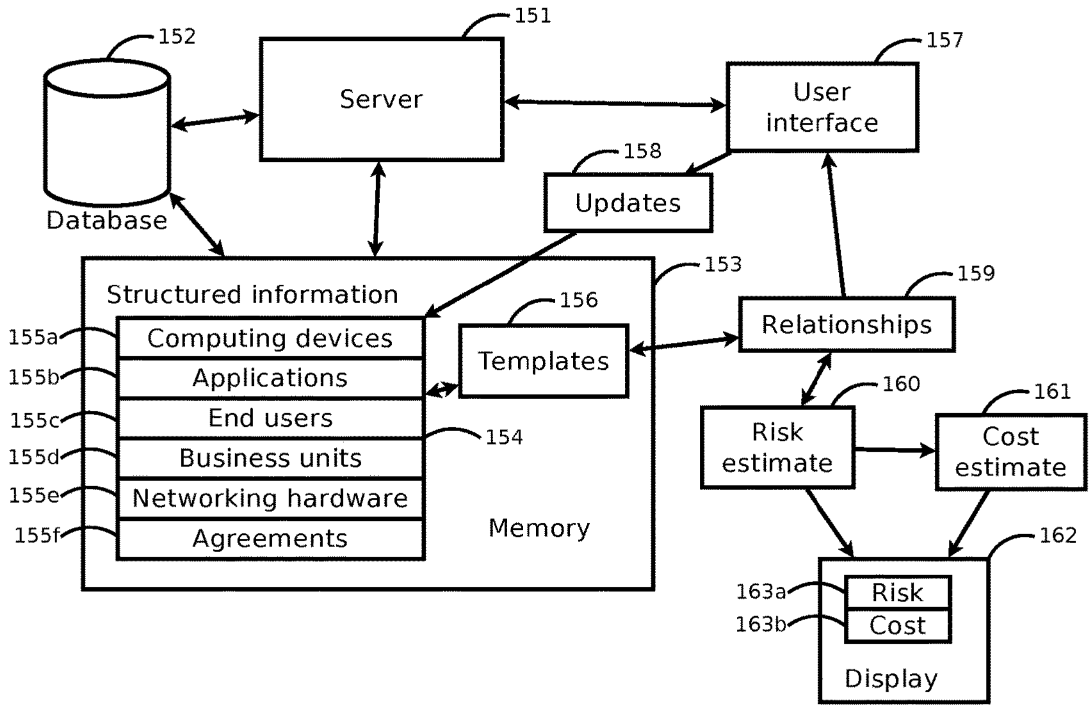
FIG. 1D is an illustrative block diagram of a system for documenting, analyzing, and supporting information technology infrastructure; displaying a risk estimate and a cost estimate.

FIG. 1D is an illustrative block diagram of a system for documenting, analyzing, and supporting information technology infrastructure; displaying a risk estimate and a cost estimate. The server 151 can access the database 152 and retrieve, into memory 153, structured information 154 about assets in information technology (IT) infrastructure, which can include information about computing devices 155*a*, applications 155*b*, end users 155*c*, business units 155*d*, networking hardware 155*e*, and agreements 155*f*. The server 151 can also retrieve into memory 153 templates 156 that can describe relationships 159 within the structured information 154. The server 151 can use the templates 156 and relationships 159 to create a user interface 157 that can display a representation of the structured information 154 and receive updates 158. The server 151 can apply the updates 158 to the structured information 154. The server 151 can use the relationships 159 along with the structured information 154 to calculate an estimate 160 of the risk associated with the failure of one or more assets in the IT infrastructure, and can use the risk estimate 160 along with the structured information 154 to calculate an estimate 161 of the cost associated with the failure of one or more assets in the IT infrastructure. The server 151 can create a display 162 that can include a representation 163*a* of the risk estimate 160 and a representation 163*b* of the cost estimate 161.

In some embodiments, the server 151 in FIG. 1D can include components or functionality of the documentation server 101 as described with respect to FIG. 1A. In some embodiments, the structured information 154 in FIG. 1D can include components or functionality of the documentation data 110 as described with respect to FIG. 1A. In some embodiments, the templates 156 in FIG. 1D can include components or functionality of the templates 111 as described with respect to FIG. 1A. In some embodiments, the user interface 157 in FIG. 1D can include components or functionality of the user interface 109 as described with respect to FIG. 1A. In some embodiments, the updates 158 in FIG. 1D can include components or functionality of the manual data collection 116 as described with respect to FIG. 1A. In some embodiments, the risk estimate 160 in FIG. 1D can include components or functionality of the risk analysis 118 as described with respect to FIG. 1A. In some embodiments, the cost estimate 161 in FIG. 1D can include components or functionality of the sales management 120 as described with respect to FIG. 1A. In some embodiments, the display 162 in FIG. 1D can include components or functionality of the displays 106 and 104*a*-104*b* as described with respect to FIG. 1A.

Figure 1E:
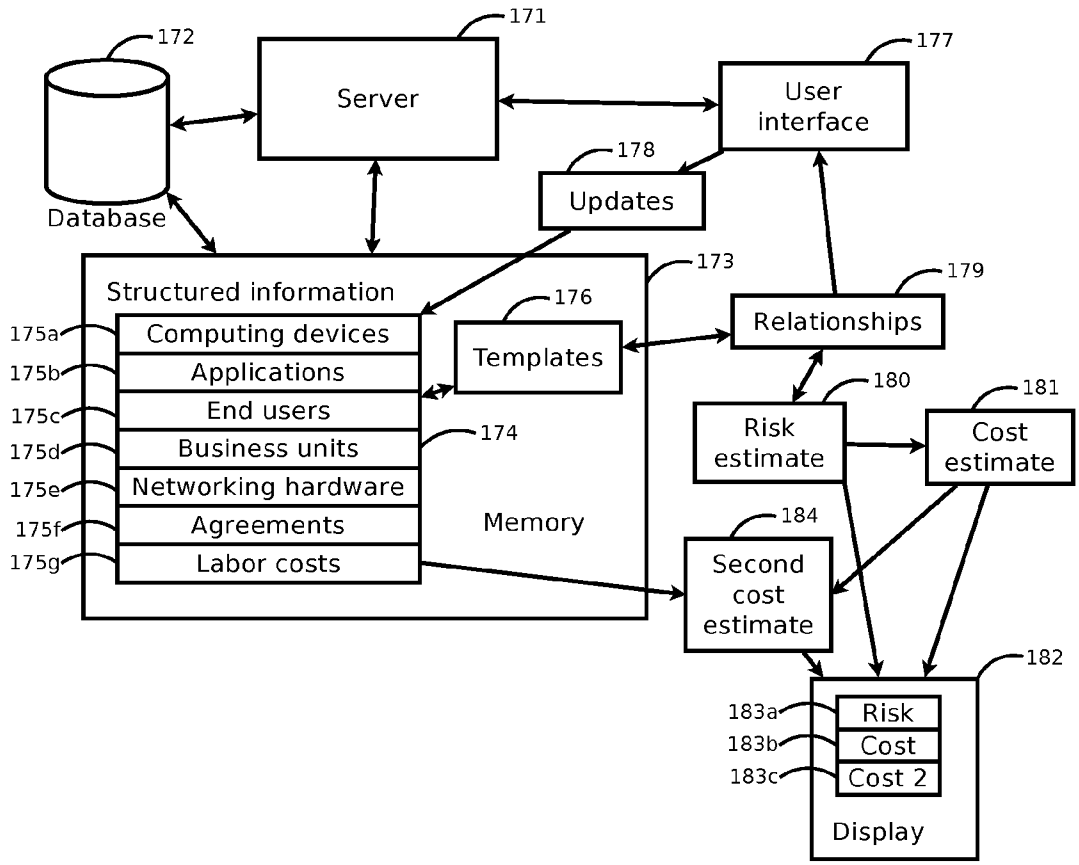
FIG. 1E is an illustrative block diagram of a system for documenting, analyzing, and supporting information technology infrastructure; displaying a risk estimate, a cost estimate, and a second cost estimate.

FIG. 1E is an illustrative block diagram of a system for documenting, analyzing, and supporting information technology infrastructure; displaying a risk estimate, a cost estimate, and a second cost estimate. The server 171 can access the database 172 and retrieve, into memory 173, structured information 174 about assets in information technology (IT) infrastructure, which can include information about computing devices 175*a*, applications 175*b*, end users 175*c*, business units 175*d*, networking hardware 175*e*, agreements 175*f*, and labor costs 175*g*. The server 171 can also retrieve into memory 173 templates 176 that can describe relationships 179 within the structured information 174. The server 171 can use the templates 176 and relationships 179 to create a user interface 177 that can display a representation of the structured information 174 and receive updates 178. The server 171 can apply the updates 178 to the structured information 174. The server 171 can use the relationships 179 along with the structured information 174 to calculate an estimate 180 of the risk associated with the failure of one or more assets in the IT infrastructure, and can use the risk estimate 180 along with the structured information 174 to calculate an estimate 181 of the cost associated with the failure of one or more assets in the IT infrastructure. The server 171 can use the cost estimate 181 along with the labor costs 175*g* in the structured information 174 to calculate an estimate 184 of the opportunity cost associated with labor under-utilization caused by the failure of one or more assets in the IT infrastructure. The server 171 can create a display 182 that can include a representation 183*a* of the risk estimate 180, a representation 183*b* of the cost estimate 181, and a representation 183*c* of the second cost estimate 184 of the opportunity cost.

In some embodiments, the server 171 in FIG. 1E can include components or functionality of the server 151 as described with respect to FIG. 1D. In some embodiments, the database 172 in FIG. 1E can include components or functionality of the database 152 as described with respect to FIG. 1D. In some embodiments, the memory 173 in FIG. 1E can include components or functionality of the memory 153 as described with respect to FIG. 1D. In some embodiments, the structured information 174 in FIG. 1E can include components or functionality of the structured information 154 as described with respect to FIG. 1D. In some embodiments, the data elements 175*a*-175*f* in FIG. 1E can include components or functionality of the data elements 155*a*-155*f* as described with respect to FIG. 1D. In some embodiments, the templates 176 in FIG. 1E can include components or functionality of the templates 156 as described with respect to FIG. 1D. In some embodiments, the user interface 177 in FIG. 1E can include components or functionality of the user interface 157 as described with respect to FIG. 1D. In some embodiments, the updates 178 in FIG. 1E can include components or functionality of the updates 158 as described with respect to FIG. 1D. In some embodiments, the relationships 179 in FIG. 1E can include components or functionality of the relationships 159 as described with respect to FIG. 1D. In some embodiments, the risk estimate 180 in FIG. 1E can include components or functionality of the risk estimate 160 as described with respect to FIG. 1D. In some embodiments, the cost estimate 181 in FIG. 1E can include components or functionality of the cost estimate 161 as described with respect to FIG. 1D. In some embodiments, the display 182 in FIG. 1E can include components or functionality of the display 162 as described with respect to FIG. 1D. In some embodiments, the display elements 183*a*-183*b* in FIG. 1E can include components or functionality of the display elements 163*a*-163*b* as described with respect to FIG. 1D. In some embodiments, the second cost estimate 184 in FIG. 1E can include components or functionality of the sales management 120 as described with respect to FIG. 1A.

Figure 1F:
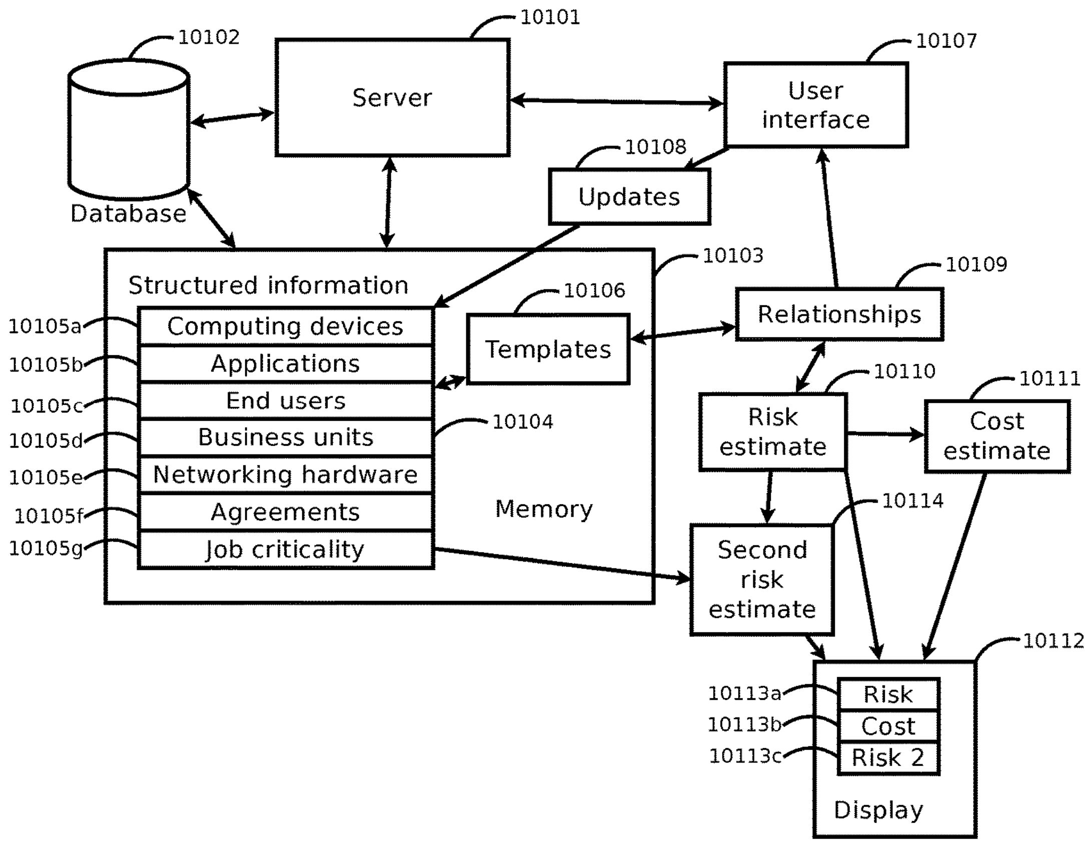
FIG. 1F is an illustrative block diagram of a system for documenting, analyzing, and supporting information technology infrastructure; displaying a risk estimate, a cost estimate, and a second risk estimate.

FIG. 1F is an illustrative block diagram of a system for documenting, analyzing, and supporting information technology infrastructure; displaying a risk estimate, a cost estimate, and a second risk estimate. The server 10101 can access the database 10102 and retrieve, into memory 10103, structured information 10104 about assets in information technology (IT) infrastructure, which can include information about computing devices 10105*a*, applications 10105*b*, end users 10105*c*, business units 10105*d*, networking hardware 10105*e*, agreements 10105*f*, and job criticality 10105*g*. The server 10101 can also retrieve into memory 10103 templates 10106 that can describe relationships 10109 within the structured information 10104. The server 10101 can use the templates 10106 and relationships 10109 to create a user interface 10107 that can display a representation of the structured information 10104 and receive updates 10108. The server 10101 can apply the updates 10108 to the structured information 10104. The server 10101 can use the relationships 10109 along with the structured information 10104 to calculate an estimate 10110 of the risk associated with the failure of one or more assets in the IT infrastructure, and can use the risk estimate 10110 along with the structured information 10104 to calculate an estimate 10111 of the cost associated with the failure of one or more assets in the IT infrastructure. The server 10101 can use the risk estimate 10110 along with the job criticality 10105*g* in the structured information 10104 to calculate an estimate 10114 of the weighted risk associated with the failure of one or more assets in the IT infrastructure. The server 10101 can create a display 10112 that can include a representation 10113*a* of the risk estimate 10110, a representation 10113*b* of the cost estimate 10111, and a representation 10113*c* of the weighted risk estimate 10114.

In some embodiments, the server 10101 in FIG. 1F can include components or functionality of the server 151 as described with respect to FIG. 1D. In some embodiments, the database 10102 in FIG. 1F can include components or functionality of the database 152 as described with respect to FIG. 1D. In some embodiments, the memory 10103 in FIG. 1F can include components or functionality of the memory 153 as described with respect to FIG. 1D. In some embodiments, the structured information 10104 in FIG. 1F can include components or functionality of the structured information 154 as described with respect to FIG. 1D. In some embodiments, the data elements 10105*a*-10105*f* in FIG. 1F can include components or functionality of the data elements 155*a*-155*f* as described with respect to FIG. 1D. In some embodiments, the templates 10106 in FIG. 1F can include components or functionality of the templates 156 as described with respect to FIG. 1D. In some embodiments, the user interface 10107 in FIG. 1F can include components or functionality of the user interface 157 as described with respect to FIG. 1D. In some embodiments, the updates 10108 in FIG. 1F can include components or functionality of the updates 158 as described with respect to FIG. 1D. In some embodiments, the relationships 10109 in FIG. 1F can include components or functionality of the relationships 159 as described with respect to FIG. 1D. In some embodiments, the risk estimate 10110 in FIG. 1F can include components or functionality of the risk estimate 160 as described with respect to FIG. 1D. In some embodiments, the cost estimate 10111 in FIG. 1F can include components or functionality of the cost estimate 161 as described with respect to FIG. 1D. In some embodiments, the display 10112 in FIG. 1F can include components or functionality of the display 162 as described with respect to FIG. 1D. In some embodiments, the display elements 10113*a*-10113*b* in FIG. 1F can include components or functionality of the display elements 163*a*-163*b* as described with respect to FIG. 1D. In some embodiments, the second risk estimate 10114 in FIG. 1F can include components or functionality of the risk analysis 118 as described with respect to FIG. 1A.

Figure 1G:
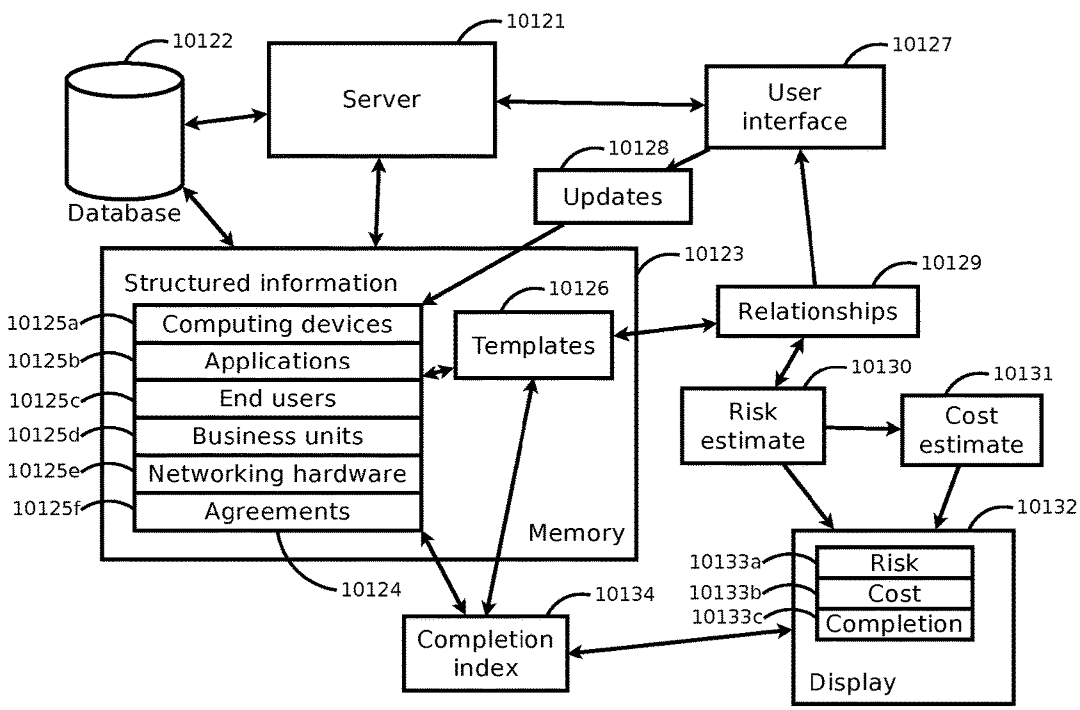
FIG. 1G is an illustrative block diagram of a system for documenting, analyzing, and supporting information technology infrastructure; displaying a risk estimate, a cost estimate, and a completion index.

FIG. 1G is an illustrative block diagram of a system for documenting, analyzing, and supporting information technology infrastructure; displaying a risk estimate, a cost estimate, and a completion index. The server 10121 can access the database 10122 and retrieve, into memory 10123, structured information 10124 about assets in information technology (IT) infrastructure, which can include information about computing devices 10125*a*, applications 10125*b*, end users 10125*c*, business units 10125*d*, networking hardware 10125*e*, and agreements 10125*f*. The server 10121 can also retrieve into memory 10123 templates 10126 that can describe relationships 10129 within the structured information 10124. The server 10121 can use the templates 10126 and relationships 10129 to create a user interface 10127 that can display a representation of the structured information 10124 and receive updates 10128. The server 10121 can apply the updates 10128 to the structured information 10124. The server 10121 can use the relationships 10129 along with the structured information 10124 to calculate an estimate 10130 of the risk associated with the failure of one or more assets in the IT infrastructure, and can use the risk estimate 10130 along with the structured information 10124 to calculate an estimate 10131 of the cost associated with the failure of one or more assets in the IT infrastructure. The server 10121 can use the templates 10126 to indicate optional and required information for describing the structured information 10124 for the assets in the IT infrastructure, and can calculate an index 10134 indicating how much of the description of the information is complete. The server 10121 can create a display 10132 that can include a representation 10133*a* of the risk estimate 10130, a representation

10133*b* of the cost estimate 10131, and a representation 10133*c* of the completion index 10134.

In some embodiments, the server 10121 in FIG. 1G can include components or functionality of the server 151 as described with respect to FIG. 1D. In some embodiments, the database 10122 in FIG. 1G can include components or functionality of the database 152 as described with respect to FIG. 1D. In some embodiments, the memory 10123 in FIG. 1G can include components or functionality of the memory 153 as described with respect to FIG. 1D. In some embodiments, the structured information 10124 in FIG. 1G can include components or functionality of the structured information 154 as described with respect to FIG. 1D. In some embodiments, the data elements 10125*a*-10125*f* in FIG. 1G can include components or functionality of the data elements 155*a*-155*f* as described with respect to FIG. 1D. In some embodiments, the templates 10126 in FIG. 1G can include components or functionality of the templates 156 as described with respect to FIG. 1D. In some embodiments, the user interface 10127 in FIG. 1G can include components or functionality of the user interface 157 as described with respect to FIG. 1D. In some embodiments, the updates 10128 in FIG. 1G can include components or functionality of the updates 158 as described with respect to FIG. 1D. In some embodiments, the relationships 10129 in FIG. 1G can include components or functionality of the relationships 159 as described with respect to FIG. 1D. In some embodiments, the risk estimate 10130 in FIG. 1G can include components or functionality of the risk estimate 160 as described with respect to FIG. 1D. In some embodiments, the cost estimate 10131 in FIG. 1G can include components or functionality of the cost estimate 161 as described with respect to FIG. 1D. In some embodiments, the display 10132 in FIG. 1G can include components or functionality of the display 162 as described with respect to FIG. 1D. In some embodiments, the display elements 10133*a*-10133*b* in FIG. 1G can include components or functionality of the display elements 163*a*-163*b* as described with respect to FIG. 1D. In some embodiments, the completion index 10134 in FIG. 1G can include components or functionality of the documentation completion module 121 as described with respect to FIG. 1A.

Figure 1H:
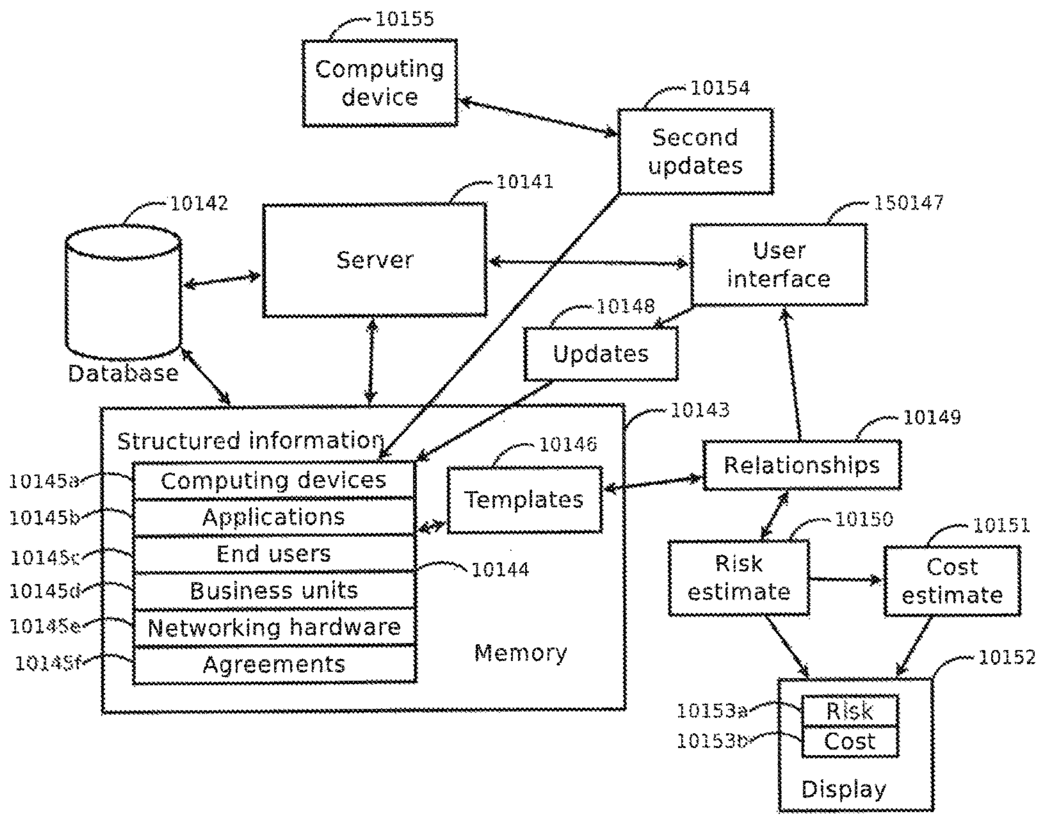
FIG. 1H is an illustrative block diagram of a system for documenting, analyzing, and supporting information technology infrastructure; displaying a risk estimate and a cost estimate; and processing updates received from a computing device.

FIG. 1H is an illustrative block diagram of a system for documenting, analyzing, and supporting information technology infrastructure; displaying a risk estimate and a cost estimate; and processing updates received from a computing device. The server 10141 can access the database 10142 and retrieve, into memory 10143, structured information 10144 about assets in information technology (IT) infrastructure, which can include information about computing devices 10145*a*, applications 10145*b*, end users 10145*c*, business units 10145*d*, networking hardware 10145*e*, and agreements 10145*f*. The server 10141 can also retrieve into memory 10143 templates 10146 that can describe relationships 10149 within the structured information 10144. The server 10141 can use the templates 10146 and relationships 10149 to create a user interface 10147 that can display a representation of the structured information 10144 and receive updates 10148. The server 10141 can apply the updates 10148 to the structured information 10144. The server 10141 can receive a second set of updates 10154 from a computing device 10155, and apply the second updates 10154 to the structured information 10144. The second updates 10154 may be received from an agent running on the computing device 10155. The server 10141 can use the relationships 10149 along with the structured information 10144 to calculate an estimate 10150 of the risk associated with the failure of one or more assets in the IT infrastructure, and can use the risk estimate 10150 along with the structured information 10144 to calculate an estimate 10151 of the cost associated with the failure of one or more assets in the IT infrastructure. The server 10141 can create a display 10152 that can include a representation 10153*a* of the risk estimate 10150 and a representation 10153*b* of the cost estimate 10151.

In some embodiments, the server 10141 in FIG. 1H can include components or functionality of the server 151 as described with respect to FIG. 1D. In some embodiments, the database 10142 in FIG. 1H can include components or functionality of the database 152 as described with respect to FIG. 1D. In some embodiments, the memory 10143 in FIG. 1H can include components or functionality of the memory 153 as described with respect to FIG. 1D. In some embodiments, the structured information 10144 in FIG. 1H can include components or functionality of the structured information 154 as described with respect to FIG. 1D. In some embodiments, the data elements 10145*a*-10145*f* in FIG. 1H can include components or functionality of the data elements 155*a*-155*f* as described with respect to FIG. 1D. In some embodiments, the templates 10146 in FIG. 1H can include components or functionality of the templates 156 as described with respect to FIG. 1D. In some embodiments, the user interface 10147 in FIG. 1H can include components or functionality of the user interface 157 as described with respect to FIG. 1D. In some embodiments, the updates 10148 in FIG. 1H can include components or functionality of the updates 158 as described with respect to FIG. 1D. In some embodiments, the relationships 10149 in FIG. 1H can include components or functionality of the relationships 159 as described with respect to FIG. 1D. In some embodiments, the risk estimate 10150 in FIG. 1H can include components or functionality of the risk estimate 160 as described with respect to FIG. 1D. In some embodiments, the cost estimate 10151 in FIG. 1H can include components or functionality of the cost estimate 161 as described with respect to FIG. 1D. In some embodiments, the display 10152 in FIG. 1H can include components or functionality of the display 162 as described with respect to FIG. 1D. In some embodiments, the display elements 10153*a*-10153*b* in FIG. 1H can include components or functionality of the display elements 163*a*-163*b* as described with respect to FIG. 1D. In some embodiments, the second updates 10154 in FIG. 1H can include components or functionality of the import/export module 126 and the automatic data collection module 115 as described with respect to FIG. 1A. In some embodiments, the computing device 10155 in FIG. 1H can include components or functionality of the devices 108*a*, the networking equipment 108*b*, and the servers 108*c* as described with respect to FIG. 1A.

Figure 1I:
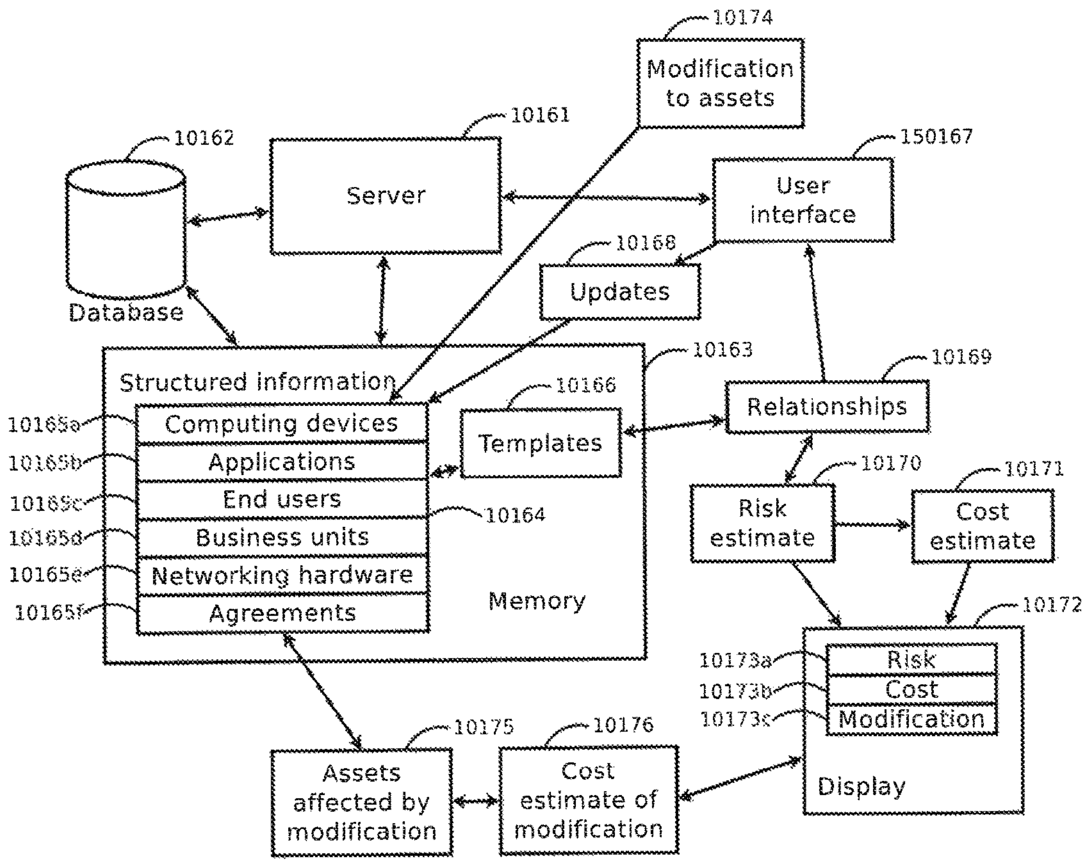
FIG. 1I is an illustrative block diagram of a system for documenting, analyzing, and supporting information technology infrastructure; displaying a risk estimate, a cost estimate, and a cost estimate of a modification to the information technology infrastructure.

FIG. 1I is an illustrative block diagram of a system for documenting, analyzing, and supporting information technology infrastructure; displaying a risk estimate, a cost estimate, and a cost estimate of a modification to the information technology infrastructure. The server 10161 can access the database 10162 and retrieve, into memory 10163, structured information 10164 about assets in information technology (IT) infrastructure, which can include information about computing devices 10165*a*, applications 10165*b*, end users 10165*c*, business units 10165*d*, networking hardware 10165*e*, and agreements 10165*f*. The server 10161 can also retrieve into memory 10163 templates 10166 that can describe relationships 10169 within the structured information 10164. The server 10161 can use the templates 10166 and relationships 10169 to create a user interface 10167 that can display a representation of the structured information

10164 and receive updates 10168. The server 10161 can apply the updates 10168 to the structured information 10164. The server 10161 can use the relationships 10169 along with the structured information 10164 to calculate an estimate 10170 of the risk associated with the failure of one or more assets in the IT infrastructure, and can use the risk estimate 10170 along with the structured information 10164 to calculate an estimate 10171 of the cost associated with the failure of one or more assets in the IT infrastructure. The server 10161 can receive a modification 10174 to the assets in the IT infrastructure, and use the structured information 10164 to determine the assets 10175 affected by the modification 10174 and calculate an estimate 10176 of the cost of the modification 10174. The server 10161 can create a display 10172 that can include a representation 10173*a* of the risk estimate 10170, a representation 10173*b* of the cost estimate 10171, and a representation 10173*c* of the cost estimate 10176 of the modification 10174.

In some embodiments, the server 10161 in FIG. 1I can include components or functionality of the server 151 as described with respect to FIG. 1D. In some embodiments, the database 10162 in FIG. 1I can include components or functionality of the database 152 as described with respect to FIG. 1D. In some embodiments, the memory 10163 in FIG. 1I can include components or functionality of the memory 153 as described with respect to FIG. 1D. In some embodiments, the structured information 10164 in FIG. 1I can include components or functionality of the structured information 154 as described with respect to FIG. 1D. In some embodiments, the data elements 10165*a*-10165*f* in FIG. 1I can include components or functionality of the data elements 155*a*-155*f* as described with respect to FIG. 1D. In some embodiments, the templates 10166 in FIG. 1I can include components or functionality of the templates 156 as described with respect to FIG. 1D. In some embodiments, the user interface 10167 in FIG. 1I can include components or functionality of the user interface 157 as described with respect to FIG. 1D. In some embodiments, the updates 10168 in FIG. 1I can include components or functionality of the updates 158 as described with respect to FIG. 1D. In some embodiments, the relationships 10169 in FIG. 1I can include components or functionality of the relationships 159 as described with respect to FIG. 1D. In some embodiments, the risk estimate 10170 in FIG. 1I can include components or functionality of the risk estimate 160 as described with respect to FIG. 1D. In some embodiments, the cost estimate 10171 in FIG. 1I can include components or functionality of the cost estimate 161 as described with respect to FIG. 1D. In some embodiments, the display 10172 in FIG. 1I can include components or functionality of the display 162 as described with respect to FIG. 1D. In some embodiments, the display elements 10173*a*-10173*b* in FIG. 1I can include components or functionality of the display elements 163*a*-163*b* as described with respect to FIG. 1D. In some embodiments, the modification 10174 in FIG. 1I can include components or functionality of the sales management module 120 as described with respect to FIG. 1A. In some embodiments, the cost estimate 10176 in FIG. 1I can include components or functionality of the sales management module 120 as described with respect to FIG. 1A.

Figure 1J:
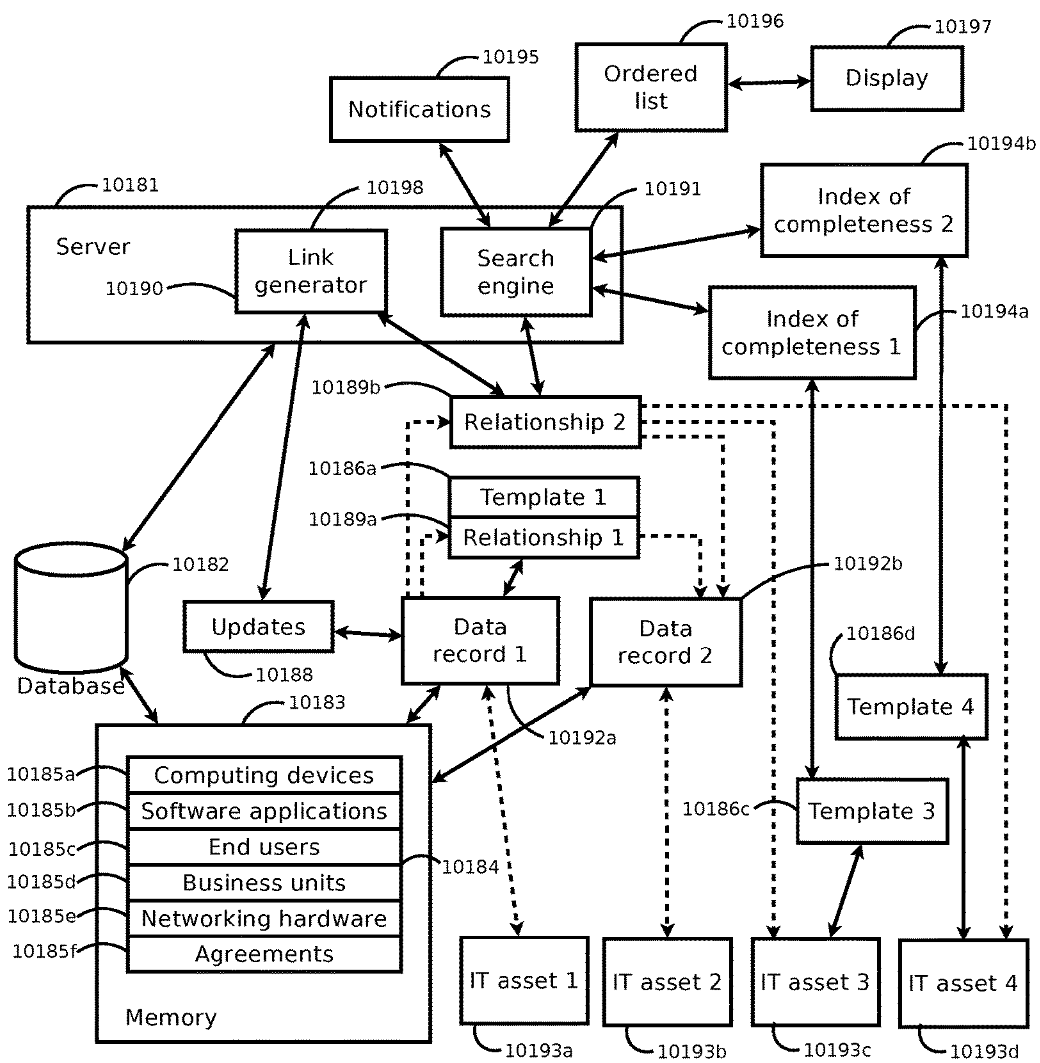
FIG. 1J is an illustrative block diagram of a system for managing information technology infrastructure and displaying an ordered list of information technology assets.

FIG. 1J is an illustrative block diagram of a system for managing information technology infrastructure and displaying an ordered list of information technology assets. The server 10181 can access the database 10182 and retrieve, into memory 10183, structured information 10184 about assets in information technology (IT) infrastructure, which can include information about computing devices 10185*a*, applications 10185*b*, end users 10185*c*, business units 10185*d*, networking hardware 10185*e*, and agreements 10185*f*. For example, a computing device 10185*a* could be a desktop computer, an application 10185*b* could be an email application such as Microsoft Exchange Server, an end user 10185*c* could be an engineer working at a company, a business unit 10185*d* could be the finance department of a company, a piece of networking hardware 10185*e* could be a firewall, and an agreement 10185*f* could be a service agreement with a service provider to manage computer equipment for a company. The server 10181 can access a first data record 10192*a* associated with a first IT asset 10193*a* and a second data record 10192*b* associated with a second IT asset 10193*b*. For example, the first IT asset 10193*a* may be a firewall, the second IT asset 10193*b* may be a cable modem, the first data record 10192*a* may be the information associated with the firewall, and the second data record 10192*b* may be the information associated with the cable modem. The server 10181 can select a first template 10186*a* associated with the first data record 10192*a*. The template 10186*a* can contain data fields that are related to information about the IT asset 10193*a*. The information can be characteristics or parameters associated with the IT asset 10193*a*. Continuing the example, a characteristic of a firewall may be its model number, and a parameter associated with the firewall may be the password for accessing and controlling the firewall. The selection of the template 10186*a* for the IT asset 10193*a* can be based on information about the IT asset 10193*a* such as product type, product name, version number, classification, or configuration. More than one template can apply to a particular asset, and one template can be a more specific version of a parent template, forming a hierarchy. Continuing the example, one template could apply to any firewall, and another template could apply to any Cisco firewall, and still another template could apply to a Cisco ASA 5510 firewall. The server 10181 may choose to use the most specific template available for the IT asset 10193*a*, or it may allow an end user to choose a different template. The template 10186*a* can include a first relationship 10189*a* between the first data record 10192*a* and the second data record 10192*b*. Continuing the example, the first relationship may be that "the two IT assets are connected", and may be determined by examining the network where the firewall (the first IT asset) is connected. The data record 10192*a* can have an update 10188 applied to it. Continuing the example, the update may be applied as the result of user input, or it may come from an external data source. As a result of the update 10188, a link generator 10198 can generate a second relationship 10189*b* that is different from the first relationship 10189*a*, is not in the template 10186*a*, and applies between the first data record 10192*a* and the second data record 10192*b*. Continuing the example, the second relationship may be that "the two IT assets are compatible to work with each other", and may be determined by examining the version numbers of the two IT assets and determining that they do not appear in a table of known incompatibilities. A search engine 10191 can use the generated second relationship 10189*b* to find a third IT asset 10193*c* and a fourth IT asset 10193*d* for which the relationship 10189*b* applies between both of the new IT assets and the first IT asset 10193*a*. Continuing the example, the search engine may find a printer and an email application that are both compatible with the firewall because they do not appear in any known list of incompatibilities. The third IT asset 10193*c* can be associated with a third template 10186*c* and the fourth IT asset 10193*d* can be associated with a fourth template 10186*d*. The search engine 10191 can examine the third template 10186*c* and determine a first index of completeness 10194*a* for it by determining what fraction of the data fields in the template 10186*c* are completed. The search engine 10191 can similarly determine a second index of completeness 10194*b* for the fourth template 10186*d*, and then compare the two indices to determine a ranking for the two IT assets, and generate an ordered list 10196 using the ranking Continuing the example, the search engine may find that the template for the printer is 60% complete and the template for the email application is 80% complete, and may rank the email application higher than the printer in the ordered list as a result. The server 10181 can generate a display 10197 of the ordered list. Continuing the example, the server can generate a display in a user interface that is displayed to an end user using a browser. The search engine can also generate notifications 10195 based on a result of a search using the generated second relationship 10189*b*, or based on a result in the ordered list 10196, and the server 10181 can deliver the notifications. Continuing the example, the search engine may generate a notification upon discovering that the third IT asset satisfies the second relationship, and the server may deliver the notification to an end user as a text message.

In some embodiments, the server 10181 in FIG. 1J can include components or functionality of the server 151 as described with respect to FIG. 1D. In some embodiments, the database 10182 in FIG. 1J can include components or functionality of the database 152 as described with respect to FIG. 1D. In some embodiments, the memory 10183 in FIG. 1J can include components or functionality of the memory 153 as described with respect to FIG. 1D. In some embodiments, the structured information 10184 in FIG. 1J can include components or functionality of the structured information 154 as described with respect to FIG. 1D. In some embodiments, the data elements 10185*a*-10185*f* in FIG. 1J can include components or functionality of the data elements 155*a*-155*f* as described with respect to FIG. 1D. In some embodiments, the templates 10186*a*-10186*d* in FIG. 1J can include components or functionality of the templates 156 as described with respect to FIG. 1D. In some embodiments, the updates 10188 in FIG. 1J can include components or functionality of the updates 158 as described with respect to FIG. 1D. In some embodiments, the relationships 10189*a*-10189*b* in FIG. 1J can include components or functionality of the relationships 159 as described with respect to FIG. 1D. In some embodiments, the display 10197 in FIG. 1J can include components or functionality of the display 162 as described with respect to FIG. 1D.

Figure 2A:
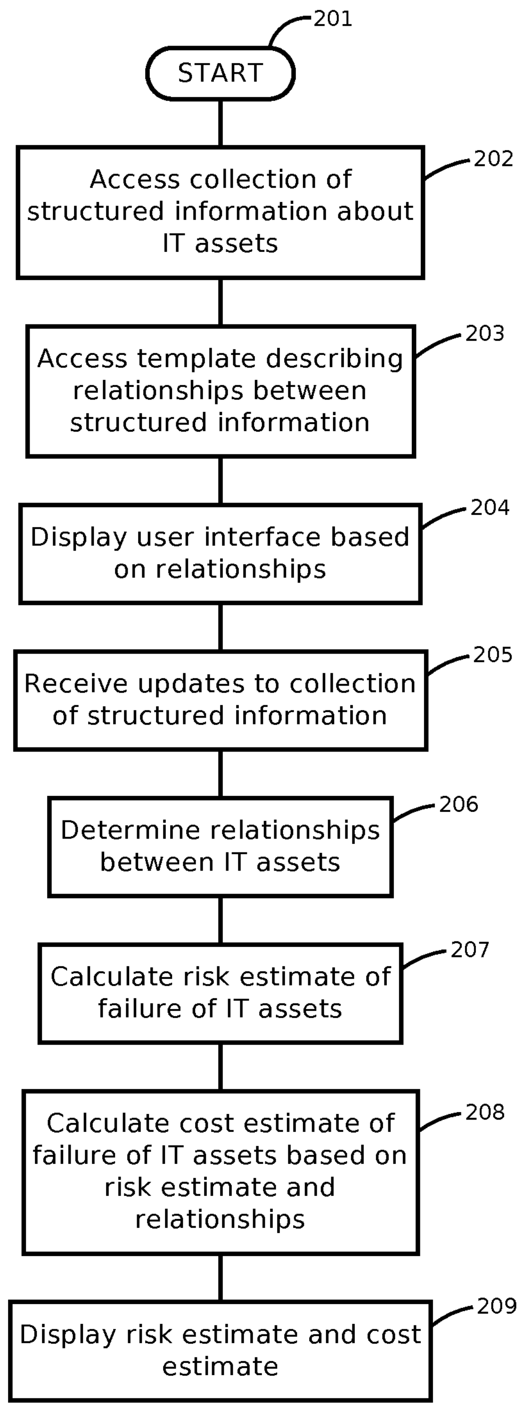
FIG. 2A is an illustrative flowchart depicting an example embodiment of a method of documenting, analyzing, and supporting information technology infrastructure; and displaying a risk estimate and a cost estimate.

FIG. 2A is an illustrative flowchart depicting an example embodiment of a method of documenting, analyzing, and supporting information technology infrastructure; and displaying a risk estimate and a cost estimate. The method 201 can include accessing a collection of structured information about IT assets (202). For example, the method may access a database with records describing the IT assets. The assets may be hardware assets, such as computing devices or networking equipment. The assets may be software assets, such as an application or an application role. The assets may be human assets, such as a business unit or an end user. The assets may be business assets, such as an agreement for an IT service. The method 201 can include accessing a template describing the relationships between items in the structured information (203). The template can contain data fields that are related to information about one of the IT assets. The information can be characteristics or parameters associated with the asset. The information can be read only (not editable) or read write (editable). The template can be selected for an IT asset based on information about the asset, such as a product type, product name, version number, classification, or configuration. More than one template can apply to a particular asset, and one template can be a more specific version of a parent template, forming a hierarchy. For example, one template could apply to any email application, and another template could apply to Microsoft Exchange, and still another template could apply to Microsoft Exchange Server 2007. All three templates may have information about the incoming mail server and outgoing mail server. The Microsoft Exchange and Microsoft Exchange Server 2007 templates may additionally have information about the installation directory of the application. The Microsoft Exchange Server 2007 template may include IPV6 addresses for the mail servers. The system may choose the most specific template available for an asset, or it may allow an end user to choose a specific template. The method 201 can include displaying a user interface based on the relationships (204). The user interface may be accessible through a web browser, or may be accessible through a dedicated client application, or may be accessible directly on the device running the system. The user interface may include both display-only controls, input-only controls, and controls that both display values and allow them to be modified. The method 201 can include receiving updates to the collection of structured information (205). The updates may originate from the user interface. The updates may originate from another manual entry method outside the system. The updates may originate from an automated process that collects information about the IT assets and transmits the information to the system. The method 201 can include determining relationships between the IT assets (206). The relationships can be based on information about IT assets in the data fields of one or more templates. The relationships can be based on data from external sources that may be accessed using information about IT assets in the data fields of one or more templates. The relationships can be composite relationships derived from these relationships as described. The method 201 can include calculating a risk estimate of the failure of some or all of the IT assets (207). The risk estimate can be based on the relationships between the IT assets. The risk estimate can include summary components that are functions of the results of multiple relationships, for example, a sum or average. The method 201 can include calculating a cost estimate of the failure of some or all of the IT assets based on the risk estimate and the relationships (208). The cost estimate can be directly determined from the risk estimate or relationships. The cost estimate can be a function of additional parameters as well as the risk estimate or relationships. The additional parameters can be derived from external input, or can be derived from the IT assets or their relationships. The method 201 can include displaying the risk estimate and the cost estimate (209). The display can be done through a web browser, a dedicated client application, or directly on the system. The display can be a notification such as an alert, an email, a text message, or a mobile notification mechanism.

Figure 2B:
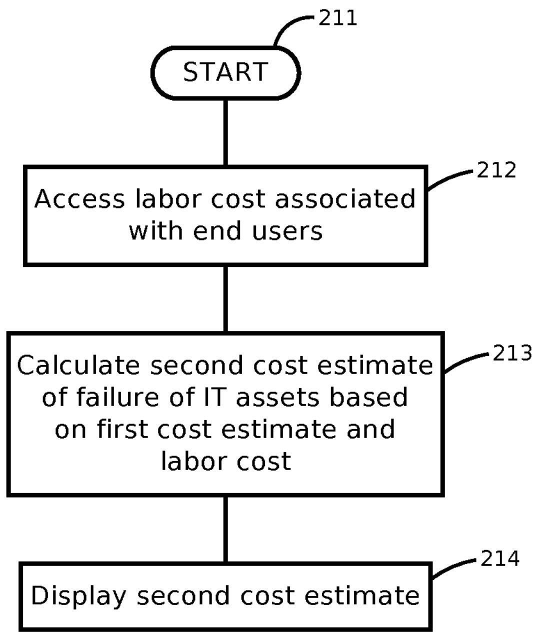
FIG. 2B is an illustrative flowchart depicting an example embodiment of a method of documenting, analyzing, and supporting information technology infrastructure; and displaying a risk estimate, a cost estimate, and a second cost estimate.

FIG. 2B is an illustrative flowchart depicting an example embodiment of a method of documenting, analyzing, and supporting information technology infrastructure; and displaying a risk estimate, a cost estimate, and a second cost estimate. The method 211 can include accessing the labor costs associated with the end users (212). The method 211 can include calculating a second cost estimate of failure of some or all of the IT assets, based on the first cost estimate and the labor costs (213). The method 211 can include displaying the second cost estimate (214).

Figure 2C:
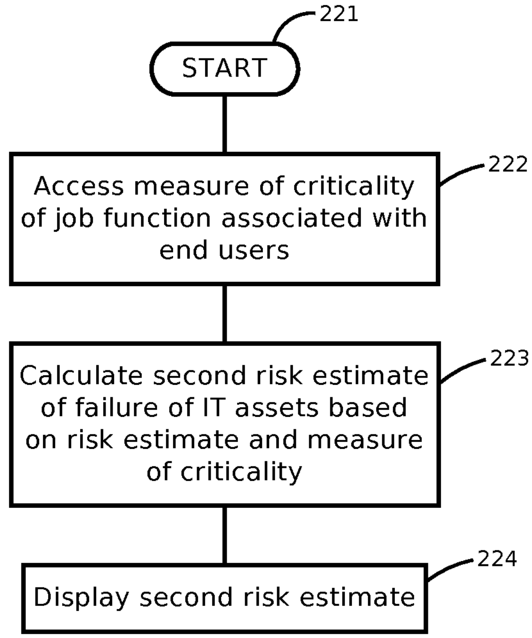
FIG. 2C is an illustrative flowchart depicting an example embodiment of a method of documenting, analyzing, and supporting information technology infrastructure; and displaying a risk estimate, a cost estimate, and a second risk estimate.

FIG. 2C is an illustrative flowchart depicting an example embodiment of a method of documenting, analyzing, and supporting information technology infrastructure; and displaying a risk estimate, a cost estimate, and a second risk estimate. The method 221 can include accessing a measure of criticality of the job functions associated with the end users (222). The method 221 can include calculating a second risk estimate of the failure of some or all of the IT assets based on the risk estimate and the measure of criticality of the job functions (223). The method 221 can include displaying the second risk estimate (224).

Figure 2D:
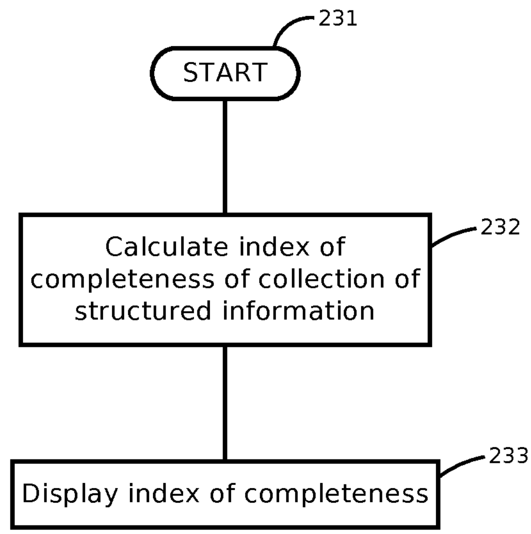
FIG. 2D is an illustrative flowchart depicting an example embodiment of a method of documenting, analyzing, and supporting information technology infrastructure; and displaying a risk estimate, a cost estimate, and an index of completeness.

FIG. 2D is an illustrative flowchart depicting an example embodiment of a method of documenting, analyzing, and supporting information technology infrastructure; and displaying a risk estimate, a cost estimate, and an index of completeness. The method 231 can include calculating an index of the completeness of the collection of structured information (232). The method 231 can include displaying the index of completeness of the collection of structured information (233).

Figure 2E:
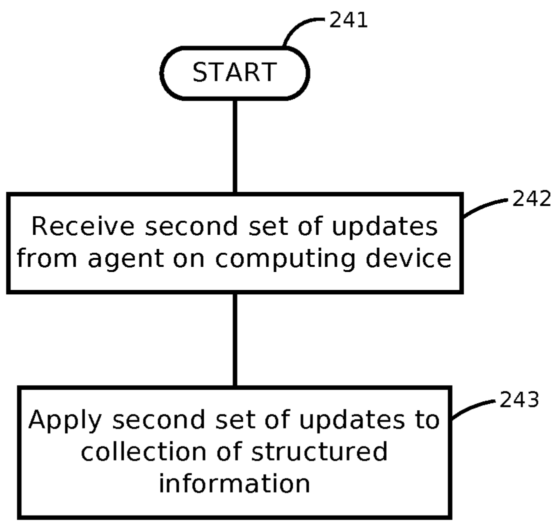
FIG. 2E is an illustrative flowchart depicting an example embodiment of a method of documenting, analyzing, and supporting information technology infrastructure; displaying a risk estimate and a cost estimate; and processing updates received from a computing device.

FIG. 2E is an illustrative flowchart depicting an example embodiment of a method of documenting, analyzing, and supporting information technology infrastructure; displaying a risk estimate and a cost estimate; and processing updates received from a computing device. The method 241 can include receiving a second set of updates from a computing device. The receiving may be from an agent on the computing device (242). The method 241 can include applying the second set of updates to the collection of structured information (243).

Figure 2F:
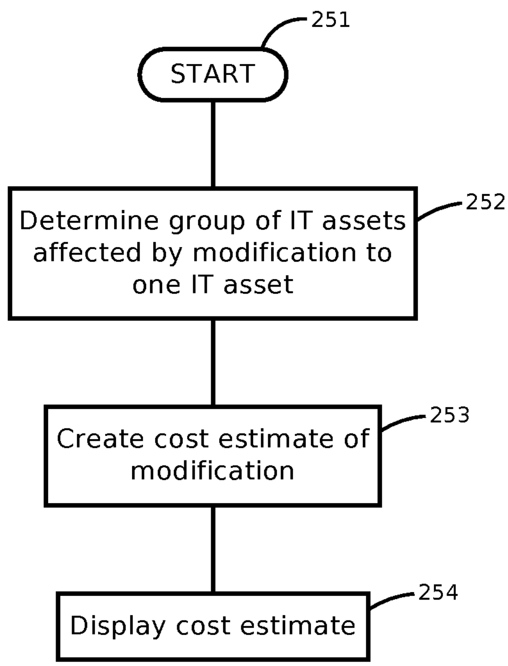
FIG. 2F is an illustrative flowchart depicting an example embodiment of a method of documenting, analyzing, and supporting information technology infrastructure; and displaying a risk estimate, a cost estimate, and a cost estimate of a modification to the information technology infrastructure.

FIG. 2F is an illustrative flowchart depicting an example embodiment of a method of documenting, analyzing, and supporting information technology infrastructure; and displaying a risk estimate, a cost estimate, and a cost estimate of a modification to the information technology infrastructure. The method 251 can include determining a group of IT assets that may be affected by modification to one or more IT assets in the structured information (252). The method 251 can include creating a cost estimate of the modification (253). The method 251 can include displaying the cost estimate (254).

Figure 2G:
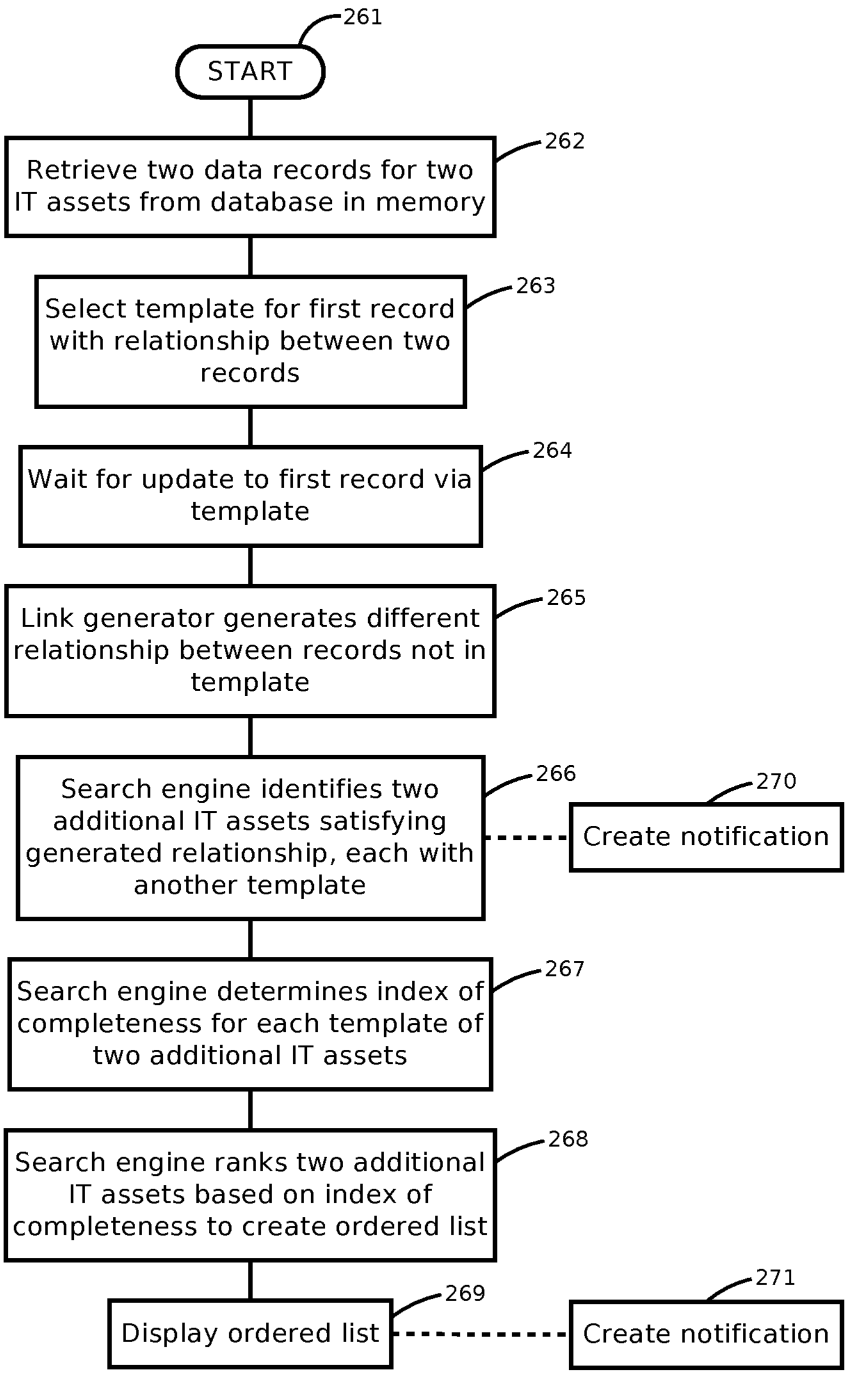
FIG. 2G is an illustrative flowchart depicting an example embodiment of a method of managing information technology infrastructure and displaying an ordered list of information technology assets.
Figure 3A:
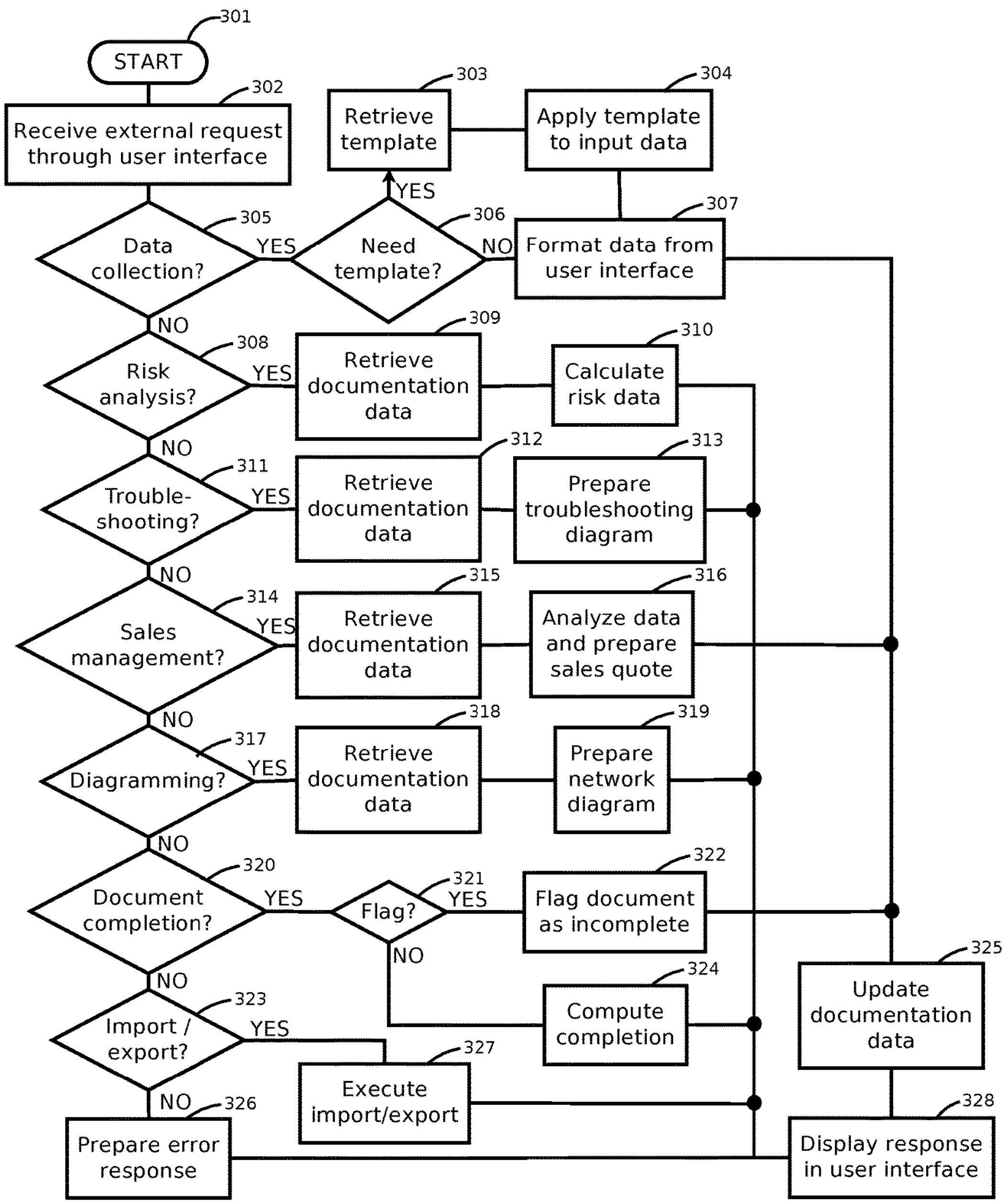
FIG. 3A is an illustrative flowchart depicting an example embodiment of a method of documenting, analyzing, and supporting information technology infrastructure.

FIG. 2G is an illustrative flowchart depicting an example embodiment of a method of managing information technology infrastructure and displaying an ordered list of information technology assets. The method 261 can include retrieving two data records for two IT assets from a database in memory (262). For example, the method may access a database with data records describing the IT assets. The assets may be hardware assets, such as computing devices or networking equipment. The assets may be software assets, such as an application or an application role. The assets may be human assets, such as a business unit or an end user. The assets may be business assets, such as an agreement for an IT service. In an illustrative example, the first IT asset may be a firewall, the second IT asset may be a cable modem, the first data record may contain information about the firewall, and the second data record may contain information about the cable modem. The method 261 can include selecting a template for the first data record, where the template includes a first relationship between the two data records (263). Continuing the example, the template can contain data fields that are related to information about the firewall. The information can be characteristics or parameters associated with the firewall. A characteristic of a firewall may be its model number, and a parameter associated with the firewall may be the password for accessing and controlling the firewall. The selection of the template for the firewall can be based on information about the firewall such as product type, product name, version number, classification, or configuration. More than one template can apply to a particular asset, and one template can be a more specific version of a parent template, forming a hierarchy. Continuing the example, one template could apply to any firewall, and another template could apply to any Cisco firewall, and still another template could apply to a Cisco ASA 5510 firewall. The server may choose to use the most specific template available for the firewall, or it may allow an end user to choose a different template. Continuing the example, the first relationship may be that "the two IT assets are connected", and may be determined by examining the network where the firewall (the first IT asset) is connected. The method 261 can include waiting for an update to the first data record via the template (264). Continuing the example, the update may be applied as the result of user input, or it may come from an external data source. The method 261 can include using a link generator to generate a second relationship between the two data records, where the second relationship is different from the first relationship, and is not included in the template (265). Continuing the example, the second relationship may be that "the two IT assets are compatible to work with each other", and may be determined by examining the version numbers of the two IT assets and determining that they do not appear in a table of known incompatibilities. The method 261 can include using a search engine to identify a third IT asset and a fourth IT asset that both satisfy the second relationship with the first IT asset. The third IT asset can be associated with a third template, and the fourth IT asset can be associated with a fourth template (266). Continuing the example, the search engine may find a printer and an email application that are both compatible with the firewall because they do not appear in any known list of incompatibilities. The method 261 can include having the search engine generate a notification based on finding the third IT asset (270). Continuing the example, the search engine may generate a notification upon discovering that the third IT asset satisfies the second relationship, and the server may deliver the notification to an end user as a text message. The method 261 can include having the search engine determine a first index of completeness for the third template, and a second index of completeness for the fourth template. The index of completeness can be based on what fraction of the data fields of the template are completed (267). The method 261 can include the search engine ranking the third and fourth IT assets based on the two indices of completion, and generating an ordered list using the ranking (268). Continuing the example, the search engine may find that the template for the printer is 60% complete and the template for the email application is 80% complete, and may rank the email application higher than the printer in the ordered list as a result. The method 261 can include displaying the ordered list (269). Continuing the example, the server can generate a display in a user interface that is displayed to an end user using a browser. The method 261 can include having the search engine generate a notification based on generating and displaying the ordered list (271). Continuing the example, the search engine may generate a notification upon generating the ordered list, and the server may deliver the notification to an end user as a text message FIG. 3A is an illustrative flowchart depicting an example embodiment of a method of documenting, analyzing, and supporting information technology infrastructure. The method 301 can include receiving an external request through a user interface (302). The method 301 can include checking whether an external request is a request for data collection (305). In one embodiment, the method 301 can include checking whether an external request is a request for risk analysis (308). In one embodiment, the method 301 can include checking whether an external request is a request for troubleshooting (311). In one embodiment, the method 301 can include checking whether an external request is a request for sales management (314). In one embodiment, the method 301 can include checking whether an external request is a request for diagramming (317). In one embodiment, the method 301 can include checking whether an external request is a request for document completion (320). In one embodiment, the method 301 can include checking whether an external request is a request for import/export (323). In one embodiment, the method 301 can include checking whether a template is used for an external request for data collection (306). In one embodiment, the method 301 can include retrieving a template from a template module (303). In one embodiment, the method 301 can include applying a template to the data received from a data collection request (304). In one embodiment, the method 301 can include formatting the data received from a data collection request to prepare the received data for updating documentation data (307). In one embodiment, the method 301 can include retrieving documentation data to use for risk analysis (309). In one embodiment, the method 301 can include retrieving documentation data to use for troubleshooting (312). In one embodiment, the method 301 can include retrieving documentation data to use for sales management (315). In one embodiment, the method 301 can include retrieving documentation data to use for diagramming (318). In one embodiment, the method 301 can include calculating risk data using retrieved documentation data (310). In one embodiment, the method 301 can include preparing a troubleshooting diagram using retrieved documentation data (313). In one embodiment, the method 301 can include analyzing data and preparing a sales quote using retrieved documentation data (316). In one embodiment, the method 301 can include preparing a network diagram using retrieved documentation data (319). In one embodiment, the method 301 can include checking whether a document completion request is a request to flag documentation as incomplete (321). In one embodiment, the method 301 can include flagging documentation data as incomplete (322). In one embodiment, the method 301 can include computing the completeness of documentation (324). In one embodiment, the method 301 can include executing an import/export function (327), as will be described with respect to FIG. 3B. In one embodiment, the method 301 can include preparing an error response (326). In one embodiment, the method 301 can include updating documentation data (325). In one embodiment, the method 301 can include displaying a response through a user interface (328).

Figure 3B:
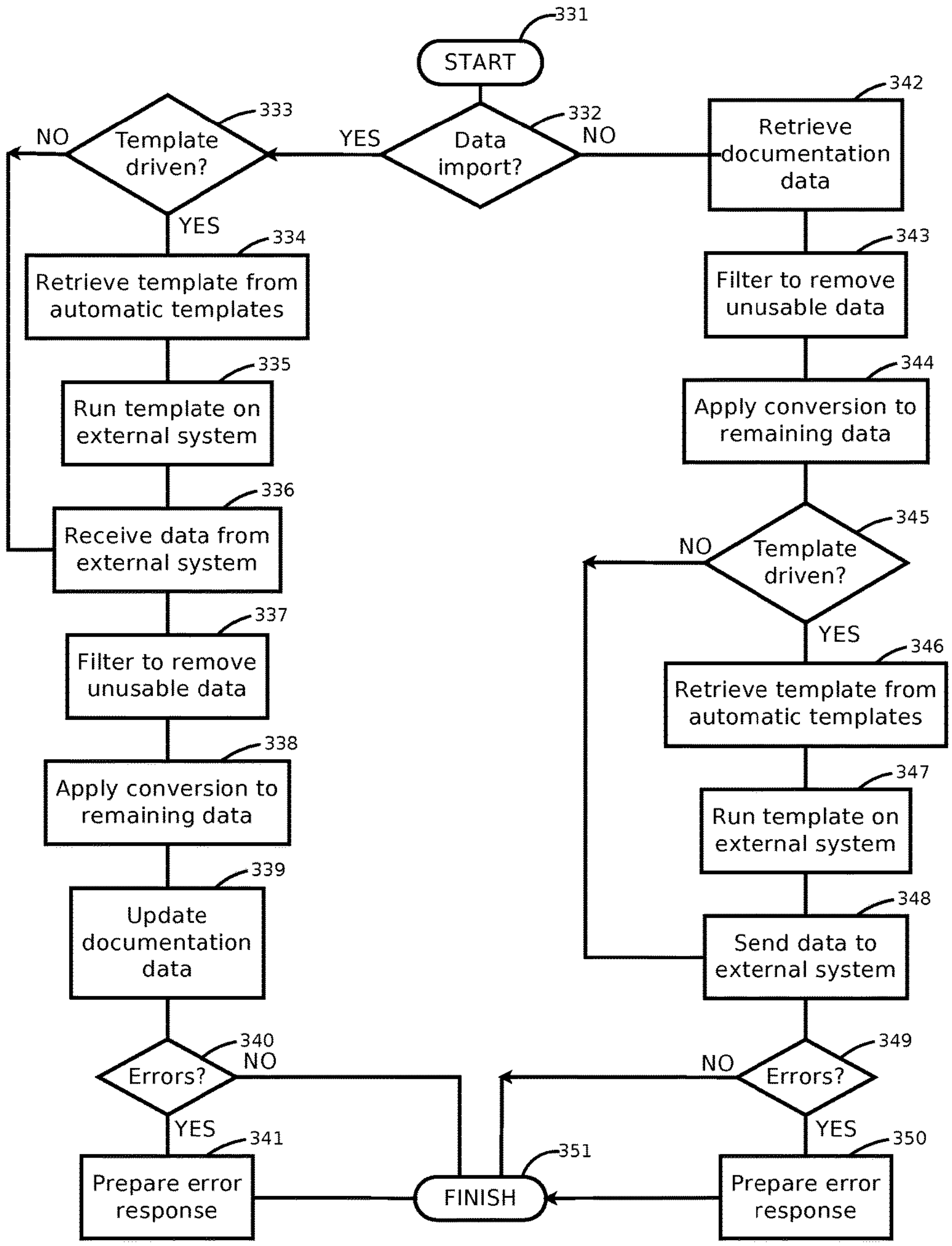
FIG. 3B is an illustrative flowchart depicting an example embodiment of a method of importing and exporting data as part of documenting, analyzing, and supporting information technology infrastructure.

FIG. 3B is an illustrative flowchart depicting an example embodiment of a method of importing and exporting data as part of documenting, analyzing, and supporting information technology infrastructure. The method 331 can include checking whether an external request is a request for data import (332). In one embodiment, the method 331 can include checking whether a data import method is template driven (333). In one embodiment, the method 331 can include retrieving an import template from a set of automatic templates (334). In one embodiment, the method 331 can include running an import template, which may be a script, on an external system (335). In one embodiment, the method 331 can include receiving data from an external system (336). In one embodiment, the method 331 can include filtering data from an external system to remove unusable data (337). In one embodiment, the method 331 can include applying a conversion to data left after filtering to remove unusable data (338). In one embodiment, the method 331 can include updating documentation data (339). In one embodiment, the method 331 can include checking whether errors occurred during an import process (340). In one embodiment, the method 331 can include preparing an error response for an import process (341). In one embodiment, the method 331 can include retrieving documentation data (342). In one embodiment, the method 331 can include filtering retrieved documentation data to remove unusable data (343). In one embodiment, the method 331 can include applying a conversion to data left after filtering to remove unusable data (344). In one embodiment, the method 331 can include checking whether a data export method is template driven (345). In one embodiment, the method 331 can include retrieving an export template from a set of automatic templates (346). In one embodiment, the method 331 can include running an export template, which may be a script, on an external system (347). In one embodiment, the method 331 can include sending data to an external system (348). In one embodiment, the method 331 can include checking whether errors occurred during an export process (349). In one embodiment, the method 331 can include preparing an error response for an export process (350). The method 331 can include joining a plurality of control flows (351).

Figure 4A:
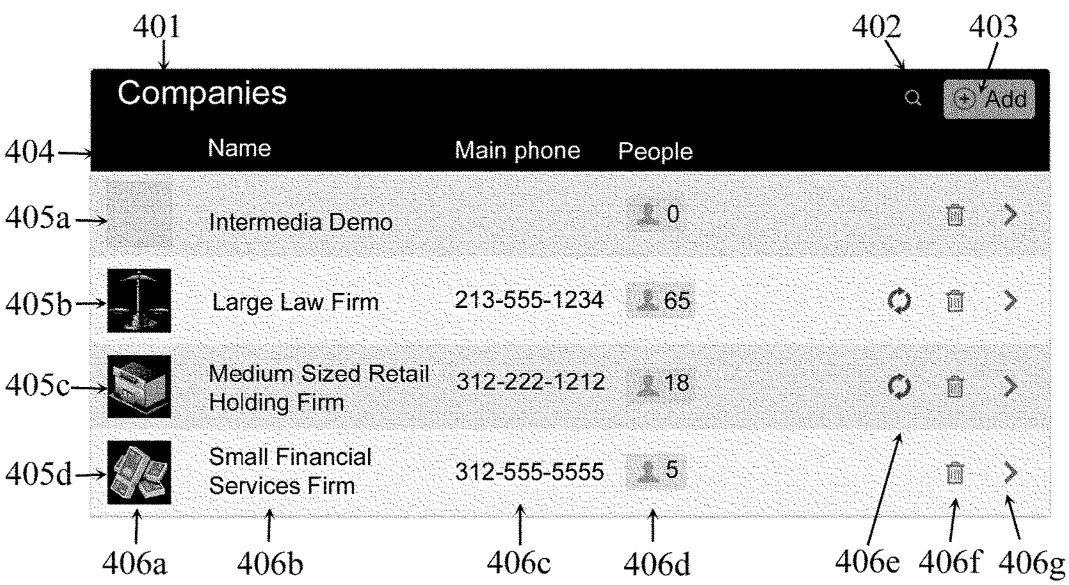
FIG. 4A is an illustrative example of an embodiment of a user interface for managing the documentation for a group of companies.

FIG. 4A is an illustrative example of an embodiment of a user interface for managing the documentation for a group of companies. The display in FIG. 4A can be identified by a header 401, and the information can be displayed in a tabular form with descriptive column headers 404, rows 405*a*-405*d* that can represent companies, and columns 406*a*-406*g*. The filter tool 402 can be used to specify a filter that will select a subset of the data to be displayed. The Add button 403 can be selected to display a user interface for adding a new company to the IT infrastructure documentation. Column 406*a* can display an identifying visual logo for the company in each row. Column 406*b* can display the name of the company in each row. Column 406*c* can display the primary contact telephone number for the company in each row. Column 406*d* can display the number of people in the company in each row. Column 406*e* can display an icon that can be selected to synchronize the data of the company in each row with an external source, when the company data was originally imported from an external source. Column 406*f* can display an icon that can be selected to remove the company in each row from the documentation. Column 406*g* can display an icon that can be selected to display a user interface for editing the information about the company in each row.

Figure 4B:
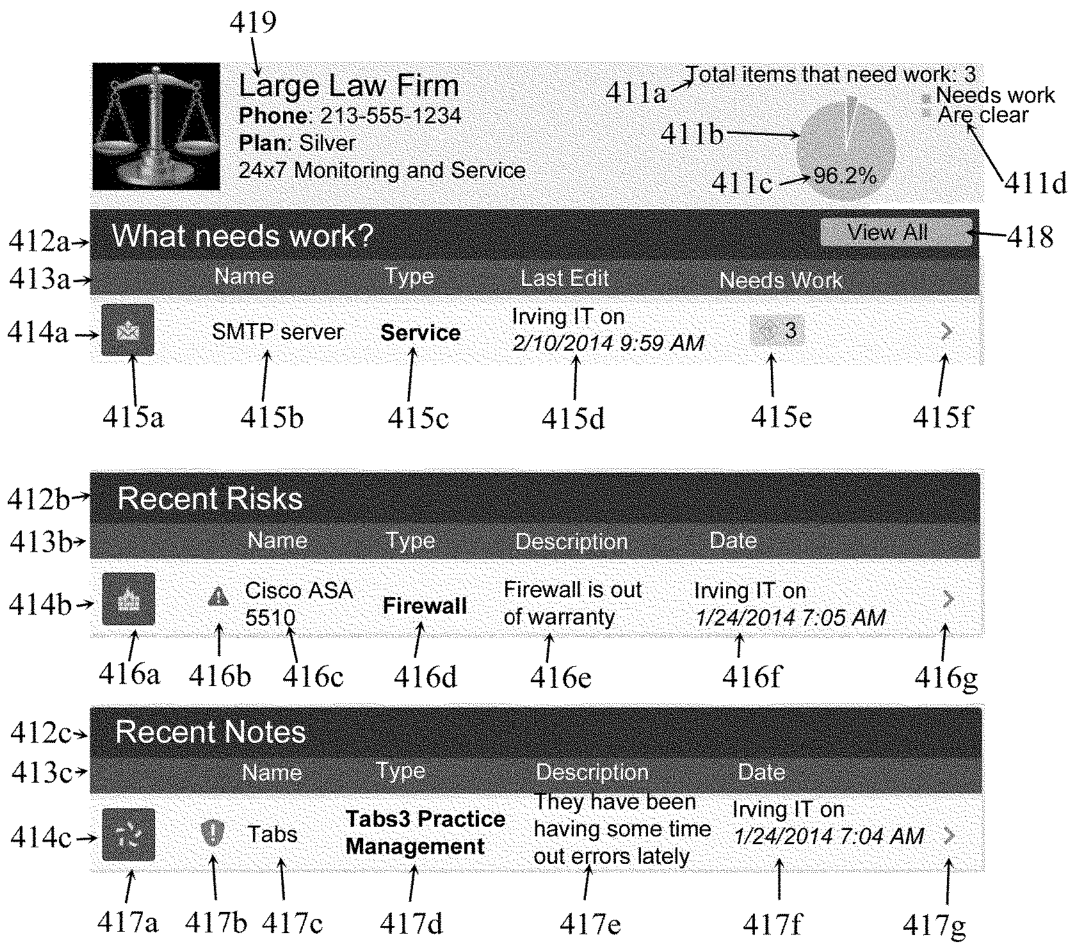
FIG. 4B is an illustrative example of an embodiment of a user interface for a dashboard showing the overview information about the documentation on a single company.

FIG. 4B is an illustrative example of an embodiment of a user interface for a dashboard showing the overview information about the documentation on a single company. The display in FIG. 4B can have a summary header area at the top with a description 419 of the company that can include the company logo, the company name, the company primary contact telephone number, the service plan used for servicing the company, and additional notes about the service plan for the company. The display in FIG. 4B can contain elements 411*a*-411*d* that can indicate the relative completion of the documentation for the company. Text 411*a* can describe how many items of documentation are still outstanding. Pie chart 411*b* can visually display the amount of outstanding documentation work, and the numeric percentage 411*c* can show the detail behind pie chart 411*b*. The legend 411*d* can help to facilitate understanding of pie chart 411*b*. The display in FIG. 4B can include a header 412*a* identifying a table of components requiring additional work to complete documentation, a header 412*b* identifying a table of risks recently added to the documentation, and a header 412*c* identifying a table of notes recently added to the documentation. The table identified by the header 412*a* can have descriptive column headers 413*a*, rows 414*a* that can represent documentation components, and columns 415*a*-415*f*. The table identified by the header 412*a* can be a summary table that shows a limited number of the most recent components requiring additional work, and the View All button 418 can be selected to display a user interface for viewing some or all of the documentation components that require additional work. Column 415*a* can display an identifying visual icon for the component in each row that requires additional work. Column 415*b* can display the name of the component in each row that requires additional work. Column 415*c* can display the type of the component in each row that requires additional work. Column 415*d* can display the last date and time that the component in each row that requires additional work was edited, and the name of the person who did the edit. Column 415*e* can display the count of the number of areas in which the component in each row requires additional work. Column 415*f* can display an icon that can be selected to display a user interface for editing the component in each row. The table identified by the header 412*b* can have descriptive column headers 413*b*, rows 414*b* that can represent documentation components with associated risks, and columns 416*a*-416*g*. Column 416*a* can display an identifying visual icon for the component with the risk in each row. Column 416*b* can display an identifying visual icon indicating the severity of the risk in each row. Column 416*c* can display the name of the component with the risk in each row. Column 416*d* can display the type of the component with the risk in each row. Column 416*e* can display the description of the risk in each row. Column 416*f* can display last date and time that the risk in each row was edited, and the name of the person who did the edit. Column 416*g* can display an icon that can be selected to display a user interface for editing the information for the component with the risk in each row. The table identified by the header 412*c* can have descriptive column headers 413*c*, rows 414*c* that can represent documentation components with associated notes, and columns 417*a*-417*g*. Column 417*a* can display an identifying visual icon for the component with the note in each row. Column 417*b* can display an identifying visual icon indicating the importance of the note in each row. Column 417*c* can display the name of the component with the note in each row. Column 417*d* can display the type of the component with the note in each row. Column 417*e* can display the description of the note in each row. Column 417*f* can display last date and time that the note in each row was edited, and the name of the person who did the edit. Column 417*g* can display an icon that can be selected to display a user interface for editing the information for the component with the note in each row.

Figure 4C:
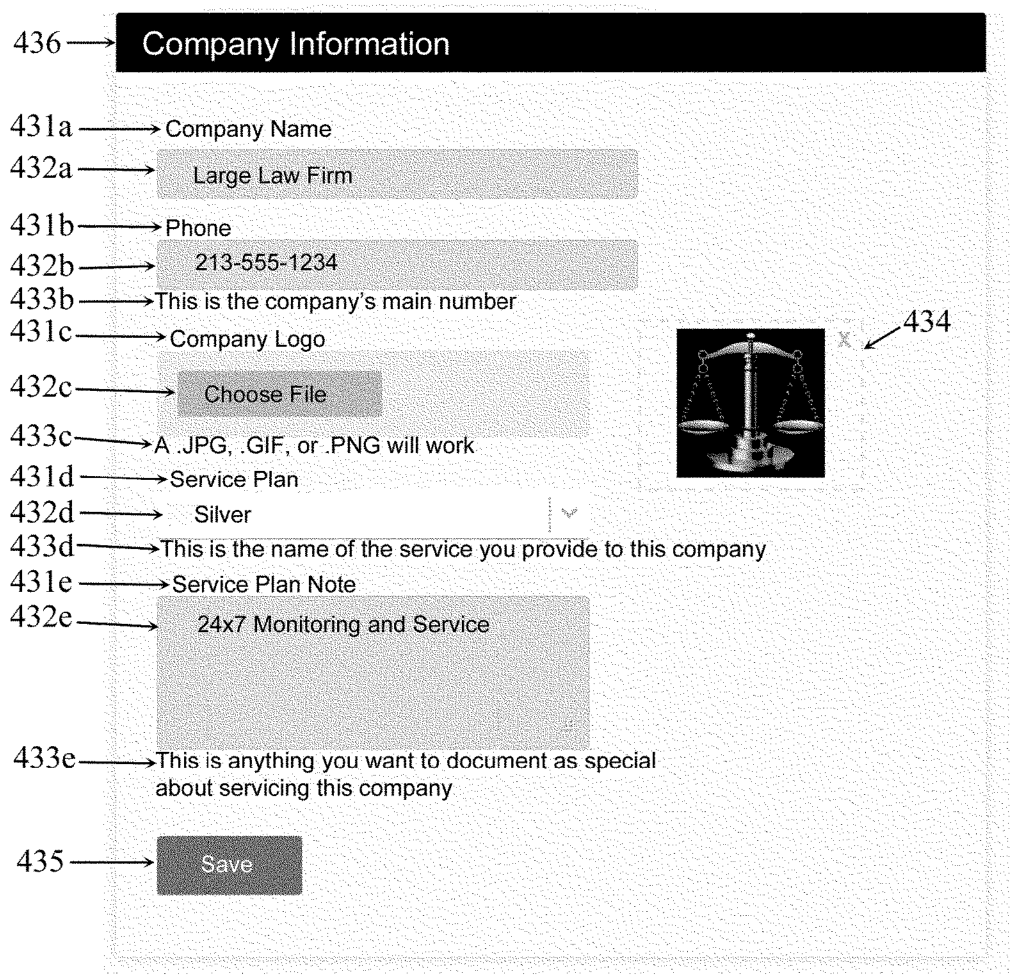
FIG. 4C is an illustrative example of an embodiment of a user interface for viewing and updating the information about a single company.

FIG. 4C is an illustrative example of an embodiment of a user interface for viewing and updating the information about a single company. FIG. 4C can be the user interface that is selected by using an icon in column 406*g* as described with respect to FIG. 4A. The header 436 can identify the display as being one for editing company information. The form names 431*a*-431*e* can identify the information about the company that can be displayed and edited. The form entries 432*a*-432*e* can display the information about the company and allow the information to be edited. The form descriptions 433*b*-433*e* can provide additional descriptive text about the information about the company that can be displayed and edited. The logo area 434 can display the currently selected company logo. The Save button 435 can be selected to save information about the company that has been modified in the form entries 432*a*-432*e*. The form elements 431*a* and 432*a* can refer to the name of the company. The form elements 431*b*, 432*b*, and 433*b* can refer to the primary contact telephone number for the company. The form elements 431*c*, 432*c*, and 433*c* can refer to the company logo, which can be displayed in form element 434. The form elements 431*d*, 432*d*, and 433*d* can refer to the service plan used for servicing the company. The form elements 431*e*, 432*e*, and 433*e* can refer to additional notes about the service plan for the company.

Figure 5A:
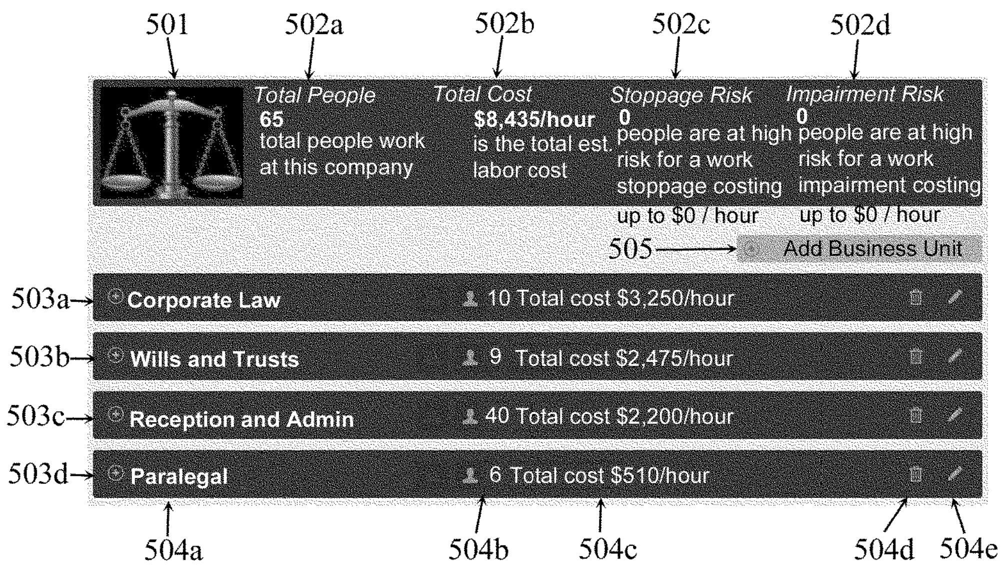
FIG. 5A is an illustrative example of an embodiment of a user interface for viewing and managing the business units of a company.

FIG. 5A is an illustrative example of an embodiment of a user interface for viewing and managing the business units of a company. The display in FIG. 5A can have a header showing the logo 501 of the company and a summary of the risk analysis 502*a*-502*d* for the company. In the summary of the risk analysis for the company, 502*a* can show the total number of people at the company, 502*b* can show the total labor cost for the company, 502*c* can show the number of people and estimated cost at a high risk for work stoppage by a component failure in the IT infrastructure, and 502*d* can show the number of people and estimated cost at a high risk for work impairment by a component failure in the IT infrastructure. The display in FIG. 5A can show the business units of the company in a tabular format with rows 503*a*-503*d* that can represent business units, and columns 504*a*-504*e*. The Add Business Unit button 505 can be selected to display a user interface for adding a new business unit to the company in the IT infrastructure documentation. Column 504*a* can display the name of the business unit in each row. Column 504*b* can display the number of people in the business unit in each row. Column 504*c* can display the estimated hourly labor cost of the business unit in each row. Column 504*d* can display an icon that can be selected to remove the business unit in each row from the documentation. Column 504*e* can display an icon that can be selected to display a user interface for editing the information for the business unit in each row.

Figure 5B:
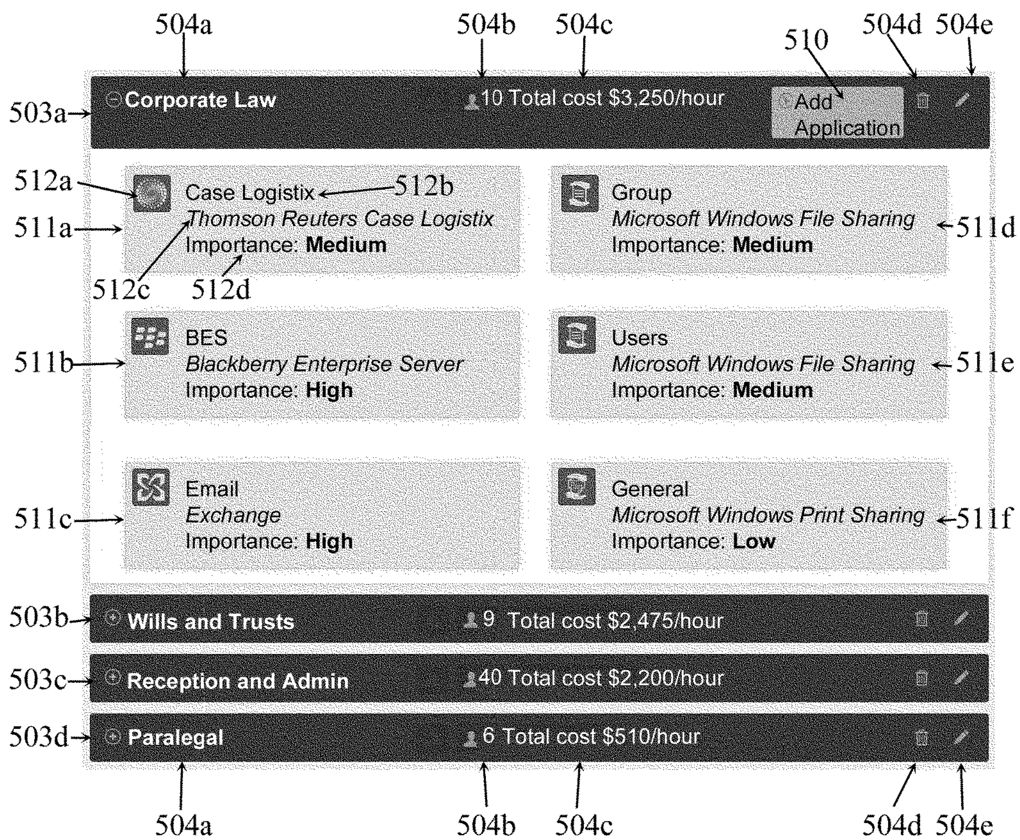
FIG. 5B is an illustrative example of an embodiment of a user interface for viewing and managing a single business unit of a company.

FIG. 5B is an illustrative example of an embodiment of a user interface for viewing and managing a single business unit of a company. The display in FIG. 5B can be the user interface that is displayed when the Corporate Law row 503*a* is selected, therefore expanding the information for that business unit. The other rows 503*b*-503*d* can be moved down to leave room for the additional information 511*a*-511*f* about the applications used by the business unit. The columns 504*a*-504*e* remain the same as described with respect to FIG. 5A. The Add Application button 510 can be used to display a user interface for adding another application to the list of applications used by the business unit described in the row 503*a*. An application 511*a* can be described by the elements 512*a*-512*d*. 512*a* can be a visual icon identifying the application 511*a*. 512*b* can be a short descriptive name of the application 511*a*. 512*c* can be the full name of the application 511*a*. 512*d* can indicate the importance of the application 511*a* to the operation of the business unit in the row 503*a*. Similar descriptive information can be displayed for applications 511*b*-511*f*.

Figure 5C:
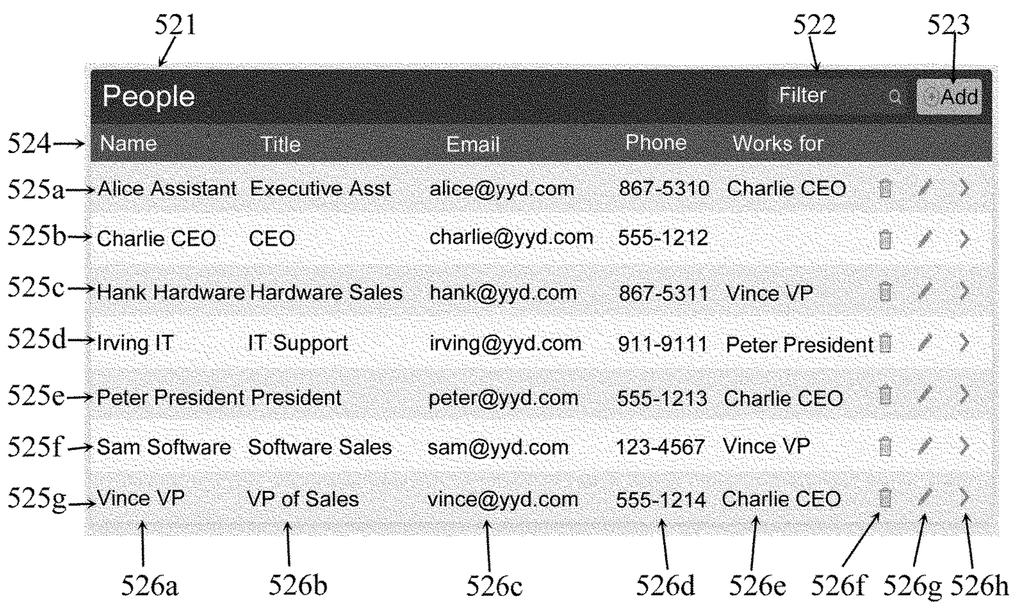
FIG. 5C is an illustrative example of an embodiment of a user interface for viewing and managing a list of people associated with a company.

FIG. 5C is an illustrative example of an embodiment of a user interface for viewing and managing a list of people associated with a company. The display in FIG. 5C can be identified by a header 521, and the information can be displayed in a tabular form with descriptive column headers 524, rows 525*a*-525*g* that can represent people, and columns 526*a*-526*h*. The filter tool 522 can be used to specify a filter that will select a subset of the data to be displayed. The Add button 523 can be selected to display a user interface for adding a new person to the IT infrastructure documentation. Column 526*a* can display the name of the person in each row. Column 526*b* can display the title of the person in each row. Column 526*c* can display the email address for the person in each row. Column 526*d* can display the phone number for the person in each row. Column 526*e* can display the manager for the person in each row. Column 526*f* can display an icon that can be selected to remove the person in each row from the documentation. Column 526*g* can display an icon that can be selected to display a user interface for editing the information about the person in each row. Column 526*h* can display an icon that can be selected to display a user interface for viewing the person in each row as a contact page.

Figure 6A:
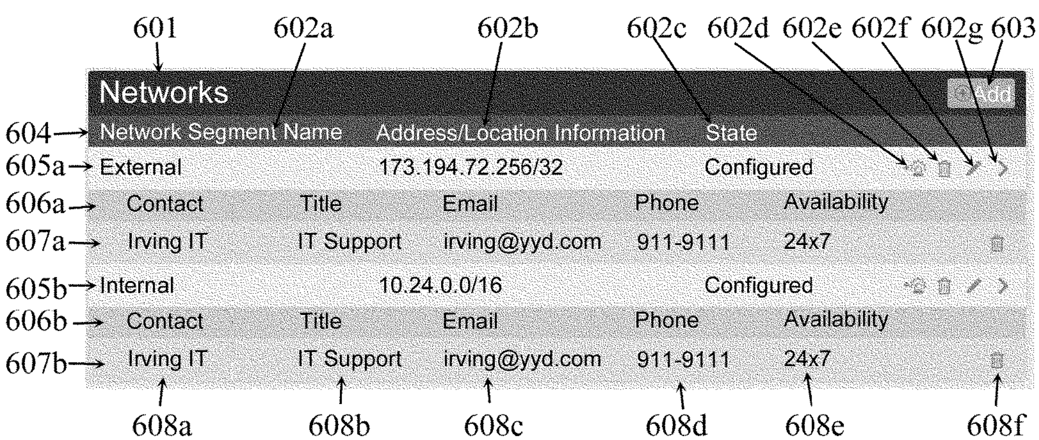
FIG. 6A is an illustrative example of an embodiment of a user interface for viewing and managing the list of networks in a company.

FIG. 6A is an illustrative example of an embodiment of a user interface for viewing and managing the list of networks in a company. The display in FIG. 6A can be identified by a header 601, and the information can be displayed in a two-level tabular form, with descriptive column headers 604 for the first level, rows 605*a*-605*b* that can represent network segments for the first level, and columns 602*a*-602*g* for the first level. The second level can have descriptive column headers 606*a*-606*b*, rows 607*a*-607*b* that can represent emergency contacts for the network in the level above, and columns 608*a*-608*f*. The Add button 603 can be selected to display a user interface for adding a new network segment to the IT infrastructure documentation. Column 602*a* can display the name of the network segment in each row. Column 602*b* can display the address for the network segment in each row. Column 602*c* can display the state of the network segment in each row. Column 602*d* can display an icon that can be selected to display a user interface for adding a new emergency contact for the network segment in each row. Column 602*e* can display an icon that can be selected to remove the network segment in each row from the documentation. Column 602*f* can display an icon that can be selected to display a user interface for editing the information for the network segment in each row. Column 602*g* can display an icon that can be selected to display a user interface with the graphical form of the network segment in each row. Column 608*a* can display the name for the contact in each row. Column 608*b* can display the title for the contact in each row. Column 608*c* can display the email address for the contact in each row. Column 608*d* can display the phone number for the contact in each row. Column 608*e* can display the availability of the contact for support in each row. Column 608*f* can display an icon that can be selected to remove the contact in each row from the documentation.

Figure 6B:
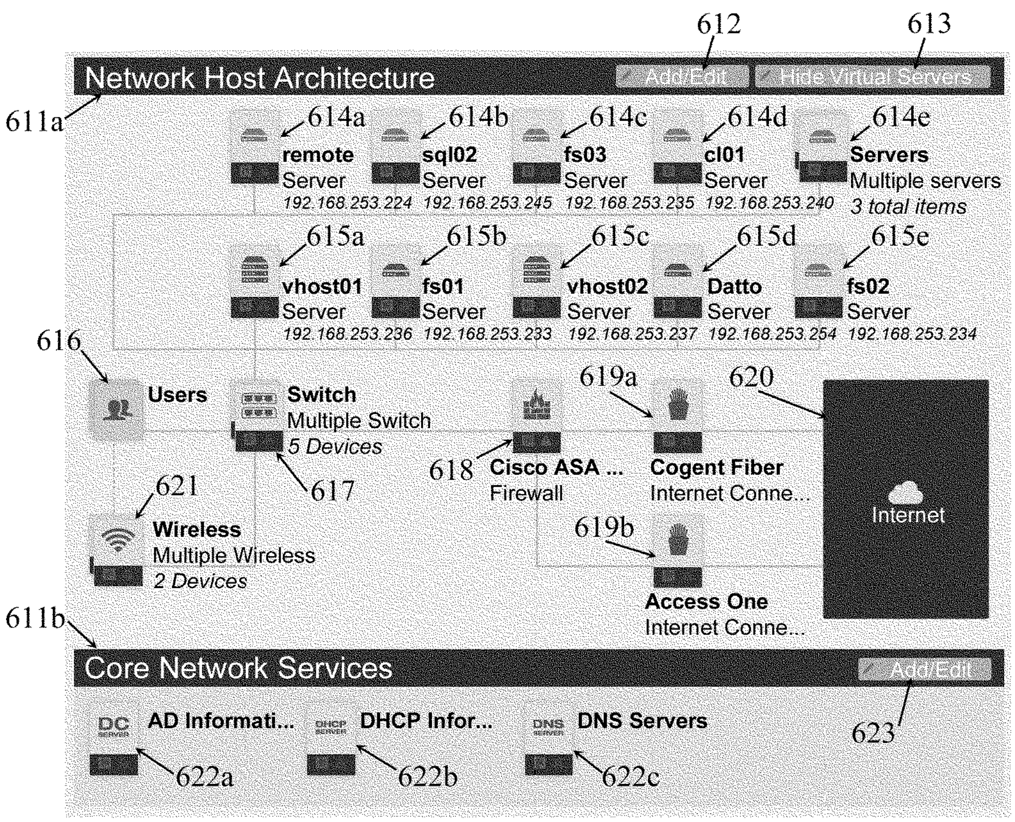
FIG. 6B is an illustrative example of an embodiment of a user interface for viewing and interacting with a graphical representation of a network in a company.

FIG. 6B is an illustrative example of an embodiment of a user interface for viewing and interacting with a graphical representation of a network in a company. The display in FIG. 6B can be the user interface that is displayed when an icon in column 602*g* is selected as described with respect to FIG. 6A. The display in FIG. 6B can be in two sections that are identified by headers 611*a*-611*b*. The section identified by header 611*a* can display a visual graphic representing the components of the IT infrastructure of the company and the connectivity of those components, including, for example, virtual servers 614*a*-614*e*, physical servers 615*a*-615*e*, switches 617, firewalls 618, users 616, wireless access points 621, internet connectivity 619*a*-619*b*, and external internet 620. The Add/Edit button 612 can be selected to display a user interface for adding or editing components in the IT infrastructure documentation for the company. The Hide Virtual Servers button 613 can be selected to remove the virtual servers 614*a*-614*e* from the display. The section identified by header 611*b* can display a visual graphic representing the core network services of the company, including, for example, active directory (AD) information 622*a*, dynamic host control protocol (DHCP) information 622*b*, and domain name service (DNS) servers 622*c*. The Add/Edit button 623 can be selected to display a user interface for adding or editing core networks services in the IT infrastructure documentation for the company. Graphical elements 614*e*, 617, and 621 can represent more than one component, as may be indicated by the word “multiple” in their description, and may be selected in order to display information about some or all of the components that the graphical elements represent.

Figure 6C:
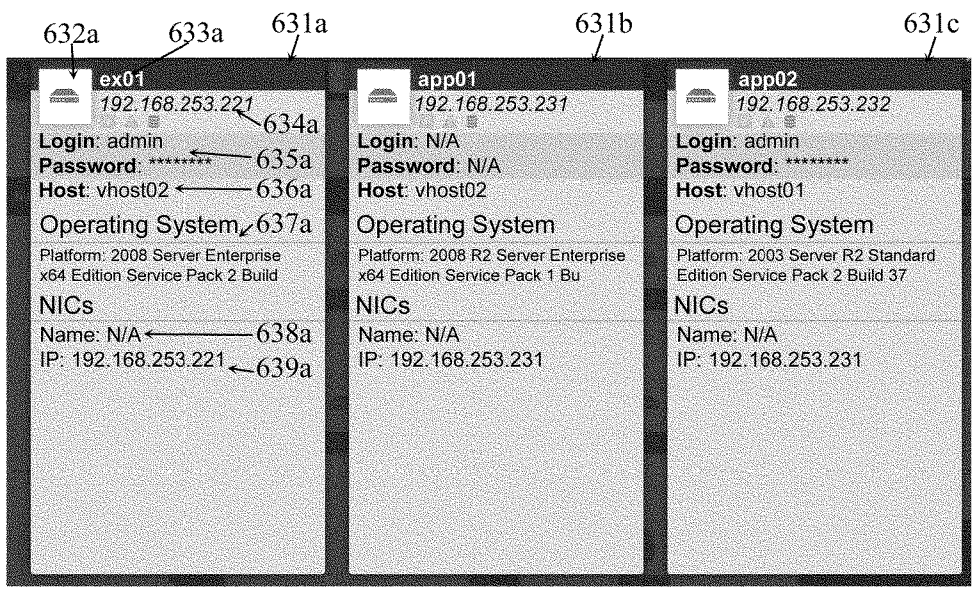
FIG. 6C is an illustrative example of an embodiment of a user interface for viewing and managing the data associated with components in the graphical representation of a network in a company.

FIG. 6C is an illustrative example of an embodiment of a user interface for viewing and managing the data associated with components in the graphical representation of a network in a company. The display in FIG. 6C can be the user interface that is displayed by selecting component 614*e* as described with respect to FIG. 6B. The display in FIG. 6C can represent multiple servers 631*a*-631*c*. A server 631*a* can have an identifying visual icon 632*a*, a name 633*a*, an address 634*a*, access information 635*a*, a hostname 636*a*, operating system information 637*a*, and information for some or all of the network interface cards (NICs) including name 638*a* and address 639*a*. This information can be repeated for servers 631*b*-631*c*.

Figure 6D:
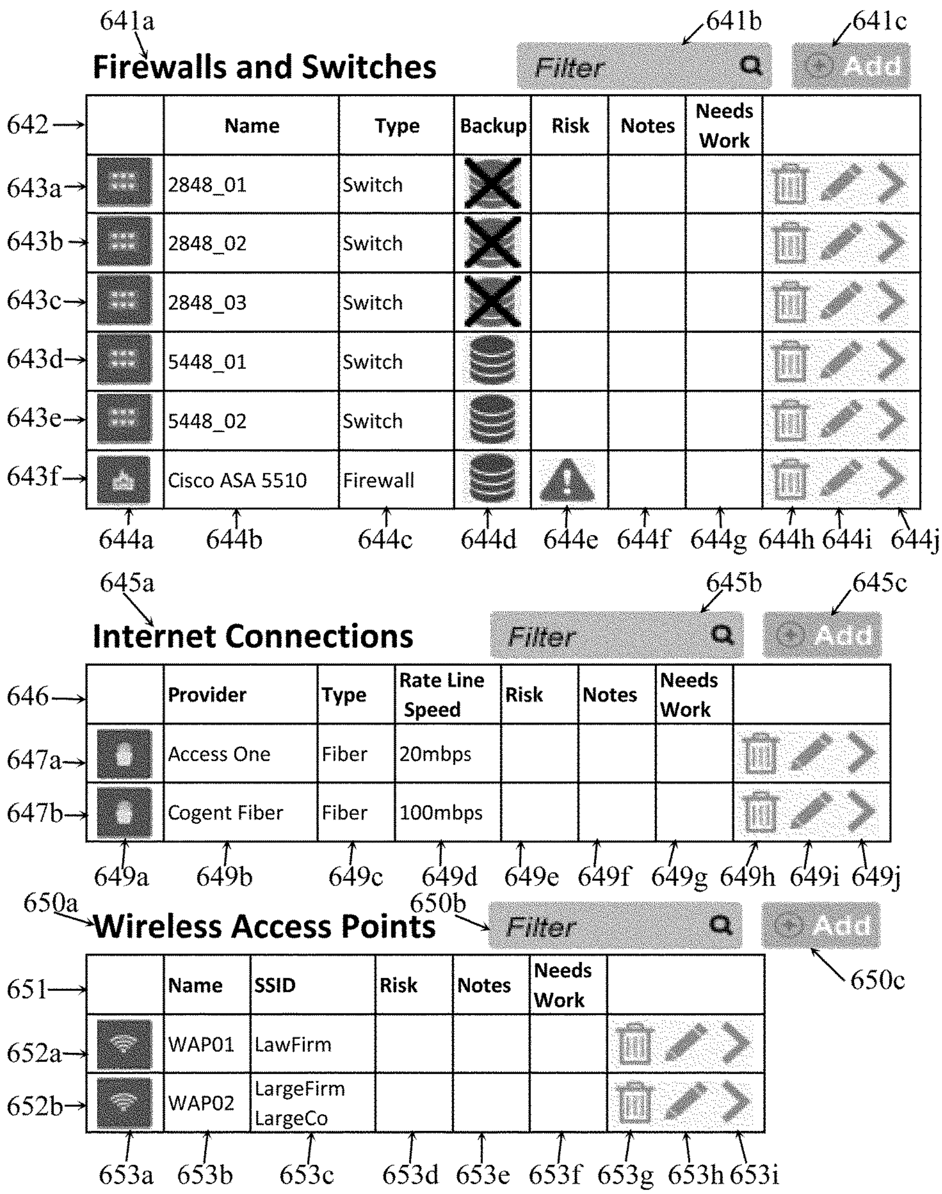
FIG. 6D and FIG. 6E are illustrative examples of embodiments of a user interface for viewing and managing a list of the components of a network in a company.
Figure 6E:
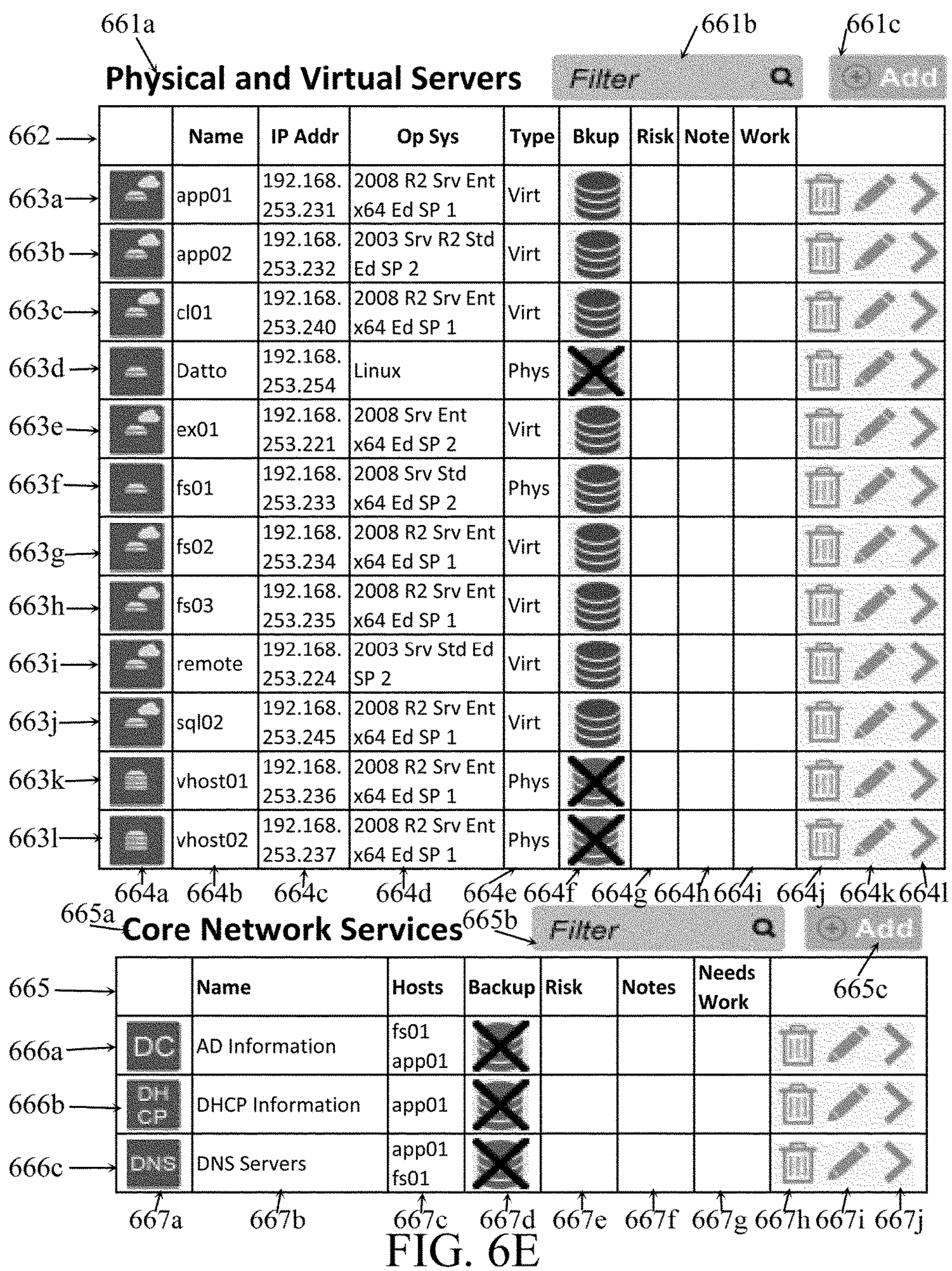

FIG. 6D and FIG. 6E are illustrative examples of an embodiment of a user interface for viewing and managing a list of the components of a network in a company. The displays in FIG. 6D and FIG. 6E can correspond to tabular displays of the information shown in FIG. 6B. The information about the list of components can be shown in three tables in FIG. 6D identified by headers 641*a*, 645*a*, and 650*a*, and two tables in FIG. 6E identified by headers 661*a* and 665*a*.

The table identified by header 641*a* can display information about the firewalls and switches in the IT infrastructure of the company, with descriptive column headers 642, rows 643*a*-643*f* that can represent firewalls or switches, and columns 644*a*-644*j*. The filter tool 641*b* can be used to specify a filter that will select a subset of the data to be displayed. The Add button 641*c* can be selected to display a user interface for adding a new firewall or switch to the IT infrastructure documentation. Column 644*a* can display a visual icon showing the type of the firewall or switch in each row. Column 644*b* can display the name of the firewall or switch in each row. Column 644*c* can display the type of the firewall or switch in each row. Column 644*d* can display an icon providing a visual indicator of whether or not the firewall or switch in each row is being backed up. Column 644*e* can display an icon providing a visual indicator of the presence and severity of identified risks for the firewall or switch in each row. Column 644*f* can display an icon providing a visual indicator of the presence and importance of notes on the firewall or switch in each row. Column 644*g* can display an icon providing a visual indicator of how many outstanding documentation issues should be resolved for the firewall or switch in each row. Column 644*h* can display an icon that can be selected to remove the firewall or switch in each row from the documentation. Column 644*i* can display an icon that can be selected to display a user interface for editing the information about the firewall or switch in each row. Column 644*j* can display an icon that can be selected to display a user interface for viewing the extended information about the firewall or switch in each row.

The table identified by header 645*a* can display information about the internet connections in the IT infrastructure of the company, with descriptive column headers 646, rows 647*a*-647*b* that can represent internet connections, and columns 649*a*-649*j*. The filter tool 645*b* can be used to specify a filter that will select a subset of the data to be displayed. The Add button 645*c* can be selected to display a user interface for adding a new internet connection to the IT infrastructure documentation. Column 649*a* can display a visual icon showing the type of the internet connection in each row. Column 649*b* can display the provider of the internet connection in each row. Column 649*c* can display the type of the internet connection in each row. Column 649*d* can display the rate or line speed of the internet connection in each row. Column 649*e* can display an icon providing a visual indicator of the presence and severity of identified risks for the internet connection in each row. Column 649*f* can display an icon providing a visual indicator of the presence and importance of notes on the internet connection in each row. Column 649*g* can display an icon providing a visual indicator of how many outstanding documentation issues should be resolved for the internet connection in each row. Column 649*h* can display an icon that can be selected to remove the internet connection in each row from the documentation. Column 649*i* can display an icon that can be selected to display a user interface for editing the information about the internet connection in each row. Column 649*j* can display an icon that can be selected to display a user interface for viewing the extended information about the internet connection in each row.

The table identified by header 650*a* can display information about the wireless access points in the IT infrastructure of the company, with descriptive column headers 651, rows 652*a*-652*b* that can represent wireless access points, and columns 653*a*-653*i*. The filter tool 650*b* can be used to specify a filter that will select a subset of the data to be displayed. The Add button 650*c* can be selected to display a user interface for adding a new wireless access point to the IT infrastructure documentation. Column 653*a* can display a visual icon showing the type of the wireless access point in each row. Column 653*b* can display the name of the wireless access point in each row. Column 653*c* can display the service set identification (SSID) of the wireless access point in each row. Column 653*d* can display an icon providing a visual indicator of the presence and severity of identified risks for the wireless access point in each row. Column 653*e* can display an icon providing a visual indicator of the presence and importance of notes on the wireless access point in each row. Column 653*f* can display an icon providing a visual indicator of how many outstanding documentation issues should be resolved for the wireless access point in each row. Column 653*g* can display an icon that can be selected to remove the wireless access point in each row from the documentation. Column 653*h* can display an icon that can be selected to display a user interface for editing the information about the wireless access point in each row. Column 653*i* can display an icon that can be selected to display a user interface for viewing the extended information about the wireless access point in each row.

Turning to FIG. 6E, the table identified by header 661*a* can display information about the physical and virtual servers in the IT infrastructure of the company, with descriptive column headers 662, rows 663*a*-663*l* that can represent physical or virtual servers, and columns 664*a*-664*l*. The filter tool 661*b* can be used to specify a filter that will select a subset of the data to be displayed. The Add button 661*c* can be selected to display a user interface for adding a new physical or virtual server to the IT infrastructure documentation. Column 664*a* can display a visual icon showing the type of the physical or virtual server in each row. Column 664*b* can display the name of the physical or virtual server in each row. Column 664*c* can display the address of the physical or virtual server in each row. Column 664*d* can display the operating system of the physical or virtual server in each row. Column 664*e* can display an indicator of whether the server in each row is virtual or physical. Column 664*f* can display an icon providing a visual indicator of whether or not the physical or virtual server in each row is being backed up. Column 664*g* can display an icon providing a visual indicator of the presence and severity of identified risks for the physical or virtual server in each row. Column 664*h* can display an icon providing a visual indicator of the presence and importance of notes on the physical or virtual server in each row. Column 664*i* can display an icon providing a visual indicator of how many outstanding documentation issues should be resolved for the physical or virtual server in each row. Column 664*j* can display an icon that can be selected to remove the physical or virtual server in each row from the documentation. Column 664*k* can display an icon that can be selected to display a user interface for editing the information about the physical or virtual server in each row. Column 664*l* can display an icon that can be selected to display a user interface for viewing the extended information about the physical or virtual server in each row.

The table identified by header 665*a* can display information about the core network services in the IT infrastructure of the company, with descriptive column headers 665, rows 666*a*-666*c* that can represent core network services, and columns 667*a*-667*j*. The filter tool 665*b* can be used to specify a filter that will select a subset of the data to be displayed. The Add button 665*c* can be selected to display a user interface for adding a new core network service to the IT infrastructure documentation. Column 667*a* can display a visual icon showing the type of the core network service in each row. Column 667*b* can display the name of the core network service in each row. Column 667*c* can display the name of the hosts on which the core network service in each row runs. Column 667*d* can display an icon providing a visual indicator of whether or not the core network service in each row is being backed up. Column 667*e* can display an icon providing a visual indicator of the presence and severity of identified risks for the core network service in each row. Column 667*f* can display an icon providing a visual indicator of the presence and importance of notes on the core network service in each row. Column 667*g* can display an icon providing a visual indicator of how many outstanding documentation issues should be resolved for the core network service in each row. Column 667*h* can display an icon that can be selected to remove the core network service in each row from the documentation. Column 667*i* can display an icon that can be selected to display a user interface for editing the information about the core network service in each row. Column 667*j* can display an icon that can be selected to display a user interface for viewing the extended information about the core network service in each row.

Figure 6F:
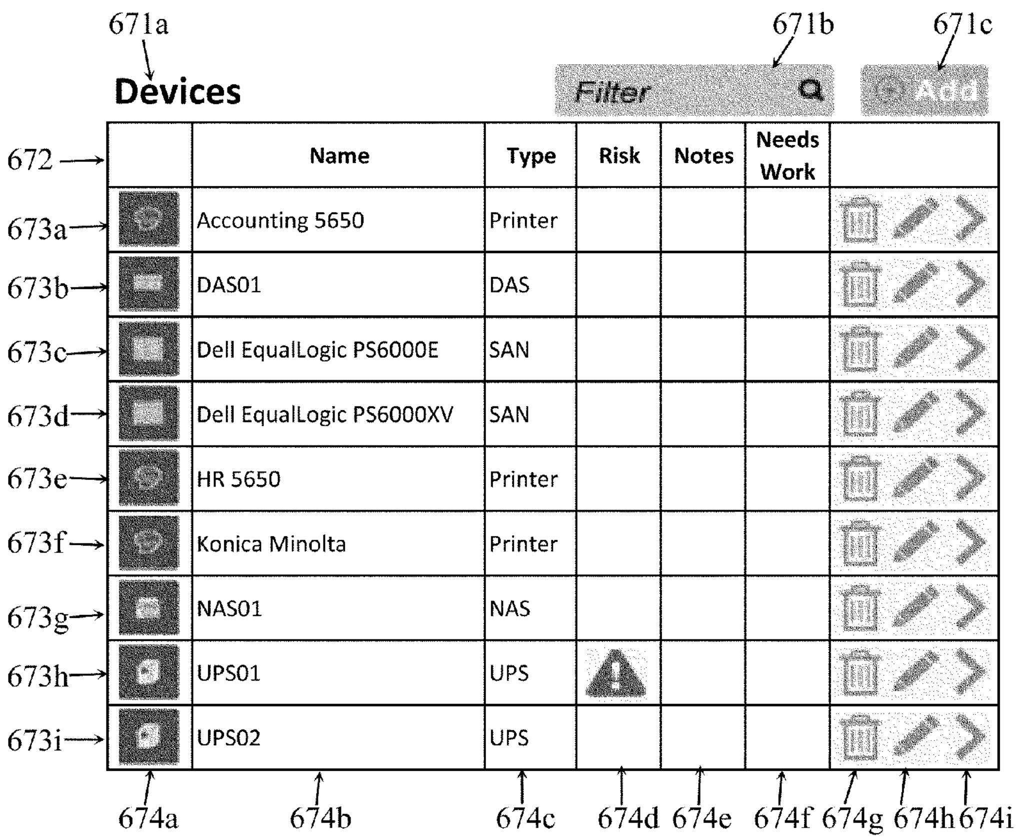
FIG. 6F is an illustrative example of an embodiment of a user interface for viewing and managing a list of the devices connected to a network in a company.

FIG. 6F is an illustrative example of an embodiment of a user interface for viewing and managing a list of the devices connected to a network in a company. The display in FIG. 6F can be identified by a header 671*a*, and the information can be displayed in a tabular form with descriptive column headers 672, rows 673*a*-673*i* that can represent devices, and columns 674a-674i. The filter tool 671b can be used to specify a filter that will select a subset of the data to be displayed. The Add button 671c can be selected to display a user interface for adding a new device to the IT infrastructure documentation. Column 674a can display a visual icon showing the type of the device in each row. Column 674b can display the name of the device in each row. Column 674c can display the type of the device in each row runs. Column 674d can display an icon providing a visual indicator of the presence and severity of identified risks for the device in each row. Column 674e can display an icon providing a visual indicator of the presence and importance of notes on the device in each row. Column 674f can display an icon providing a visual indicator of how many outstanding documentation issues should be resolved for the device in each row. Column 674g can display an icon that can be selected to remove the device in each row from the documentation. Column 674h can display an icon that can be selected to display a user interface for editing the information about the device in each row. Column 674i can display an icon that can be selected to display a user interface for viewing the extended information about the device in each row.

FIG. 6G is an illustrative example of an embodiment of a user interface for viewing and managing a list of the roles played by components of a network in a company. The display in FIG. 6G can be identified by a header 681a, and the information can be displayed in a tabular form with descriptive column headers 682, rows 683a-683o that can represent roles, and columns 684a-684j. The filter tool 681b can be used to specify a filter that will select a subset of the data to be displayed. The Add button 681c can be selected to display a user interface for adding a new role to the IT infrastructure documentation. Column 684a can display a visual icon showing the type of the role in each row. Column 684b can display the name of the role in each row. Column 684c can display the names of the applications for which the role in each row applies. Column 684d can display the name of the server that serves the role, or an icon representing a cloud if the role is served by an external (cloud) service. Column 684e can display an icon providing a visual indicator of the presence and severity of identified risks for the role in each row. Column 684f can display an icon providing a visual indicator of the presence and importance of notes on the role in each row. Column 684g can display an icon providing a visual indicator of how many outstanding documentation issues should be resolved for the role in each row. Column 684h can display an icon that can be selected to remove the role in each row from the documentation. Column 684i can display an icon that can be selected to display a user interface for editing the information about the role in each row. Column 684j can display an icon that can be selected to display a user interface for viewing the extended information about the role in each row.

Figure 7A:
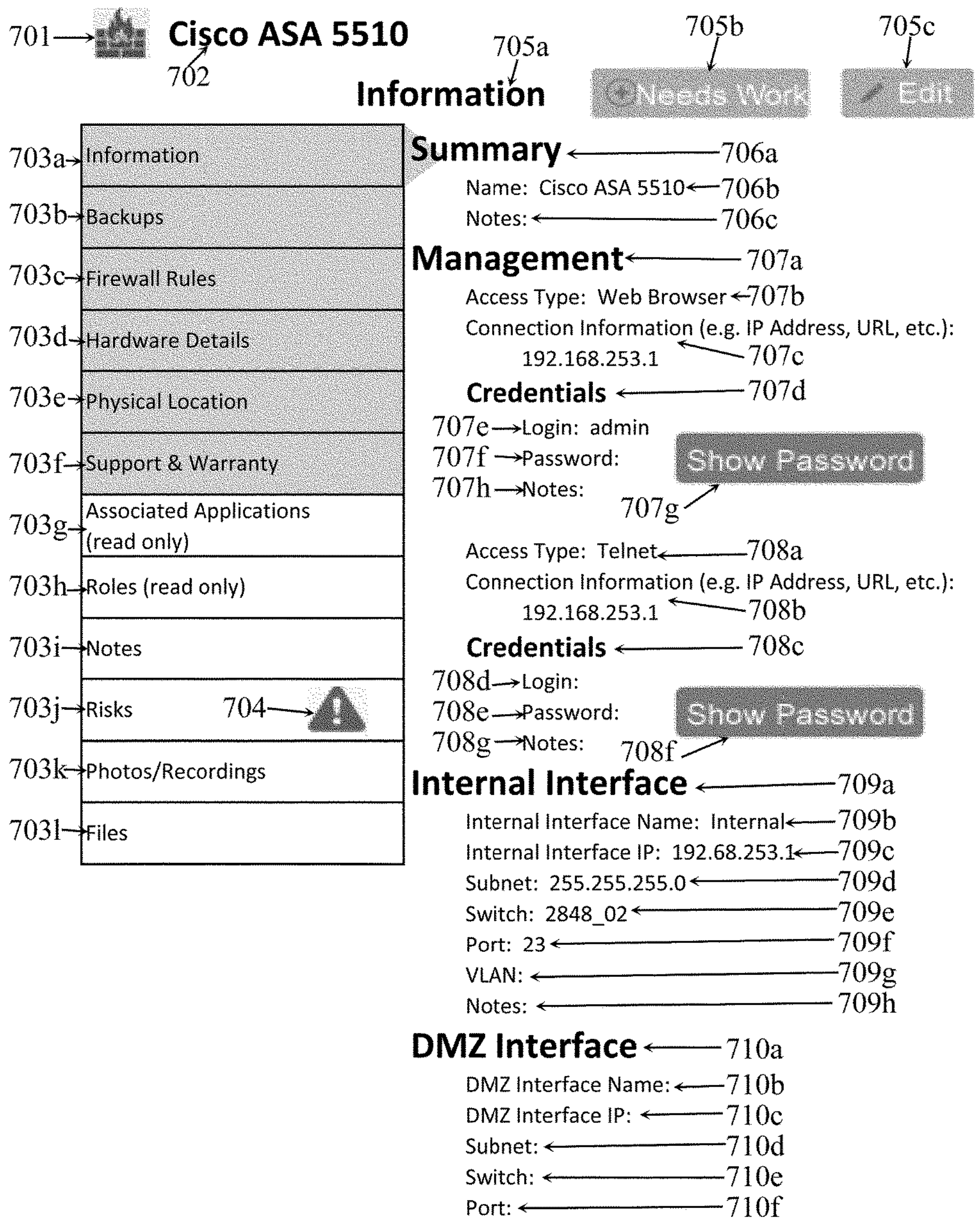
FIG. 7A and FIG. 7B are illustrative examples of embodiments of a user interface for viewing and updating general information about a firewall component of a network.
Figure 7B:
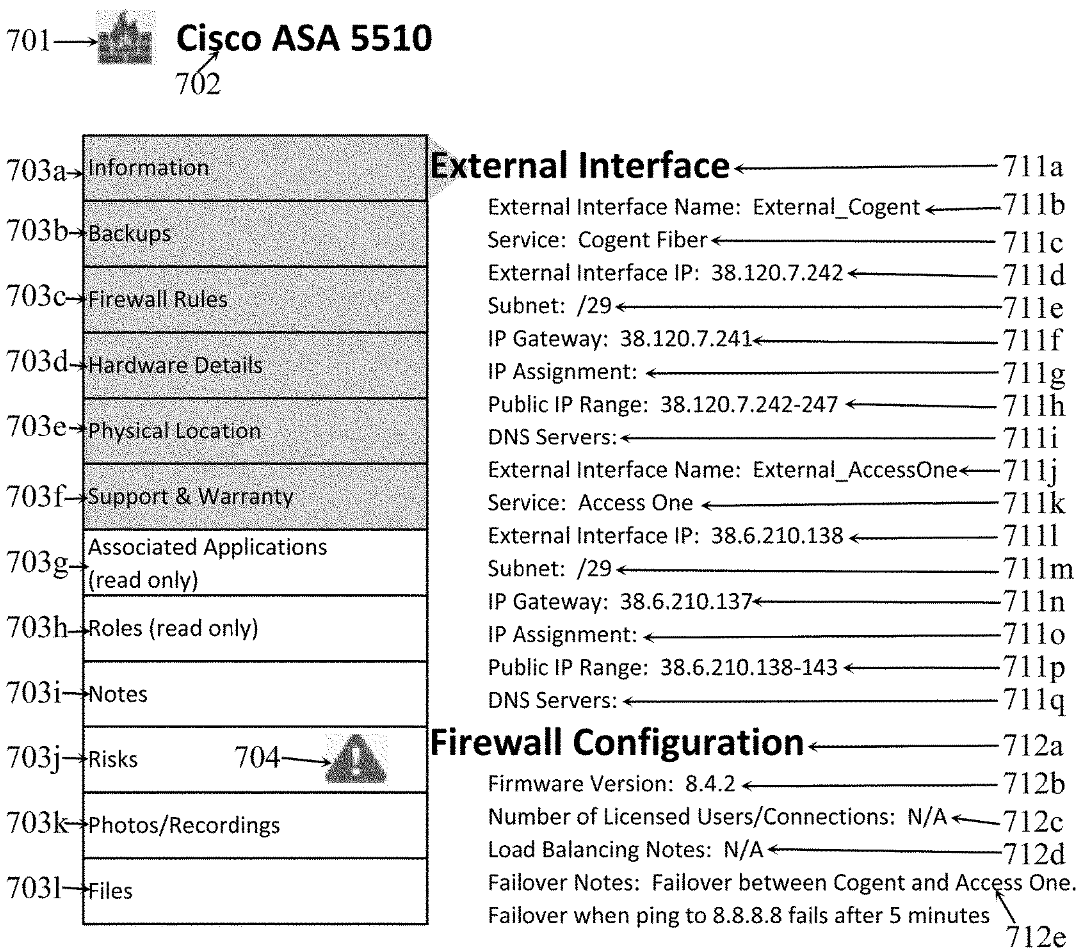

FIG. 7A and FIG. 7B are illustrative examples of an embodiment of a user interface for viewing and updating general information about a firewall component of a network. The display in FIG. 7A and FIG. 7B can be the user interface that is displayed by selecting the icon in column 644j as described with respect to FIG. 6D. The display in FIG. 7A and FIG. 7B can be identified by a visual icon 701 that can represent the type of firewall, and the name 702 of the firewall. The display options 703a-703l can be shown on the left, and as seen in FIG. 7A and FIG. 7B, the selected display option, which is the Information option 703a in the example of FIG. 7A and FIG. 7B, can have a visual indicator of an arrow on the right side to indicate that this option is selected. The display options 703a-703l can have visual icons highlighting status, for example, the Risks display option 703j in FIG. 7A and FIG. 7B has a visual icon 704 indicating that a high priority risk is on this firewall. The initial part of the display shown in FIG. 7A can have a header 705a indicating the Information display option that is selected. The Needs Work button 705b can select a user interface for marking the documentation about the Information of this firewall as incomplete. The Edit button 705c can select a user interface for editing the documentation about the Information of this firewall.

The Summary section 706a can contain the name 706b of the firewall and notes 706c that are specific to the firewall. The Management section 707a can contain the method for accessing the firewall 707b, the address 707c for accessing the firewall, and a set of credentials 707d for accessing the firewall. The Credentials 707d can contain a username 707e, a password 707f, and notes 707h that are specific to the credentials. To prevent casual accidental disclosure of the password, the password can be obscured by a Show Password button 707g that can be selected to display the actual password. There may be more than one way to access the firewall. For example, FIG. 7A has a second access method 708a-708f similar to the access method 707b-707g previously described. The Internal Interface section 709a can contain a name 709b for the interface, an address 709c for the interface, a subnet mask 709d for the interface, the name of the switch 709e that is connected to the interface, the port 709f that the interface is on, the virtual local area network (VLAN) 709g that the interface is on, and notes 709h that are specific to the interface. The demilitarized zone (DMZ) Interface section 710a can contain a name 710b for the interface, an address 710c for the interface, a subnet mask 710d for the interface, the name of the switch 710e that is connected to the interface, and the port 710f that the interface is on.

Turning to FIG. 7B, the External Interface section 711a can contain a name 711b for the interface, a description of the service 711c for the interface, an address 711d for the interface, a subnet mask 711e for the interface, a gateway 711f for the interface, an assignment 711g for the interface, a public address range 711h for the interface, and the name of the DNS servers 711i used for the interface. The firewall may have more than one external interface, for example, FIG. 7B illustrates a second external interface 711j-711q that is similar to the external interface 711b-711i previously described. The Firewall Configuration section 712a can contain a firmware version 712b, a count of the licensed connections 712c, notes 712d specific to load balancing, and notes 712e specific to failover.

Figure 7C:
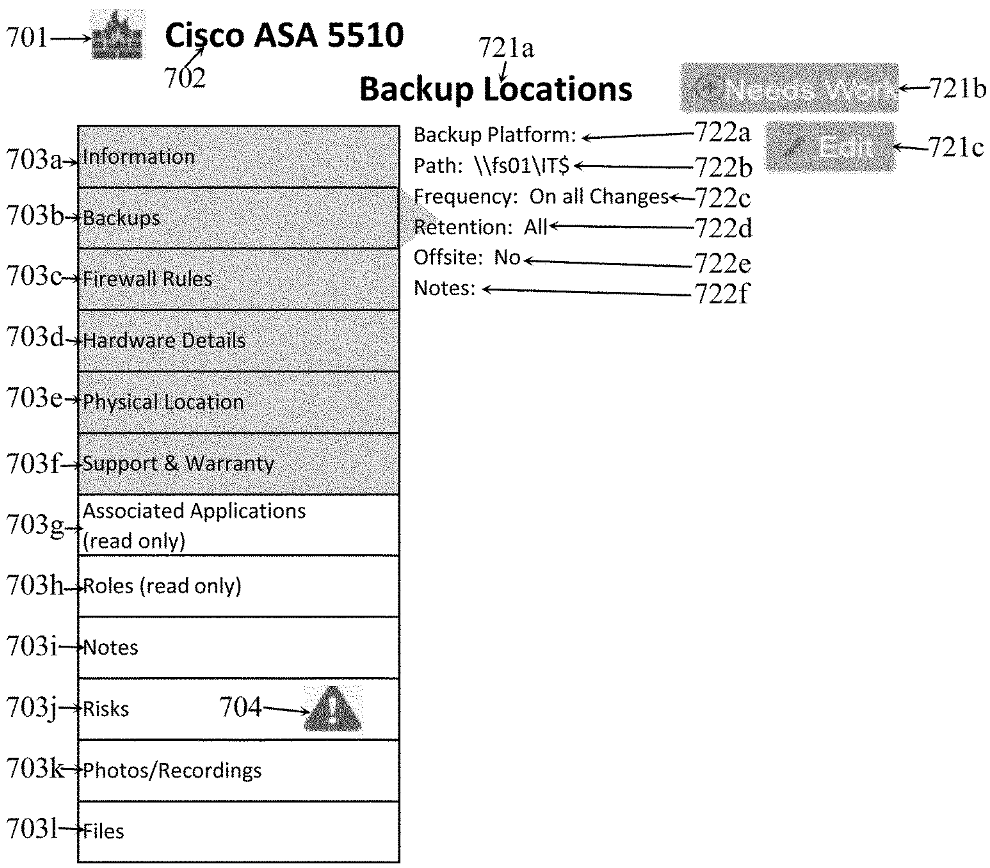
FIG. 7C is an illustrative example of an embodiment of a user interface for viewing and updating backup information about a firewall component of a network.

FIG. 7C is an illustrative example of an embodiment of a user interface for viewing and updating backup information about a firewall component of a network. The display in FIG. 7C can be the user interface that is displayed by selecting the display option 703b as described with respect to FIG. 7A and FIG. 7B. The display in FIG. 7C can be identified by a visual icon 701 that can represent the type of firewall, and the name 702 of the firewall. The display options 703a-703l can be shown on the left, and as seen in FIG. 7C, the selected display option, which is the Backups option 703b in the example of FIG. 7C, can have a visual indicator of an arrow on the right side to indicate that this option is selected. The display options 703a-703l can have visual icons highlighting status, for example, the Risks display option 703j in FIG. 7C has a visual icon 704 indicating that a high priority risk is on this firewall. The display in FIG. 7C can have a header 721a indicating the Backups display option that is selected. The Needs Work button 721*b* can select a user interface for marking the documentation about the Backups of this firewall as incomplete. The Edit button 721*c* can select a user interface for editing the documentation about the Backups of this firewall. The Backups information can contain the platform 722*a* that is used for backing up the firewall, the path 722*b* to the backup files, the frequency 722*c* of backups, the retention period 722*d* for backups, a description 722*e* of the policy for offsite backups, and notes 722*f* specific to the backups.

Figure 7D:
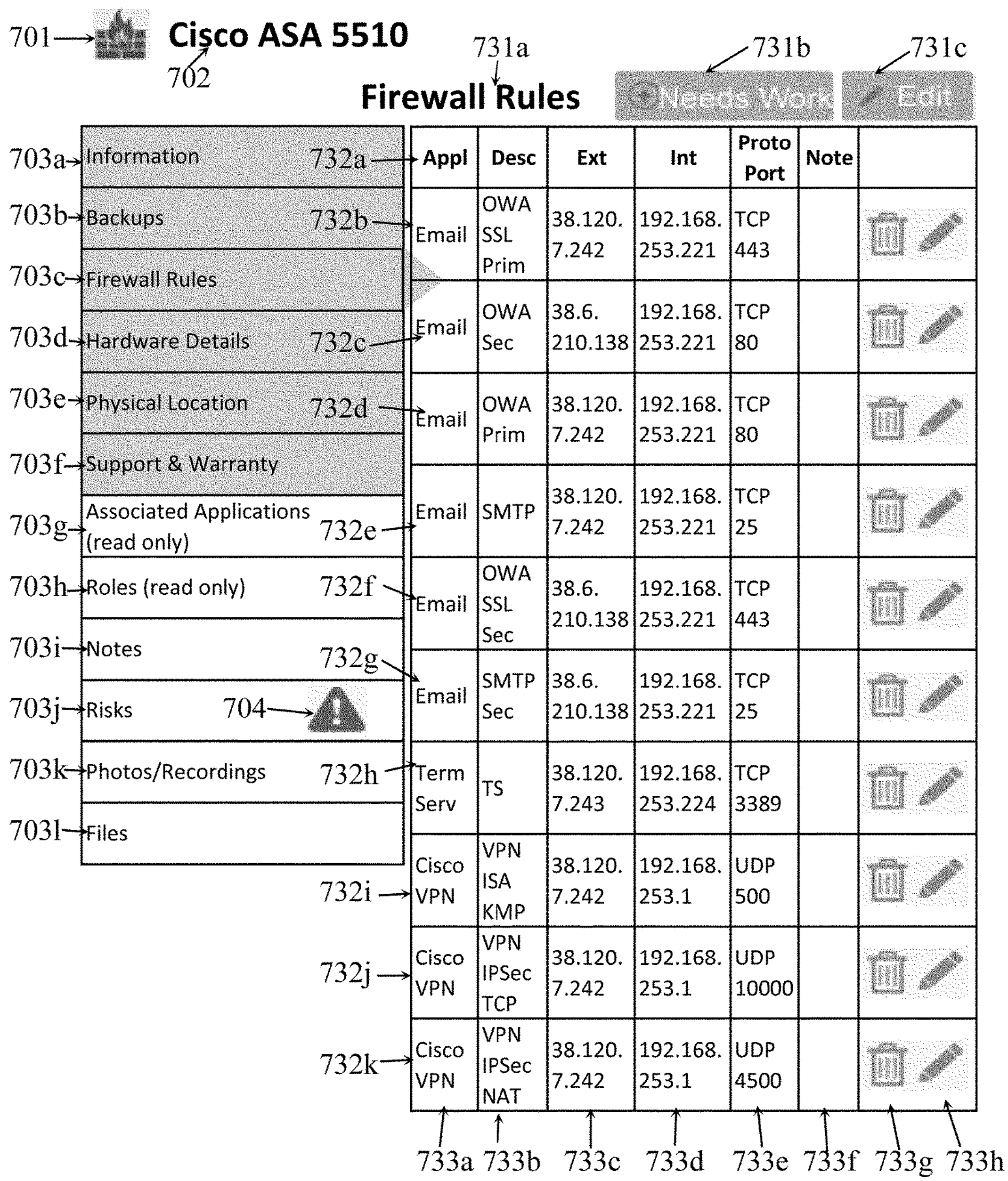
FIG. 7D is an illustrative example of an embodiment of a user interface for viewing and updating firewall rules for a firewall component of a network.

FIG. 7D is an illustrative example of an embodiment of a user interface for viewing and updating firewall rules for a firewall component of a network. The display in FIG. 7D can be the user interface that is displayed by selecting the display option 703*c* as described with respect to FIG. 7A and FIG. 7B. The display in FIG. 7D can be identified by a visual icon 701 that can represent the type of firewall, and the name 702 of the firewall. The display options 703*a*-703*l* can be shown on the left, and as seen in FIG. 7D, the selected display option, which is the Firewall Rules option 703*c* in the example of FIG. 7D, can have a visual indicator of an arrow on the right side to indicate that this option is selected. The display options 703*a*-703*l* can have visual icons highlighting status, for example, the Risks display option 703*j* in FIG. 7D has a visual icon 704 indicating that a high priority risk is on this firewall. The display in FIG. 7D can have a header 731*a* indicating the Firewall Rules display option that is selected. The Needs Work button 731*b* can select a user interface for marking the documentation about the Firewall Rules of this firewall as incomplete. The Edit button 731*c* can select a user interface for editing the documentation about the Firewall Rules of this firewall.

The information about the firewall rules can be displayed in a tabular form with descriptive column headers 732*a*, rows 732*b*-732*k* that can represent firewall rules, and columns 733*a*-733*h*. Column 733*a* can display the application affected by the rule in each row. Column 733*b* can display the description of the rule in each row. Column 733*c* can display the external address that is allowed access by the rule in each row. Column 733*d* can display the internal address for routing traffic by the rule in each row. Column 733*e* can display the protocol and port allowed by the rule in each row. Column 733*f* can display an icon providing a visual indicator of the presence and importance of notes specific to the rule in each row. Column 733*g* can display an icon that can be selected to remove the rule in each row from the documentation. Column 733*h* can display an icon that can be selected to display a user interface for editing the information about the rule in each row.

Figure 7E:
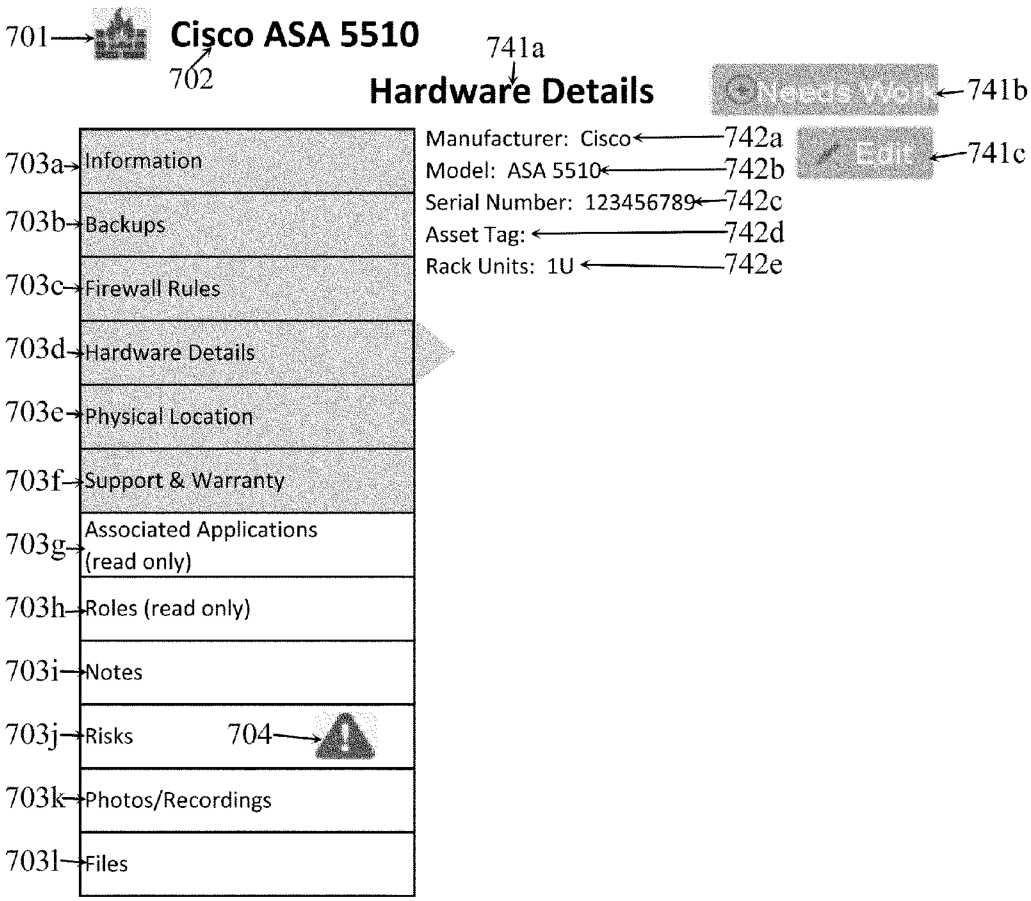
FIG. 7E is an illustrative example of an embodiment of a user interface for viewing and updating hardware details about a firewall component of a network.

FIG. 7E is an illustrative example of an embodiment of a user interface for viewing and updating hardware details about a firewall component of a network. The display in FIG. 7E can be the user interface that is displayed by selecting the display option 703*d* as described with respect to FIG. 7A and FIG. 7B. The display in FIG. 7E can be identified by a visual icon 701 that can represent the type of firewall, and the name 702 of the firewall. The display options 703*a*-703*l* can be shown on the left, and as seen in FIG. 7E, the selected display option, which is the Hardware Details option 703*d* in the example of FIG. 7E, can have a visual indicator of an arrow on the right side to indicate that this option is selected. The display options 703*a*-703*l* can have visual icons highlighting status, for example, the Risks display option 703*j* in FIG. 7E has a visual icon 704 indicating that a high priority risk is on this firewall. The display in FIG. 7E can have a header 741*a* indicating the Hardware Details display option that is selected. The Needs Work button 741*b* can select a user interface for marking the documentation about the Hardware Details of this firewall as incomplete. The Edit button 741*c* can select a user interface for editing the documentation about the Hardware Details of this firewall. The Hardware Details information can contain the manufacturer 742*a* of the firewall, the model number 742*b* of the firewall, the serial number 742*c* of the firewall, the asset tag 742*d* of the firewall, and the number of units of rack space 742*e* used by the firewall unit.

Figure 7F:
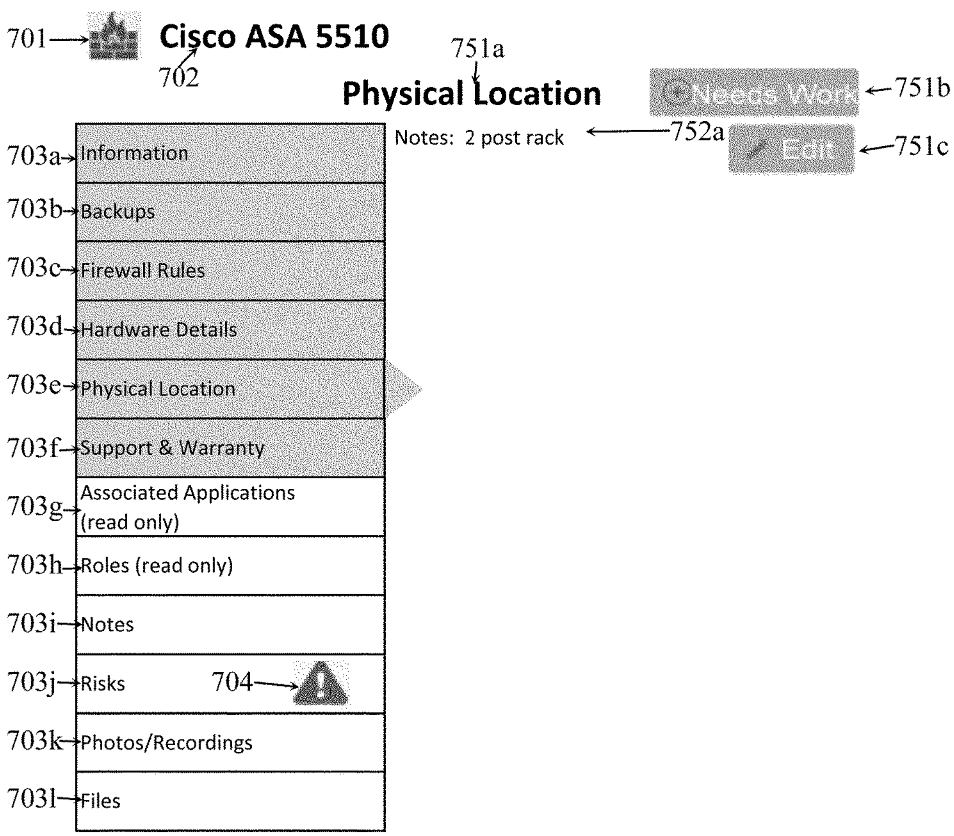
FIG. 7F is an illustrative example of an embodiment of a user interface for viewing and updating physical location information about a firewall component of a network.

FIG. 7F is an illustrative example of an embodiment of a user interface for viewing and updating physical location information about a firewall component of a network. The display in FIG. 7F can be the user interface that is displayed by selecting the display option 703*e* as described with respect to FIG. 7A and FIG. 7B. The display in FIG. 7F can be identified by a visual icon 701 that can represent the type of firewall, and the name 702 of the firewall. The display options 703*a*-703*l* can be shown on the left, and as seen in FIG. 7F, the selected display option, which is the Physical Location option 703*e* in the example of FIG. 7F, can have a visual indicator of an arrow on the right side to indicate that this option is selected. The display options 703*a*-703*l* can have visual icons highlighting status, for example, the Risks display option 703*j* in FIG. 7F has a visual icon 704 indicating that a high priority risk is on this firewall. The display in FIG. 7F can have a header 751*a* indicating the Physical Location display option that is selected. The Needs Work button 751*b* can select a user interface for marking the documentation about the Physical Location of this firewall as incomplete. The Edit button 751*c* can select a user interface for editing the documentation about the Physical Location of this firewall. The Physical Location information can contain notes 752*a* specific to the actual physical location of the firewall unit.

Figure 7G:
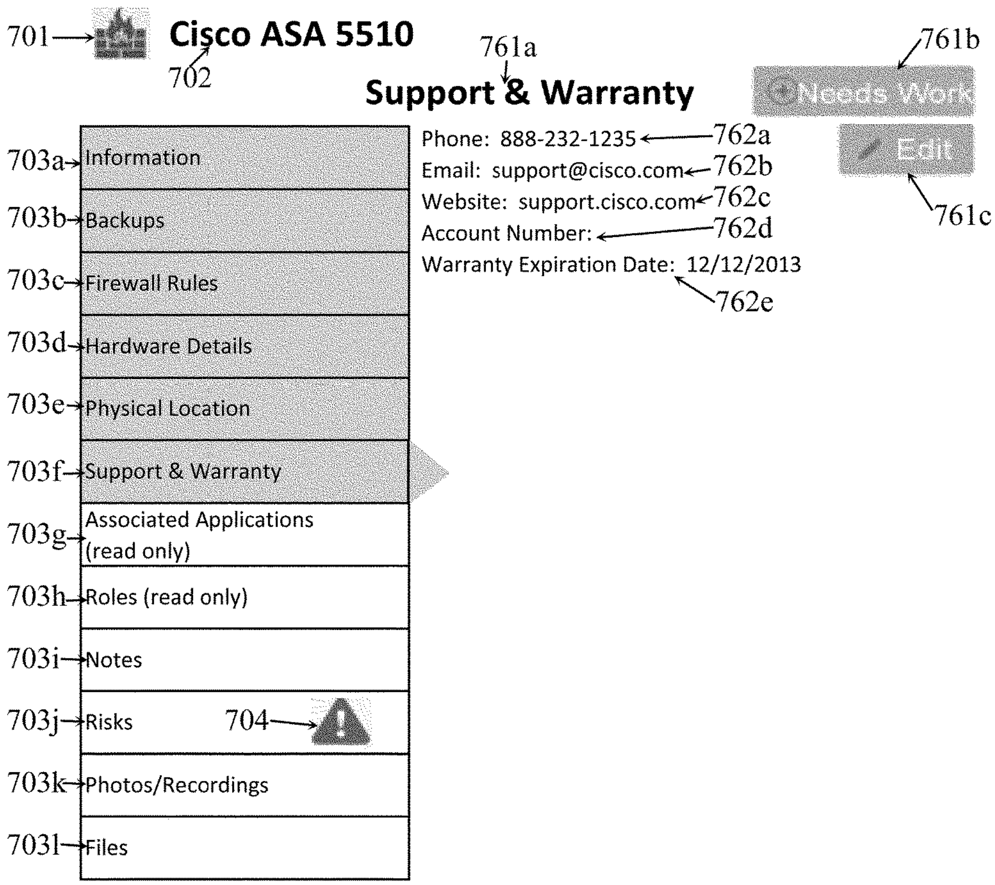
FIG. 7G is an illustrative example of an embodiment of a user interface for viewing and updating support and warranty information about a firewall component of a network.

FIG. 7G is an illustrative example of an embodiment of a user interface for viewing and updating support and warranty information about a firewall component of a network. The display in FIG. 7G can be the user interface that is displayed by selecting the display option 703*f* as described with respect to FIG. 7A and FIG. 7B. The display in FIG. 7G can be identified by a visual icon 701 that can represent the type of firewall, and the name 702 of the firewall. The display options 703*a*-703*l* can be shown on the left, and as seen in FIG. 7G, the selected display option, which is the Support & Warranty option 703*f* in the example of FIG. 7G, can have a visual indicator of an arrow on the right side to indicate that this option is selected. The display options 703*a*-703*l* can have visual icons highlighting status, for example, the Risks display option 703*j* in FIG. 7G has a visual icon 704 indicating that a high priority risk is on this firewall. The display in FIG. 7G can have a header 761*a* indicating the Support & Warranty display option that is selected. The Needs Work button 761*b* can select a user interface for marking the documentation about the Support & Warranty of this firewall as incomplete. The Edit button 761*c* can select a user interface for editing the documentation about the Support & Warranty of this firewall. The Support & Warranty information can contain a phone number 762*a* for accessing support for the firewall, an email address 762*b* for accessing support for the firewall, a web site address 762*c* for accessing support for the firewall, an account number 762*d* to be used when accessing support for the firewall, and an expiration date 762*e* for the warranty on the firewall.

Figure 7H:
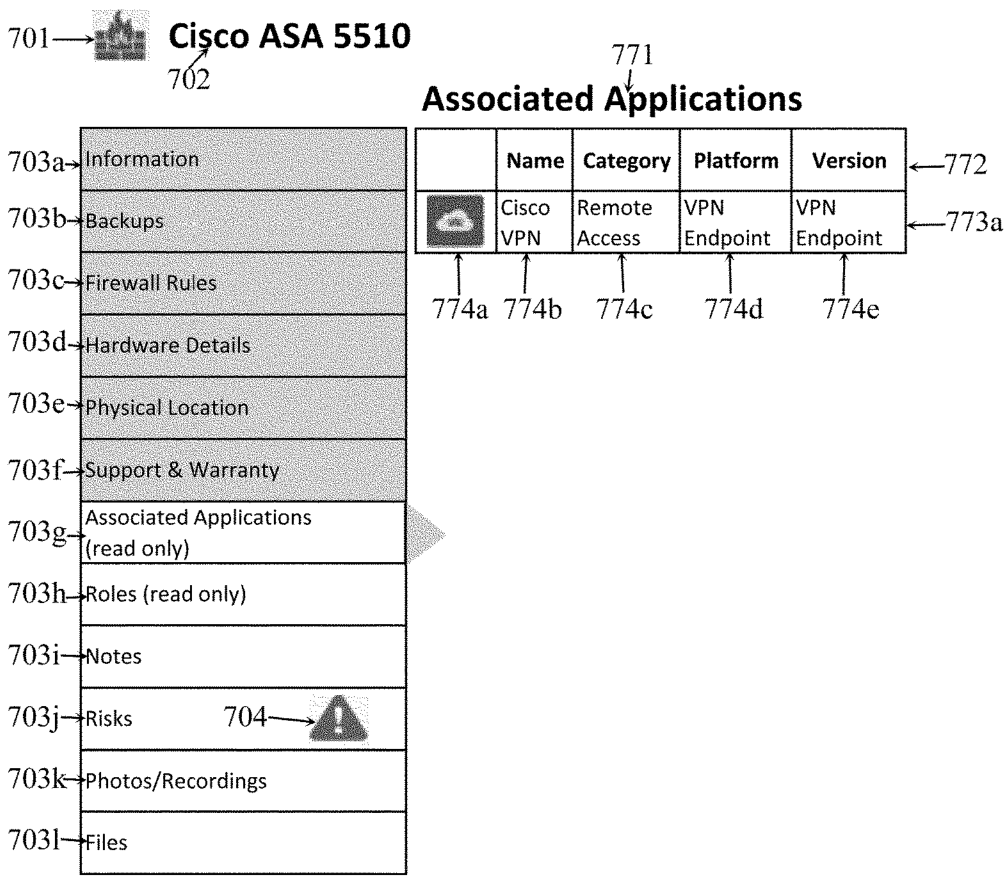
FIG. 7H is an illustrative example of an embodiment of a user interface for viewing information about applications that are associated with a firewall component of a network.

FIG. 7H is an illustrative example of an embodiment of a user interface for viewing information about applications that are associated with a firewall component of a network. The display in FIG. 7H can be the user interface that is displayed by selecting the display option 703*g* as described with respect to FIG. 7A and FIG. 7B. The display in FIG. 7H can be identified by a visual icon 701 that can represent the type of firewall, and the name 702 of the firewall. The display options 703*a*-703*l* can be shown on the left, and as seen in FIG. 7H, the selected display option, which is the Associated Applications option 703*g* in the example of FIG. 7H, can have a visual indicator of an arrow on the right side to indicate that this option is selected. The display options 703*a*-703*l* can have visual icons highlighting status, for example, the Risks display option 703*j* in FIG. 7H has a visual icon 704 indicating that a high priority risk is on this firewall. The display in FIG. 7H can have a header 771 indicating the Associated Applications display option that is selected.

The information about the associated applications can be displayed as a read only display in a tabular form with descriptive column headers 772, rows 773*a* that can represent applications, and columns 774*a*-774*e*. The display can be read only because the associations with applications can be edited in other parts of the system, but the display in one table of some or all of the application information associated with the firewall can still be useful. For example, the relationship between the firewall and the associated applications may not be explicitly represented in the structured documentation. Instead, the documentation may represent the devices on which applications are installed, and the system may use the dependencies between applications to determine the dependencies of applications upon devices. In the example of FIG. 7H, the structured documentation may indicate that a Cisco firewall application is installed on the Cisco ASA 5510 firewall, and may separately indicate that the Cisco VPN application depends on the Cisco firewall application in order to operate. The system may then determine that the Cisco VPN application is associated with the Cisco ASA 5510 firewall. Column 774*a* can display a visual icon representing the role of the application in each row with respect to the firewall. Column 774*b* can display the name of the application in each row. Column 774*c* can display the category of the role of the application in each row with respect to the firewall. Column 774*d* can display the platform on which the application in each row runs. Column 774*e* can display the version of the application in each row.

Figure 8A:
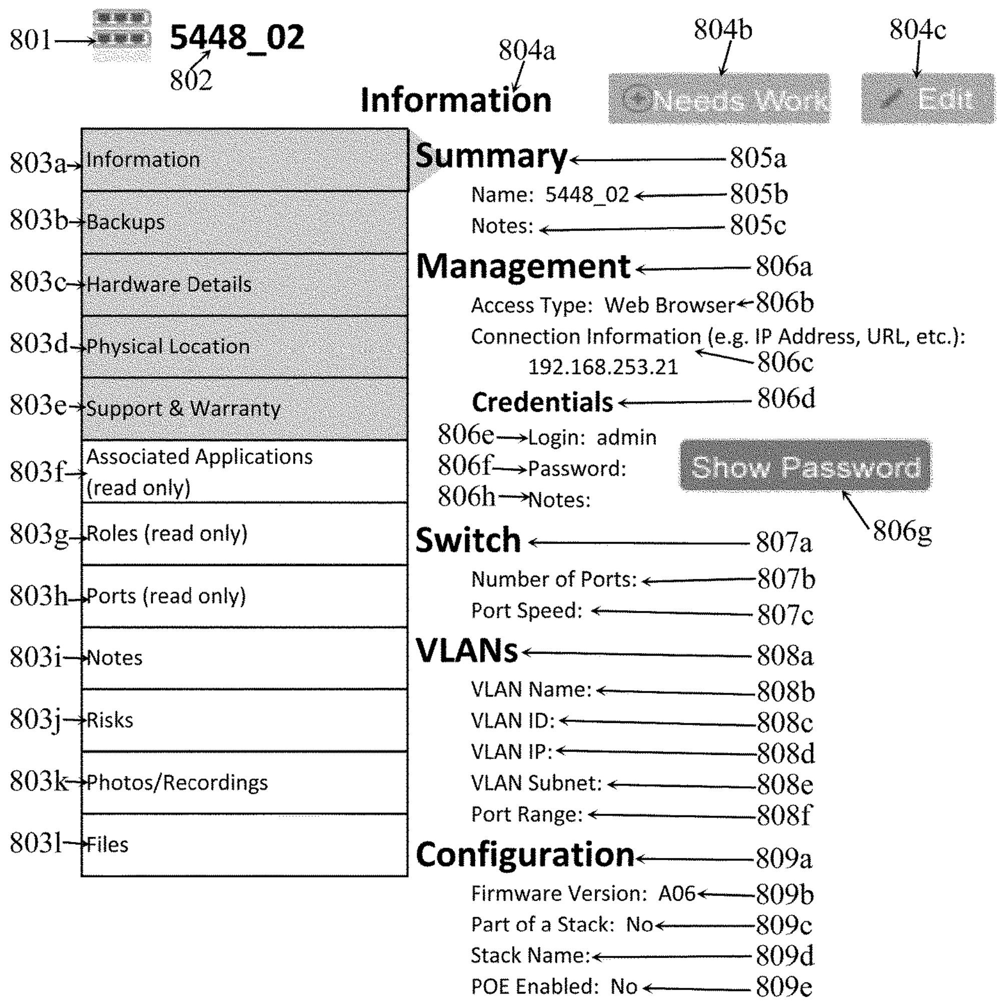
FIG. 8A is an illustrative example of an embodiment of a user interface for viewing and updating general information about a switch component of a network.

FIG. 8A is an illustrative example of an embodiment of a user interface for viewing and updating general information about a switch component of a network. The display in FIG. 8A can be the user interface that is displayed by selecting the icon in column 644*j* as described with respect to FIG. 6D. The display in FIG. 8A can be identified by a visual icon 801 that can represent the type of switch, and the name 802 of the switch. The display options 803*a*-803*l* can be shown on the left, and as seen in FIG. 8A, the selected display option, which is the Information option 803*a* in the example of FIG. 8A, can have a visual indicator of an arrow on the right side to indicate that this option is selected. The display shown in FIG. 8A can have a header 804*a* indicating the Information display option that is selected. The Needs Work button 804*b* can select a user interface for marking the documentation about the Information of this switch as incomplete. The Edit button 804*c* can select a user interface for editing the documentation about the Information of this switch.

The Summary section 805*a* can contain the name 805*b* of the switch and notes 805*c* that are specific to the switch. The Management section 806*a* can contain the method for accessing the switch 806*b*, the address 806*c* for accessing the switch, and a set of credentials 806*d* for accessing the switch. The Credentials 806*d* can contain a username 806*e*, a password 806*f*, and notes 806*h* that are specific to the credentials. To prevent casual accidental disclosure of the password, the password can be obscured by a Show Password button 806*g* that can be selected to display the actual password. The Switch section 807*a* can contain the number of physical ports 807*b* for the switch and the speed 807*c* for the physical ports on the switch. The virtual local area networks (VLANs) section 808*a* can contain a name 808*b* for the VLAN, an identification (ID) 808*c* for the VLAN, an address 808*d* for the VLAN, a subnet mask 808*e* for the VLAN, and a range of protocol ports 808*f* used on the VLAN. The Configuration section 809*a* can contain a firmware version 809*b* for the switch, an indicator 809*c* whether or not the switch is part of a stack, the name 809*d* of one or more stacks containing the switch, and an indicator 809*e* whether power over Ethernet (POE) is enabled on the switch.

Figure 8B:
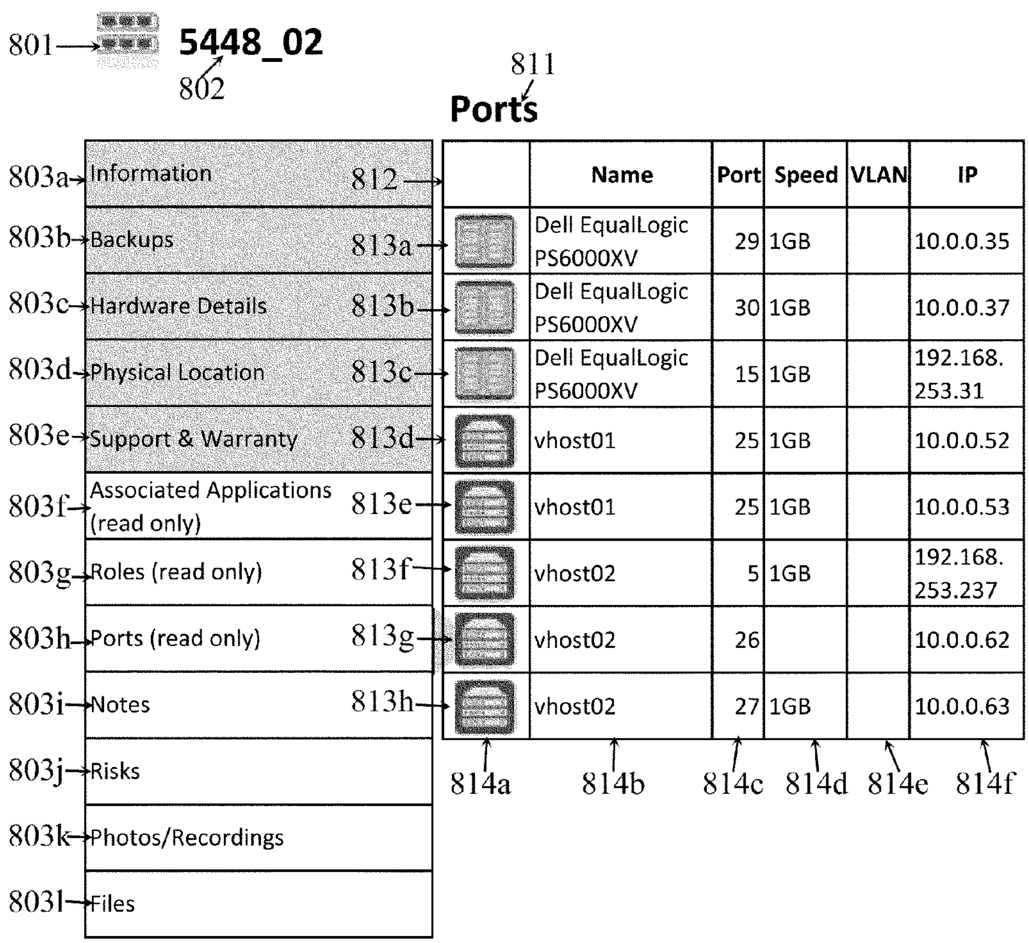
FIG. 8B is an illustrative example of an embodiment of a user interface for viewing port information about a switch component of a network.

FIG. 8B is an illustrative example of an embodiment of a user interface for viewing port information about a switch component of a network. The display in FIG. 8B can be the user interface that is displayed by selecting the display option 803*h* as described with respect to FIG. 8A. The display in FIG. 8B can be identified by a visual icon 801 that can represent the type of switch, and the name 802 of the switch. The display options 803*a*-803*l* can be shown on the left, and as seen in FIG. 8B, the selected display option, which is the Ports option 803*h* in the example of FIG. 8B, can have a visual indicator of an arrow on the right side to indicate that this option is selected. The display in FIG. 8B can have a header 811 indicating the Ports display option that is selected.

The information about the ports can be displayed as a read only display in a tabular form with descriptive column headers 812, rows 813*a*-813*h* that can represent physical ports on the switch, and columns 814*a*-814*f*. The display can be read only because the port associations can be edited in other parts of the system, but the display in one table of some or all of the port information associated with the switch can still be useful. For example, the relationship between the switch and the devices connected to it may not be explicitly represented in the structured documentation. Instead, the documentation may represent the network to which devices are connected, and the system may use the connectivity between networks and switch ports to determine the connectivity of devices to those switch ports. In the example of FIG. 8B, the structured documentation may indicate that a 5488_02 is connected to a specific network on port 29, and may separately indicate that a Dell EqualLogic PS6000XV is connected to that same network. The system may then determine that the Dell EqualLogic PS6000XV is connected to port 29 of the 5488_02 switch. Column 814*a* can display a visual icon identifying the type of component that is connected to the port in each row. Column 814*b* can display the name of the component that is connected to the port in each row. Column 814*c* can display the physical port number of the port in each row. Column 814*d* can display the speed of the connection for the port in each row. Column 814*e* can display the VLAN connected to the port in each row. Column 814*f* can display the address of the port in each row.

Figure 9A:
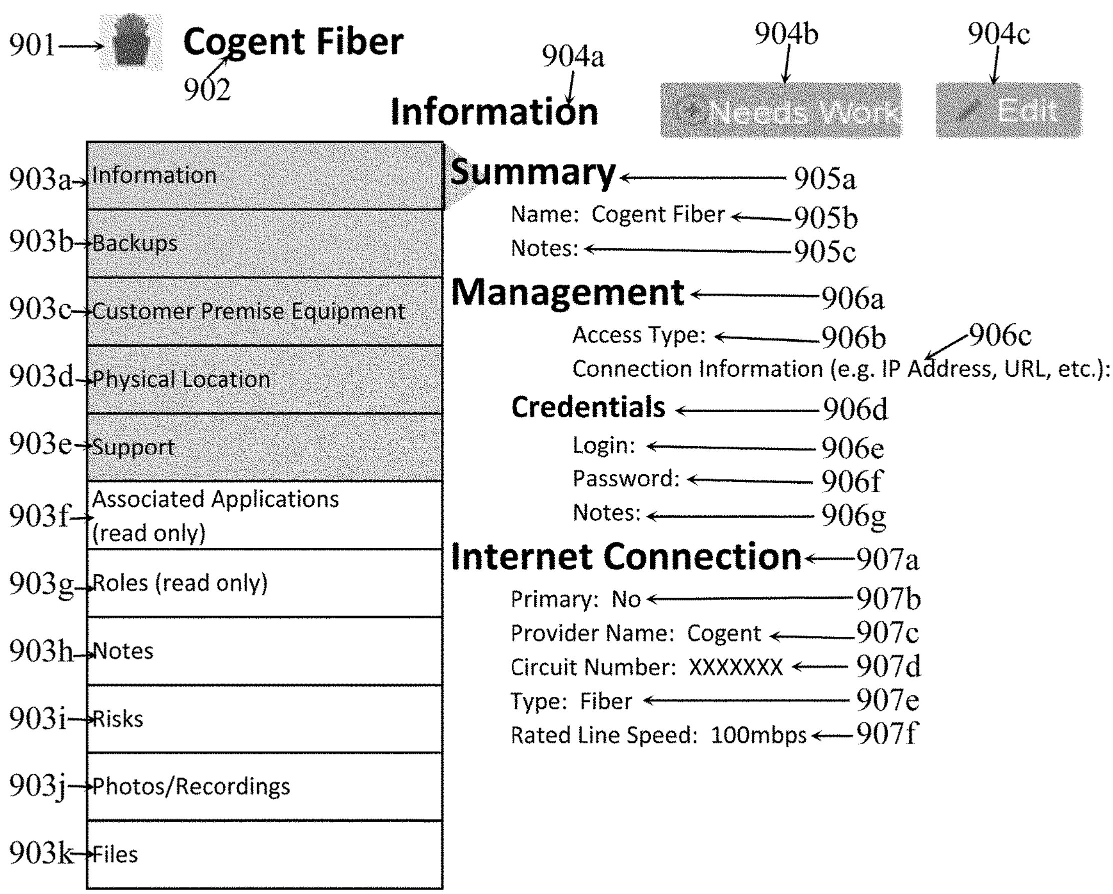
FIG. 9A is an illustrative example of an embodiment of a user interface for viewing and updating general information about an internet connection of a network.

FIG. 9A is an illustrative example of an embodiment of a user interface for viewing and updating general information about an internet connection of a network. The display in FIG. 9A can be the user interface that is displayed by selecting the icon in column 649*j* as described with respect to FIG. 6D. The display in FIG. 9A can be identified by a visual icon 901 that can represent the type of internet connection, and the name 902 of the internet connection. The display options 903*a*-903*k* can be shown on the left, and as seen in FIG. 9A, the selected display option, which is the Information option 903*a* in the example of FIG. 9A, can have a visual indicator of an arrow on the right side to indicate that this option is selected. The display shown in FIG. 9A can have a header 904*a* indicating the Information display option that is selected. The Needs Work button 904*b* can select a user interface for marking the documentation about the Information of this internet connection as incomplete. The Edit button 904*c* can select a user interface for editing the documentation about the Information of this internet connection.

The Summary section 905*a* can contain the name 905*b* of the internet connection and notes 905*c* that are specific to the internet connection. The Management section 906*a* can contain the method for accessing the internet connection 906*b*, the address 906*c* for accessing the internet connection, and a set of credentials 906*d* for accessing the internet connection. The Credentials 906*d* can contain a username 906*e*, a password 906*f*, and notes 906*g* that are specific to the credentials. The Internet Connection section 907*a* can contain an indication 907*b* about whether or not the internet connection is the primary connection for the company, the name 907*c* of the provider for the internet connection, the circuit number 907*d* of the internet connection, the type 907*e* of the internet connection, and the rated line speed 907*f* of the internet connection.

Figure 9B:
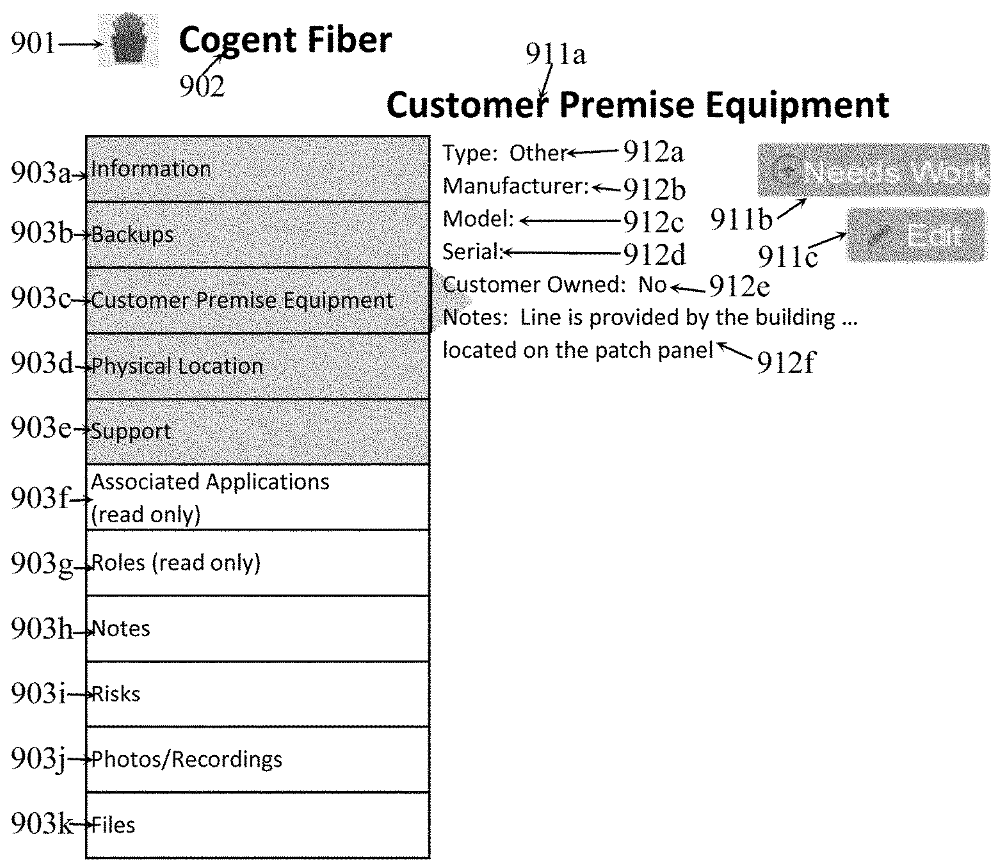
FIG. 9B is an illustrative example of an embodiment of a user interface for viewing and updating information about customer premise equipment of an internet connection of a network.

FIG. 9B is an illustrative example of an embodiment of a user interface for viewing and updating information about customer premise equipment of an internet connection of a network. The display in FIG. 9B can be the user interface that is displayed by selecting the display option 903*c* as described with respect to FIG. 9A. The display in FIG. 9B can be identified by a visual icon 901 that can represent the type of internet connection, and the name 902 of the internet connection. The display options 903*a*-903*k* can be shown on the left, and as seen in FIG. 9B, the selected display option, which is the Customer Premise Equipment option 903*c* in the example of FIG. 9B, can have a visual indicator of an arrow on the right side to indicate that this option is selected. The display in FIG. 9B can have a header 911*a* indicating the Customer Premise Equipment display option that is selected. The Needs Work button 911*b* can select a user interface for marking the documentation about the Customer Premise Equipment of this internet connection as incomplete. The Edit button 911*c* can select a user interface for editing the documentation about the Customer Premise Equipment of this internet connection. The Customer Premise Equipment information can contain the type 912*a* of the customer premise equipment, the manufacturer 912*b* of the customer premise equipment, the model 912*c* of the customer premise equipment, the serial number 912*d* of the customer premise equipment, an indicator 912*e* on whether the customer premise equipment is owned by the customer, and notes 912*f* specific to the customer premise equipment.

Figure 10:
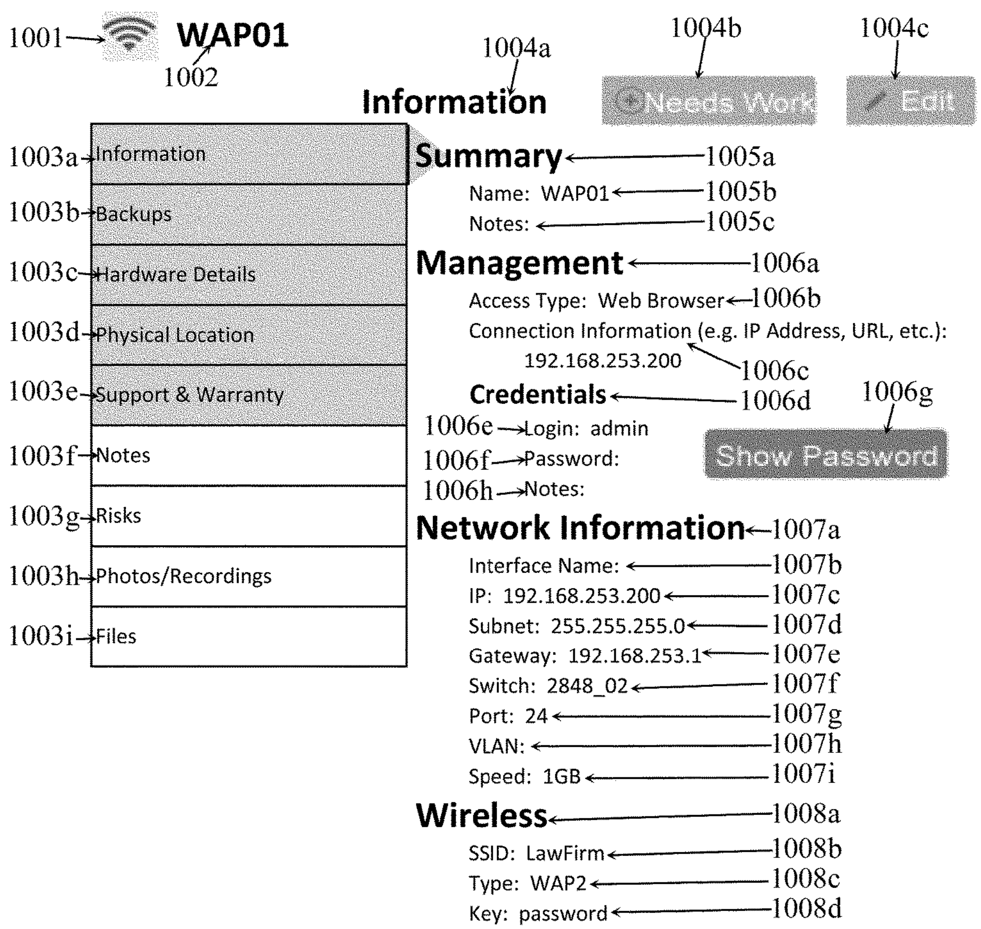
FIG. 10 is an illustrative example of an embodiment of a user interface for viewing and updating general information about a wireless access point of a network.

FIG. 10 is an illustrative example of an embodiment of a user interface for viewing and updating general information about a wireless access point of a network. The display in FIG. 10 can be the user interface that is displayed by selecting the icon in column 653*i* as described with respect to FIG. 6D. The display in FIG. 10 can be identified by a visual icon 1001 that can represent the type of wireless access point, and the name 1002 of the wireless access point. The display options 1003*a*-1003*i* can be shown on the left, and as seen in FIG. 10, the selected display option, which is the Information option 1003*a* in the example of FIG. 10, can have a visual indicator of an arrow on the right side to indicate that this option is selected. The display shown in FIG. 10 can have a header 1004*a* indicating the Information display option that is selected. The Needs Work button 1004*b* can select a user interface for marking the documentation about the Information of this wireless access point as incomplete. The Edit button 1004*c* can select a user interface for editing the documentation about the Information of this wireless access point.

The Summary section 1005*a* can contain the name 1005*b* of the wireless access point and notes 1005*c* that are specific to the wireless access point. The Management section 1006*a* can contain the method for accessing the wireless access point 1006*b*, the address 1006*c* for accessing the wireless access point, and a set of credentials 1006*d* for accessing the wireless access point. The Credentials 1006*d* can contain a username 1006*e*, a password 1006*f*, and notes 1006*h* that are specific to the credentials. To prevent casual accidental disclosure of the password, the password can be obscured by a Show Password button 1006*g* that can be selected to display the actual password. The Network Information section 1007*a* can contain the name 1007*b* of the internal interface of the wireless access point, the address 1007*c* of the internal interface of the wireless access point, the subnet mask 1007*d* of the internal interface of the wireless access point, the gateway address 1007*e* of the internal interface of the wireless access point, the name 1007*f* of the switch to which the internal interface of the wireless access point is connected, the physical port 1007*g* of the switch to which the internal interface of the wireless access point is connected, the VLAN 1007*h* to which the internal interface of the wireless access point is connected, and the speed 10071 of the internal interface of the wireless access point. The Wireless section 1008*a* can contain the service set identification (SSID) 1008*b* of the wireless access point, the security type 1008*c* of the wireless access point, and the password 1008*d* for the security type of the wireless access point.

Figure 11A:
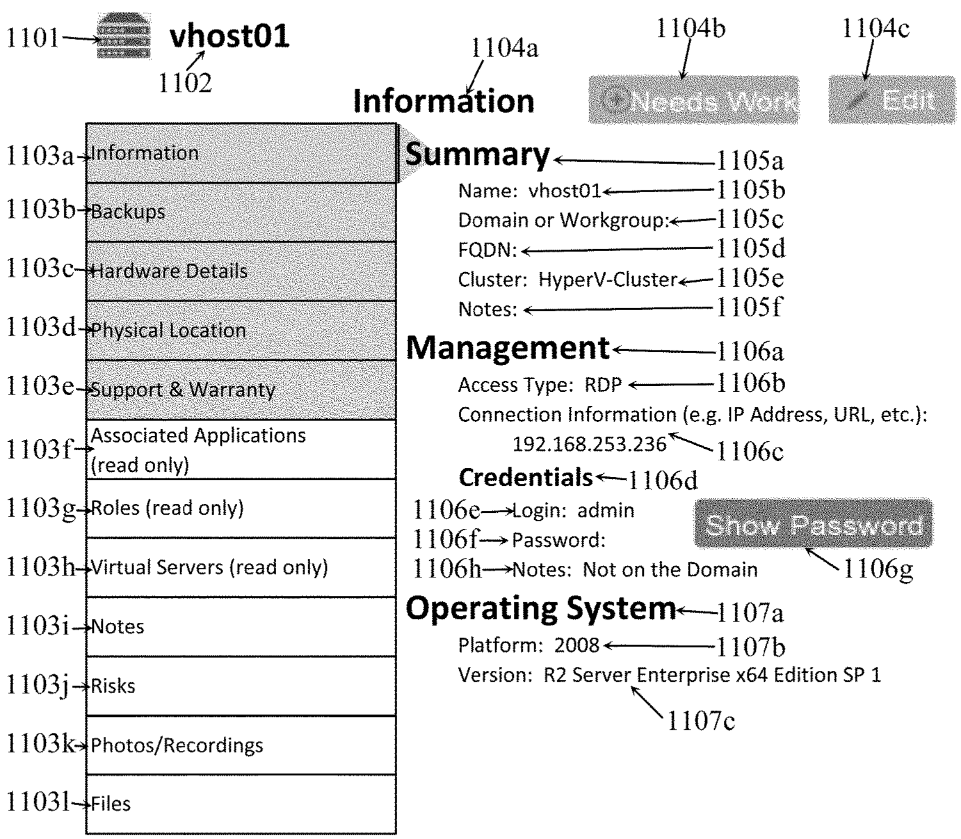
FIG. 11A and FIG. 11B are illustrative examples of embodiments of a user interface for viewing and updating general information about a physical server in a network.
Figure 11B:
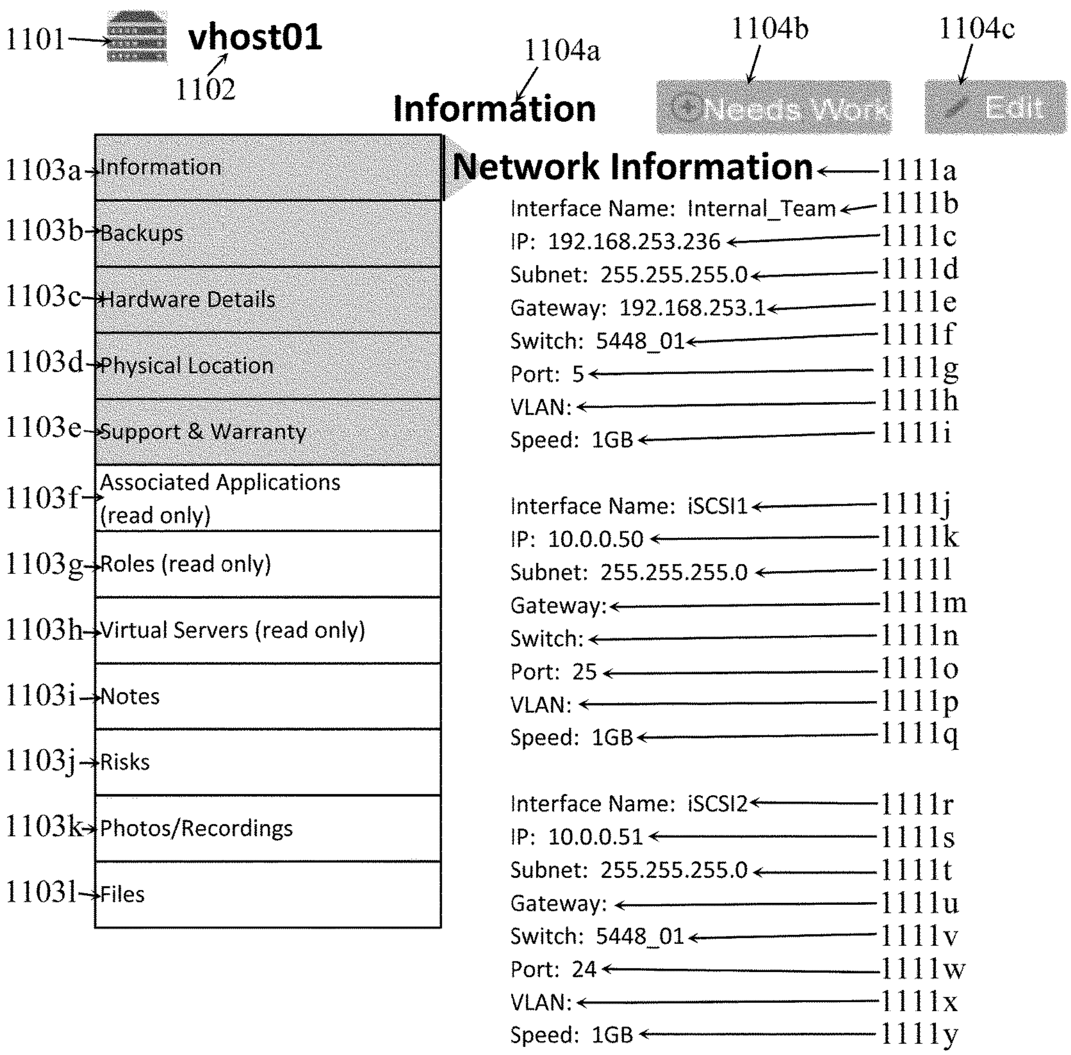

FIG. 11A and FIG. 11B are illustrative examples of an embodiment of a user interface for viewing and updating general information about a physical server in a network. The display in FIG. 11A and FIG. 11B can be the user interface that is displayed by selecting the icon in column 664*l* as described with respect to FIG. 6E. The display in FIG. 11A and FIG. 11B can be identified by a visual icon 1101 that can represent the type of physical server, and the name 1102 of the physical server. The display options 1103*a*-1103*l* can be shown on the left, and as seen in FIG. 11A and FIG. 11B, the selected display option, which is the Information option 1103*a* in the example of FIG. 11A and FIG. 11B, can have a visual indicator of an arrow on the right side to indicate that this option is selected. The display in FIG. 11A and FIG. 11B can have a header 1104*a* indicating the Information display option that is selected. The Needs Work button 1104*b* can select a user interface for marking the documentation about the Information of this physical server as incomplete. The Edit button 1104*c* can select a user interface for editing the documentation about the Information of this physical server.

The Summary section 1105*a* can contain the name 1105*b* of the physical server, the domain or workgroup 1105*c* of the physical server, the fully qualified domain name (FQDN) 1105*d* of the physical server, the name of the cluster 1105*e* containing the physical server, and notes 1105*f* that are specific to the physical server. The Management section

1106*a* can contain the method for accessing the physical server 1106*b*, the address 1106*c* for accessing the physical server, and a set of credentials 1106*d* for accessing the physical server. The Credentials 1106*d* can contain a username 1106*e*, a password 1106*f*, and notes 1106*h* that are specific to the credentials. To prevent casual accidental disclosure of the password, the password can be obscured by a Show Password button 1106*g* that can be selected to display the actual password. The Operating System section 1107*a* can contain the platform 1107*b* on which the physical server runs, and the version 1107*c* of the operating system running on the physical server.

Turning to FIG. 11B, the Network Information section 1111*a* can contain information about multiple network interfaces on the physical server. For example, FIG. 11B shows information about three network interfaces: the first is 1111*b*-1111*i*, the second is 1111*j*-1111*q*, and the third is 1111*r*-1111*y*. The information can contain the name 1111*b*, 1111*j*, 1111*r* of the network interface, the address 1111*c*, 1111*k*, 1111*s* of the network interface, the subnet mask 1111*d*, 1111*l*, 1111*t* of the network interface, the gateway address 1111*e*, 1111*m*, 1111*u* of the network interface, the name 1111*f*, 1111*n*, 1111*v* of the switch that is connected to the network interface, the physical port 1111*g*, 1111*o*, 1111*w* of the switch that is connected to the network interface, the VLAN 1111*h*, 1111*p*, 1111*x* that is connected to the network interface, and the speed 1111*i*, 1111*q*, 1111*y* of the network interface.

Figure 11C:
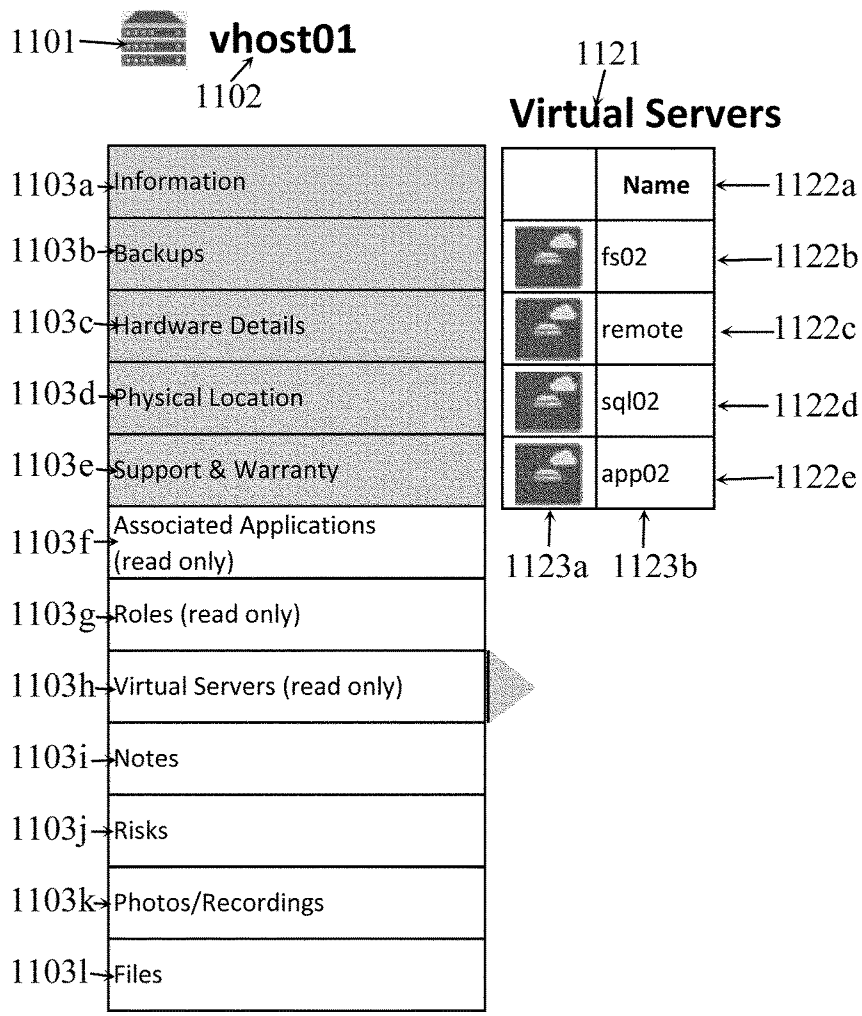
FIG. 11C is an illustrative example of an embodiment of a user interface for viewing information about virtual servers running on a physical server in a network.

FIG. 11C is an illustrative example of an embodiment of a user interface for viewing information about virtual servers running on a physical server in a network. The display in FIG. 11C can be the user interface that is displayed by selecting the display option 1103*h* as described with respect to FIG. 11A and FIG. 11B. The display in FIG. 11C can be identified by a visual icon 1101 that can represent the type of physical server, and the name 1102 of the physical server. The display options 1103*a*-1103*l* can be shown on the left, and as seen in FIG. 11C, the selected display option, which is the Virtual Servers option 1103*h* in the example of FIG. 11C, can have a visual indicator of an arrow on the right side to indicate that this option is selected. The display in FIG. 11C can have a header 1121 indicating the Virtual Servers display option that is selected.

The information about the virtual servers can be displayed as a read only display in a tabular form with descriptive column headers 1122*a*, rows 1122*b*-1122*e* that can represent virtual servers, and columns 1123*a*-1123*b*. The display can be read only because the associations of virtual servers to physical servers can be edited in other parts of the system, but the display in one table of some or all of the virtual server information associated with the physical server can still be useful. For example, the relationship between the physical server and the virtual servers running on it may not be explicitly represented in the structured documentation. Instead, the documentation may represent the physical server on which a hypervisor application is installed, and the system may use the relationship between a virtual server and the hypervisor controlling the virtual server to determine the physical server on which the virtual server is running. In the example of FIG. 11C, the structured documentation may indicate that physical server vhost01 is running a specific hypervisor, and may separately indicate that virtual server fs02 is running under that same hypervisor. The system may then determine that virtual server fs02 is running on physical server vhost01. Column 1123*a* can display a visual icon identifying the type of the virtual server in each row. Column 1123*b* can display the name of the virtual server in each row.

Figure 12A:
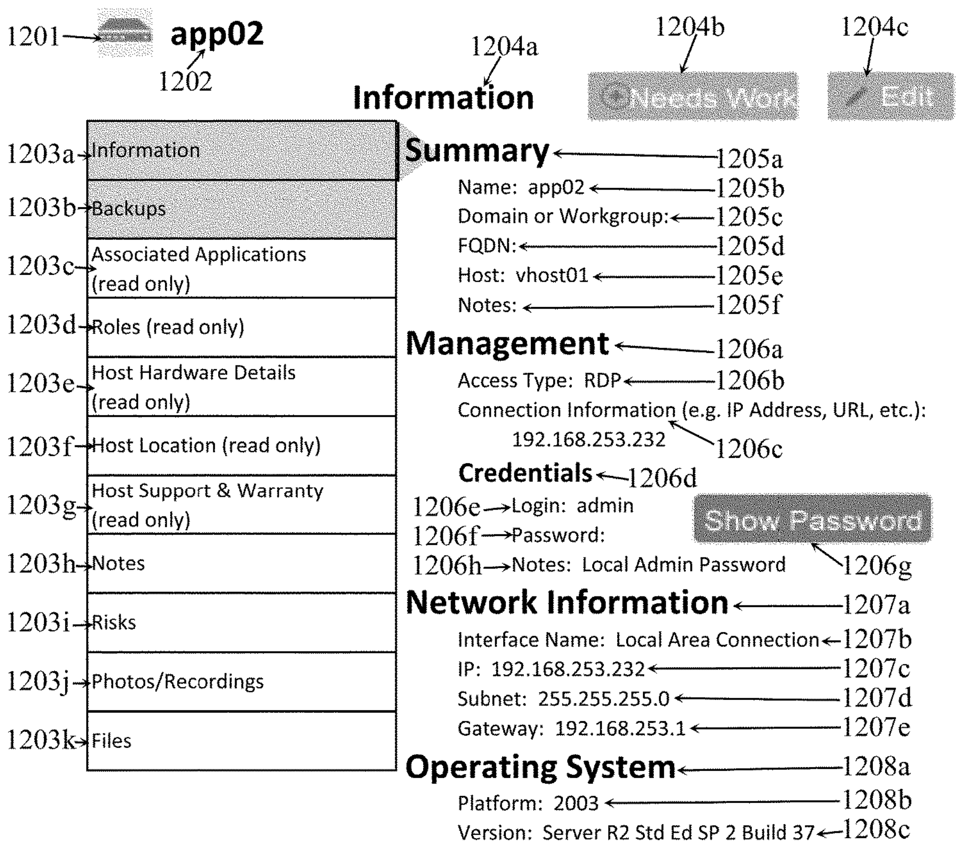
FIG. 12A is an illustrative example of an embodiment of a user interface for viewing and updating general information about a virtual server in a network.

FIG. 12A is an illustrative example of an embodiment of a user interface for viewing and updating general information about a virtual server in a network. The display in FIG. 12A can be the user interface that is displayed by selecting the icon in column 664*l* as described with respect to FIG. 6E. The display in FIG. 12A can be identified by a visual icon 1201 that can represent the type of virtual server, and the name 1202 of the virtual server. The display options 1203*a*-1203*k* can be shown on the left, and as seen in FIG. 12A, the selected display option, which is the Information option 1203*a* in the example of FIG. 12A, can have a visual indicator of an arrow on the right side to indicate that this option is selected. The display in FIG. 12A can have a header 1204*a* indicating the Information display option that is selected. The Needs Work button 1204*b* can select a user interface for marking the documentation about the Information of this virtual server as incomplete. The Edit button 1204*c* can select a user interface for editing the documentation about the Information of this virtual server.

The Summary section 1205*a* can contain the name 1205*b* of the virtual server, the domain or workgroup 1205*c* of the virtual server, the fully qualified domain name (FQDN) 1205*d* of the virtual server, the name of the host physical server 1205*e* running the virtual server, and notes 1205*f* that are specific to the virtual server. The Management section 1206*a* can contain the method for accessing the virtual server 1206*b*, the address 1206*c* for accessing the virtual server, and a set of credentials 1206*d* for accessing the virtual server. The Credentials 1206*d* can contain a username 1206*e*, a password 1206*f*, and notes 1206*h* that are specific to the credentials. To prevent casual accidental disclosure of the password, the password can be obscured by a Show Password button 1206*g* that can be selected to display the actual password. The Network Information section 1207*a* can contain information about the network interfaces on the virtual server. In the example of FIG. 12A, the Network Information section 1207*a* contains information about a single network interface 1207*b*-1207*e*. The information can include the name 1207*b* of the network interface, the address 1207*c* of the network interface, the subnet mask 1207*d* of the network interface, and the gateway address 1207*e* of the network interface. The Operating System section 1208*a* can contain the platform 1208*b* on which the virtual server runs, and the version 1208*c* of the operating system running on the virtual server.

Figure 12B:
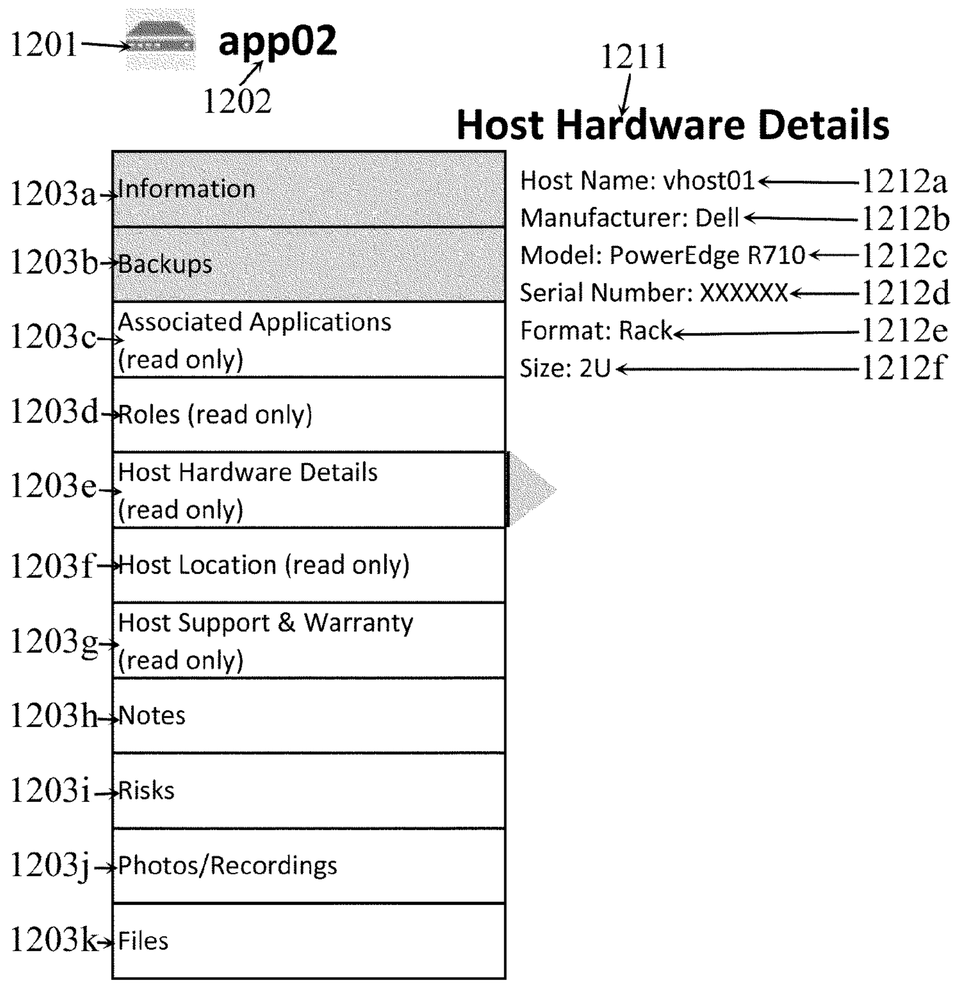
FIG. 12B is an illustrative example of an embodiment of a user interface for viewing information about hardware details of the physical server that is running a virtual server in a network.

FIG. 12B is an illustrative example of an embodiment of a user interface for viewing information about hardware details of the physical server that is running a virtual server in a network. The display in FIG. 12B can be the user interface that is displayed by selecting the display option 1203*e* as described with respect to FIG. 12A. The display in FIG. 12B can be identified by a visual icon 1201 that can represent the type of virtual server, and the name 1202 of the virtual server. The display options 1203*a*-1203*k* can be shown on the left, and as seen in FIG. 12B, the selected display option, which is the Host Hardware Details option 1203*e* in the example of FIG. 12B, can have a visual indicator of an arrow on the right side to indicate that this option is selected. The display in FIG. 12B can have a header 1211 indicating the Host Hardware Details display option that is selected.

The information about the physical server that is running the virtual server can be displayed as a read only display. The display can be read only because the hardware details of physical servers can be edited in other parts of the system, but the display in one table of some or all of the physical server information associated with the virtual server can still be useful. For example, the relationship between a virtual server and the hardware details of the physical server on which it is running may not be explicitly represented in the structured documentation. Instead, the documentation may represent the hardware details of the physical server on which a hypervisor application is installed, and the system may use the relationship between a virtual server and the hypervisor controlling the virtual server to determine the hardware details of the physical server on which the virtual server is running. In the example of FIG. 12B, the structured documentation may indicate that physical server vhost01 is running a specific hypervisor, may represent the hardware details of the physical server vhost01 such as its manufacturer Dell, and may separately indicate that virtual server app02 is running under that same hypervisor. The system may then determine that virtual server app02 is running on a physical server with the manufacturer Dell. The Host Hardware Details can contain the name 1212*a* of the physical server running the virtual server, the manufacturer 1212*b* of the physical server running the virtual server, the model number 1212*c* of the physical server running the virtual server, the serial number 1212*d* of the physical server running the virtual server, the physical format 1212*e* of the physical server running the virtual server, and the number of rack spaces 1212*f* used by the physical server running the virtual server.

Figure 13A:
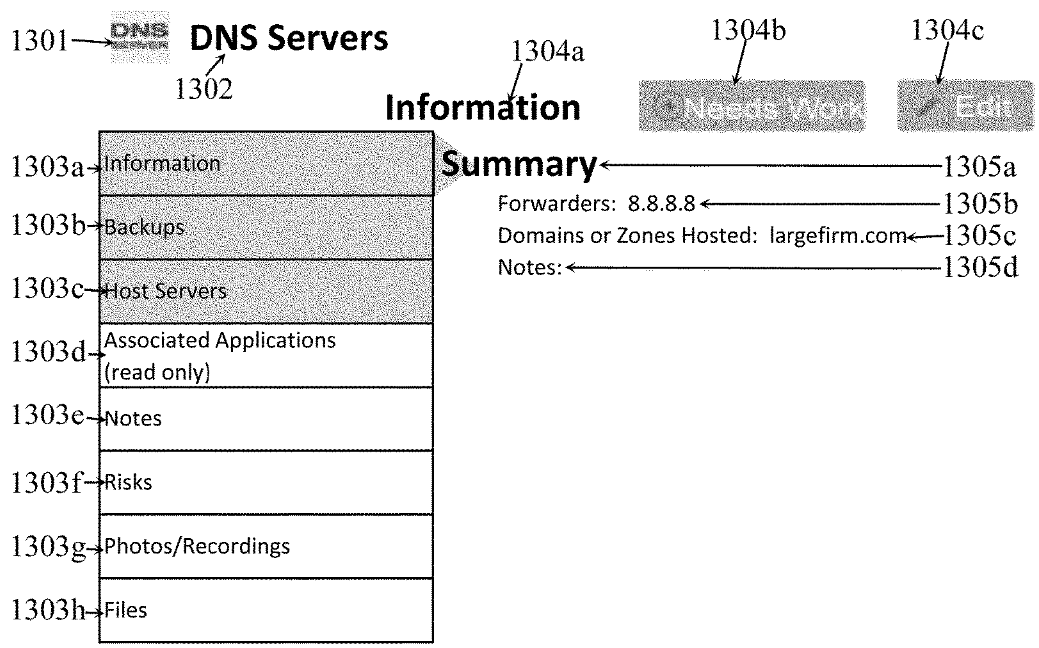
FIG. 13A is an illustrative example of an embodiment of a user interface for viewing and updating general information about a core network service used by a network.

FIG. 13A is an illustrative example of an embodiment of a user interface for viewing and updating general information about a core network service used by a network. The display in FIG. 13A can be the user interface that is displayed by selecting the icon in column 667*j* as described with respect to FIG. 6E. The display in FIG. 13A can be identified by a visual icon 1301 that can represent the type of core network service, and the name 1302 of the core network service. The display options 1303*a*-1303*h* can be shown on the left, and as seen in FIG. 13A, the selected display option, which is the Information option 1303*a* in the example of FIG. 13A, can have a visual indicator of an arrow on the right side to indicate that this option is selected. The display in FIG. 13A can have a header 1304*a* indicating the Information display option that is selected. The Needs Work button 1304*b* can select a user interface for marking the documentation about the Information of this core network service as incomplete. The Edit button 1304*c* can select a user interface for editing the documentation about the Information of this core network service.

The Summary section 1305*a* can contain the address 1305*b* of the forwarding server for the core network service, the domains or zones 1305*c* that are hosted by the core network service, and notes 1305*d* that are specific to the core network service.

Figure 13B:
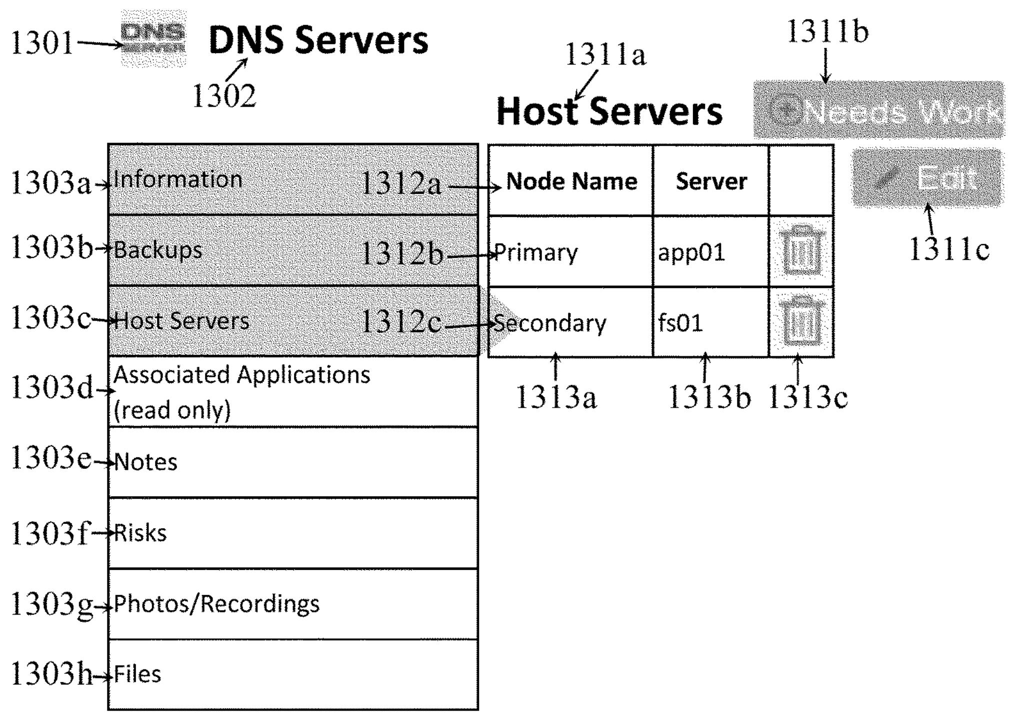
FIG. 13B is an illustrative example of an embodiment of a user interface for viewing and updating host server information about a core network service used by a network.

FIG. 13B is an illustrative example of an embodiment of a user interface for viewing and updating host server information about a core network service used by a network. The display in FIG. 13B can be the user interface that is displayed by selecting the display option 1303*c* as described with respect to FIG. 13A. The display in FIG. 13B can be identified by a visual icon 1301 that can represent the type of core network service, and the name 1302 of the core network service. The display options 1303*a*-1303*h* can be shown on the left, and as seen in FIG. 13B, the selected display option, which is the Host Servers option 1303*c* in the example of FIG. 13B, can have a visual indicator of an arrow on the right side to indicate that this option is selected. The display in FIG. 13B can have a header 1311*a* indicating the Host Servers display option that is selected. The Needs Work button 1311*b* can select a user interface for marking the documentation about the Host Servers of this core network service as incomplete. The Edit button 1311*c* can select a user interface for editing the documentation about the Host Servers of this core network service.

The information about the host servers for the core network service can be displayed in a tabular form with descriptive column headers 1312*a*, rows 1312*b*-1312*c* that can represent host servers, and columns 1313*a*-1313*c*. Column 1313*a* can display the node name of the host server in each row. Column 1313*b* can display the server name of the host server in each row. Column 1313*c* can display an icon that can be selected to remove the host server in each row from the documentation.

Figure 14A:
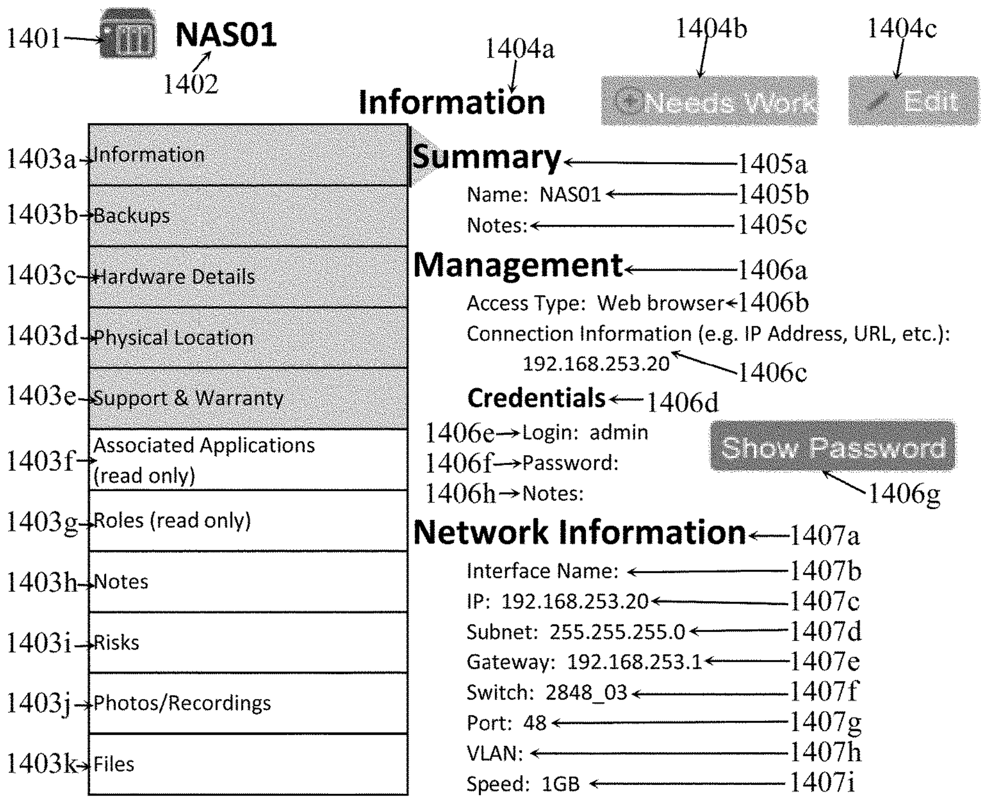
FIG. 14A is an illustrative example of an embodiment of a user interface for viewing and updating general information about a device connected to a network.

FIG. 14A is an illustrative example of an embodiment of a user interface for viewing and updating general information about a device connected to a network. The display in FIG. 14A can be the user interface that is displayed by selecting the icon in column 674*i* as described with respect to FIG. 6F. The display in FIG. 14A can be identified by a visual icon 1401 that can represent the type of device, and the name 1402 of the device. The display options 1403*a*-1403*k* can be shown on the left, and as seen in FIG. 14A, the selected display option, which is the Information option 1403*a* in the example of FIG. 14A, can have a visual indicator of an arrow on the right side to indicate that this option is selected. The display in FIG. 14A can have a header 1404*a* indicating the Information display option that is selected. The Needs Work button 1404*b* can select a user interface for marking the documentation about the Information of this device as incomplete. The Edit button 1404*c* can select a user interface for editing the documentation about the Information of this device.

The Summary section 1405*a* can contain the name 1405*b* of the device and notes 1405*c* that are specific to the device. The Management section 1406*a* can contain the method for accessing the device 1406*b*, the address 1406*c* for accessing the device, and a set of credentials 1406*d* for accessing the device. The Credentials 1406*d* can contain a username 1406*e*, a password 1406*f*, and notes 1406*h* that are specific to the credentials. To prevent casual accidental disclosure of the password, the password can be obscured by a Show Password button 1406*g* that can be selected to display the actual password. The Network Information section 1407*a* can contain information about the network interfaces on the device. In the example of FIG. 14A, the Network Information section 1407*a* contains information about a single network interface 1407*b*-1407*i*. The information can include the name 1407*b* of the network interface, the address 1407*c* of the network interface, the subnet mask 1407*d* of the network interface, the gateway address 1407*e* of the network interface, the name 1407*f* of the switch to which the network interface is connected, the physical port number 1407*g* of the switch to which the network interface is connected, the VLAN 1407*h* to which the device is connected, and the speed 1407*i* of the network interface.

Figure 14B:
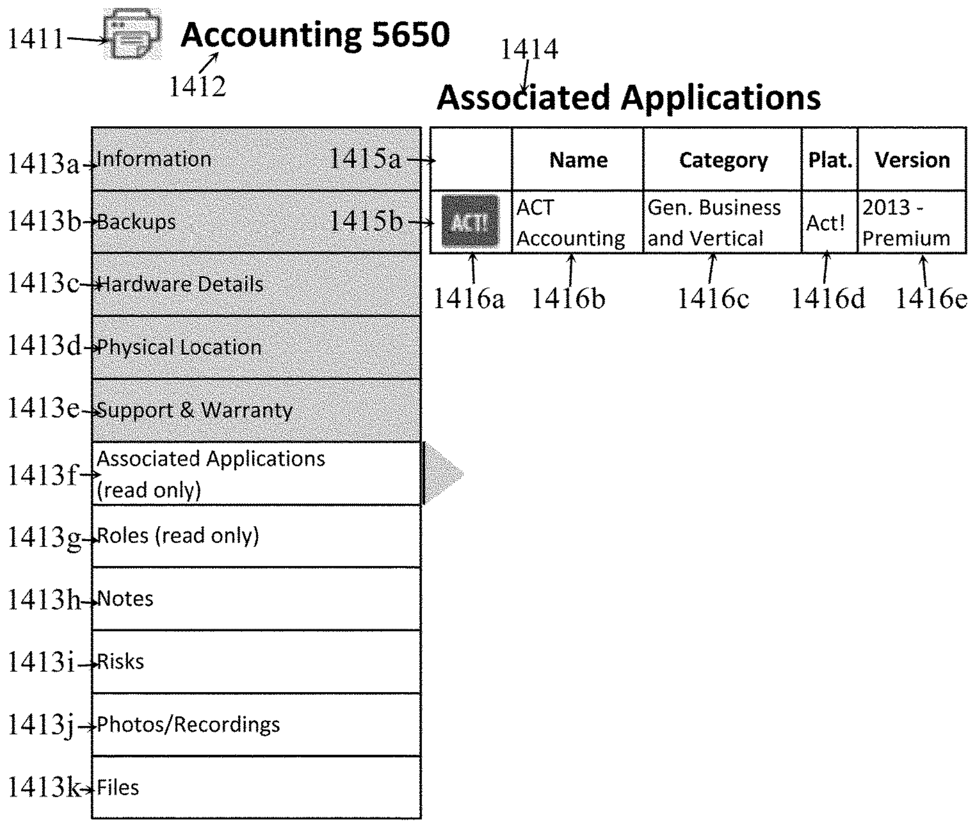
FIG. 14B is an illustrative example of an embodiment of a user interface for viewing applications that are associated with a device connected to a network.

FIG. 14B is an illustrative example of an embodiment of a user interface for viewing applications that are associated with a device connected to a network. The display in FIG. 14B can be the user interface that is displayed by selecting the display option 1413*f* as described with respect to FIG. 14A. The display in FIG. 14B can be identified by a visual icon 1411 that can represent the type of device, and the name 1412 of the device. The display options 1413*a*-1413*k* can be shown on the left, and as seen in FIG. 14B, the selected display option, which is the Associated Applications option 1413*f* in the example of FIG. 14B, can have a visual indicator of an arrow on the right side to indicate that this option is selected. The display in FIG. 14B can have a header 1414 indicating the Associated Applications display option that is selected.

The information about the associated applications can be displayed as a read only display in a tabular form with descriptive column headers 1415*a*, rows 1415*b* that can represent applications, and columns 1416*a*-1416*e*. The display can be read only because the associations of applications with devices can be edited in other parts of the system, but the display in one table of some or all of the application information associated with the device can still be useful. For example, the relationship between a printer and the applications that use the printer may not be explicitly represented in the structured documentation. Instead, the documentation may represent the printer that is accessed by a print server, and the system may use the relationship between an application and the print server it uses to determine the printer that is used by the application. In the example of FIG. 14B, the structured documentation may indicate that printer Accounting 5650 is used by a specific print server, and may separately indicate that application ACT Accounting uses that same print server in order to print. The system may then determine that the application ACT Accounting uses the printer Accounting 5650 in order to print. Column 1416*a* can display a visual icon representing the application in each row. Column 1416*b* can display the name of the application in each row. Column 1416*c* can display the category of the application in each row. Column 1416*d* can display the platform on which the application in each row runs. Column 1416*e* can display the version of the application in each row.

Figure 14C:
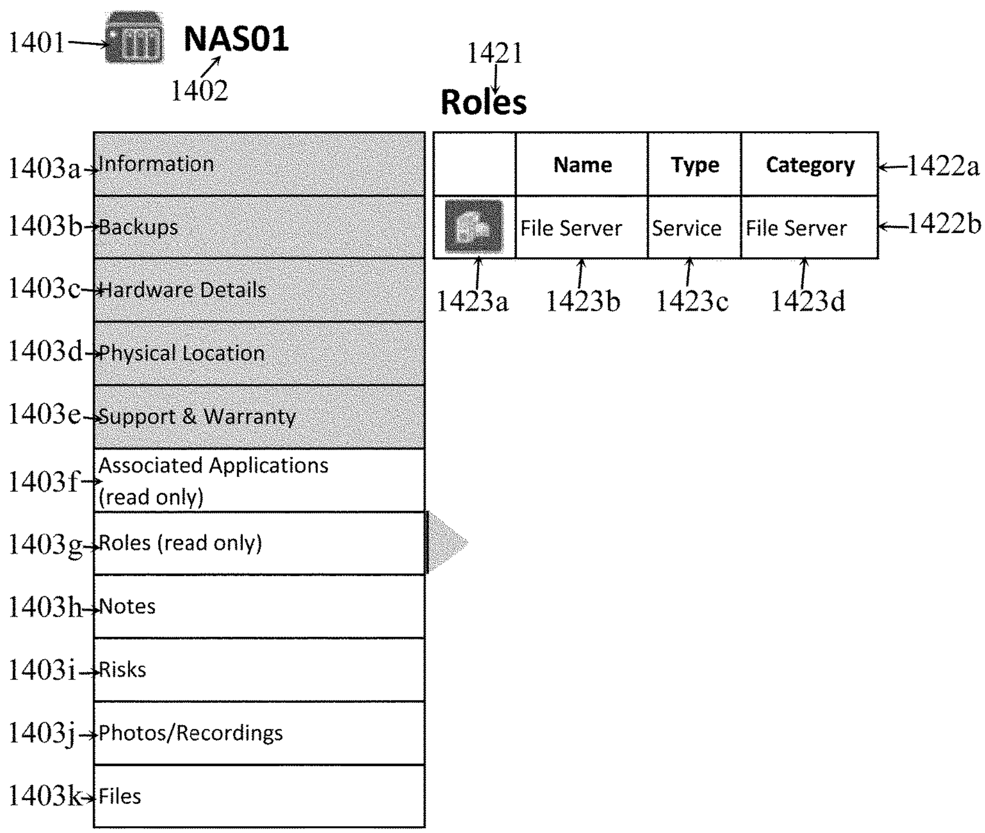
FIG. 14C is an illustrative example of an embodiment of a user interface for viewing the roles played by a device connected to a network.

FIG. 14C is an illustrative example of an embodiment of a user interface for viewing the roles played by a device connected to a network. The display in FIG. 14C can be the user interface that is displayed by selecting the display option 1403*g* as described with respect to FIG. 14A. The display in FIG. 14C can be identified by a visual icon 1401 that can represent the type of device, and the name 1402 of the device. The display options 1403*a*-1403*k* can be shown on the left, and as seen in FIG. 14C, the selected display option, which is the Roles option 1403*g* in the example of FIG. 14C, can have a visual indicator of an arrow on the right side to indicate that this option is selected. The display in FIG. 14C can have a header 1421 indicating the Roles display option that is selected.

The information about the roles can be displayed as a read only display in a tabular form with descriptive column headers 1422*a*, rows 1422*b* that can represent roles, and columns 1423*a*-1423*d*. The display can be read only because the associations of roles with devices can be edited in other parts of the system, but the display in one table of some or all of the roles associated with a device can still be useful. For example, the relationship between a network storage device and the file server roles that use the network storage device may not be explicitly represented in the structured documentation. Instead, the documentation may represent the drive identifiers that are stored on the network storage device, and the system may use the relationship between the file server role and the drive identifiers it uses to determine the network storage devices that are used by the file server role. In the example of FIG. 14C, the structured documentation may indicate that network storage device NAS01 has a specific group of drives on it, and may separately indicate that the file server role File Server uses one or more of those specific drives. The system may then determine that the file server role File Server uses the network storage device NAS01 for its storage. Column 1423*a* can display a visual icon representing the role in each row. Column 1423*b* can display the name of the role in each row. Column 1423*c* can display the type of the role in each row. Column 1423*d* can display the category of the role in each row.

Figure 15A:
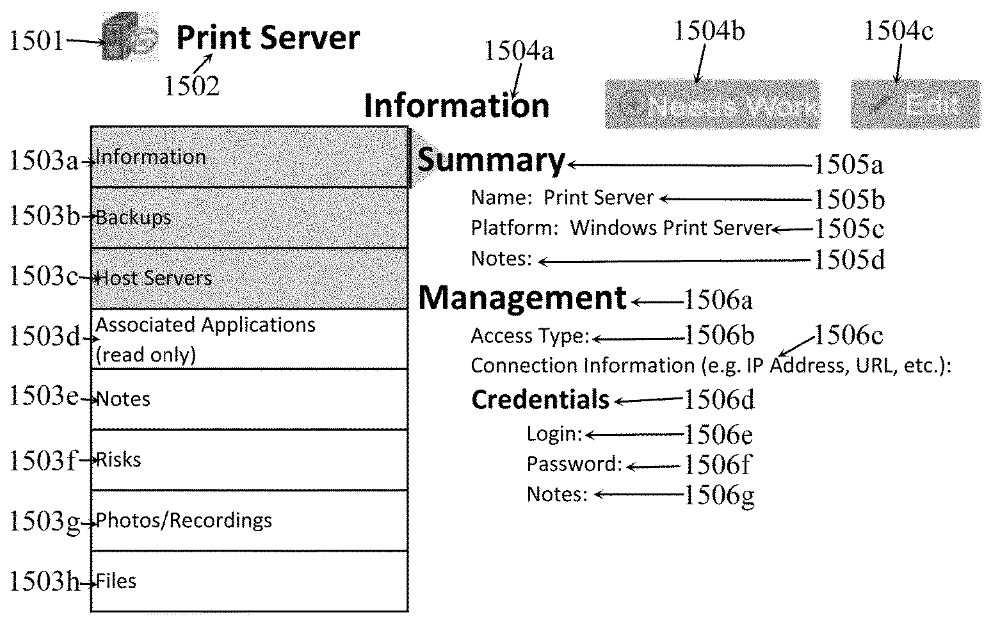
FIG. 15A is an illustrative example of an embodiment of a user interface for viewing and updating general information about a specific role played by components of a network.

FIG. 15A is an illustrative example of an embodiment of a user interface for viewing and updating general information about a specific role played by components of a network. The display in FIG. 15A can be the user interface that is displayed by selecting the icon in column 684*j* as described with respect to FIG. 6G. The display in FIG. 15A can be identified by a visual icon 1501 that can represent the type of role, and the name 1502 of the role. The display options 1503*a*-1503*h* can be shown on the left, and as seen in FIG. 15A, the selected display option, which is the Information option 1503*a* in the example of FIG. 15A, can have a visual indicator of an arrow on the right side to indicate that this option is selected. The display in FIG. 15A can have a header 1504*a* indicating the Information display option that is selected. The Needs Work button 1504*b* can select a user interface for marking the documentation about the Information of this role as incomplete. The Edit button 1504*c* can select a user interface for editing the documentation about the Information of this role.

The Summary section 1505*a* can contain the name 1505*b* of the role, the platform 1505*c* on which the role runs, and notes 1505*d* that are specific to the role. The Management section 1506*a* can contain the method 1506*b* for accessing the server that implements the role, the address 1506*c* for accessing the server that implements the role, and a set of credentials 1506*d* for accessing the server that implements the role. The Credentials 1506*d* can contain a username 1506*e*, a password 1506*f*, and notes 1506*g* that are specific to the credentials.

Figure 15B:
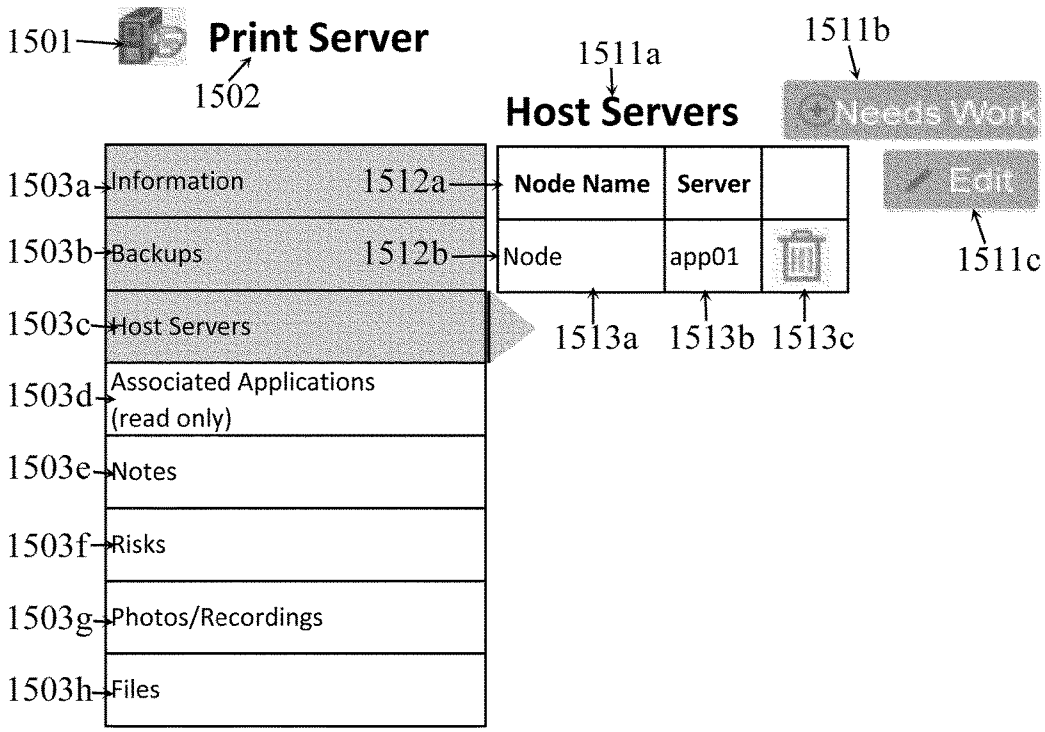
FIG. 15B is an illustrative example of an embodiment of a user interface for viewing and updating information about servers in a network that play a specific role.

FIG. 15B is an illustrative example of an embodiment of a user interface for viewing and updating information about servers in a network that play a specific role. The display in FIG. 15B can be the user interface that is displayed by selecting the display option 1503*c* as described with respect to FIG. 15A. The display in FIG. 15B can be identified by a visual icon 1501 that can represent the type of role, and the name 1502 of the role. The display options 1503*a*-1503*h* can be shown on the left, and as seen in FIG. 15B, the selected display option, which is the Host Servers option 1503*c* in the example of FIG. 15B, can have a visual indicator of an arrow on the right side to indicate that this option is selected. The display in FIG. 15B can have a header 1511*a* indicating the Host Servers display option that is selected. The Needs Work button 1511*b* can select a user interface for marking the documentation about the Host Servers of this role as incomplete. The Edit button 1511*c* can select a user interface for editing the documentation about the Host Servers of this role.

The information about the host servers for the role can be displayed in a tabular form with descriptive column headers 1512*a*, rows 1512*b* that can represent servers, and columns 1513*a*-1513*c*. Column 1513*a* can display the node name of the host server in each row. Column 1513*b* can display the server name of the host server in each row. Column 1513*c* can display an icon that can be selected to remove the host server in each row from the documentation.

Figure 15C:
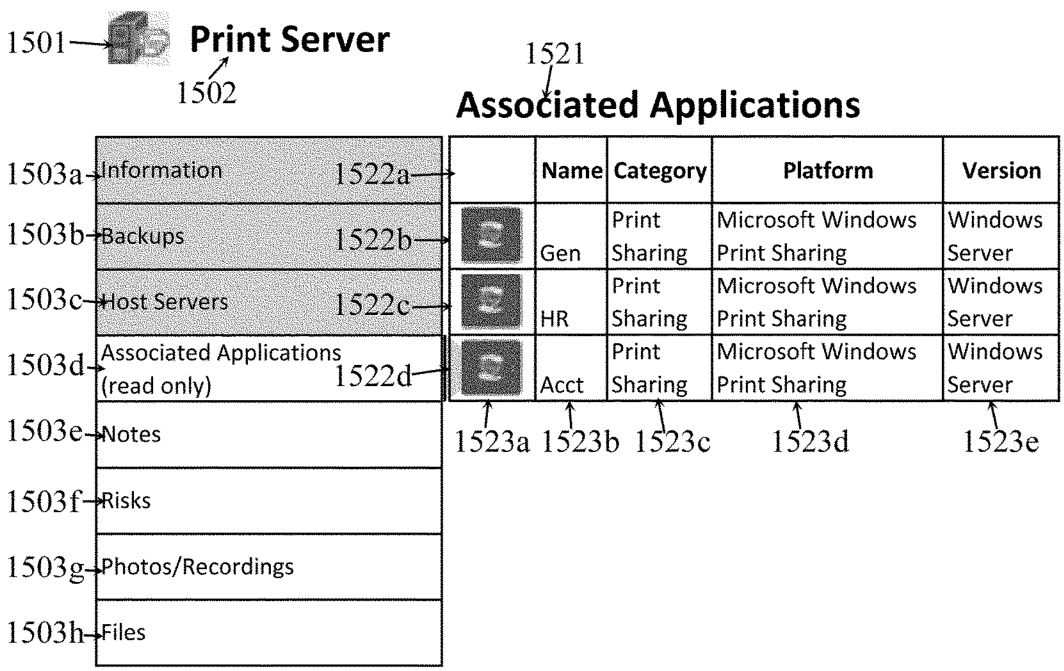
FIG. 15C is an illustrative example of an embodiment of a user interface for viewing applications that are associated with a specific role played by components of a network.

FIG. 15C is an illustrative example of an embodiment of a user interface for viewing applications that are associated with a specific role played by components of a network. The display in FIG. 15C can be the user interface that is displayed by selecting the display option 1503*d* as described with respect to FIG. 15A. The display in FIG. 15C can be identified by a visual icon 1501 that can represent the type of device, and the name 1502 of the device. The display options 1503*a*-1503*h* can be shown on the left, and as seen in FIG. 15C, the selected display option, which is the Associated Applications option 1503*d* in the example of FIG. 15C, can have a visual indicator of an arrow on the right side to indicate that this option is selected. The display in FIG. 15C can have a header 1521 indicating the Associated Applications display option that is selected.

The information about the associated applications can be displayed as a read only display in a tabular form with descriptive column headers 1522*a*, rows 1522*b*-1522*d* that can represent applications, and columns 1523*a*-1523*e*. The display can be read only because the associations of applications to roles can be edited in other parts of the system, but the display in one table of some or all of the applications associated with a role can still be useful. For example, the relationship between a print server and an application that uses the print server may not be explicitly represented in the structured documentation. Instead, the documentation may represent the print server that is used by a print driver, and the system may use the relationship between an application and the print drivers it uses to determine the print server that is used by the application. In the example of FIG. 15C, the structured documentation may indicate that print server Print Server is referenced by a specific print driver, and may separately indicate that the application Gen, a print sharing application, uses that specific print driver. The system may then determine that the application Gen uses the print driver Print Driver for printing. Column 1523*a* can display a visual icon representing the application in each row. Column 1523*b* can display the name of the application in each row. Column 1523*c* can display the category of the application in each row. Column 1523*d* can display the platform on which the application in each row runs. Column 1523*e* can display the version of the application in each row.

FIGS. 16A-16D are illustrative examples of embodiments of a user interface for viewing and updating information about applications that are used by a company. The information about the list of applications can be shown in three tables in FIG. 16A identified by headers 1602*a*, 1606*a*, and 1610*a*, three tables in FIG. 16B identified by headers 1614*a*, 1618*a*, and 1622*a*, four tables in FIG. 16C identified by headers 1626*a*, 1630*a*, 1634*a*, and 1638*a*, and two tables in FIG. 16D identified by headers 1642*a* and 1646*a*.

The overall header 1601*a* can indicate that the interface is a list of the applications 135 that are used by a company 132, as described with respect to FIG. 1C. The Add Library button 1601*b* can be selected to display a user interface for adding a new application to the list from a library of templates 111, as described with respect to FIG. 1A. The Add Custom button 1601*c* can be selected to display a user interface for adding a new application to the list without using a template.

The table identified by header 1602*a* can display information about the applications that are used in the company for communications and messaging, with descriptive column headers 1603, rows 1604*a*-1604*b* that can represent applications, and columns 1605*a*-1605*j*. The filter tool 1602*b* can be used to specify a filter that will select a subset of the data to be displayed. Column 1605*a* can display a visual icon showing the type of the application in each row. Column 1605*b* can display the descriptive name of the application in each row. Column 1605*c* can display the platform on which the application in each row runs. Column 1605*d* can display an icon providing a visual indicator of the presence and severity of identified risks for the application in each row. Column 1605*e* can display an icon providing a visual indicator of the presence and importance of notes for the application in each row, for example, there is at least one note for the application in row 1604*a*. Column 1605*f* can display an icon providing a visual indicator of how many outstanding documentation issues should be resolved for the application in each row. Column 1605*g* can display a count of the people at the company for whom the application in each row is documented to have a high importance. Column 1605*h* can display an icon that can be selected to remove the application in each row from the documentation. Column 1605*i* can display an icon that can be selected to display a user interface to show the IT infrastructure of the company, highlighting the relationship of the application in each row to the IT infrastructure. Column 1605*j* can display an icon that can be selected to display a user interface for viewing the extended information about the application in each row.

The table identified by header 1606*a* can display information about the applications that are used in the company for phone systems, with descriptive column headers 1607, row 1608 that can represent an application, and columns 1609*a*-1609*j*. The filter tool 1606*b* can be used to specify a filter that will select a subset of the data to be displayed. Column 1609*a* can display a visual icon showing the type of the application in each row. Column 1609*b* can display the descriptive name of the application in each row. Column 1609*c* can display the platform on which the application in each row runs. Column 1609*d* can display an icon providing a visual indicator of the presence and severity of identified risks for the application in each row. Column 1609*e* can display an icon providing a visual indicator of the presence and importance of notes for the application in each row. Column 1609*f* can display an icon providing a visual indicator of how many outstanding documentation issues should be resolved for the application in each row, for example, there is at least one documentation issue that should be resolved for the application in row 1608. Column 1609*g* can display a count of the people at the company for whom the application in each row is documented to have a high importance. Column 1609*h* can display an icon that can be selected to remove the application in each row from the documentation. Column 1609*i* can display an icon that can be selected to display a user interface to show the IT infrastructure of the company, highlighting the relationship of the application in each row to the IT infrastructure. Column 1609*j* can display an icon that can be selected to display a user interface for viewing the extended information about the application in each row.

The table identified by header 1610*a* can display information about the general business applications that are used in the company and the applications oriented toward vertical markets, with descriptive column headers 1611, rows 1612*a*-1612*d* that can represent applications, and columns 1613*a*-1613*j*. The filter tool 1610*b* can be used to specify a filter that will select a subset of the data to be displayed. Column 1613*a* can display a visual icon showing the type of the application in each row. Column 1613*b* can display the descriptive name of the application in each row. Column 1613*c* can display the platform on which the application in each row runs. Column 1613*d* can display an icon providing a visual indicator of the presence and severity of identified risks for the application in each row. Column 1613*e* can display an icon providing a visual indicator of the presence and importance of notes for the application in each row, for example, there is at least one note for the application in row

1612*d*. Column 1613*f* can display an icon providing a visual indicator of how many outstanding documentation issues should be resolved for the application in each row, for example, there is at least one documentation issue that should be resolved for the application in row 1612*c*. Column 1613*g* can display a count of the people at the company for whom the application in each row is documented to have a high importance. Column 1613*h* can display an icon that can be selected to remove the application in each row from the documentation. Column 1613*i* can display an icon that can be selected to display a user interface to show the IT infrastructure of the company, highlighting the relationship of the application in each row to the IT infrastructure. Column 1613*j* can display an icon that can be selected to display a user interface for viewing the extended information about the application in each row.

Figure 16A:
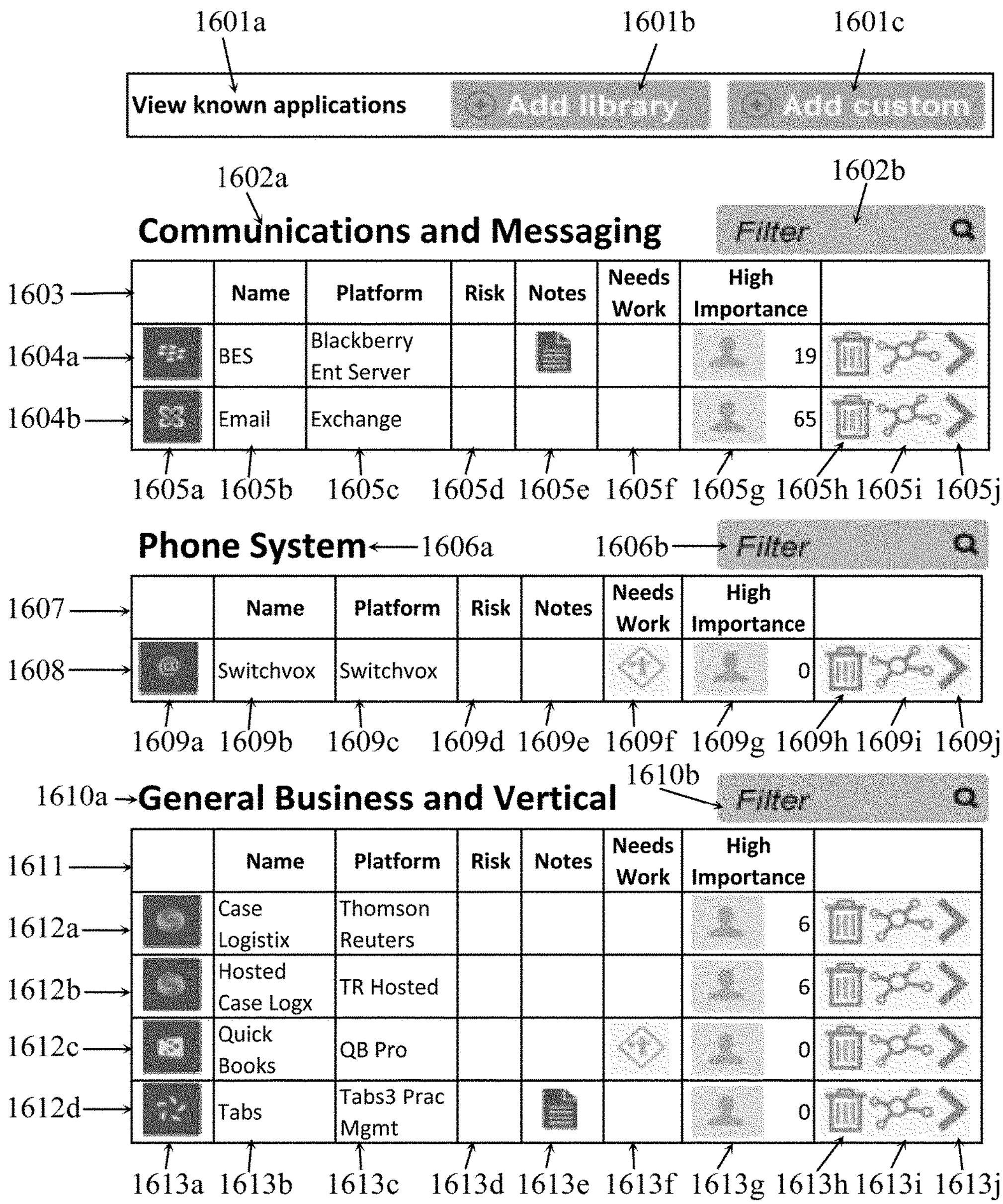
FIGS. 16A-16D are illustrative examples of embodiments of a user interface for viewing and updating information about applications that are used by a company.
Figure 16B:
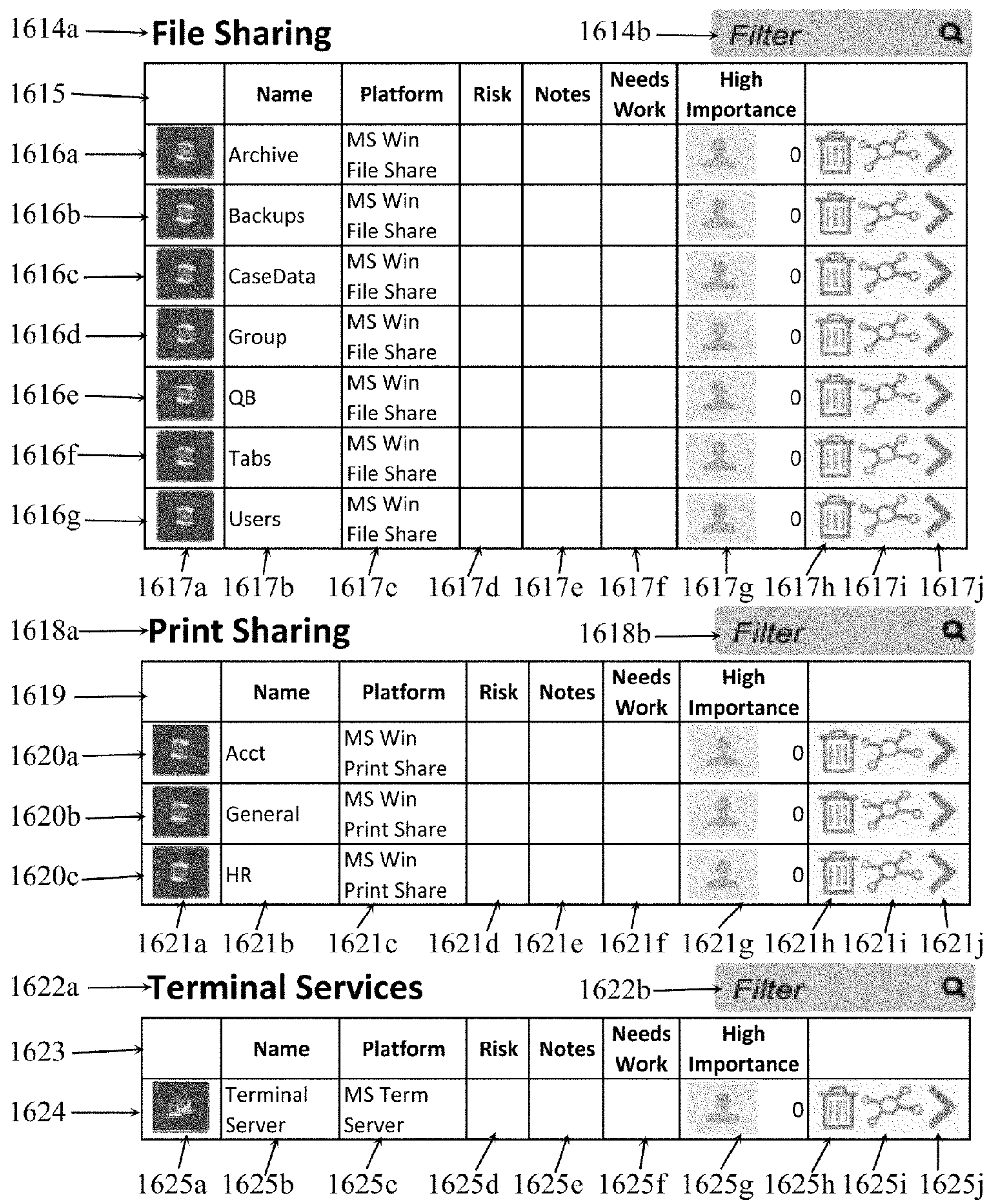

Turning to FIG. 16B, the table identified by header 1614*a* can display information about the file sharing applications that are used in the company, with descriptive column headers 1615, rows 1616*a*-1616*g* that can represent applications, and columns 1617*a*-1617*j*. The filter tool 1614*b* can be used to specify a filter that will select a subset of the data to be displayed. Column 1613*a* can display a visual icon showing the type of the application in each row. Column 1617*b* can display the descriptive name of the application in each row. Column 1617*c* can display the platform on which the application in each row runs. Column 1617*d* can display an icon providing a visual indicator of the presence and severity of identified risks for the application in each row. Column 1617*e* can display an icon providing a visual indicator of the presence and importance of notes for the application in each row. Column 1617*f* can display an icon providing a visual indicator of how many outstanding documentation issues should be resolved for the application in each row. Column 1617*g* can display a count of the people at the company for whom the application in each row is documented to have a high importance. Column 1617*h* can display an icon that can be selected to remove the application in each row from the documentation. Column 1617*i* can display an icon that can be selected to display a user interface to show the IT infrastructure of the company, highlighting the relationship of the application in each row to the IT infrastructure. Column 1617*j* can display an icon that can be selected to display a user interface for viewing the extended information about the application in each row.

The table identified by header 1618*a* can display information about the print sharing applications that are used in the company, with descriptive column headers 1619, rows 1620*a*-1620*c* that can represent applications, and columns 1621*a*-1621*j*. The filter tool 1618*b* can be used to specify a filter that will select a subset of the data to be displayed. Column 1621*a* can display a visual icon showing the type of the application in each row. Column 1621*b* can display the descriptive name of the application in each row. Column 1621*c* can display the platform on which the application in each row runs. Column 1621*d* can display an icon providing a visual indicator of the presence and severity of identified risks for the application in each row. Column 1621*e* can display an icon providing a visual indicator of the presence and importance of notes for the application in each row. Column 1621*f* can display an icon providing a visual indicator of how many outstanding documentation issues should be resolved for the application in each row. Column 1621*g* can display a count of the people at the company for whom the application in each row is documented to have a high importance. Column 1621*h* can display an icon that can be selected to remove the application in each row from the documentation. Column 1621*i* can display an icon that can be selected to display a user interface to show the IT infrastructure of the company, highlighting the relationship of the application in each row to the IT infrastructure. Column 1621*j* can display an icon that can be selected to display a user interface for viewing the extended information about the application in each row.

The table identified by header 1622*a* can display information about the terminal services applications that are used in the company, with descriptive column headers 1623, row 1624 that can represent an application, and columns 1625*a*-1625*j*. The filter tool 1622*b* can be used to specify a filter that will select a subset of the data to be displayed. Column 1625*a* can display a visual icon showing the type of the application in each row. Column 1625*b* can display the descriptive name of the application in each row. Column 1625*c* can display the platform on which the application in each row runs. Column 1625*d* can display an icon providing a visual indicator of the presence and severity of identified risks for the application in each row. Column 1625*e* can display an icon providing a visual indicator of the presence and importance of notes for the application in each row. Column 1625*f* can display an icon providing a visual indicator of how many outstanding documentation issues should be resolved for the application in each row. Column 1625*g* can display a count of the people at the company for whom the application in each row is documented to have a high importance. Column 1625*h* can display an icon that can be selected to remove the application in each row from the documentation. Column 1625*i* can display an icon that can be selected to display a user interface to show the IT infrastructure of the company, highlighting the relationship of the application in each row to the IT infrastructure. Column 1625*j* can display an icon that can be selected to display a user interface for viewing the extended information about the application in each row.

Figure 16C:
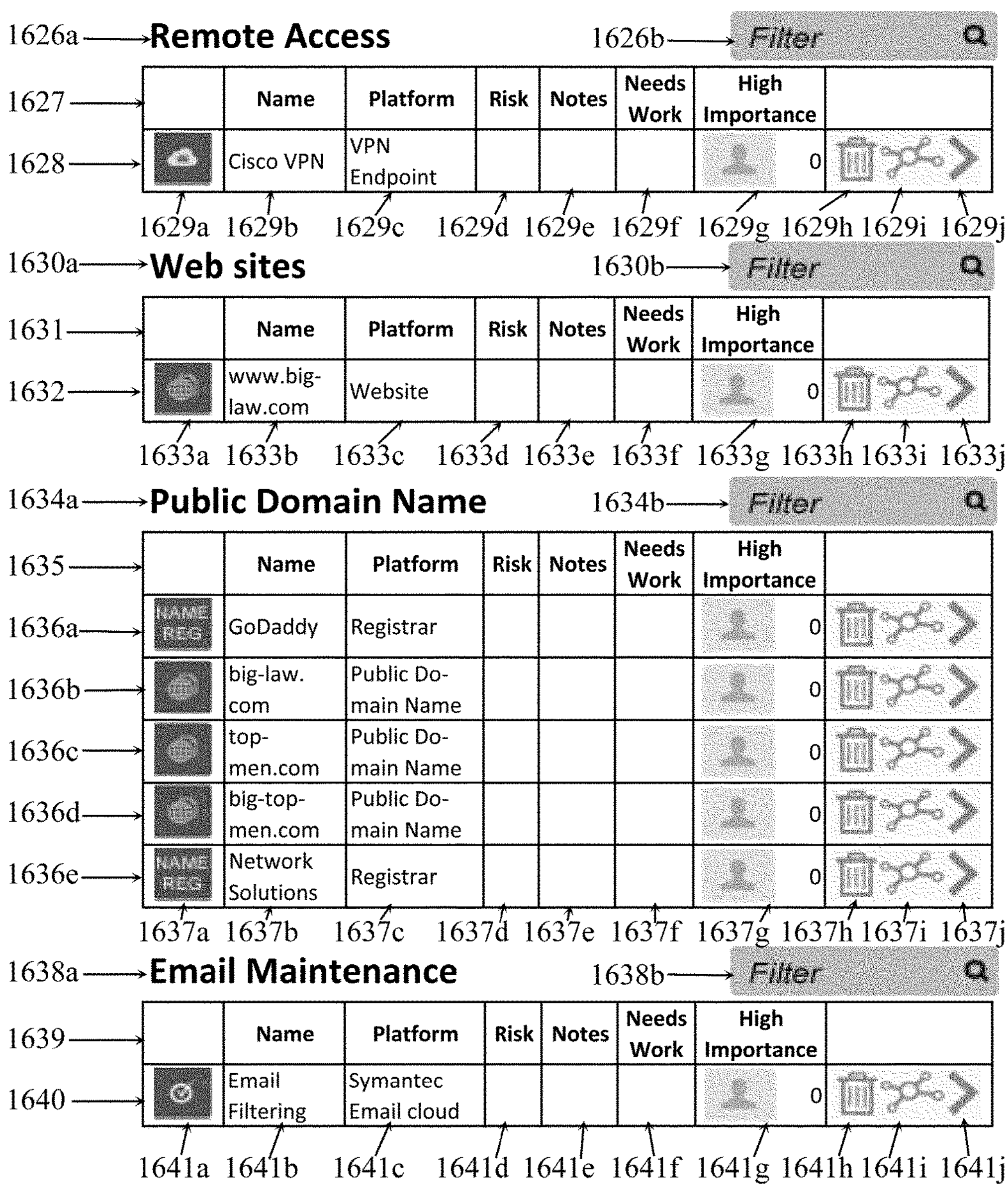

Turning to FIG. 16C, the table identified by header 1626*a* can display information about the applications that are used in the company for remote access, with descriptive column headers 1627, row 1628 that can represent an application, and columns 1629*a*-1629*j*. The filter tool 1626*b* can be used to specify a filter that will select a subset of the data to be displayed. Column 1629*a* can display a visual icon showing the type of the application in each row. Column 1629*b* can display the descriptive name of the application in each row. Column 1629*c* can display the platform on which the application in each row runs. Column 1629*d* can display an icon providing a visual indicator of the presence and severity of identified risks for the application in each row. Column 1629*e* can display an icon providing a visual indicator of the presence and importance of notes for the application in each row. Column 1629*f* can display an icon providing a visual indicator of how many outstanding documentation issues should be resolved for the application in each row. Column 1629*g* can display a count of the people at the company for whom the application in each row is documented to have a high importance. Column 1629*h* can display an icon that can be selected to remove the application in each row from the documentation. Column 1629*i* can display an icon that can be selected to display a user interface to show the IT infrastructure of the company, highlighting the relationship of the application in each row to the IT infrastructure. Column 1629*j* can display an icon that can be selected to display a user interface for viewing the extended information about the application in each row.

The table identified by header 1630*a* can display information about the web sites that are provided by the company, with descriptive column headers 1631, row 1632 that can represent a web site, and columns 1633*a*-1633*j*. The filter tool 1630*b* can be used to specify a filter that will select a subset of the data to be displayed. Column 1633*a* can display a visual icon showing the type of the web site in each row. Column 1633*b* can display the domain name for the web site in each row. Column 1633*c* can display the platform on which the web site in each row runs. Column 1633*d* can display an icon providing a visual indicator of the presence and severity of identified risks for the web site in each row. Column 1633*e* can display an icon providing a visual indicator of the presence and importance of notes for the web site in each row. Column 1633*f* can display an icon providing a visual indicator of how many outstanding documentation issues should be resolved for the web site in each row. Column 1633*g* can display a count of the people at the company for whom the web site in each row is documented to have a high importance. Column 1633*h* can display an icon that can be selected to remove the web site in each row from the documentation. Column 1633*i* can display an icon that can be selected to display a user interface to show the IT infrastructure of the company, highlighting the relationship of the web site in each row to the IT infrastructure. Column 1633*j* can display an icon that can be selected to display a user interface for viewing the extended information about the web site in each row.

The table identified by header 1634*a* can display information about the public domain names that are owned by the company, with descriptive column headers 1635, rows 1636*a*-1636*e* that can represent domain name resources, and columns 1637*a*-1637*j*. The filter tool 1634*b* can be used to specify a filter that will select a subset of the data to be displayed. Column 1637*a* can display a visual icon showing the type of the domain name resource in each row. Column 1637*b* can display the name of the domain name resource in each row. Column 1637*c* can display the type of the domain name resource in each row. Column 1637*d* can display an icon providing a visual indicator of the presence and severity of identified risks for the domain name resource in each row. Column 1637*e* can display an icon providing a visual indicator of the presence and importance of notes for the domain name resource in each row. Column 1637*f* can display an icon providing a visual indicator of how many outstanding documentation issues should be resolved for the domain name resource in each row. Column 1637*g* can display a count of the people at the company for whom the domain name resource in each row is documented to have a high importance. Column 1637*h* can display an icon that can be selected to remove the domain name resource in each row from the documentation. Column 1637*i* can display an icon that can be selected to display a user interface to show the IT infrastructure of the company, highlighting the relationship of the domain name resource in each row to the IT infrastructure. Column 1637*j* can display an icon that can be selected to display a user interface for viewing the extended information about the domain name resource in each row.

The table identified by header 1638*a* can display information about the applications that are used by the company for email maintenance, with descriptive column headers 1639, row 1640 that can represent an application, and columns 1641*a*-1641*j*. The filter tool 1638*b* can be used to specify a filter that will select a subset of the data to be displayed. Column 1641*a* can display a visual icon showing the type of the application in each row. Column 1641*b* can display the descriptive name of the application in each row. Column 1641*c* can display the platform on which the application in each row runs. Column 1641*d* can display an icon providing a visual indicator of the presence and severity of identified risks for the application in each row. Column 1641*e* can display an icon providing a visual indicator of the presence and importance of notes for the application in each row. Column 1641*f* can display an icon providing a visual indicator of how many outstanding documentation issues should be resolved for the application in each row. Column 1641*g* can display a count of the people at the company for whom the application in each row is documented to have a high importance. Column 1641*h* can display an icon that can be selected to remove the application in each row from the documentation. Column 1641*i* can display an icon that can be selected to display a user interface to show the IT infrastructure of the company, highlighting the relationship of the application in each row to the IT infrastructure. Column 1641*j* can display an icon that can be selected to display a user interface for viewing the extended information about the application in each row.

Figure 16D:
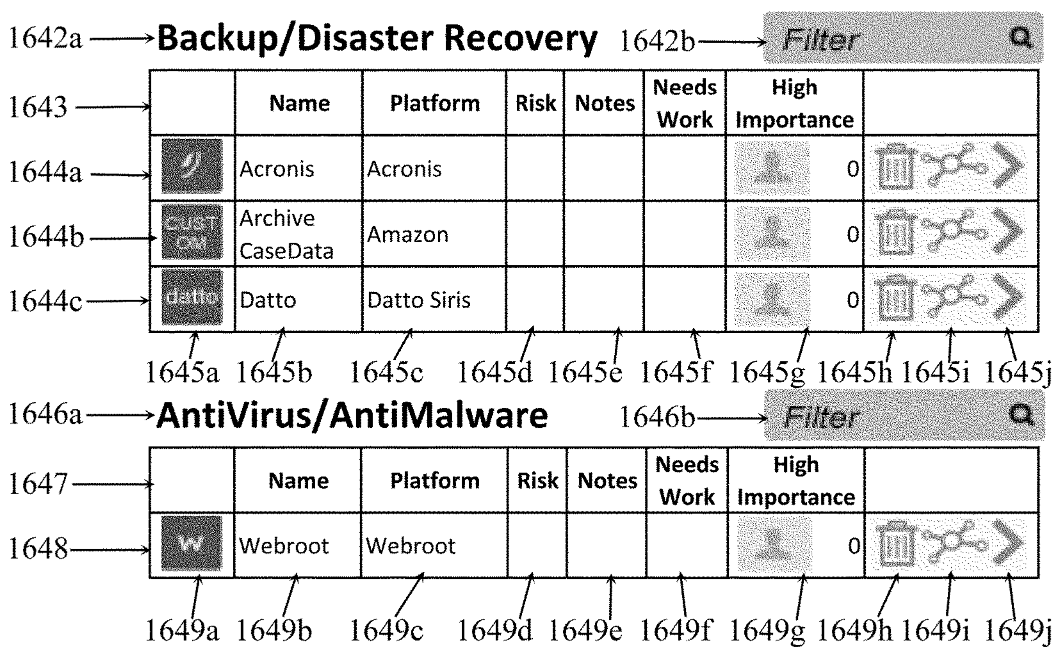

Turning to FIG. 16D, the table identified by header 1642*a* can display information about the applications that are used in the company for backup and disaster recovery, with descriptive column headers 1643, rows 1644*a*-1644*c* that can represent applications, and columns 1645*a*-1645*j*. The filter tool 1642*b* can be used to specify a filter that will select a subset of the data to be displayed. Column 1645*a* can display a visual icon showing the type of the application in each row. Column 1645*b* can display the descriptive name of the application in each row. Column 1645*c* can display the platform on which the application in each row runs. Column 1645*d* can display an icon providing a visual indicator of the presence and severity of identified risks for the application in each row. Column 1645*e* can display an icon providing a visual indicator of the presence and importance of notes for the application in each row. Column 1645*f* can display an icon providing a visual indicator of how many outstanding documentation issues should be resolved for the application in each row. Column 1645*g* can display a count of the people at the company for whom the application in each row is documented to have a high importance. Column 1645*h* can display an icon that can be selected to remove the application in each row from the documentation. Column 1645*i* can display an icon that can be selected to display a user interface to show the IT infrastructure of the company, highlighting the relationship of the application in each row to the IT infrastructure. Column 1645*j* can display an icon that can be selected to display a user interface for viewing the extended information about the application in each row.

The table identified by header 1646*a* can display information about the applications that are used in the company for antivirus and antimalware, with descriptive column headers 1647, row 1648 that can represent an application, and columns 1649*a*-1649*j*. The filter tool 1646*b* can be used to specify a filter that will select a subset of the data to be displayed. Column 1649*a* can display a visual icon showing the type of the application in each row. Column 1649*b* can display the descriptive name of the application in each row. Column 1649*c* can display the platform on which the application in each row runs. Column 1649*d* can display an icon providing a visual indicator of the presence and severity of identified risks for the application in each row. Column 1649*e* can display an icon providing a visual indicator of the presence and importance of notes for the application in each row. Column 1649*f* can display an icon providing a visual indicator of how many outstanding documentation issues should be resolved for the application in each row. Column 1649*g* can display a count of the people at the company for whom the application in each row is documented to have a high importance. Column 1649*h* can display an icon that can be selected to remove the application in each row from the documentation. Column 1649*i* can display an icon that can be selected to display a user interface to show the IT infrastructure of the company, highlighting the relationship of the application in each row to the IT infrastructure. Column 1649*j* can display an icon that can be selected to display a user interface for viewing the extended information about the application in each row.

Figure 16E:
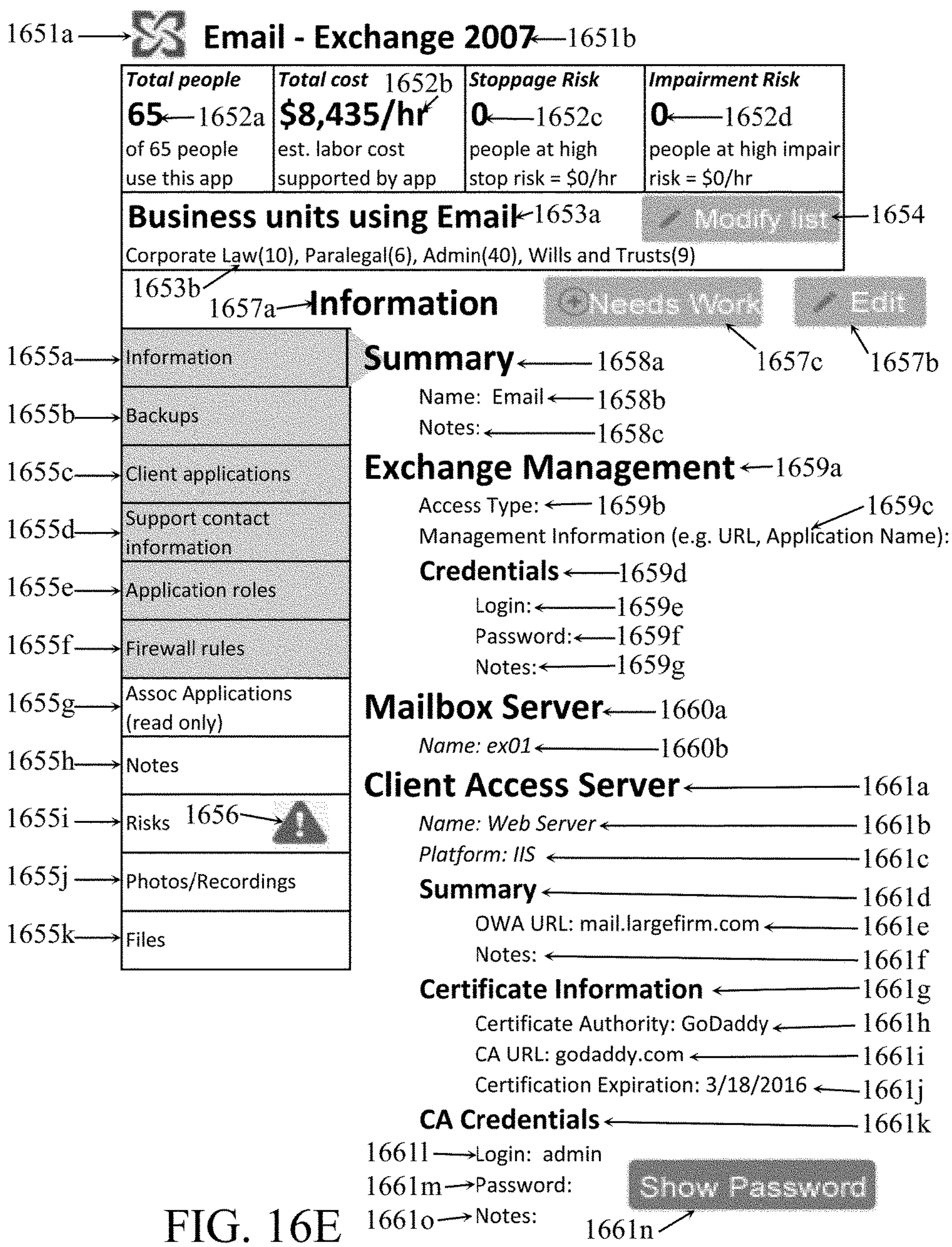
FIG. 16E and FIG. 16F are illustrative examples of embodiments of a user interface for viewing and updating general information about an application that is used by a company.
Figure 16F:
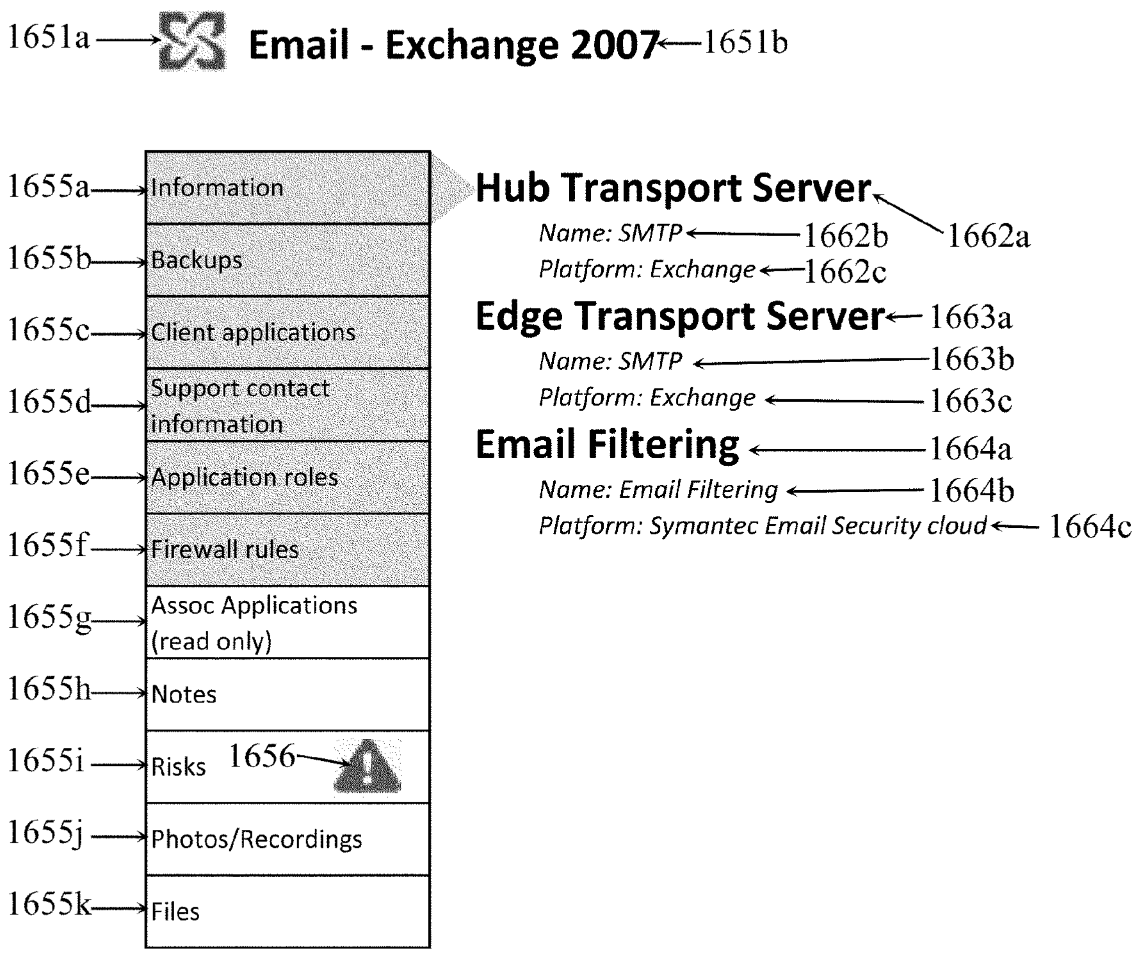

FIG. 16E and FIG. 16F are illustrative examples of embodiments of a user interface for viewing and updating general information about an application that is used by a company. The display in FIG. 16E and FIG. 16F can be the user interface that is displayed by selecting the icon in column 1605*j* for row 1604*b* as described with respect to FIG. 16A. The display in FIG. 16E and FIG. 16F can be identified by a visual icon 1651*a* that can represent the application, and the name 1651*b* of the application. The display options 1655*a*-1655*k* can be shown on the left, and as seen in FIG. 16E and FIG. 16F, the selected display option, which is the Information option 1655*a* in the example of FIG. 16E and FIG. 16F, can have a visual indicator of an arrow on the right side to indicate that this option is selected. The display options 1655*a*-1655*k* can have visual icons highlighting status, for example, the Risks display option 1655*i* in FIG. 16E and FIG. 16F has a visual icon 1656 indicating that a high priority risk is on this application.

The initial part of the display shown in FIG. 16E can have a business summary, which can describe the importance of the email application to the company, and can show the count 1652*a* of people in the company who use the application, the total cost to the company per hour 1652*b* in salaries of the people in the company who could potentially be affected by problems with the application, the number of people 1652*c* who are at risk of stopping work completely if the application fails, and the hourly cost associated with the salaries of those people, the number of people 1652*d* who are at risk of having their work impaired if the application fails, and the hourly cost associated with the salaries of those people. The business summary can also have a business unit section indicated by the header 1653*a* that shows the business units that depend on the application. The business unit section can have a list 1653*b* of the business units that depend on the application and the number of people in each business unit, and can have a Modify List button 1654 that can be selected to view and update the list of business units associated with the application.

The initial part of the display shown in FIG. 16E can have a header 1657*a* indicating the Information display option that is selected. The Needs Work button 1657*c* can be selected to display a user interface for marking the documentation about the Information of this application as incomplete. The Edit button 1657*b* can be selected to display a user interface for editing the documentation about the Information of this application.

The Summary section 1658*a* can contain a name 1658*b* of the application and notes 1658*c* that are specific to the application. The Exchange Management section 1659*a* can contain a method for accessing the application management interface 1659*b*, an address 1659*c* for accessing the application management interface, and a set of credentials 1659*d* for accessing the application management interface. The credentials 1659*d* can contain a username 1659*e*, a password 1659*f*, and notes 1659*g* that are specific to the credentials. The Mailbox Server section 1660*a* can contain a name 1660*b* of the server that is set up to receive email for the application. The Client Access Server section 1661*a* can contain a name 1661*b* of the server that is set up to provide user access to email (the client access server), a platform 1661*c* on which the email client access application runs, and a Summary section 1661*d*, Certificate Information section 1661*g*, and CA Credentials section 1661*k* with more information about the client access server. The Summary section 1661*d* can contain an address 1661*e* that end users can use to access the email interface and notes 1661*f* specific to user access of email. The Certificate Information section 1661*g* can contain information about a secure sockets layer (SSL) certificate installed on the client access server and used by the application, including the certificate authority (CA) 1661*h* that issued the certificate, the address 1661*l* of the CA, and the expiration date 1661*j* of the certificate. The CA Credentials section 1661*k* can contain credentials for managing the certificate at the CA, including a username 1661*l*, a password 1661*m*, and notes 1661*o* that are specific to the credentials. To prevent casual accidental disclosure of the password, the password can be obscured by a Show Password button 1661*n* that can be selected to display the actual password.

Turning to FIG. 16F, the Hub Transport Server section 1662*a* can contain a name 1662*b* of the server that provides mail transport agent (MTA) services for the application and a platform 1662*c* on which the MTA services run. The Edge Transport Server section 1663*a* can contain a name 1663*b* of the server that provides routing services from the hub transport server to the outside world and a platform 1663*c* on which the routing services run. The Email Filtering section 1664*a* can contain a name 1664*b* of an email filtering application used for processing email to remove harmful messages and attachments, and a platform 1664*c* on which the email filtering application runs.

It should be noted that the layout and contents of the user interface described by FIG. 16E and FIG. 16F can be specific to the application, and this specificity can be an advantage of the present disclosure. For example, the Client Access Server section 1661*a*, the Hub Transport Server section 1662*a*, the Edge Transport Server section 1663*a*, and the Email Filtering section 1664*a* may only be present for an email application, and may not be present for other types of applications. In this way, the application documentation can be tailored to the application itself, and may therefore be more relevant and useful.

Figure 16G:
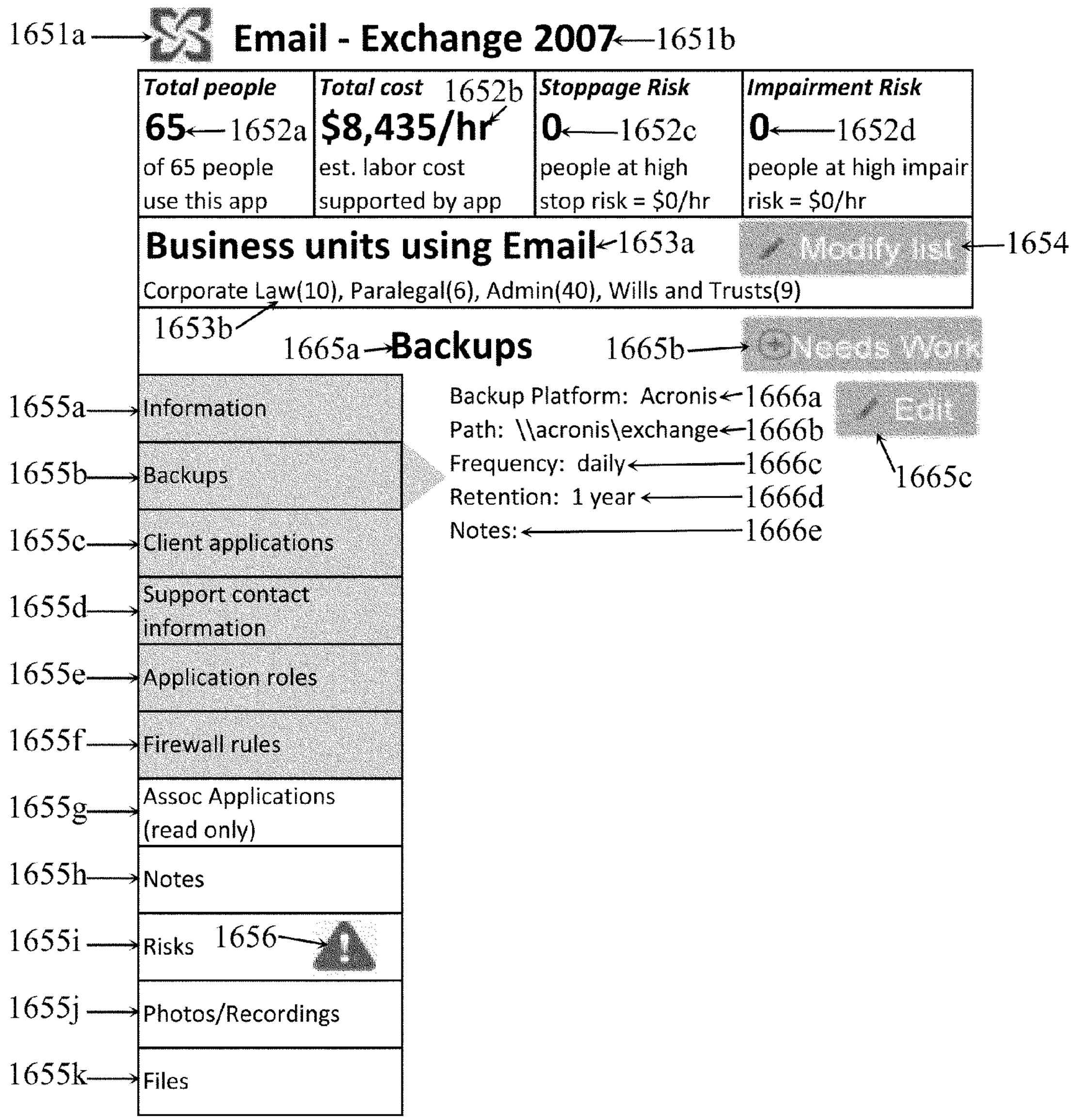
FIG. 16G is an illustrative example of an embodiment of a user interface for viewing and updating backup information about an application that is used by a company.

FIG. 16G is an illustrative example of an embodiment of a user interface for viewing and updating backup information about an application that is used by a company. The display in FIG. 16G can be the user interface that is displayed by selecting the display option 1655*b* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16G, the selected display option, which is the Backups option 1655*b* in the example of FIG. 16G, can have a visual indicator of an arrow on the right side to indicate that this option is selected. The initial part of the display shown in FIG. 16G can have a header 1665*a* indicating the Backups display option that is selected. The Needs Work button 1665*b* can be selected to display a user interface for marking the documentation about the Backups of this application as incomplete. The Edit button 1665*c* can be selected to display a user interface for editing the documentation about the Backups of this application.

The information displayed about the Backups of this application can include the platform 1666*a* that is used to back up the application, the path 1666*b* where the backups are written, the frequency 1666*c* of running the backup, the retention period 1666*d* for which the backups are kept, and notes 1666*e* specific to the backup operations.

Figure 16H:
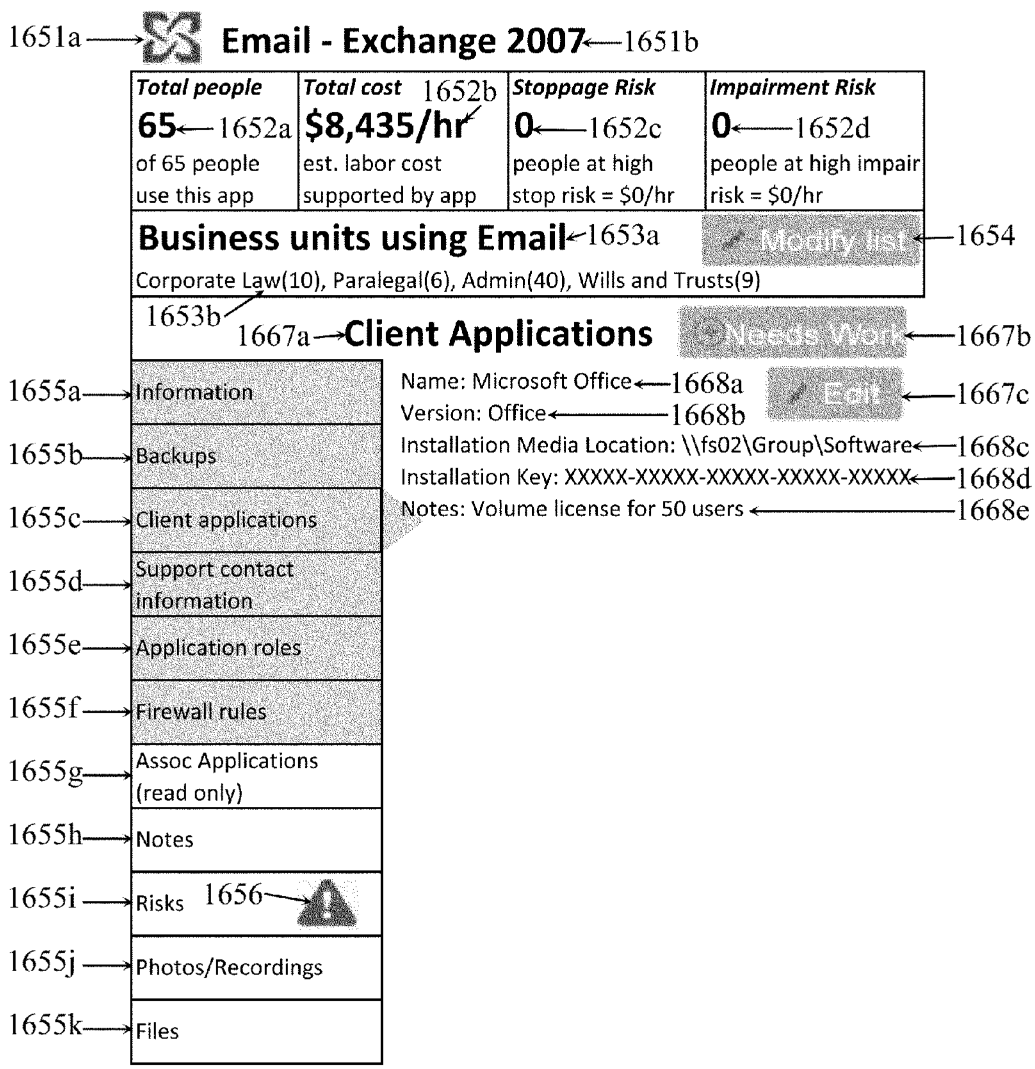
FIG. 16H is an illustrative example of an embodiment of a user interface for viewing and updating information about client applications for an application that is used by a company.

FIG. 16H is an illustrative example of an embodiment of a user interface for viewing and updating information about client applications for an application that is used by a company. The display in FIG. 16H can be the user interface that is displayed by selecting the display option 1655*c* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16H, the selected display option, which is the Client Applications option 1655*c* in the example of FIG. 16H, can have a visual indicator of an arrow on the right side to indicate that this option is selected. The initial part of the display shown in FIG. 16H can have a header 1667*a* indicating the Client Applications display option that is selected. The Needs Work button 1667*b* can be selected to display a user interface for marking the documentation about the Client Applications of this application as incomplete. The Edit button 1667*c* can be selected to display a user interface for editing the documentation about the Client Applications of this application.

The information displayed about the Client Applications of this application can include a name 1668*a* of the application used to access the application data (the client application), a version 1668*b* of the client application, a location 1668*c* where the installation for the client application resides, a key 1668*d* that can be used to install the client application, and notes 1668*e* specific to the client application.

Figure 16I:
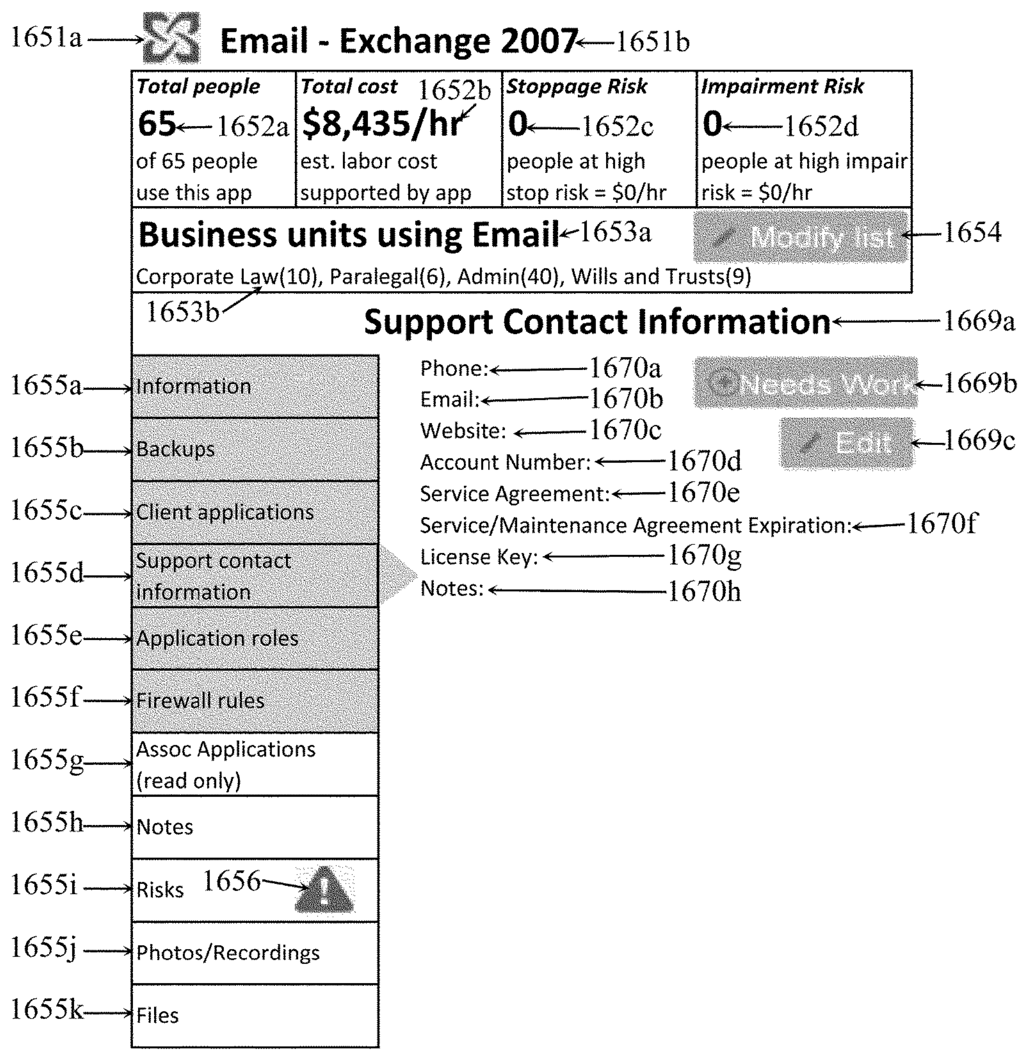
FIG. 16I is an illustrative example of an embodiment of a user interface for viewing and updating contact information for support of an application that is used by a company.

FIG. 16I is an illustrative example of an embodiment of a user interface for viewing and updating contact information for support of an application that is used by a company. The display in FIG. 16I can be the user interface that is displayed by selecting the display option 1655*d* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16I, the selected display option, which is the Support Contact Information option 1655*d* in the example of FIG. 16I, can have a visual indicator of an arrow on the right side to indicate that this option is selected. The initial part of the display shown in FIG. 16I can have a header 1669*a* indicating the Support Contact Information display option that is selected. The Needs Work button 1669*b* can be selected to display a user interface for marking the documentation about the Support Contact Information of this application as incomplete. The Edit button 1669*c* can be selected to display a user interface for editing the documentation about the Support Contact Information of this application.

The information displayed about the Support Contact Information of this application can include a phone number 1670*a* for contacting customer support about the application, an email address 1670*b* for contacting email support about the application, a website 1670*c* for finding support information about the application, an account number 1670*d* to reference when contacting customer support, a service agreement number 1670*e* to reference when contacting customer support, the expiration date 1670*f* of the service agreement for the application, the license key 1670*g* assigned to the application, and notes 1670*h* specific to supporting the application.

Figure 16J:
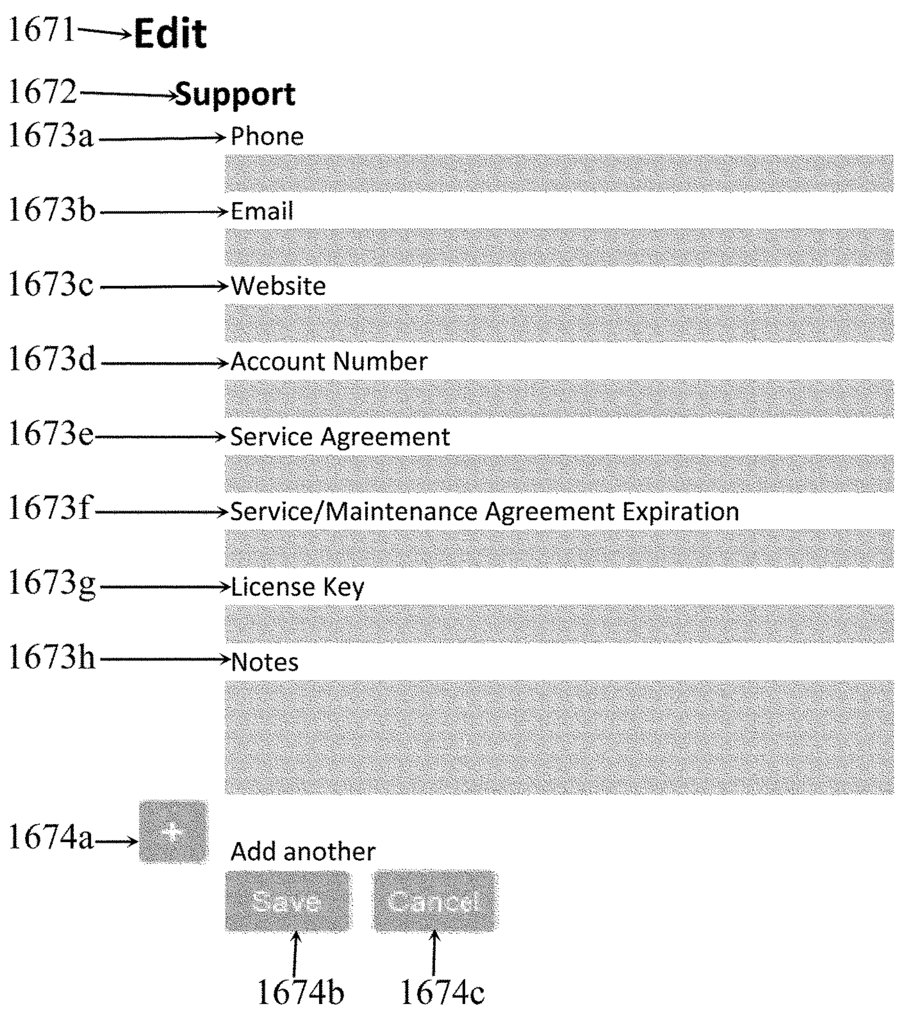
FIG. 16J is an illustrative example of an embodiment of a user interface for viewing and updating the contact information for one support contact.

FIG. 16J is an illustrative example of an embodiment of a user interface for viewing and updating the contact information for one support contact. The display in FIG. 16J can be the user interface that is displayed by selecting the Edit button 1669*c* as described with respect to FIG. 16I. The user interface can be identified by the Edit header 1671 and the Support sub-header 1672. The fields that can be entered, modified, and viewed in the user interface can include a phone number 1673*a* for contacting customer support about the application, an email address 1673*b* for contacting email support about the application, a website 1673*c* for finding support information about the application, an account number 1673*d* to reference when contacting customer support, a service agreement number 1673*e* to reference when contacting customer support, the expiration date 1673*f* of the service agreement for the application, the license key 1673*g* assigned to the application, and notes 1673*h* specific to supporting the application. The Add Another button 1647*a* can be selected to add another set of support contact information like the fields 1673*a*-1673*h*, which may be then filled in with information for another support contact. The Save button 1647*b* can be selected to update the documentation with the information entered in the user interface, and then return to the previous display. The Cancel button 1674*c* can be selected to discard the information entered in the user interface, and then return to the previous display.

Figure 16K:
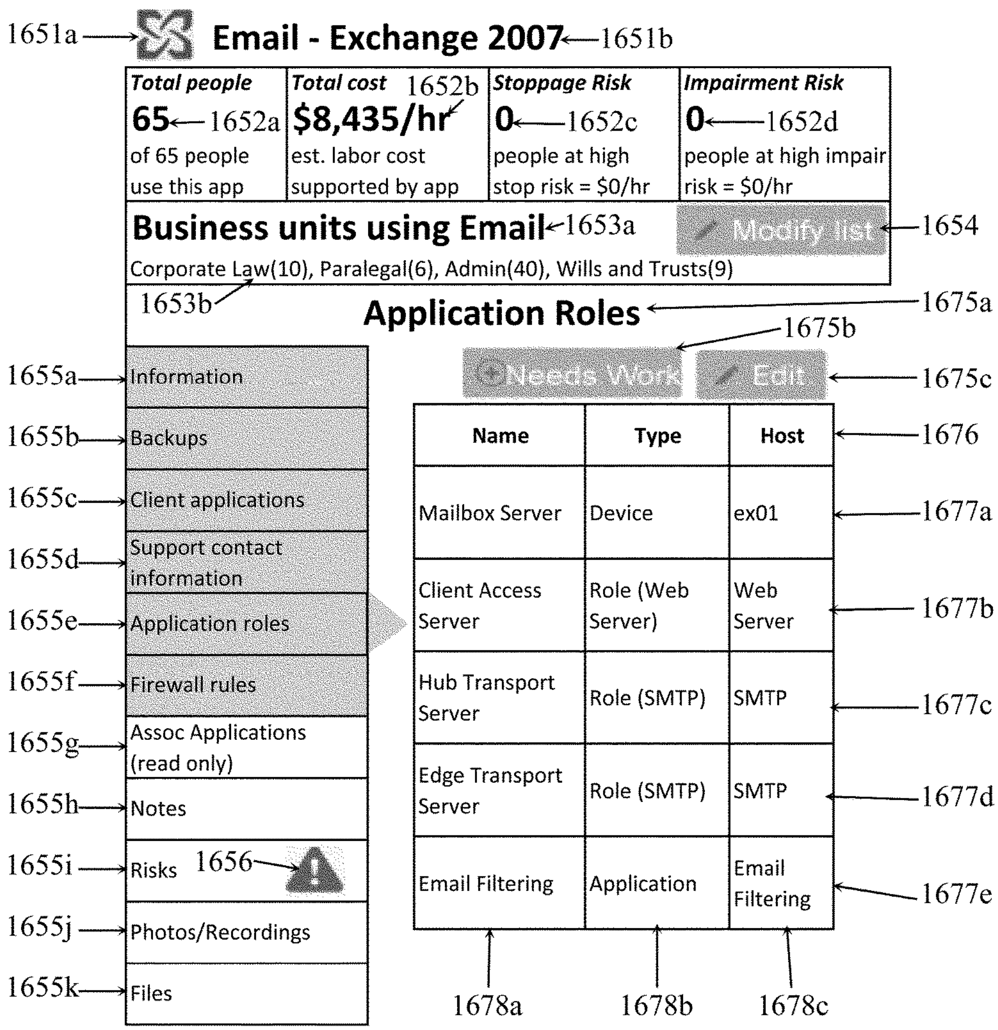
FIG. 16K is an illustrative example of an embodiment of a user interface for viewing and updating information about the roles, played by components of a network, for an application that is used by a company.

FIG. 16K is an illustrative example of an embodiment of a user interface for viewing and updating information about the roles, played by components of a network, for an application that is used by a company. The display in FIG. 16K can be the user interface that is displayed by selecting the display option 1655*e* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16K, the selected display option, which is the Application Roles option 1655*e* in the example of FIG. 16K, can have a visual indicator of an arrow on the right side to indicate that this option is selected. The initial part of the display shown in FIG. 16K can have a header 1675*a* indicating the Application Roles display option that is selected. The Needs Work button 1675*b* can be selected to display a user interface for marking the documentation about the Support Contact Information of this application as incomplete. The Edit button 1675*c* can be selected to display a user interface for editing the documentation about the Application Roles of this application.

The information about application roles for this application can be displayed in a tabular format with descriptive column headers 1676, rows 1677*a*-1677*e*, and columns 1678*a*-1678*c*. Each row 1677*a*-1677*e* can represent an application role for this application. Column 1678*a* can display the name of the application role in each row. Column 1678*b* can display the role type of the application role in each row. Column 1678*c* can display the name of the host server where the application role in each row runs.

Figure 16L:
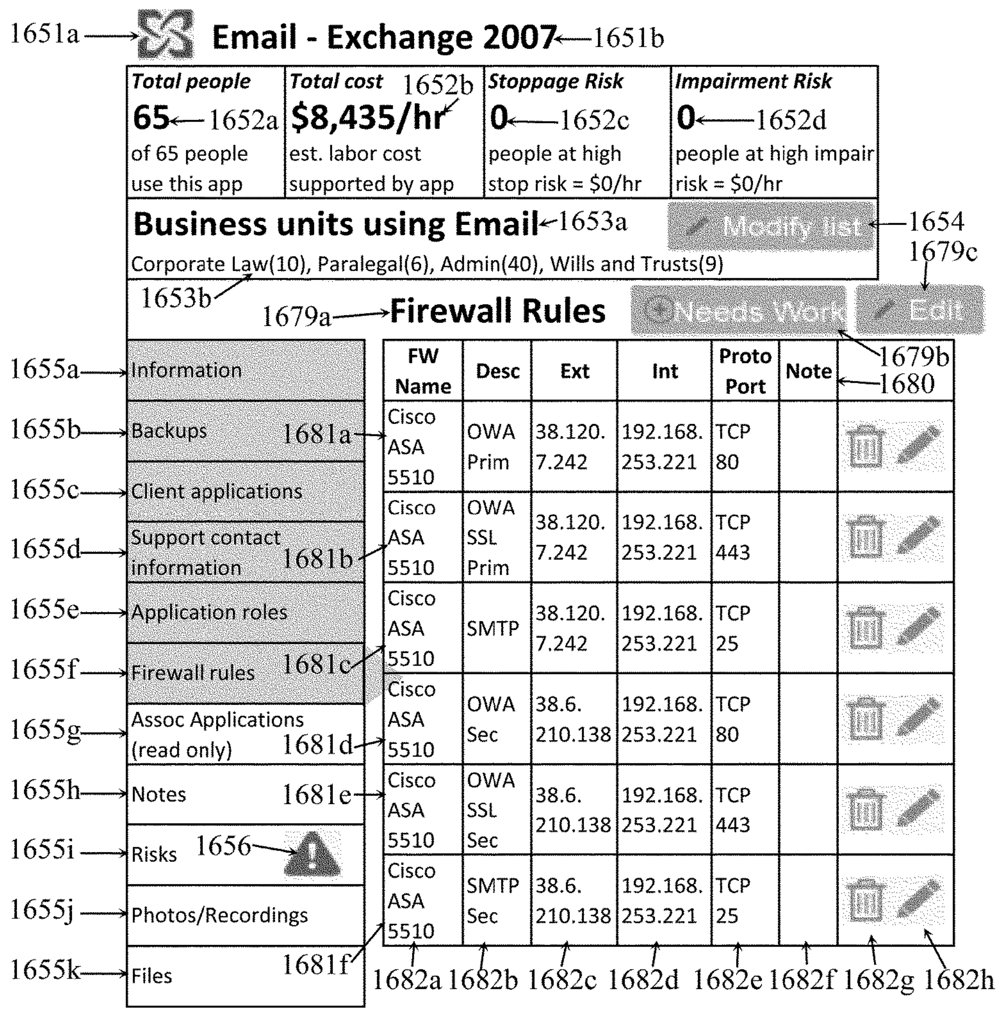
FIG. 16L is an illustrative example of an embodiment of a user interface for viewing and updating firewall rules that are associated with an application that is used by a company.

FIG. 16L is an illustrative example of an embodiment of a user interface for viewing and updating firewall rules that are associated with an application that is used by a company. The display in FIG. 16L can be the user interface that is displayed by selecting the display option 1655*f* as described with respect to FIG. 16E and FIG. 16F. The header section 1651_a_-1651_b_, business summary section 1652_a_-1652_d_, business unit summary section 1653_a_-1653_b_ and 1654, and display option section 1655_a_-1655_k_ and 1656, can be the same as described with respect to FIG. 16E and FIG. 16F, and as seen in FIG. 16L, the selected display option, which is the Firewall Rules option 1655_f_ in the example of FIG. 16L, can have a visual indicator of an arrow on the right side to indicate that this option is selected. The initial part of the display shown in FIG. 16L can have a header 1679_a_ indicating the Firewall Rules display option that is selected. The Needs Work button 1679_b_ can be selected to display a user interface for marking the documentation about the Firewall Rules of this application as incomplete. The Edit button 1679_c_ can be selected to display a user interface for editing the documentation about the Firewall Rules of this application.

The information about firewall rules for this application can be displayed in a tabular format with descriptive column headers 1680, rows 1681_a_-1681_f_, and columns 1682_a_-1682_h_. Each row 1681_a_-1681_f_ can represent a firewall rule for this application. Column 1682_a_ can display the name of firewall appliance where the firewall rule in each row is applied. Column 1682_b_ can display a short description of the function of the firewall rule in each row. Column 1682_c_ can display the external address that is used for the firewall rule in each row. Column 1682_d_ can display the internal address that is used for the firewall rule in each row. Column 1682_e_ can display the protocol and port that are used for the firewall rule in each row. Column 1682_f_ can display an icon providing a visual indicator of the presence and importance of notes for the firewall rule in each row. Column 1682_g_ can display an icon that can be selected to remove the firewall rule in each row from the documentation. Column 1682_h_ can display an icon that can be selected to display a user interface for viewing and editing the extended information about the firewall rule in each row.

Figure 16M:
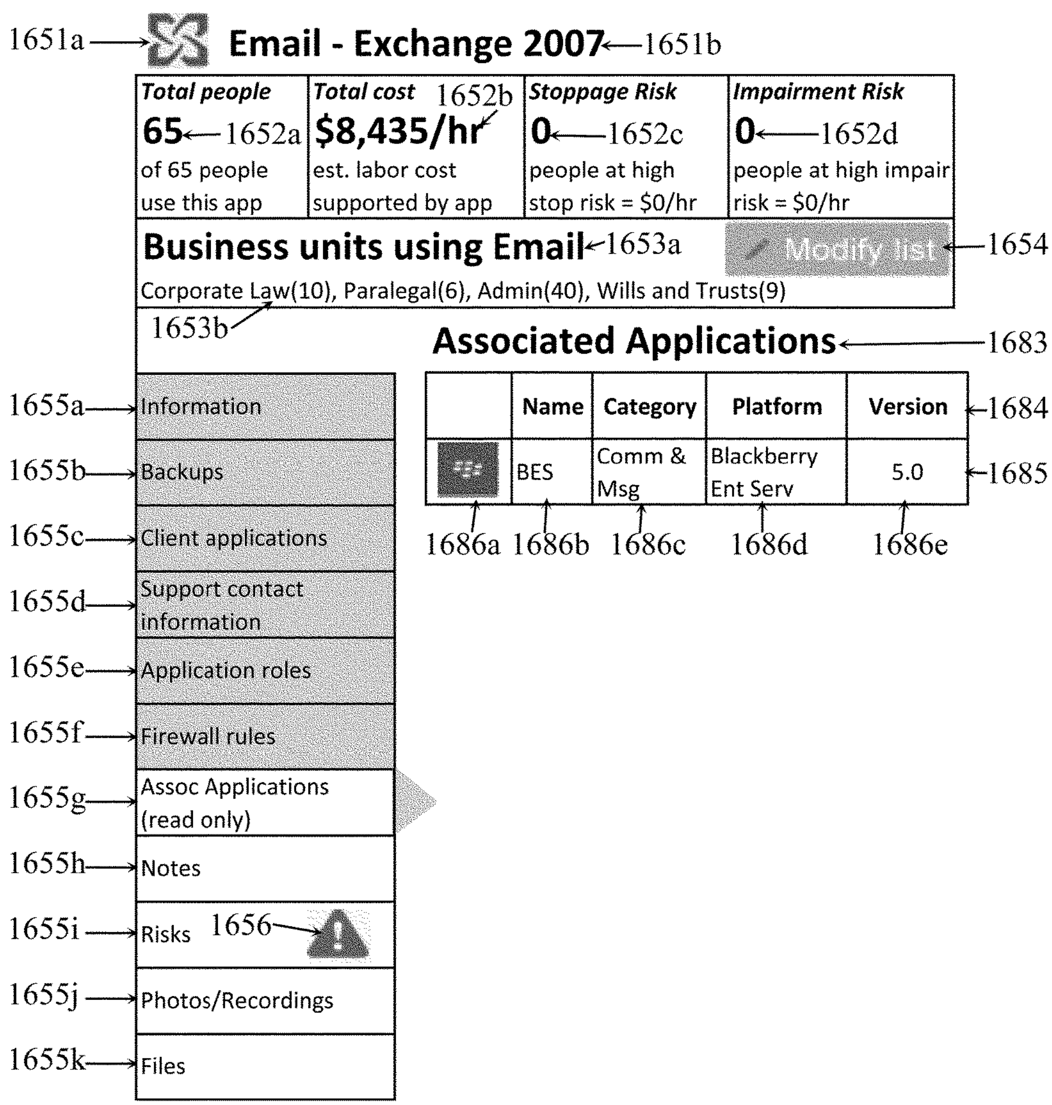
FIG. 16M is an illustrative example of an embodiment of a user interface for viewing other applications that are associated with an application that is used by a company.

FIG. 16M is an illustrative example of an embodiment of a user interface for viewing other applications that are associated with an application that is used by a company. The display in FIG. 16M can be the user interface that is displayed by selecting the display option 1655_g_ as described with respect to FIG. 16E and FIG. 16F. The header section 1651_a_-1651_b_, business summary section 1652_a_-1652_d_, business unit summary section 1653_a_-1653_b_ and 1654, and display option section 1655_a_-1655_k_ and 1656, can be the same as described with respect to FIG. 16E and FIG. 16F, and as seen in FIG. 16M, the selected display option, which is the Associated Applications option 1655_g_ in the example of FIG. 16M, can have a visual indicator of an arrow on the right side to indicate that this option is selected. The initial part of the display shown in FIG. 16M can have a header 1683 indicating the Associated Applications display option that is selected.

The information about other applications that are associated with this application can be displayed in a tabular format with descriptive column headers 1684, row 1685, and columns 1686_a_-1686_e_. The display can be read only because the associations of applications to other applications can be edited in other parts of the system, but the display in one table of some or all of the applications associated with an application can still be useful. For example, the relationship between an application and another application that depends on the first application may not be explicitly represented in the structured documentation. Instead, the documentation may represent the application service that is implemented by an application, and the system may use the relationship between an application and the application services it uses to determine a second application upon which the application relies. In the example of FIG. 16M, the structured documentation may indicate that the application Email-Exchange 2007 implements a specific email application service, and may separately indicate that the application BES uses that specific application service in order to send email. The system may then determine that the application BES depends on the application Email-Exchange 2007. Each row 1685 can represent another application that is associated with this application. Column 1686_a_ can display a visual icon representing the other application in each row. Column 1686_b_ can display the name of the other application in each row. Column 1686_c_ can display the category of the other application in each row. Column 1686_d_ can display the platform on which the other application in each row runs. Column 1686_e_ can display the version of the other application in each row.

Figure 16N:
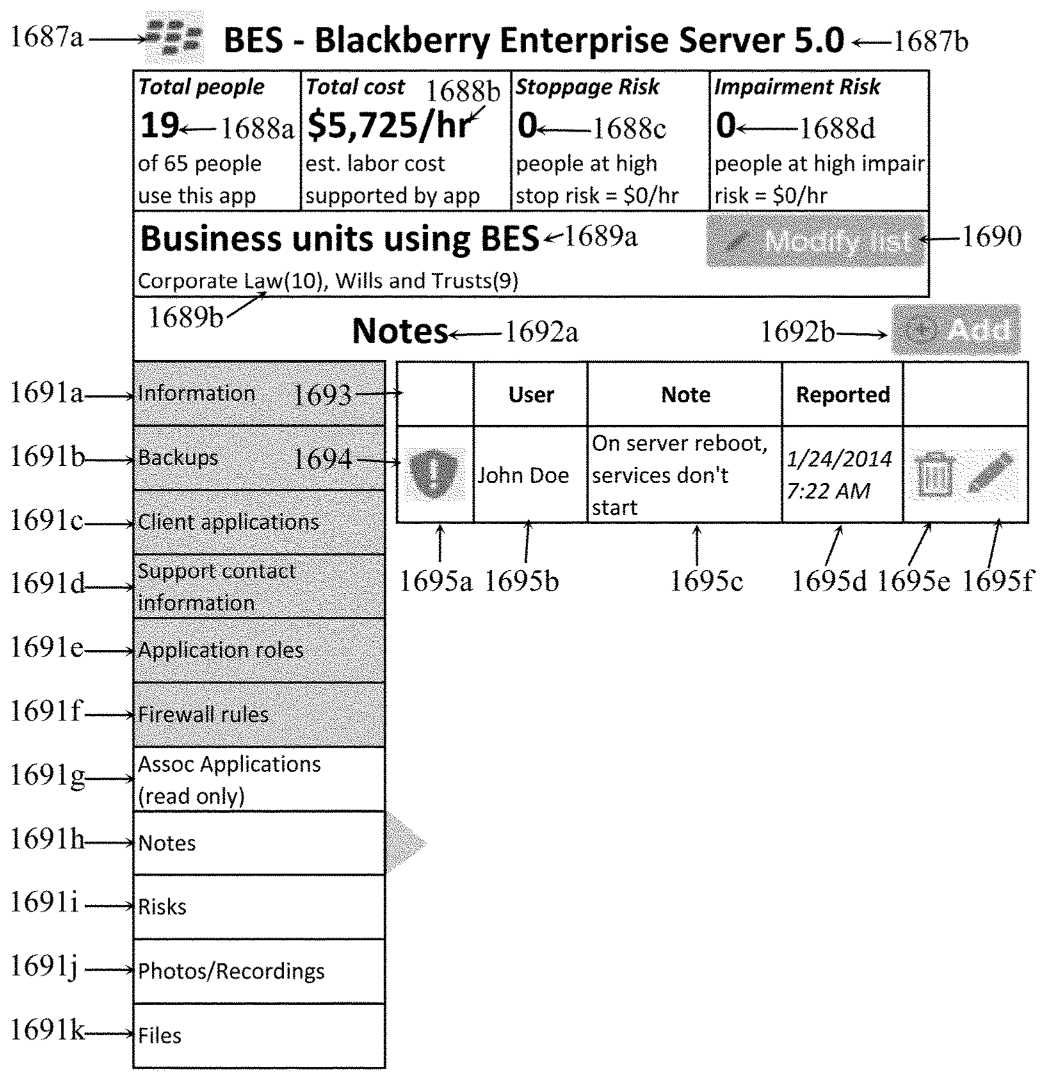
FIG. 16N is an illustrative example of an embodiment of a user interface for viewing and updating notes about an application that is used by a company.

FIG. 16N is an illustrative example of an embodiment of a user interface for viewing and updating notes about an application that is used by a company. The display in FIG. 16N can be the user interface that is displayed by selecting the icon in column 1605_j_ for row 1604_a_ as described with respect to FIG. 16A. The display in FIG. 16N can be identified by a visual icon 1687_a_ that can represent the application, and the name 1687_b_ of the application. The display options 1691_a_-1691_k_ can be shown on the left, and as seen in FIG. 16N, the selected display option, which is the Notes option 1691_h_ in the example of FIG. 16N, can have a visual indicator of an arrow on the right side to indicate that this option is selected.

The initial part of the display shown in FIG. 16N can have a business summary, which can describe the importance of the BLACKBERRY ENTERPRISE SERVER application to the company, and can show the count 1688_a_ of people in the company who use the application, the total cost to the company per hour 1688_b_ in salaries of the people in the company who could potentially be affected by problems with the application, the number of people 1688_c_ who are at risk of stopping work completely if the application fails, and the hourly cost associated with the salaries of those people, the number of people 1688_d_ who are at risk of having their work impaired if the application fails, and the hourly cost associated with the salaries of those people. The business summary can also have a business unit section indicated by the header 1689_a_ that shows the business units that depend on the application. The business unit section can have a list 1689_b_ of the business units that depend on the application and the number of people in each business unit, and can have a Modify List button 1690 that can be selected to view and update the list of business units associated with the application.

The initial part of the display shown in FIG. 16N can have a header 1692_a_ indicating the Notes display option that is selected. The Add button 1692_b_ can be selected to display a user interface for adding a note to the Notes for this application.

The information about notes about this application can be displayed in a tabular format with descriptive column headers 1693, row 1694, and columns 1695_a_-1695_f_. Each row 1694 can represent a note about this application. Column 1695_a_ can display a visual icon representing the relative importance of the note in each row. Column 1695_b_ can display the name of the person who entered the note in each row. Column 1695_c_ can display the full text of the note in each row. Column 1695_d_ can display the time and date when the note in each row was entered. Column 1695_e_ can display an icon that can be selected to remove the note in each row from the documentation. Column 1695*f* can display an icon that can be selected to display a user interface for editing the note in each row.

Figure 16O:
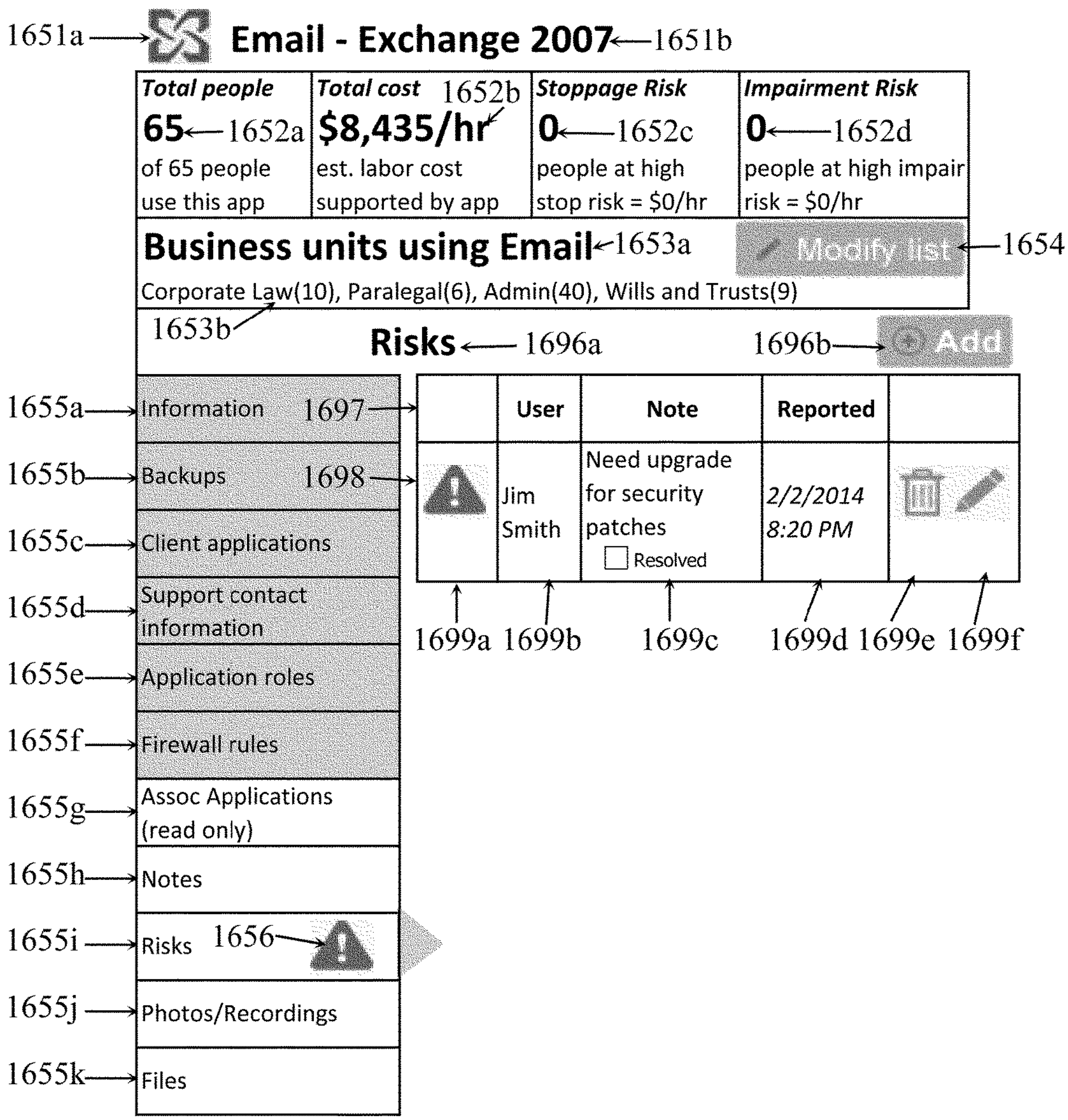
FIG. 16O is an illustrative example of an embodiment of a user interface for viewing and updating risk factors that are associated with an application that is used by a company.

FIG. 16O is an illustrative example of an embodiment of a user interface for viewing and updating risk factors that are associated with an application that is used by a company. The display in FIG. 16O can be the user interface that is displayed by selecting the display option 1655*i* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16O, the selected display option, which is the Risks option 1655*i* in the example of FIG. 16O, can have a visual indicator of an arrow on the right side to indicate that this option is selected. The initial part of the display shown in FIG. 16O can have a header 1696*a* indicating the Risks display option that is selected. The Add button 1696*b* can be selected to display a user interface for adding a risk to the Risks for this application.

The information about risks that are associated with this application can be displayed in a tabular format with descriptive column headers 1697, row 1698, and columns 1699*a*-1699*f*. Each row 1698 can represent a risk that is associated with this application. Column 1699*a* can display a visual icon representing the severity of the risk in each row. Column 1699*b* can display the name of the person who entered the risk in each row. Column 1699*c* can display the full text of the risk in each row, and can contain a checkbox that can be selected in order to mark the risk as having been successfully corrected or resolved. Column 1699*d* can display the time and date when the risk in each row was entered. Column 1699*e* can display an icon that can be selected to remove the risk in each row from the documentation. Column 1699*f* can display an icon that can be selected to display a user interface for editing the risk in each row.

Figure 16P:
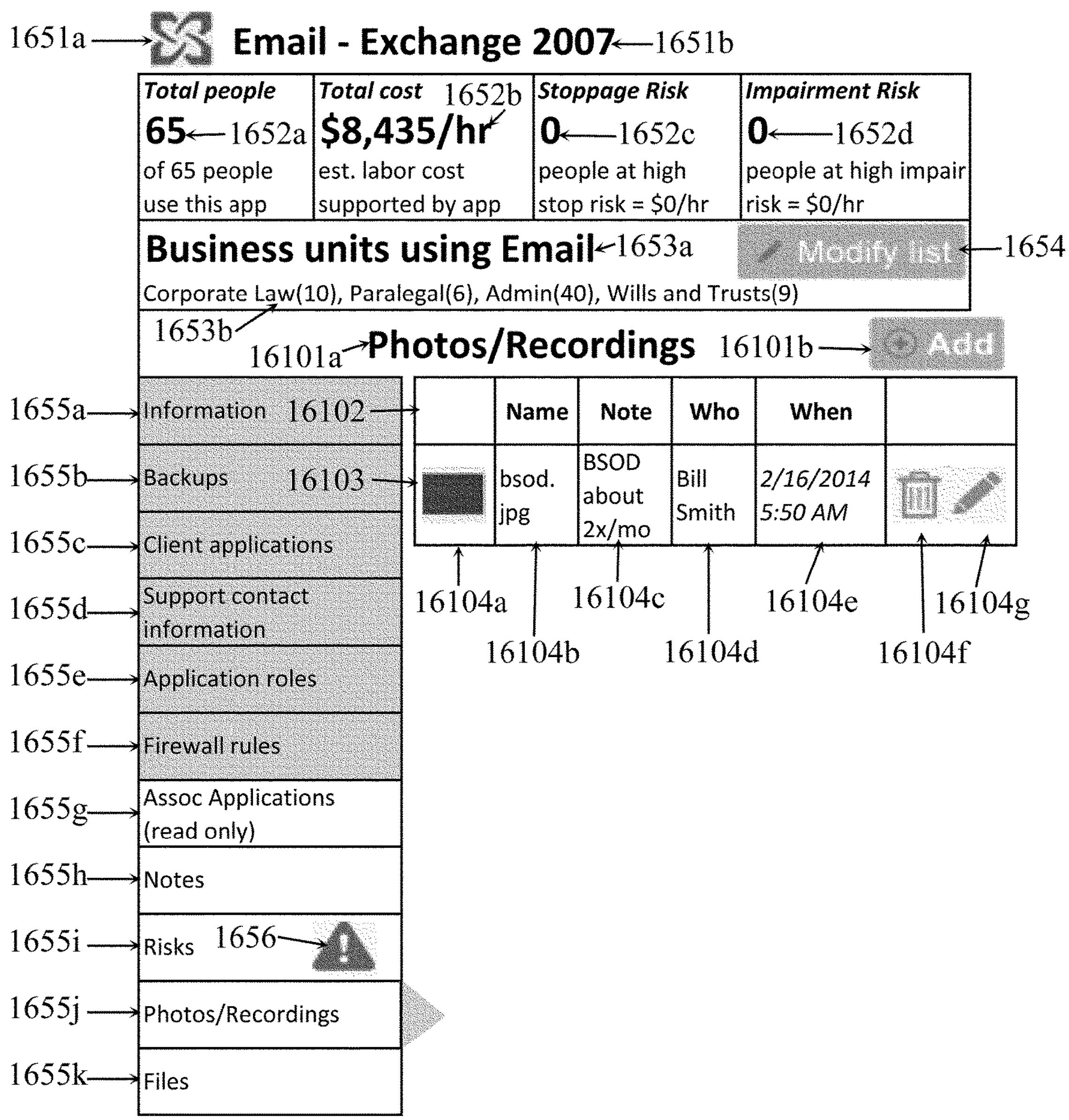
FIG. 16P is an illustrative example of an embodiment of a user interface for viewing and updating photographs and recordings that can help to document a component of a network that is used by a company.

FIG. 16P is an illustrative example of an embodiment of a user interface for viewing and updating photographs and recordings that can help to document a component of a network that is used by a company. The display in FIG. 16P can be the user interface that is displayed by selecting the display option 1655*j* as described with respect to FIG. 16E and FIG. 16F. The header section 1651*a*-1651*b*, business summary section 1652*a*-1652*d*, business unit summary section 1653*a*-1653*b* and 1654, and display option section 1655*a*-1655*k* and 1656, can be the same as described with respect to FIG. 16E and FIG. 16F, and as seen in FIG. 16P, the selected display option, which is the Photos/Recordings option 1655*j* in the example of FIG. 16P, can have a visual indicator of an arrow on the right side to indicate that this option is selected. The initial part of the display shown in FIG. 16P can have a header 16101*a* indicating the Photos/Recordings display option that is selected. The Add button 16101*b* can be selected to display a user interface for adding a photograph or recording to the documentation listing Photos/Recordings for this application.

The information about photographs and recordings that are associated with this application can be displayed in a tabular format with descriptive column headers 16102, row 16103, and columns 16104*a*-16104*g*. Each row 16103 can represent a photograph or recording that is associated with this application. Column 16104*a* can display a visual icon representing the photograph or recording in each row, and may be a small thumbnail version of a photograph. Column 16104*b* can display the filename that was used to upload the photograph or recording in each row. Column 16104*c* can display a descriptive note about the photograph or recording in each row. Column 16104*d* can display the name of the person who entered the photograph or recording in each row. Column 16104*e* can display the time and date when the photograph or recording in each row was entered. Column 16104*f* can display an icon that can be selected to remove the photograph or recording in each row from the documentation. Column 16104*g* can display an icon that can be selected to display a user interface for viewing and editing the information about the photograph or recording in each row.

Figure 16Q:
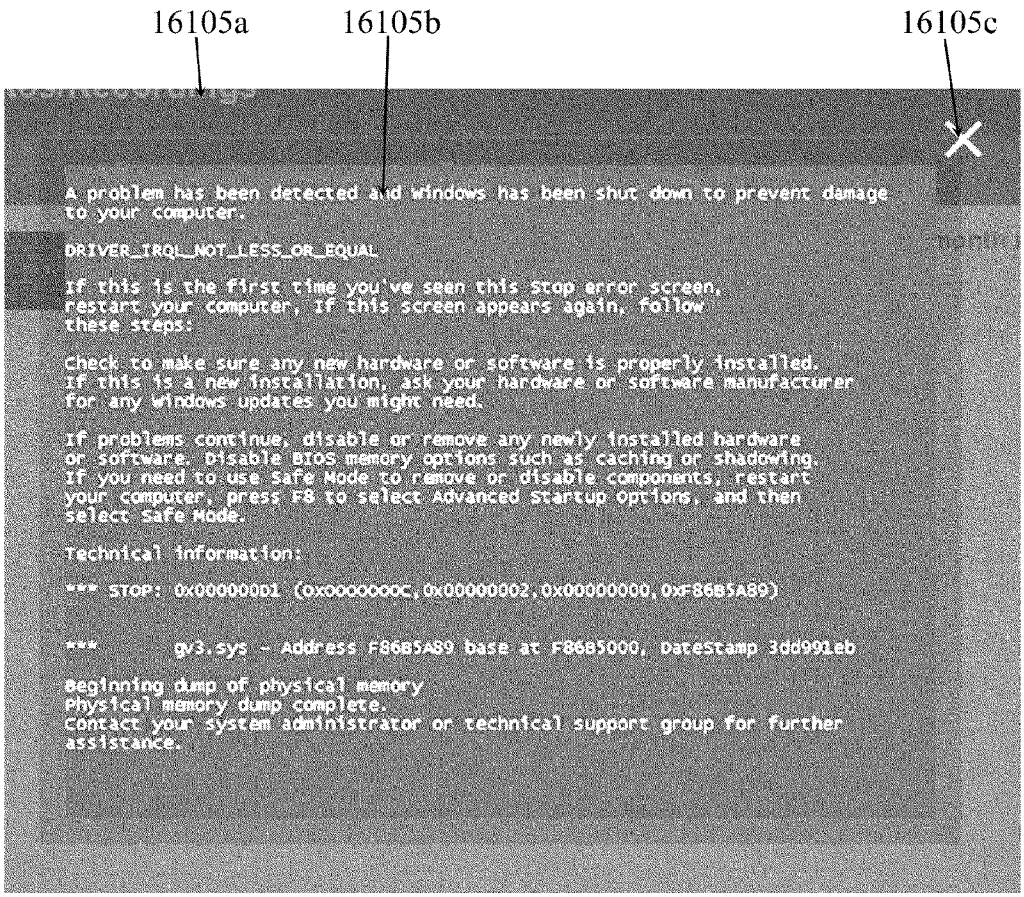
FIG. 16Q is an illustrative example of an embodiment of a user interface for viewing a photograph or recording that can help to document a component of a network that is used by a company.

FIG. 16Q is an illustrative example of an embodiment of a user interface for viewing a photograph or recording that can help to document a component of a network that is used by a company. The display in FIG. 16Q may be part of the user interface that is displayed by selecting the icon in column 16104*g* of row 16103 as described in FIG. 16P. The display in FIG. 16Q may be displayed on top of an existing interface display 16105*a* that may be darkened or otherwise de-emphasized to indicate that this display option is in the background. A close control 16105*c* may be provided to close the display of FIG. 16Q and return to the previous display 16105*a*. The information 16105*b* may be an image, for example, in FIG. 16Q the information 16105*b* represents a screen shot of an error condition that is associated with an application.

Figure 16R:
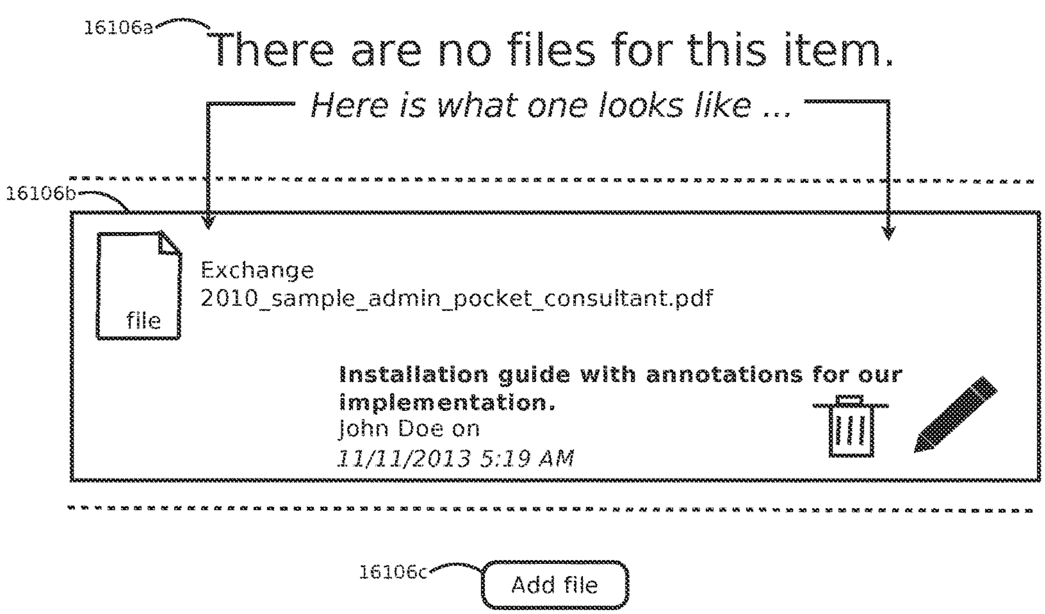
FIG. 16R is an illustrative example of an embodiment of a user interface for adding a file that can help to document a component of a network that is used by a company.

FIG. 16R is an illustrative example of an embodiment of a user interface for adding a file that can help to document a component of a network that is used by a company. The display in FIG. 16R can be the user interface that is displayed by selecting the display option 1655*k* as described with respect to FIG. 16E and FIG. 16F. The header 16016*a* can indicate that there are no files currently uploaded for this component. The example entry 16106*b* can indicate the form of the user interface for displaying files that are uploaded for a component, and can give the end user an idea of what information will be associated with an uploaded file. The Add File button 16106*c* can be selected to display a user interface for uploading a new file to help document the component.

Figure 16S:
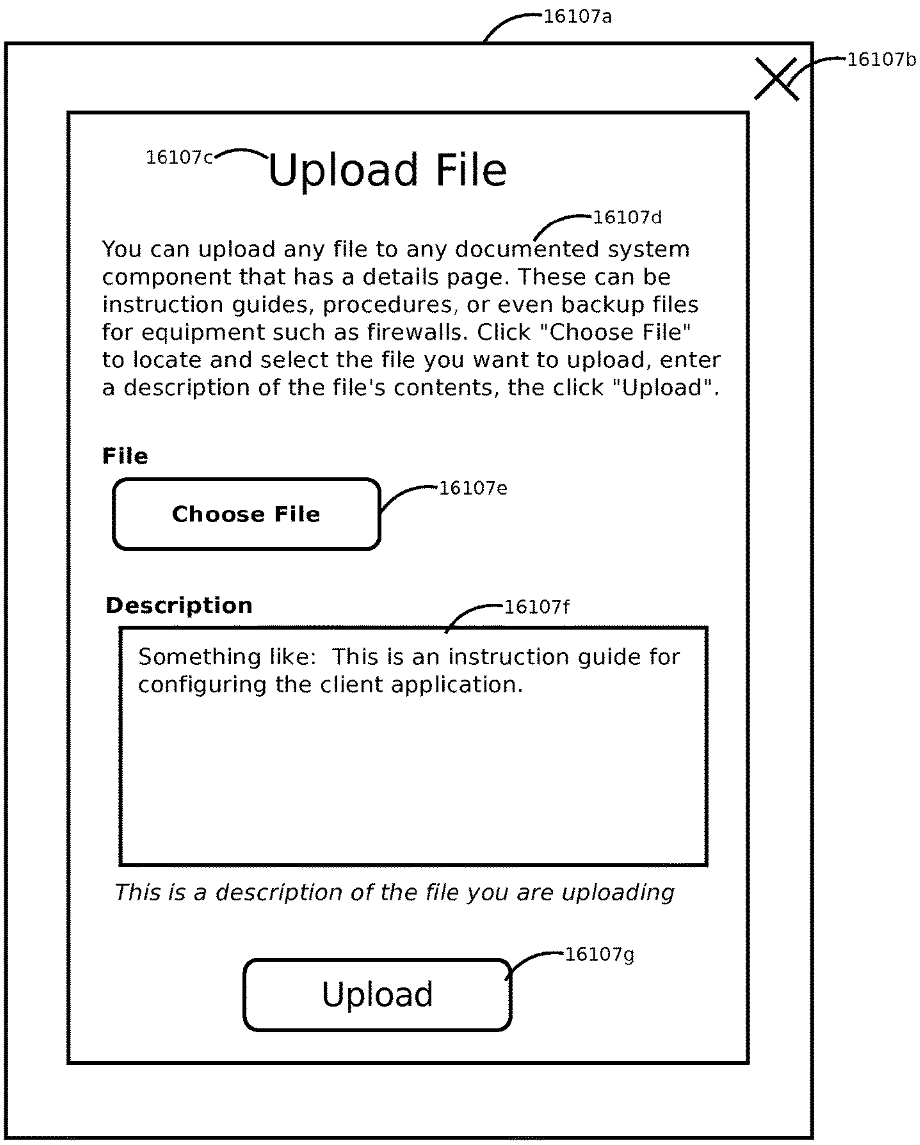
FIG. 16S is an illustrative example of an embodiment of a user interface for uploading a file that can help to document a component of a network that is used by a company.

FIG. 16S is an illustrative example of an embodiment of a user interface for uploading a file that can help to document a component of a network that is used by a company. The display in FIG. 16S may be the user interface that is displayed by selecting the Add File button 16106*c* as described with respect to FIG. 16R. The display in FIG. 16S may be displayed on top of an existing interface display 16107*a* that may be darkened or otherwise de-emphasized to indicate that the existing interface display is in the background. A close control 16107*b* may be provided to close the display of FIG. 16S and return to the previous display 16107*a*. A header 16107*c* can make the function of the user interface clear, and descriptive text 16107*d* can provide more detail about the function of the user interface. A Choose File button 16107*e* can be selected to invoke a local browse function to select a file for uploading. A Description area 16107*f* can be used to enter text to describe the contents of the file being uploaded. An Upload button 16107*g* can be used to start the upload of the selected file.

Figure 17A:
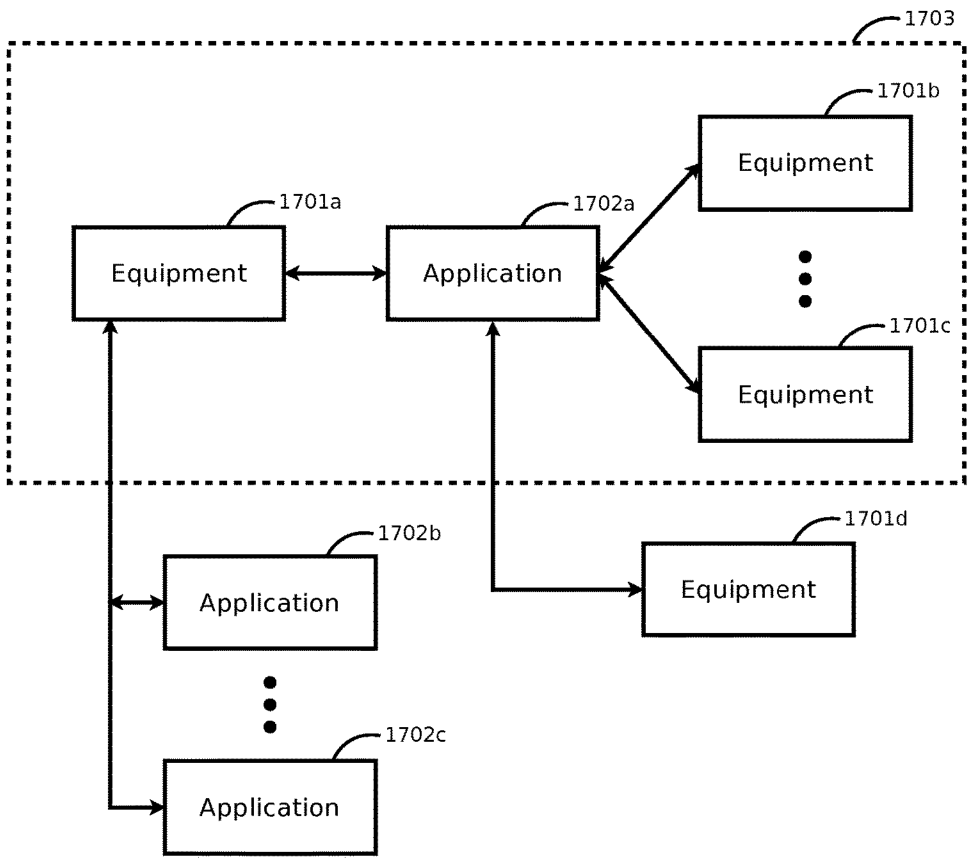
FIG. 17A is an illustrative block diagram of equipment and applications in a company, and documentation of the relationships between the equipment and applications.

FIG. 17A is an illustrative block diagram of equipment and applications in a company, and documentation of the relationships between the equipment and applications. The equipment 1701*a*-1701*d* can be the equipment 136 as described with respect to FIG. 1C. The applications 1702*a*-1702*c* can be the applications 135 as described with respect to FIG. 1C. A piece of equipment 1701*a* can be associated with several applications 1702*a*-1702*c*, which may indicate that the applications are running on the equipment 1701*a*. For example, the equipment 1701*a* may be a server that hosts the platform on which the applications 1701*a*-1701*c* run. An application 1702*a* may also be associated with additional equipment 1701*b*-1701*d*. For example, equipment 1701*b* may be a router that is used to route network traffic for the application 1702*a*, and equipment 1701*c* may be a server that is hosting a shared database that is used by the application 1702*a*. The association between the application 1702*a* and equipment 1701*a*-1701*c* may be one that is generally useful and can be stored in a template 1703. For example, the application 1702*a* may be an accounting application that is normally run on one server, uses another server for a database, and uses a router for network traffic. This association of the accounting application with the three application roles can be saved in a template 1703, and when the template 1703 is used to add documentation at a company, the application in the template 1703 can be assigned to the application 1702*a*, the host server in the template 1703 can be assigned to the server 1701*a*, the router in the template 1703 can be assigned to the router 1701*b*, and the database server in the template 1703 can be assigned to the database server 1701*c*. Associations that are not in the template may be added to the documentation. For example, if a server 1701*d* is used for backup of the accounting application 1702*a*, a custom application role of backup server can be added for the application 1702*a*, and the backup application role for the application 1702*a* can be assigned to the backup server 1701*d*.

Referring to FIG. 14B shows an illustrative example of an embodiment of a user interface for viewing applications that are associated with a device connected to a network. This display can correspond to a relationship such as the one from an application 1702*a* to a device 1701*a* as shown with respect to FIG. 17A. In the example embodiment shown with respect to FIG. 14B, the printer device represented by 1411 with respect to FIG. 14B can correspond to the device 1701*a* with respect to FIG. 17A, and the contact management application represented by row 1415*b* with respect to FIG. 14B can correspond to the application 1702*a* with respect to FIG. 17A.

Referring to FIG. 16K shows an illustrative example of an embodiment of a user interface for viewing and updating information about the roles, played by components of a network, for an application that is used by a company. This display can correspond to a relationship such as the one from a device 1701*a* to an application 1702*a* as shown with respect to FIG. 17A. In the example embodiment shown with respect to FIG. 16K, the email application represented by 1651*a* with respect to FIG. 16K can correspond to the application 1702*a* with respect to FIG. 17A, and the mailbox server device represented by row 1677*a* with respect to FIG. 16K can correspond to the device 1701*a* with respect to FIG. 17A.

Figure 17B:
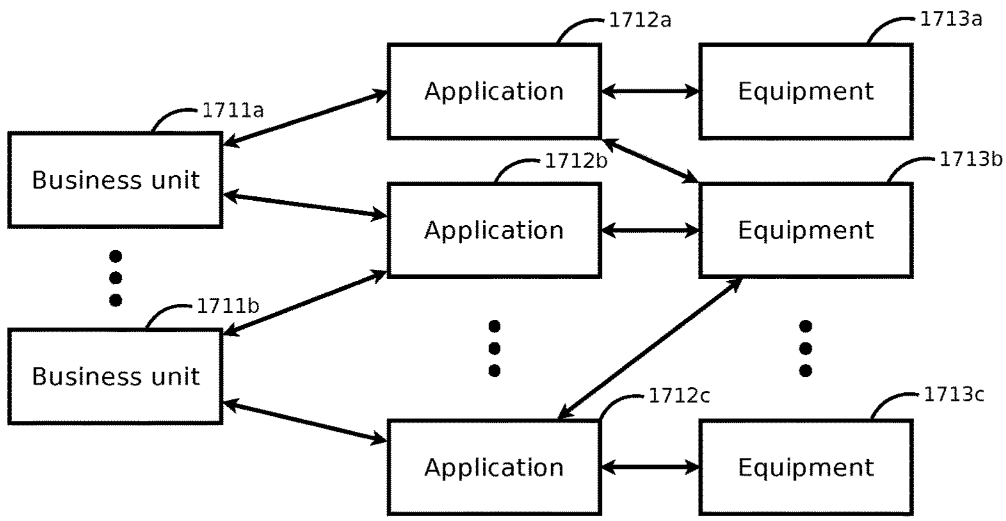
FIG. 17B is an illustrative block diagram of business units in a company, equipment and applications in the company, and documentation of the relationships between the business units, equipment, and applications.

FIG. 17B is an illustrative block diagram of business units in a company, equipment and applications in the company, and documentation of the relationships between the business units, equipment, and applications. The business units 1711*a*-1711*b* can be the business units 133 as described with respect to FIG. 1C. The applications 1712*a*-1712*c* can be the applications 135 as described with respect to FIG. 1C. The equipment 1713*a*-1713*c* can be the equipment 137 as described with respect to FIG. 1C. A business unit 1711*a* can be associated with several applications 1712*a*-1712*b*, which may indicate that people in the business unit 1711*a* use the applications 1712*a*-1712*b* for their work. Similarly, a business unit 1711*b* can be associated with several applications 1712*b*-1712*c*, which may indicate that people in the business unit 1711*b* use the applications 1712*b*-1712*c* for their work. An application 1712*a* can be associated with several pieces of equipment 1713*a*-1713*b*, which may indicate that the application 1712*a* uses the equipment 1713*a*-1713*b* in order to run. Similarly, an application 1712*b* can be associated with a piece of equipment 1713*b*, which may indicate that the application 1712*b* uses the equipment 1713*b* in order to run. Similarly, an application 1712*c* can be associated with several pieces of equipment 1713*b*-1713*c*, which may indicate that the application 1712*c* uses the equipment 1713*b*-1713*c* in order to run. These relationships can indicate an indirect relationship between business units and equipment. For example, in the example of FIG. 17B, the business unit 1711*a* can have a relationship with equipment 1713*a*-1713*b*, which may indicate that the people in the business unit 1711*a* use the equipment 1713*a*-1713*b* for their work. Similarly, the business unit 1711*b* can have a relationship with equipment 1713*b*-1713*c*, which may indicate that the people in the business unit 1711*b* use the equipment 1713*b*-1713*c* for their work. These indirect relationships may not be explicitly represented in the documentation, but the system may derive them from other relationships. In the example of FIG. 17B, business unit 1711*a* may represent the attorneys in a company. Application 1712*a* may represent an email application, and the documentation may indicate that the attorneys use the email application. Equipment 1713*a* may represent a server that runs the email application, and equipment 1713*b* may represent a firewall that the email server uses to access the internet. The documentation may indicate that the email application depends on the email server and the firewall. The system may then determine the implicit relationships that the attorneys depend on the email server, and that the attorneys depend on the firewall.

Figure 17C:
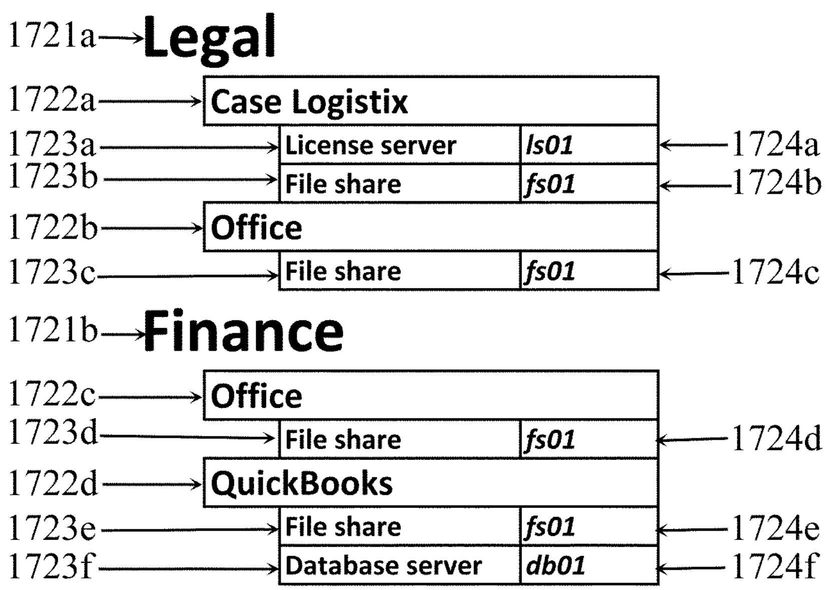
FIG. 17C is an illustrative example of an embodiment of a user interface for viewing the business units in a company, equipment and applications in the company, and documentation of the relationships between the business units, equipment, and applications.

FIG. 17C is an illustrative example of an embodiment of a user interface for viewing the business units in a company, equipment and applications in the company, and documentation of the relationships between the business units, equipment, and applications. The user interface can list business units 1721*a*-1721*b* in the company, applications 1722*a*-1722*d* in the company, application roles 1723*a*-1723*f* in the company, and equipment 1724*a*-1724*f* in the company. Business units 1721*a*-1721*b* can correspond to business units 133 with respect to FIG. 1C. Applications 1722*a*-1722*d* can correspond to applications 135 with respect to FIG. 1C. Application roles 1723*a*-1723*f* can correspond to roles 139 with respect to FIG. 1C. Equipment 1724*a*-1724*f* can correspond to equipment 137 with respect to FIG. 1C. The user interface shown in FIG. 17C can indicate the applications related to each business unit. For example, in the example of FIG. 17C, applications 1722*a*-1722*b* are related to business unit 1721*a*, and applications 1722*c*-1722*d* are related to business unit 1721*b*. The user interface shown in FIG. 17C can indicate the application roles related to each application. For example, in the example of FIG. 17C, application roles 1723*a*-1723*b* are related to application 1722*a*, application role 1723*c* is related to application 1722*b*, application role 1723*d* is related to application 1722*c*, and application roles 1723*e*-1723*f* are related to application 1722*d*. The user interface shown in FIG. 17C can indicate the equipment hosting the application roles. For example, in the example of FIG. 17C, equipment 1724*a* hosts application role 1724*a*, equipment 1724*b* hosts application role 1724*b*, equipment 1724*c* hosts application role

1724*c*, equipment 1724*d* hosts application role 1724*d*, equipment 1724*e* hosts application role 1724*e*, and equipment 1724*f* hosts application role 1724*f*.

Referring to FIG. 17B shows an illustrative block diagram of business units in a company, equipment and applications in the company, and documentation of the relationships between the business units, equipment, and applications. This display can correspond to the user interface shown in FIG. 17C. For example, the business unit 1721*a* may represent the business unit 1711*a* with respect to FIG. 17B and the business unit 1721*b* may represent the business unit 1711*b* with respect to FIG. 17B. For example, the application 1722*a* may represent the application 1712*a* with respect to FIG. 17B, the applications 1722*b* and 1722*c* may represent the application 1712*b* with respect to FIG. 17B, and the application 1722*d* may represent the application 1712*c* with respect to FIG. 17B. For example, the equipment 1724*a* may represent the equipment 1713*a* with respect to FIG. 17B, the equipment 1724*b*-1724*e* may represent the equipment 1713*b* with respect to FIG. 17B, and the equipment 1724*f* may represent the equipment 1713*c* with respect to FIG. 17B.

Figure 18A:
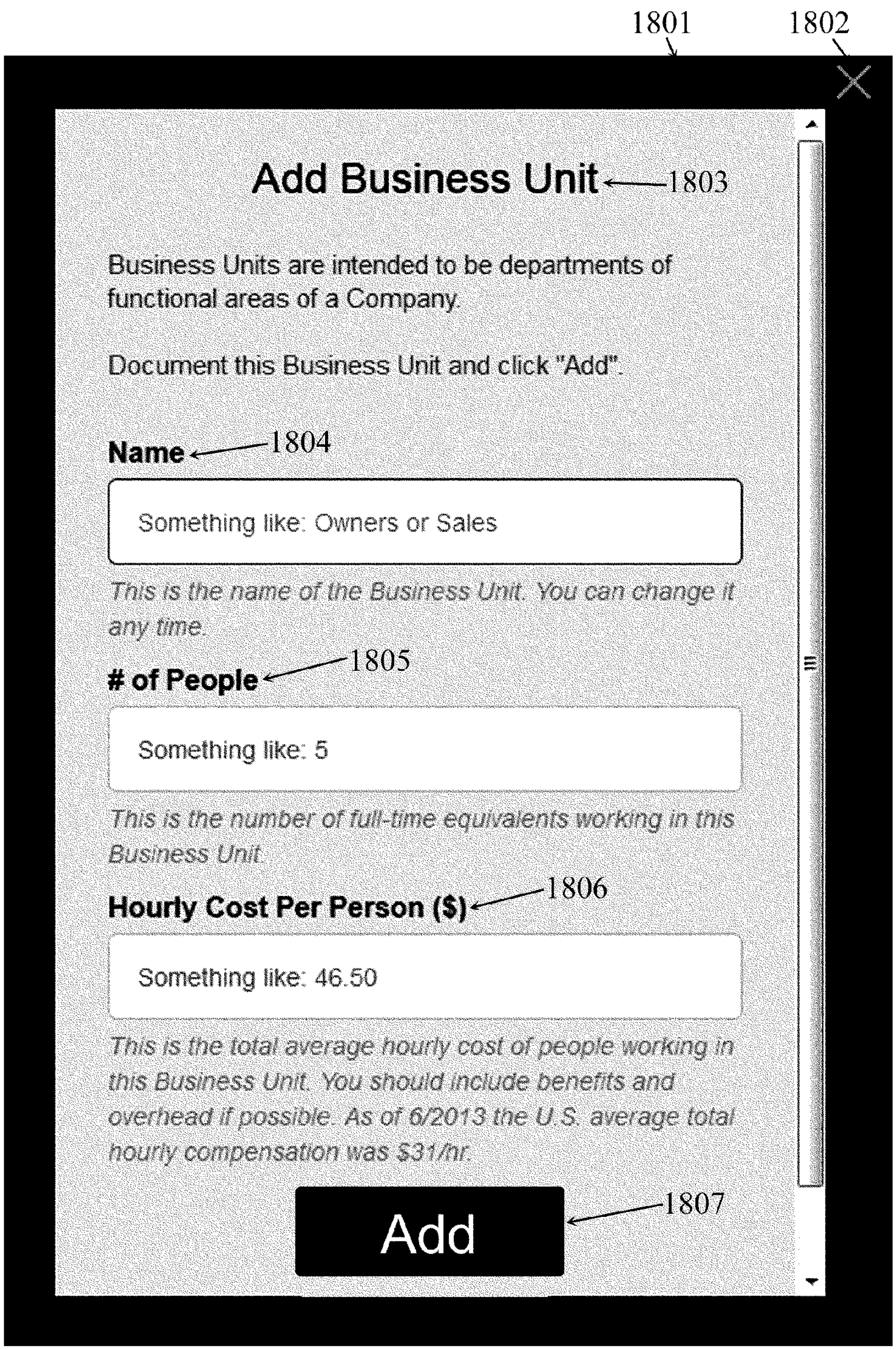
FIG. 18A is an illustrative example of an embodiment of a user interface for facilitating guiding an end user to add a business unit to the documentation for a company.
Figure 18B:
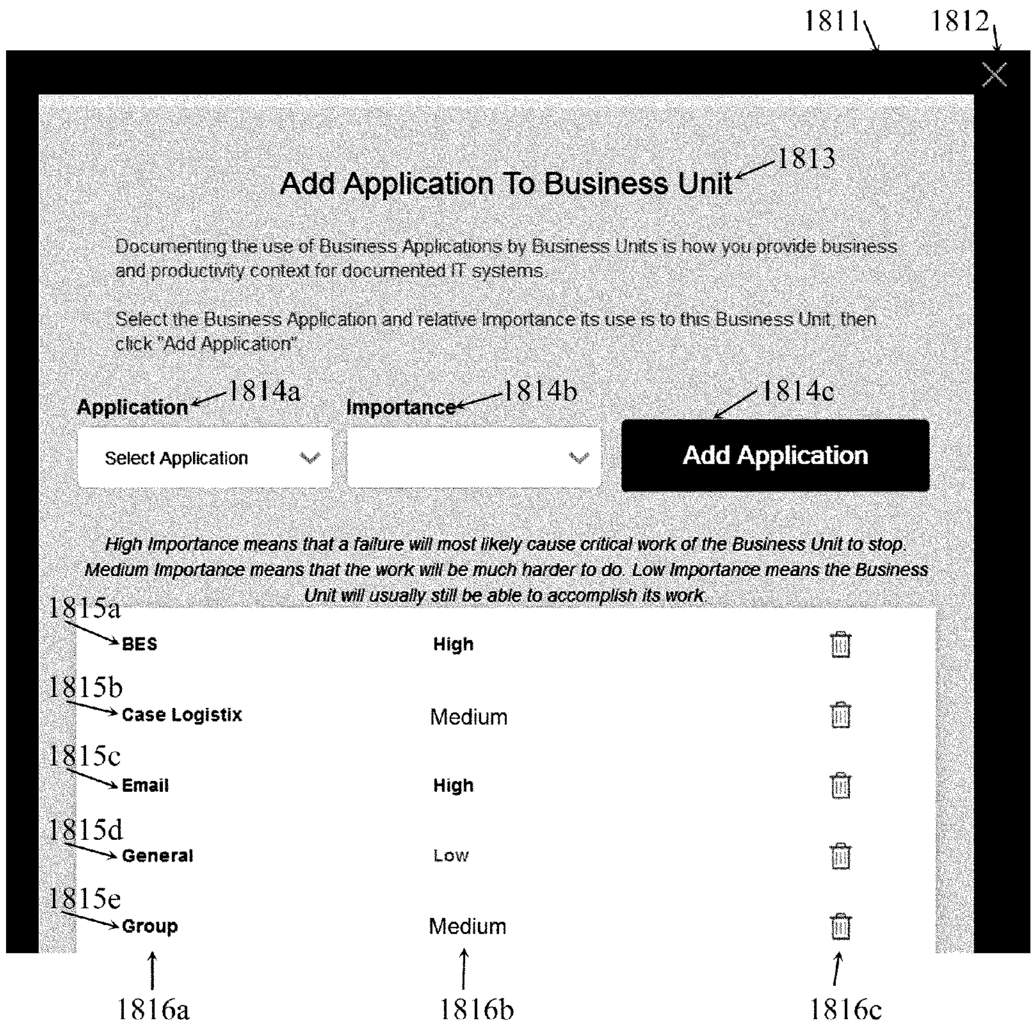
FIG. 18B is an illustrative example of an embodiment of a user interface for facilitating guiding an end user to associate a business unit of a company with an application that is used by the company.

The present disclosure can facilitate the entry of documentation by guiding an end user to enter documentation by providing structured entry of information. In this way, the end user can be made aware of the documentation that is used. FIGS. 18A-18B are illustrative examples of embodiments of user interfaces that can guide an end user to enter documentation about business units. FIGS. 19A-19J are illustrative examples of embodiments of user interfaces that can guide an end user to enter documentation about devices. FIGS. 20A-20G are illustrative examples of embodiments of user interfaces that can guide an end user to enter documentation about applications using templates. FIGS. 21A-21B are illustrative examples of embodiments of user interfaces that can guide an end user to enter documentation about custom applications without using templates.

FIG. 18A is an illustrative example of an embodiment of a user interface for facilitating guiding an end user to add a business unit to the documentation for a company. The display in FIG. 18A may be displayed on top of an existing interface display 1801 that may be darkened or otherwise de-emphasized to indicate that the existing interface display is in the background. A close control 1802 may be provided to close the display of FIG. 18A and return to the previous display 1801. A header 1803 can make the function of the user interface clear. The user interface can guide an end user in entering the name 1804 of the new business unit, the number of people 1805 in the new business unit, and the average hourly cost per person 1806 in the new business unit. The Add button 1807 can be selected to add the new business unit.

FIG. 18B is an illustrative example of an embodiment of a user interface for facilitating guiding an end user to associate a business unit of a company with an application that is used by the company. The display in FIG. 18B may be displayed on top of an existing interface display 1811 that may be darkened or otherwise de-emphasized to indicate that the existing interface display is in the background. A close control 1812 may be provided to close the display of FIG. 18B and return to the previous display 1811. A header 1813 can make the function of the user interface clear. The user interface can guide an end user in selecting the application 1814*a* and the importance 1814*b* of the application to the business unit. The Add Application button 1814*c* can be selected to associate the application with the business unit. To facilitate the end user with the selection 1814*a* of the application, the user interface can show the applications already associated with the business unit in tabular form, with rows 1815*a*-1815*e* and columns 1816*a*-1816*c*. Each row 1815*a*-1815*e* can represent an application associated with the business unit. Column 1816*a* can display the name of the application. Column 1816*b* can display the importance of the application to the business unit. Column 1816*c* can display an icon that can be selected in order to remove the association of the application with the business unit.

Figure 19A:
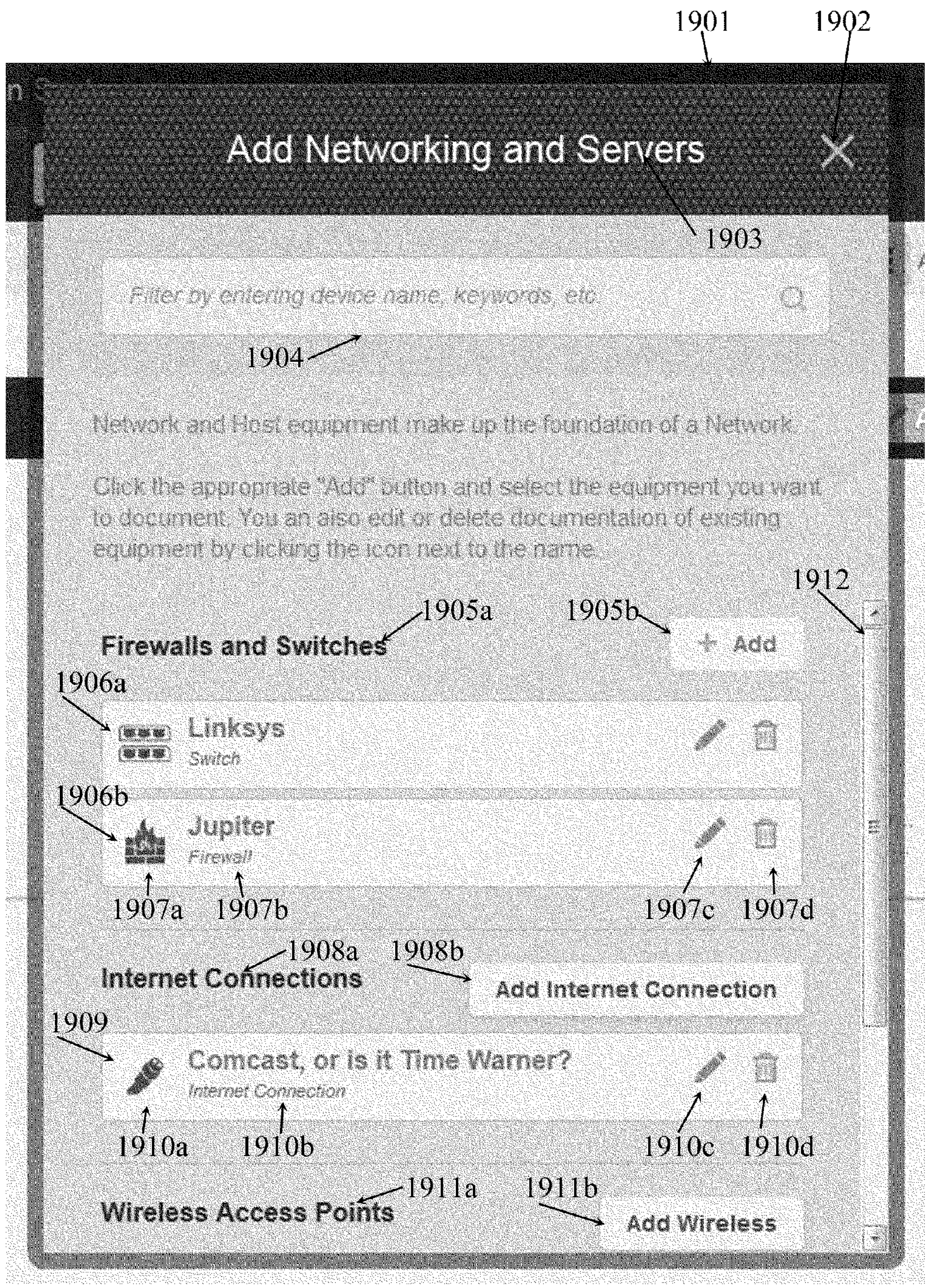
FIG. 19A is an illustrative example of an embodiment of a user interface for facilitating guiding an end user to add networking equipment to the documentation for a company.
Figure 19B:
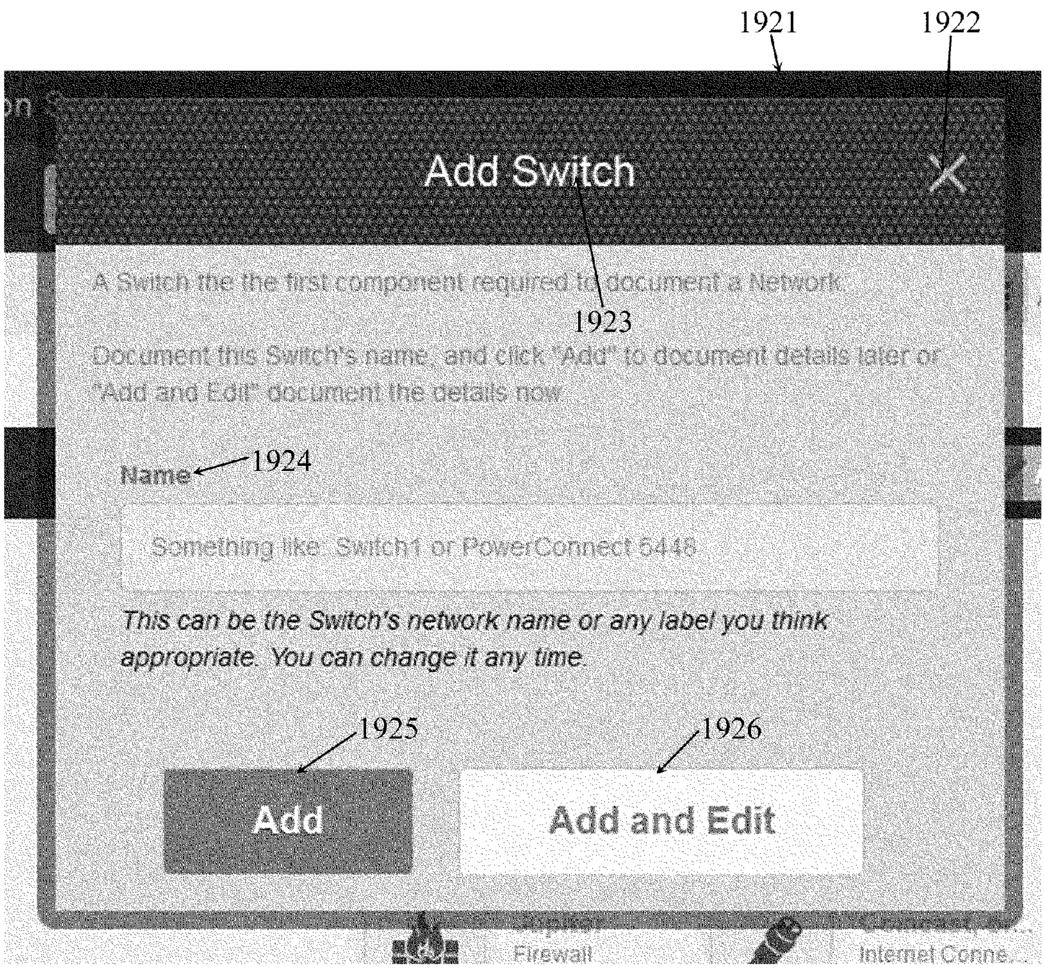
FIG. 19B is an illustrative example of an embodiment of a user interface for facilitating guiding an end user to add a switch to the documentation for a company.

FIG. 19A is an illustrative example of an embodiment of a user interface for facilitating guiding an end user to add networking equipment to the documentation for a company. The display in FIG. 19A may be displayed on top of an existing interface display 1901 that may be darkened or otherwise de-emphasized to indicate that the existing interface display is in the background. A close control 1902 may be provided to close the display of FIG. 19A and return to the previous display 1901. A header 1903 can make the function of the user interface clear. The user interface can guide an end user in finding existing templates for networking equipment using a search function 1904. The user interface can also display the network equipment that is already documented, such as the firewalls and switches 1905*a*, the internet connections 1908*a*, the wireless access points 1911*a*, and additional equipment that can be viewed using the scroll bar 1912. The firewalls and switches 1905*a* can be displayed in tabular form with rows 1906*a*-1906*b* and columns 1907*a*-1907*d*. Each row 1906*a*-1906*b* can represent a firewall or switch. Column 1907*a* can display a visual icon representing the type of the firewall or switch in each row. Column 1907*b* can display the manufacturer and type of the firewall or switch in each row. Column 1907*c* can display a visual icon that can be selected to view and edit detailed information about the firewall or switch in each row. Column 1907*d* can display a visual icon that can be selected to remove the documentation about the firewall or switch in each row. The Add button 1905*b* can be selected to display a user interface to add a new firewall or switch to the documentation. The internet connections 1908*a* can be displayed in tabular form with row 1909 and columns 1910*a*-1910*d*. Each row 1909 can represent an internet connection. Column 1910*a* can display a visual icon representing the type of the internet connection in each row. Column 1910*b* can display the provider and type of the internet connection in each row. Column 1910*c* can display a visual icon that can be selected to view and edit detailed information about the internet connection in each row. Column 1910*d* can display a visual icon that can be selected to remove the documentation about the internet connection in each row. The Add Internet Connection button 1908*b* can be selected to display a user interface to add a new internet connection to the documentation. The wireless access points 1911*a* can be displayed in a tabular form that can be made visible using the scroll bar 1912. The Add Wireless button 1911*b* can be selected to display a user interface to add a new wireless access point to the documentation FIG. 19B is an illustrative example of an embodiment of a user interface for facilitating guiding an end user to add a switch to the documentation for a company. The display in FIG. 19B may be the user interface that is displayed by selecting the Add button 1905*b* as described with respect to FIG. 19A. The display in FIG. 19B may be displayed on top of an existing interface display 1921 that may be darkened or otherwise de-emphasized to indicate that the existing interface display is in the background. A close control 1922 may be provided to close the display of FIG. 19B and return to the previous display 1921. A header 1923 can make the function of the user interface clear. The user interface can guide an end user in adding a new switch to the documentation by entering the name 1924 of the switch and selecting the Add button 1925 to add the switch, or by selecting the Add and Edit button 1926 to add the switch and open a user interface to view and edit the details of the documentation on the new switch.

Figure 19C:
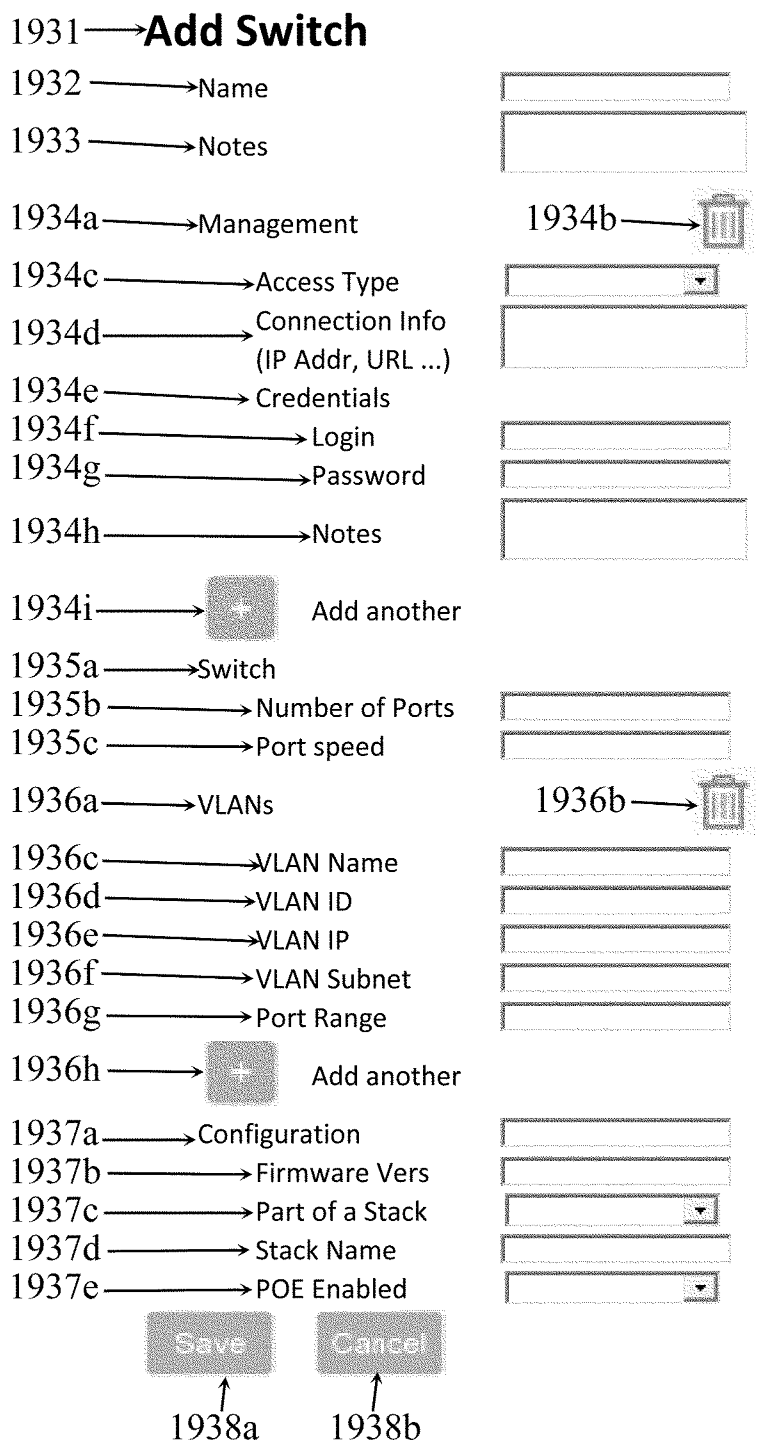
FIG. 19C is an illustrative example of an embodiment of a user interface for facilitating guiding an end user to add detailed information to the documentation for a switch.

FIG. 19C is an illustrative example of an embodiment of a user interface for facilitating guiding an end user to add detailed information to the documentation for a switch. The display in FIG. 19C may be the user interface that is displayed by selecting the Add and Edit button 1926 described with respect to FIG. 19B. The user interface can be identified by a header 1931. The user interface can guide an end user in adding detailed information for a new switch by prompting for the name 1932 of the switch and notes 1933 specific to the switch. A management section 1934*a* can guide an end user by prompting for the type of access 1934*c* for managing the switch, the address 1934*d* for managing the switch, and the credentials 1934*e* for accessing the management interface for the switch. The credentials 1934*e* can include a username 1934*f*, a password 1934*g*, and notes 1934*h* specific to the credentials 1934*e*. An additional set of management information 1934*a* can be added by selecting the Add Another button 1934*i*, and an existing set of management information 1934*a* can be removed by selecting a visual icon 1934*b*. A switch section 1935*a* can guide an end user by prompting for the number of ports 1935*b* and the port speed 1935*c* for the switch. A virtual local area networks (VLANs) section 1936*a* can guide an end user by prompting for the name 1936*c* of the VLAN, the identification (ID) 1936*d* of the VLAN, the internet protocol (IP) address 1936*e* of the VLAN, the subnet mask 1936*f* of the VLAN, and the port range 1936*g* used for the VLAN. An additional set of VLAN information 1936*a* can be added by selecting the Add Another button 1936*h*, and an existing set of VLAN information 1936*a* can be removed by selecting a visual icon 1936*b*. A configuration section 1937*a* can guide an end user by prompting for the firmware version 1937*b* of the switch, whether or not the switch is part of a stack 1937*c*, the name 1937*d* of the stack if the switch is part of a stack, and whether or not power over Ethernet (POE) is enabled 1937*e* for the switch. The Save button 1938*a* can be selected to update the documentation with the information entered in the user interface, and then return to the previous display. The Cancel button 1938*b* can be selected to discard the information entered in the user interface, and then return to the previous display.

Figure 19D:
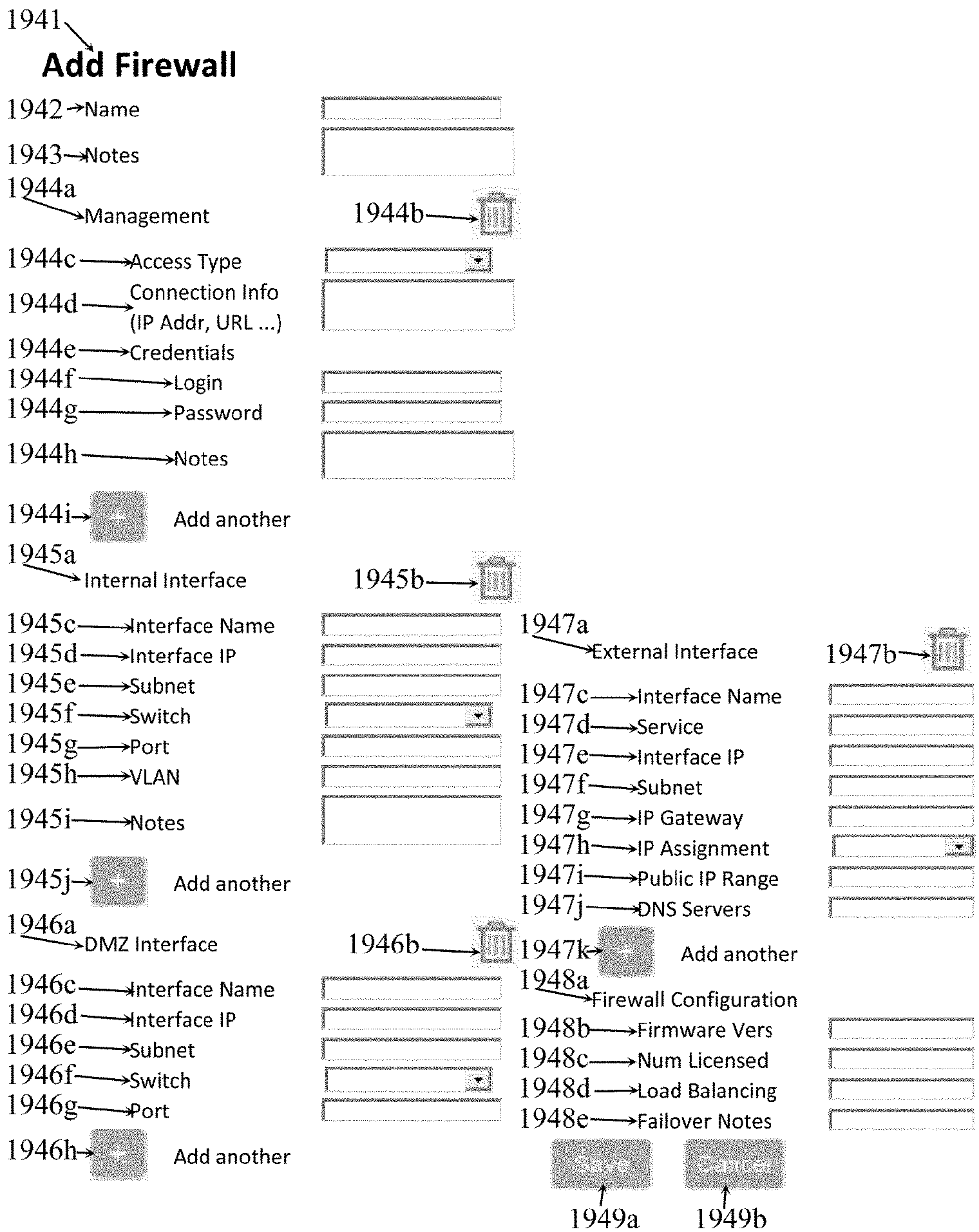
FIG. 19D is an illustrative example of an embodiment of a user interface for facilitating guiding an end user to add detailed information to the documentation for a firewall.

FIG. 19D is an illustrative example of an embodiment of a user interface for facilitating guiding an end user to add detailed information to the documentation for a firewall. The display in FIG. 19D may be the user interface that is displayed by selecting the Add and Edit button 1926 described with respect to FIG. 19B. The user interface can be identified by a header 1941. The user interface can guide an end user in adding detailed information for a new firewall by prompting for the name 1942 of the firewall and notes 1943 specific to the firewall. A management section 1944*a* can guide an end user by prompting for the type of access 1944*c* for managing the switch, the address 1944*d* for managing the switch, and the credentials 1944*e* for accessing the management interface for the switch. The credentials 1944*e* can include a username 1944*f*, a password 1944*g*, and notes 1944*h* specific to the credentials 1944*e*. An additional set of management information 1944*a* can be added by selecting the Add Another button 1944*i*, and an existing set of management information 1944*a* can be removed by selecting a visual icon 1944*b*. An internal interface section 1945*a* can guide an end user by prompting for the name 1945*c* of the internal interface, the IP address 1945*d* of the internal interface, the subnet 1945*e* of the internal interface, the switch 1945*f* that is connected to the internal interface, the physical port 1945*g* on the switch 1945*f* that is connected to the internal interface, the VLAN 1945*h* that is connected to the internal interface, and notes 1945*i* specific to the internal interface. An additional internal interface 1945*a* can be added by selecting the Add Another button 1945*j*, and an existing internal interface 1945*a* can be removed by selecting a visual icon 1945*b*. An de-militarized zone (DMZ) interface section 1946*a* can guide an end user by prompting for the name 1946*c* of the DMZ interface, the IP address 1946*d* of the DMZ interface, the subnet 1946*e* of the DMZ interface, the switch 1946*f* that is connected to the DMZ interface, and the physical port 1946*g* on the switch 1946*f* that is connected to the DMZ interface. An additional DMZ interface 1946*a* can be added by selecting the Add Another button 1946*h*, and an existing DMZ interface 1946*a* can be removed by selecting a visual icon 1946*b*. An external interface section 1947*a* can guide an end user by prompting for the name 1947*c* of the external interface, the service 1947*d* that provides the external interface, the IP address 1947*e* of the external interface, the subnet 1947*f* of the external interface, the IP gateway address 1947*g* for the external interface, the IP assignment method 1947*h* for the external interface, the public IP address range 1947*i* for the external interface, and the addresses 1947*j* of the domain name service (DNS) servers used for the external interface. An additional external interface 1947*a* can be added by selecting the Add Another button 1947*k*, and an existing external interface 1947*a* can be removed by selecting a visual icon 1947*b*. A configuration section 1948*a* can guide an end user by prompting for the firmware version 1948*b* of the firewall, the number of licensed users 1948*c* for the firewall, the load balancing 1948*d* used for the firewall, and notes 1948*e* specific to the failover properties of the firewall. The Save button 1949*a* can be selected to update the documentation with the information entered in the user interface, and then return to the previous display. The Cancel button 1949*b* can be selected to discard the information entered in the user interface, and then return to the previous display.

Figure 19E:
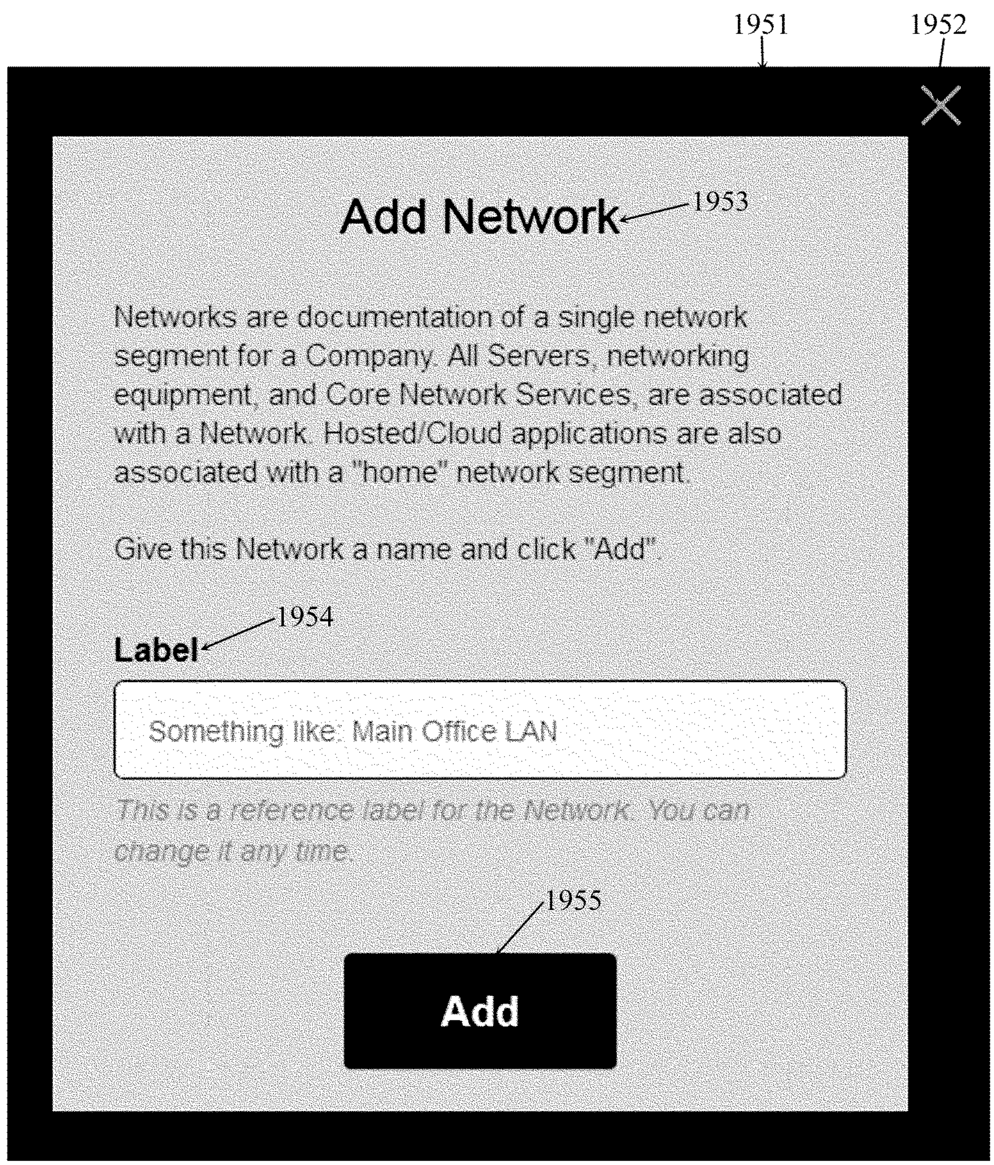
FIG. 19E is an illustrative example of an embodiment of a user interface for facilitating guiding an end user to add a network segment (subnet or separate physical network) to the documentation for a company.

FIG. 19E is an illustrative example of an embodiment of a user interface for facilitating guiding an end user to add a network segment (subnet or separate physical network) to the documentation for a company. The display in FIG. 19E may be the user interface that is displayed by selecting the Add button 603 as described with respect to FIG. 6A. The display in FIG. 19E may be displayed on top of an existing interface display 1951 that may be darkened or otherwise de-emphasized to indicate that the existing interface display is in the background. A close control 1952 may be provided to close the display of FIG. 19E and return to the previous display 1951. A header 1953 can make the function of the user interface clear. The user interface can guide an end user in adding a new network segment by prompting for a reference label 1954 for the network segment. Selecting the Add button 1955 can add the new network segment to the documentation.

Figure 19F:
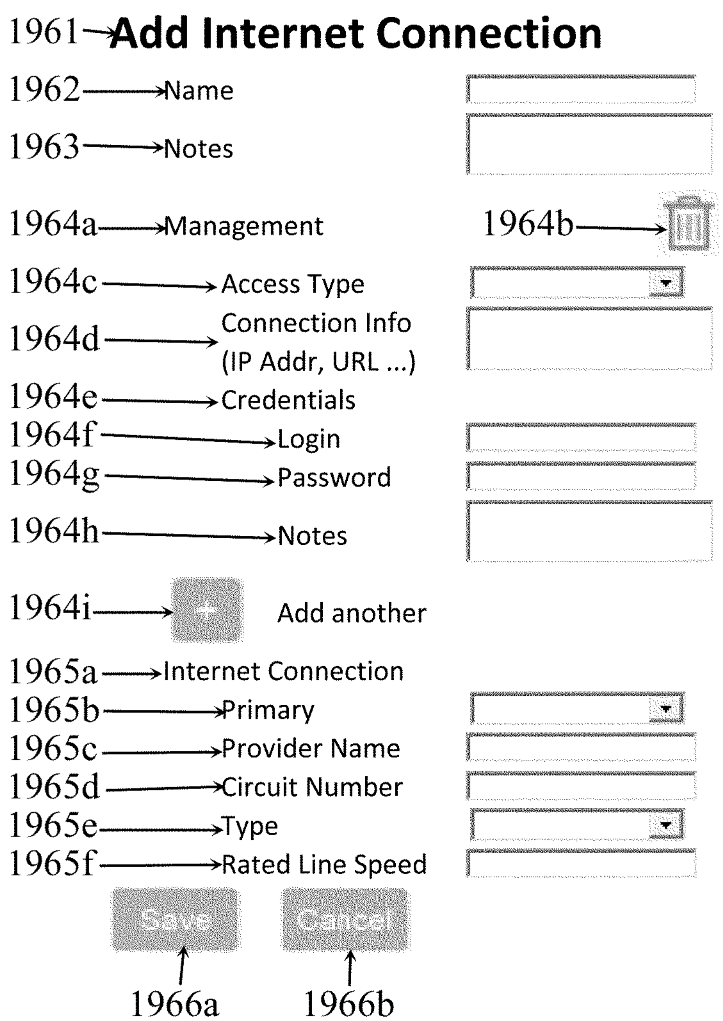
FIG. 19F is an illustrative example of an embodiment of a user interface for facilitating guiding an end user to add detailed information to the documentation for an internet connection.

FIG. 19F is an illustrative example of an embodiment of a user interface for facilitating guiding an end user to add detailed information to the documentation for an internet connection. The display in FIG. 19F may be the user interface that is displayed by selecting the Add Internet Connection button 1908*b* described with respect to FIG.

19A. The user interface can be identified by a header 1961. The user interface can guide an end user in adding detailed information for a new internet connection by prompting for the name 1962 of the internet connection and notes 1963 specific to the internet connection. A management section 1964*a* can guide an end user by prompting for the type of access 1964*c* for managing the internet connection, the address 1964*d* for managing the internet connection, and the credentials 1964*e* for accessing the management interface for the internet connection. The credentials 1964*e* can include a username 1964*f*, a password 1964*g*, and notes 1964*h* specific to the credentials 1964*e*. An additional set of management information 1964*a* can be added by selecting the Add Another button 1964*i*, and an existing set of management information 1964*a* can be removed by selecting a visual icon 1964*b*. An internet connection section 1965*a* can guide an end user by prompting for whether or not the connection is the primary internet connection for the company 1965*b*, the provider name 1965*c*, the circuit number 1965*d*, the connection type 1965*e*, and the rated line speed 1965*f* for the internet connection. The Save button 1966*a* can be selected to update the documentation with the information entered in the user interface, and then return to the previous display. The Cancel button 1966*b* can be selected to discard the information entered in the user interface, and then return to the previous display.

Figure 19G:
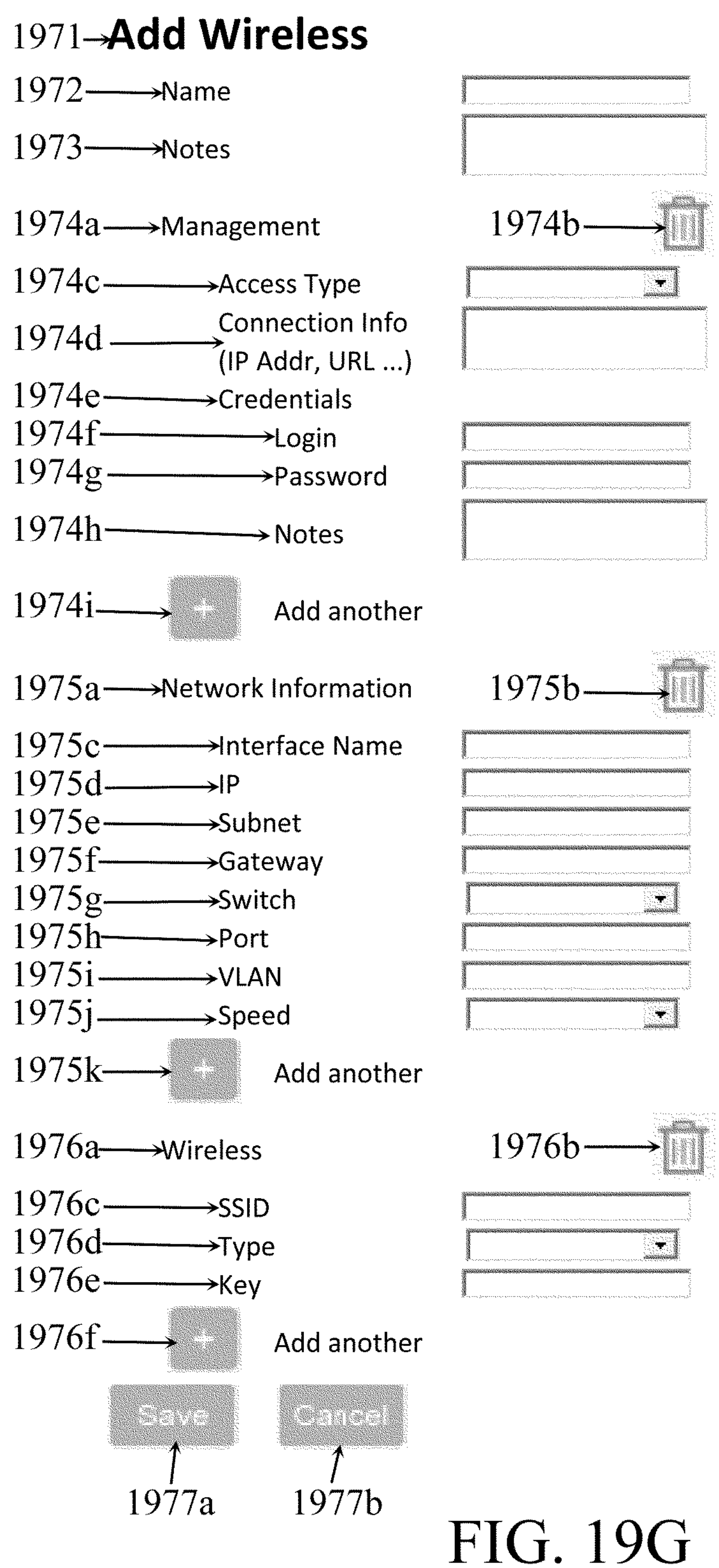
FIG. 19G is an illustrative example of an embodiment of a user interface for facilitating guiding an end user to add detailed information to the documentation for a wireless access point.

FIG. 19G is an illustrative example of an embodiment of a user interface for facilitating guiding an end user to add detailed information to the documentation for a wireless access point. The display in FIG. 19G may be the user interface that is displayed by selecting the Add Wireless Connection button 1911*b* described with respect to FIG. 19A. The user interface can be identified by a header 1971. The user interface can guide an end user in adding detailed information for a new wireless access point by prompting for the name 1972 of the wireless access point and notes 1973 specific to the wireless access point. A management section 1974*a* can guide an end user by prompting for the type of access 1974*c* for managing the wireless access point, the address 1974*d* for managing the wireless access point, and the credentials 1974*e* for accessing the management interface for the wireless access point. The credentials 1974*e* can include a username 1974*f*, a password 1974*g*, and notes 1974*h* specific to the credentials 1974*e*. An additional set of management information 1974*a* can be added by selecting the Add Another button 1974*i*, and an existing set of management information 1974*a* can be removed by selecting a visual icon 1974*b*. A network information section 1975*a* can guide an end user by prompting for the interface name 1975*c*, the IP address 1975*d*, the subnet mask 1975*e*, the gateway address 1975*f*, the connected switch 1975*g*, the physical port 1975*h* on the connected switch 1975*g*, the connected VLAN 1975*i*, and the network speed 1975*j* for a wired network connected to the wireless access point. An additional wired network connection 1975*a* can be added by selecting the Add Another button 1975*k*, and an existing wired network connection 1975*a* can be removed by selecting a visual icon 1975*b*. A wireless section 1976*a* can guide an end user by prompting for the service set identifier (SSID) 1976*c*, the security type 1976*d*, and the security key 1976*e* for the wireless network connection 1976*a*. An additional wireless network connection 1976*a* can be added by selecting the Add Another button 1976*f*, and an existing wireless network connection 1976*a* can be removed by selecting a visual icon 1976*b*. The Save button 1977*a* can be selected to update the documentation with the information entered in the user interface, and then return to the previous display. The Cancel button 1977*b* can be selected to discard the information entered in the user interface, and then return to the previous display.

Figure 19H:
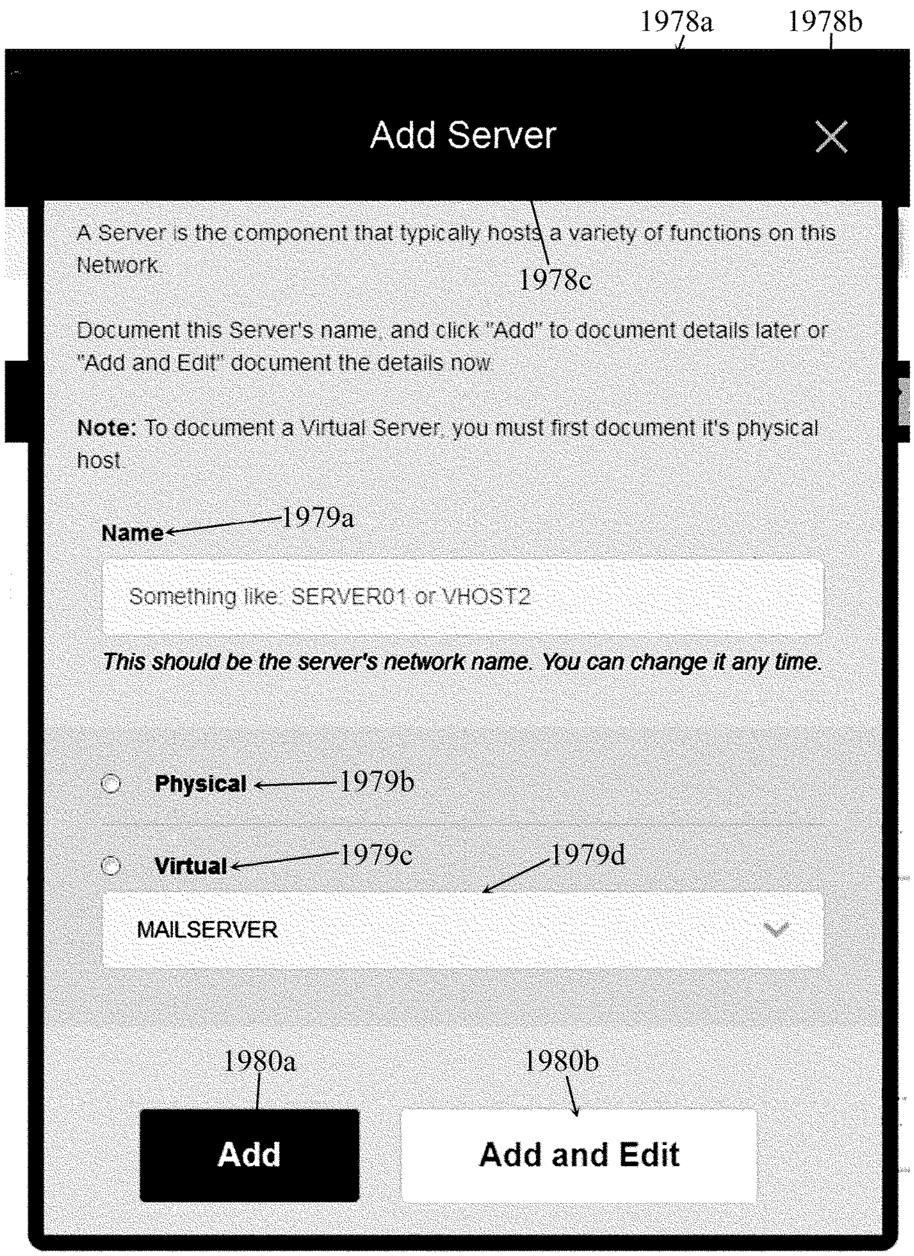
FIG. 19H is an illustrative example of an embodiment of a user interface for facilitating guiding an end user to add a server (virtual or physical) to the documentation for a company.

FIG. 19H is an illustrative example of an embodiment of a user interface for facilitating guiding an end user to add a server (virtual or physical) to the documentation for a company. The display in FIG. 19H may be the user interface that is displayed by selecting a button to add a new server as described, but not illustrated, with respect to FIG. 19A. The display in FIG. 19H may be displayed on top of an existing interface display 1978*a* that may be darkened or otherwise de-emphasized to indicate that the existing interface display is in the background. A close control 1978*b* may be provided to close the display of FIG. 19H and return to the previous display 1978*a*. A header 1978*c* can make the function of the user interface clear. The user interface can guide an end user in adding a new server by prompting for the name 1979*a* of the server, an indication of whether the server is physical 1979*b* or virtual 1979*c*, and if the server is virtual, the physical server 1979*d* that hosts the virtual server. The Add button 1980*a* can be selected to add the new server and return to the previous display 1978*a*. The Add and Edit button 1980*b* can be selected to add the new server and open a user interface to view and edit the detailed information about the new server that was added.

Figure 19I:
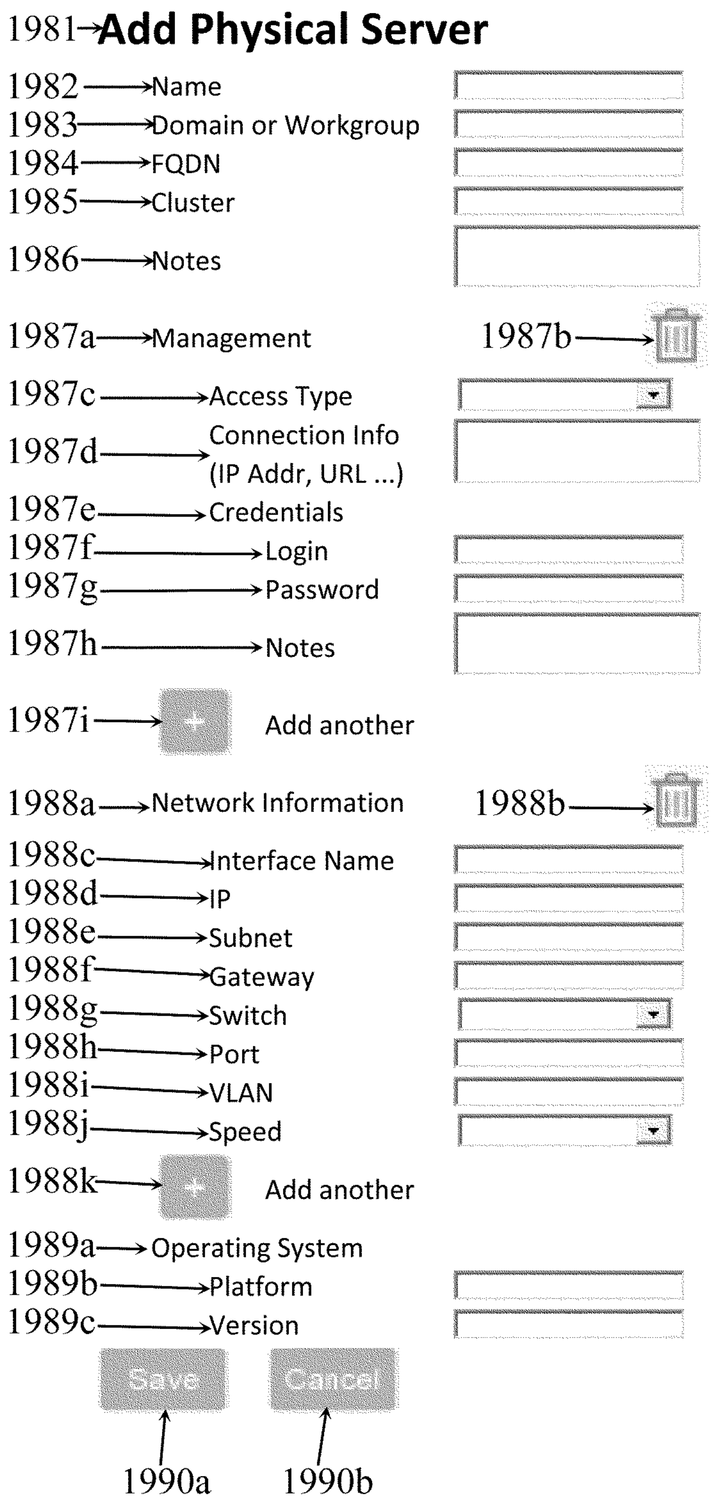
FIG. 19I is an illustrative example of an embodiment of a user interface for facilitating guiding an end user to add detailed information to the documentation for a physical server.

FIG. 19I is an illustrative example of an embodiment of a user interface for facilitating guiding an end user to add detailed information to the documentation for a physical server. The display in FIG. 19I may be the user interface that is displayed by selecting the Add and Edit button 1980*b* when the physical option 1979*b* is selected, as described with respect to FIG. 19H. The user interface can be identified by a header 1981. The user interface can guide an end user in adding detailed information for a new physical server by prompting for the name 1982, the domain or workgroup 1983, the fully qualified domain name (FQDN) 1984, and the cluster name 1985 of the physical server, and notes 1986 specific to the physical server. A management section 1987*a* can guide an end user by prompting for the type of access 1987*c* for managing the physical server, the address 1987*d* for managing the physical server, and the credentials 1987*e* for accessing the management interface for the physical server. The credentials 1987*e* can include a username 1987*f*, a password 1987*g*, and notes 1987*h* specific to the credentials 1987*e*. An additional set of management information 1987*a* can be added by selecting the Add Another button 1987*i*, and an existing set of management information 1987*a* can be removed by selecting a visual icon 1987*b*. A network information section 1988*a* can guide an end user by prompting for the interface name 1988*c*, the IP address 1988*d*, the subnet mask 1988*e*, the gateway address 1988*f*, the connected switch 1988*g*, the physical port 1988*h* on the connected switch 1988*g*, the connected VLAN 1988*i*, and the network speed 1988*j* for a network connected to the physical server. An additional network connection 1988*a* can be added by selecting the Add Another button 1988*k*, and an existing network connection 1988*a* can be removed by selecting a visual icon 1988*b*. An operating system section 1989*a* can guide an end user by prompting for the platform 1989*b* and version 1989*c* of the operating system running on the physical server. The Save button 1990*a* can be selected to update the documentation with the information entered in the user interface, and then return to the previous display. The Cancel button 1990*b* can be selected to discard the information entered in the user interface, and then return to the previous display.

Figure 19J:
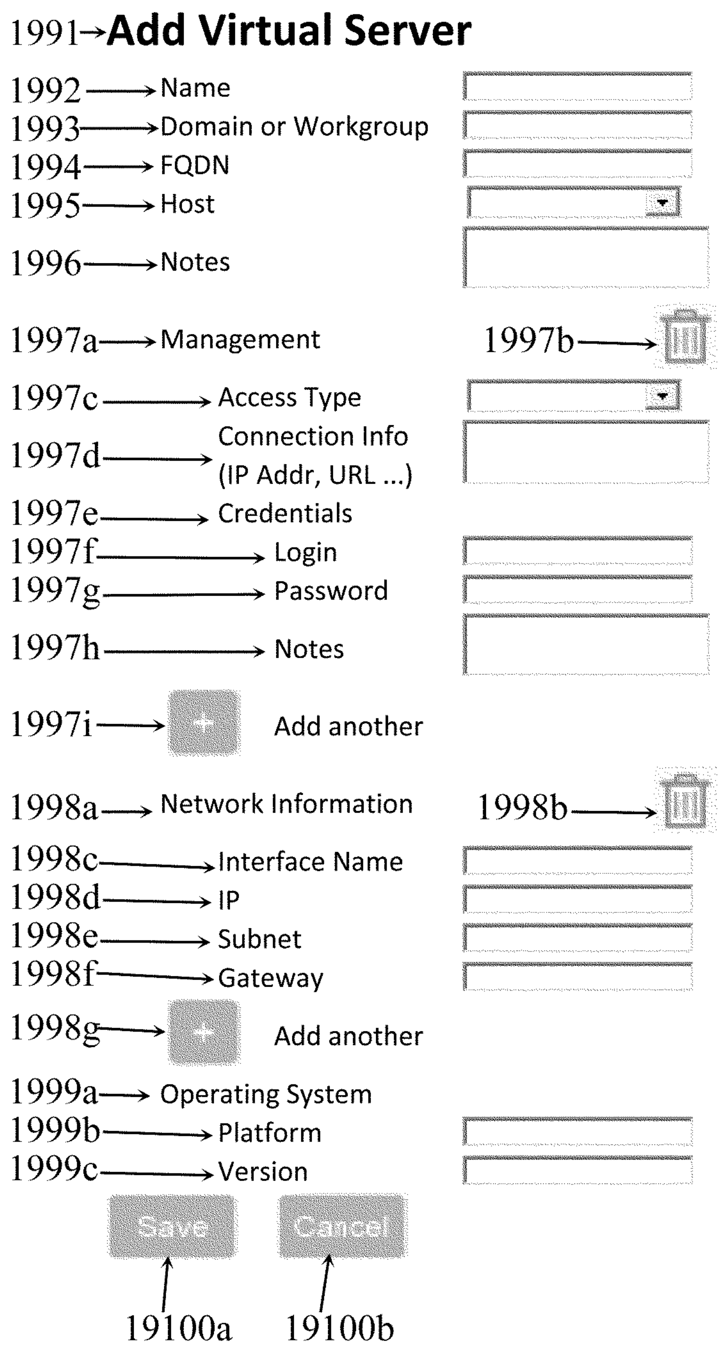
FIG. 19J is an illustrative example of an embodiment of a user interface for facilitating guiding an end user to add detailed information to the documentation for a virtual server.

FIG. 19J is an illustrative example of an embodiment of a user interface for facilitating guiding an end user to add detailed information to the documentation for a virtual server. The display in FIG. 19J may be the user interface that is displayed by selecting the Add and Edit button 1980*b* when the virtual option 1979*c* is selected, as described with respect to FIG. 19H. The user interface can be identified by a header 1991. The user interface can guide an end user in adding detailed information for a new virtual server by prompting for the name 1992, the domain or workgroup 1993, the fully qualified domain name (FQDN) 1994 of the virtual server, the name of the host server 1995 that is hosting the virtual server, and notes 1996 specific to the virtual server. A management section 1997*a* can guide an end user by prompting for the type of access 1997*c* for managing the virtual server, the address 1997*d* for managing the virtual server, and the credentials 1997*e* for accessing the management interface for the virtual server. The credentials 1997*e* can include a username 1997*f*, a password 1997*g*, and notes 1997*h* specific to the credentials 1997*e*. An additional set of management information 1997*a* can be added by selecting the Add Another button 1997*i*, and an existing set of management information 1997*a* can be removed by selecting a visual icon 1997*b*. A network information section 1998*a* can guide an end user by prompting for the interface name 1998*c*, the IP address 1998*d*, the subnet mask 1998*e*, and the gateway address 1998*f* for a network connected to the virtual server. An additional network connection 1998*a* can be added by selecting the Add Another button 1998*g*, and an existing network connection 1998*a* can be removed by selecting a visual icon 1998*b*. An operating system section 1999*a* can guide an end user by prompting for the platform 1999*b* and version 1999*c* of the operating system running on the virtual server. The Save button 19100*a* can be selected to update the documentation with the information entered in the user interface, and then return to the previous display. The Cancel button 19100*b* can be selected to discard the information entered in the user interface, and then return to the previous display.

Figure 20A:
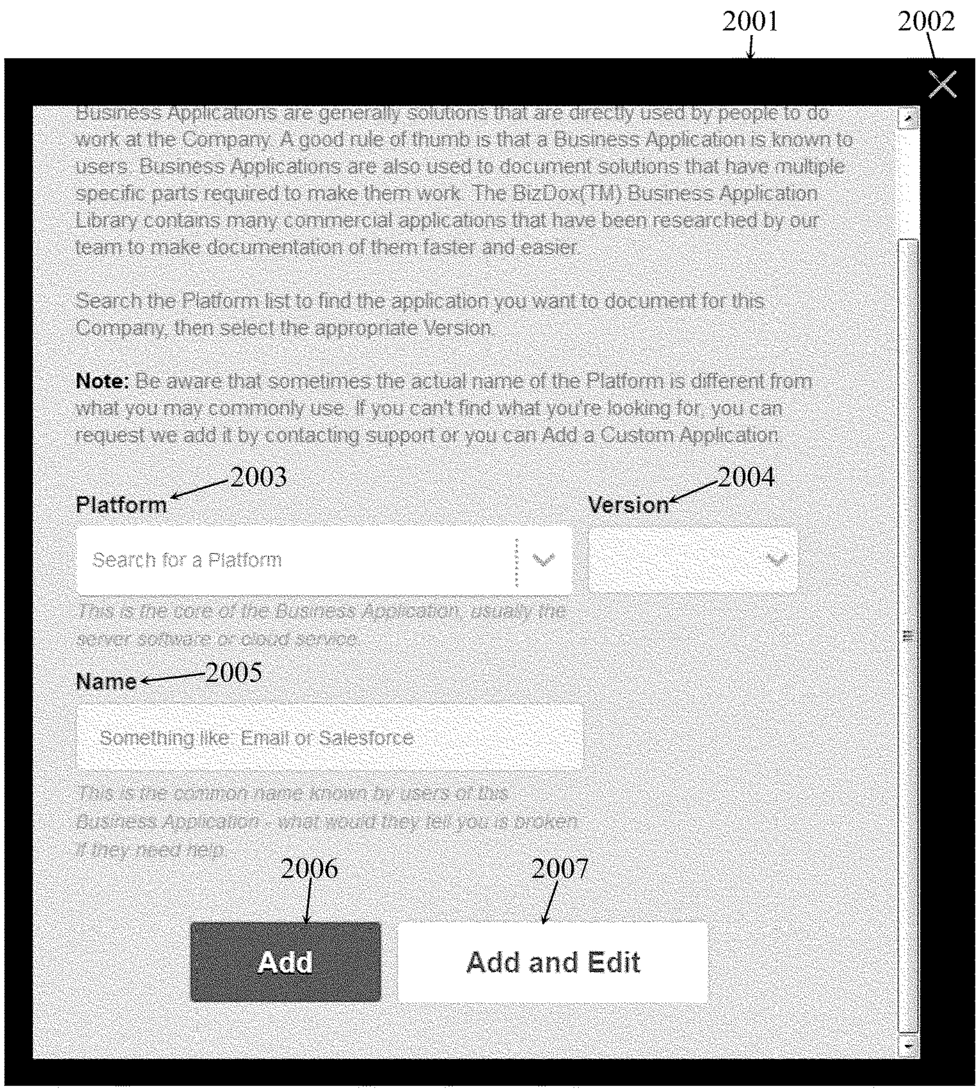
FIG. 20A is an illustrative example of an embodiment of a user interface for facilitating guiding an end user to add an application to the documentation for a company.
Figure 21A:
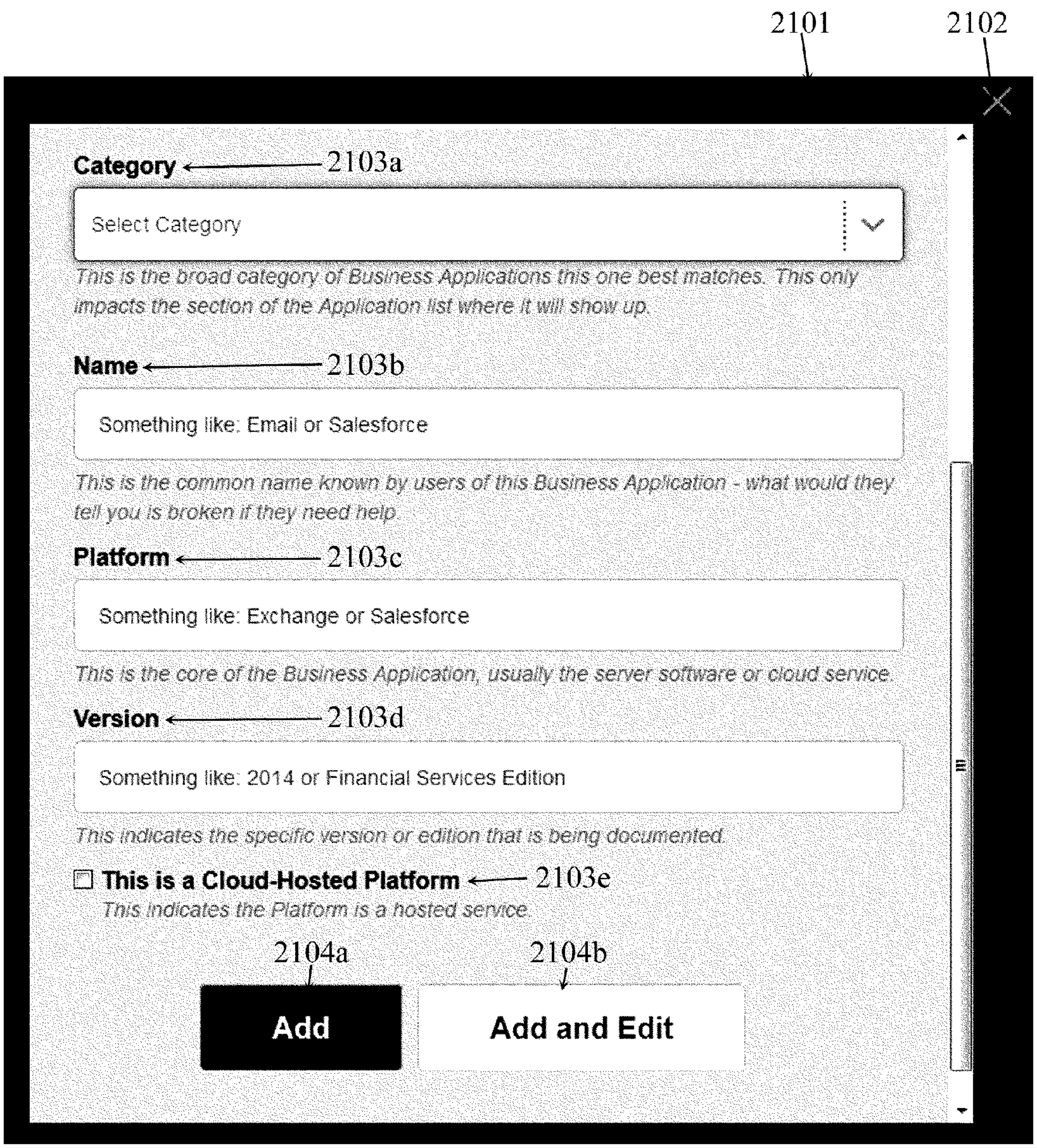
FIG. 21A is an illustrative example of an embodiment of a user interface for facilitating guiding an end user to add an application to the documentation for a company, when the application is not already included in a list of application templates.
Figure 21B:
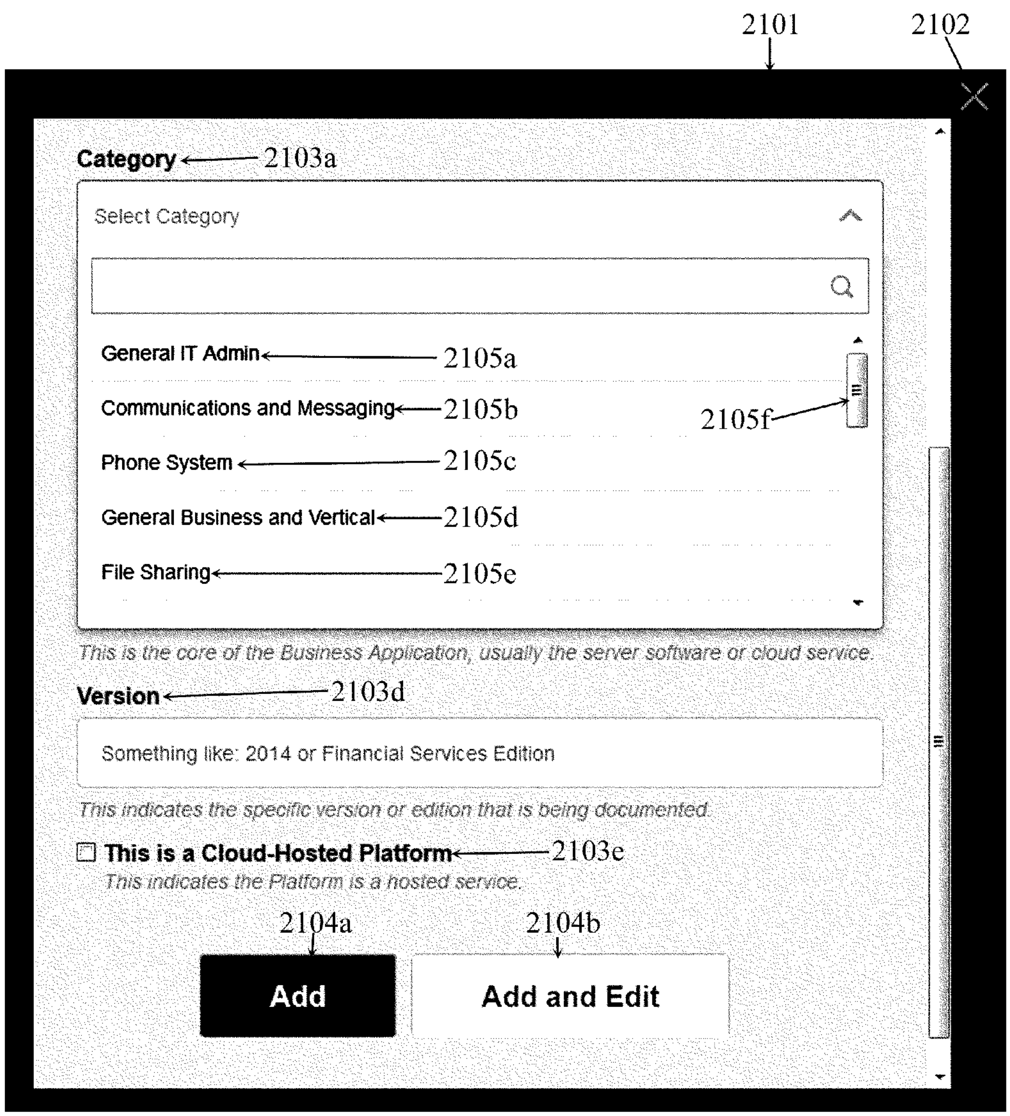
FIG. 21B is an illustrative example of an embodiment of a user interface for facilitating guiding an end user to add an application to the documentation for a company, when the application is not already included in a list of application templates, by providing the end user with a selection of application categories.

FIG. 20A is an illustrative example of an embodiment of a user interface for facilitating guiding an end user to add an application to the documentation for a company. The display in FIG. 20A may be the user interface that is displayed by selecting the Add Library button 1601*b* as described with respect to FIG. 16A. The display in FIG. 20A may be displayed on top of an existing interface display 2001 that may be darkened or otherwise de-emphasized to indicate that the existing interface display is in the background. A close control 2002 may be provided to close the display of FIG. 20A and return to the previous display 2001. The user interface can guide an end user in adding a new application by prompting for the platform 2003 on which the application runs, the version 2004 of the application, and the name 2005 of the application. The Add button 2006 can be selected to add the new application and return to the previous display 2001. The Add and Edit button 2007 can be selected to add the new application and open a user interface to view and edit the detailed information about the new application that was added.

Figure 20B:
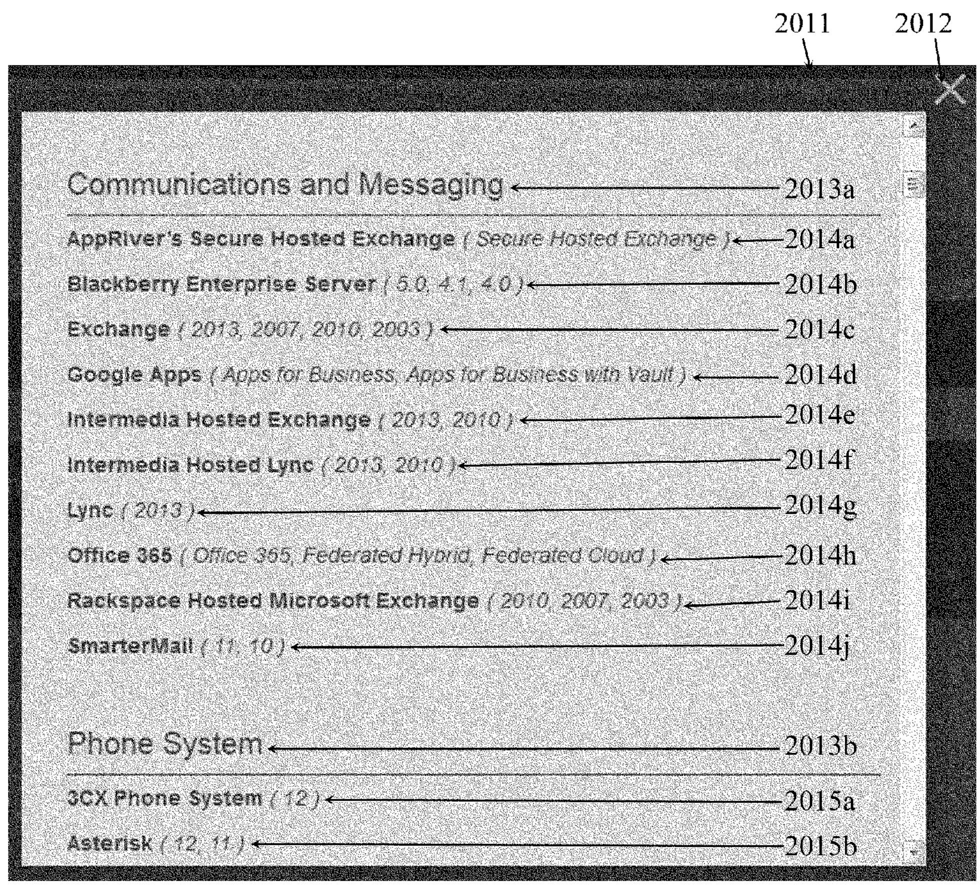
FIG. 20B is an illustrative example of an embodiment of a user interface for facilitating guiding an end user to add an application to the documentation for a company, by providing a list of application templates that have already been partially configured.

FIG. 20B is an illustrative example of an embodiment of a user interface for facilitating guiding an end user to add an application to the documentation for a company, by providing a list of application templates that have already been partially configured. The display in FIG. 20B may be the user interface that is displayed by selecting the Add Library button 1601*b* as described with respect to FIG. 16A. The display in FIG. 20B may be displayed on top of an existing interface display 2011 that may be darkened or otherwise de-emphasized to indicate that the existing interface display is in the background. A close control 2012 may be provided to close the display of FIG. 20B and return to the previous display 2011. The user interface can guide an end user in adding a new application by displaying a list of templates 2014*a*-2014*j*, 2015*a*-2015*b* organized by categories 2013*a*-2013*b*.

Figure 20C:
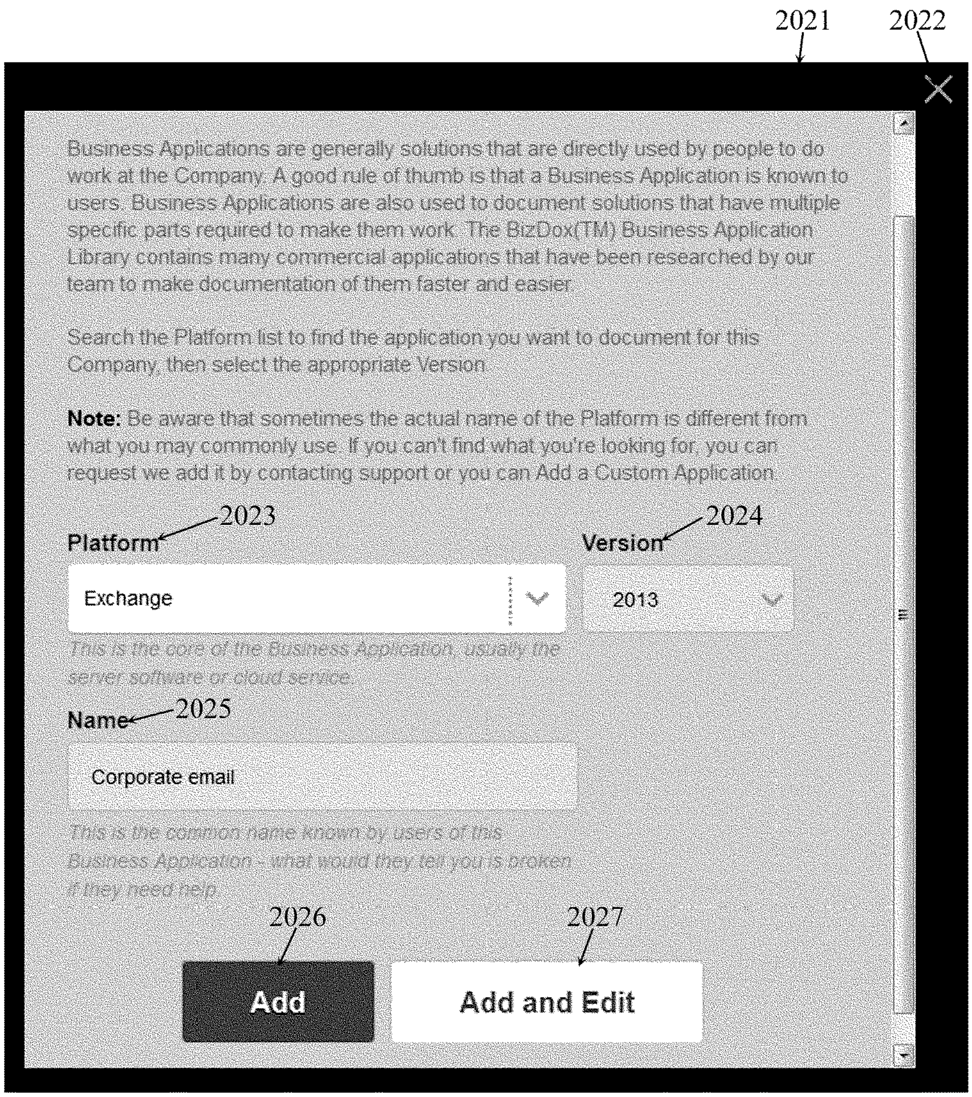
FIG. 20C is an illustrative example of an embodiment of a user interface for facilitating guiding an end user to add an application to the documentation for a company, once the application has been selected from a list of application templates that have already been partially configured.

FIG. 20C is an illustrative example of an embodiment of a user interface for facilitating guiding an end user to add an application to the documentation for a company, once the application has been selected from a list of application templates that have already been partially configured. The display in FIG. 20C may be the user interface that is displayed by selecting the Add Library button 1601*b* as described with respect to FIG. 16A. The display in FIG. 20C may be displayed on top of an existing interface display 2021 that may be darkened or otherwise de-emphasized to indicate that the existing interface display is in the background. A close control 2022 may be provided to close the display of FIG. 20C and return to the previous display 2021. The user interface can guide an end user in adding a new application by prompting for the platform 2023 on which the application runs, and may further guide an end user by pre-populating the platform field 2023 with a platform defined in the selected template. The user interface can guide an end user in adding a new application by prompting for the version 2024 of the application, and may further guide an end user by pre-populating the version field 2024 with a version defined in the selected template. The user interface can guide an end user in adding a new application by prompting for the name 2025 of the application, and may further guide an end user by pre-populating the name field 2025 with a name defined in the selected template. The Add button 2026 can be selected to add the new application and return to the previous display 2021. The Add and Edit button 2027 can be selected to add the new application and open a user interface to view and edit the detailed information about the new application that was added.

FIGS. 20D-20G are illustrative examples of embodiments of a user interface for facilitating guiding an end user to add information to the documentation for an application, once the application has been selected from a list of application templates that have already been partially configured. In the examples of FIGS. 20D-20G, the application is an email application. It should be noted that the layout and contents of the user interface described by FIGS. 20D-20G can be specific to the application, and this specificity can be an advantage of the present disclosure. For example, the Mailbox Server section 2034*a*, the Client Access Server section 2041*a*, the Client Access Server (SMTP) section 2051*a*, and the Email Filtering section 2061*a* may only be present for an email application, and may not be present for other types of applications. In this way, the application documentation can be tailored to the application itself, and may therefore be more relevant and useful.

Figure 20D:
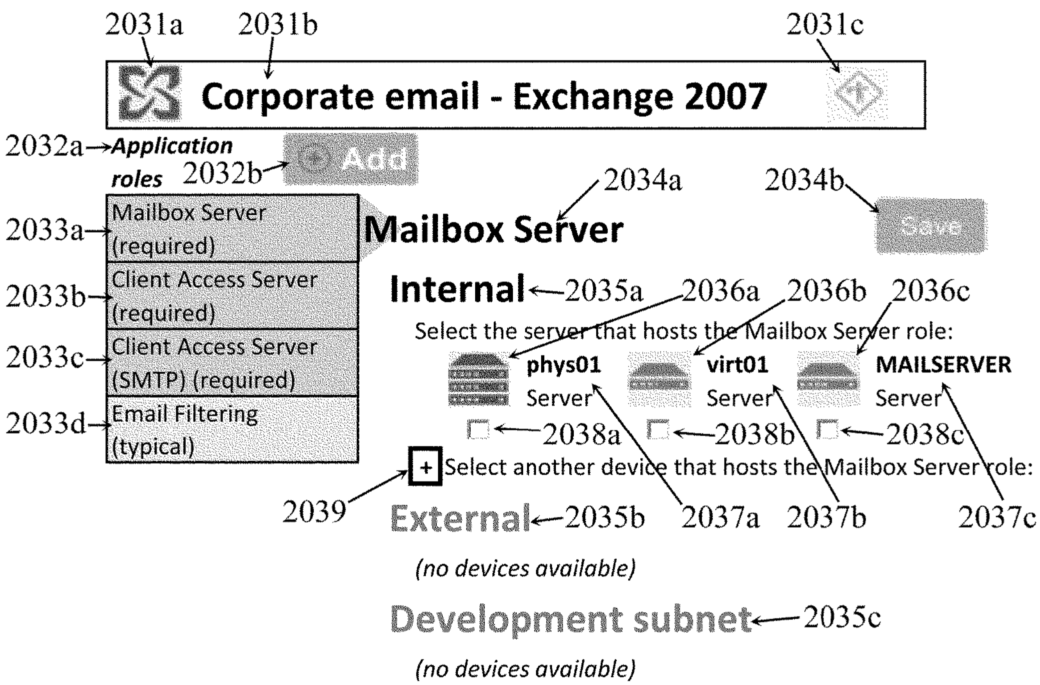
FIG. 20D is an illustrative example of an embodiment of a user interface for facilitating guiding an end user to add a mailbox server to the documentation for an email application, once the email application has been selected from a list of application templates that have already been partially configured.

FIG. 20D is an illustrative example of an embodiment of a user interface for facilitating guiding an end user to add a mailbox server to the documentation for an email application, once the email application has been selected from a list of application templates that have already been partially configured. The display in FIG. 20D can be the user interface that is displayed by selecting the Add and Edit button 2027 as described with respect to FIG. 20C. The display in FIG. 20D can be identified by a visual icon 2031*a* that can represent the application, and the name 2031*b* of the application. A visual icon 2031*c* can indicate that the documentation for the application is incomplete, which may be due to the fact that the application was recently added. A header 2032*a* can indicate that the application roles are displayed for editing, and the application roles 2033*a*-2033*d* can be shown on the left. As shown in the example of FIG. 20D, the selected application role, which is the Mailbox Server role 2033*a*, can have a visual indicator of an arrow on the right side to indicate that this application role is selected. An Add button 2032*b* can be selected to display a user interface that may be used to add a new application role. The initial part of the display shown in FIG. 20D can have a header 2034*a* indicating the Mailbox Server application role that is selected. The Save button 2034*b* can be selected to update the documentation with changes that have been made in the user interface.

The user interface can have a separate section 2035*a*-2035*c* for each network segment in the company. In the example of FIG. 20D, the Internal section 2035*a* can represent the network segment with the name "Internal", the External section 2035*b* can represent the network segment with the name "External", and the Development subnet section 2035*c* can represent the network segment with the name "Development subnet". Each segment representing a network can have a display of the servers available to serve the application role. The display of the available servers can include a visual icon 2036*a*-2036*c* representing the type of server, the name 2037*a*-2037*c* of the server, and a checkbox 2038*a*-2038*c* indicating whether the server serves the application role. The end user may be able to use the checkbox 2038*a*-2038*c* to select or deselect a server for the application role. A control 2039 may be available to show devices other than servers and make those devices available for the application role.

In the example of FIG. 20D, the "External" network segment and the "Development subnet" network segment may not contain devices that would be suitable for the application role, so the External section 2035*b* and the Development subnet section 2035*c* can both indicate that no devices are available.

Figure 20E:
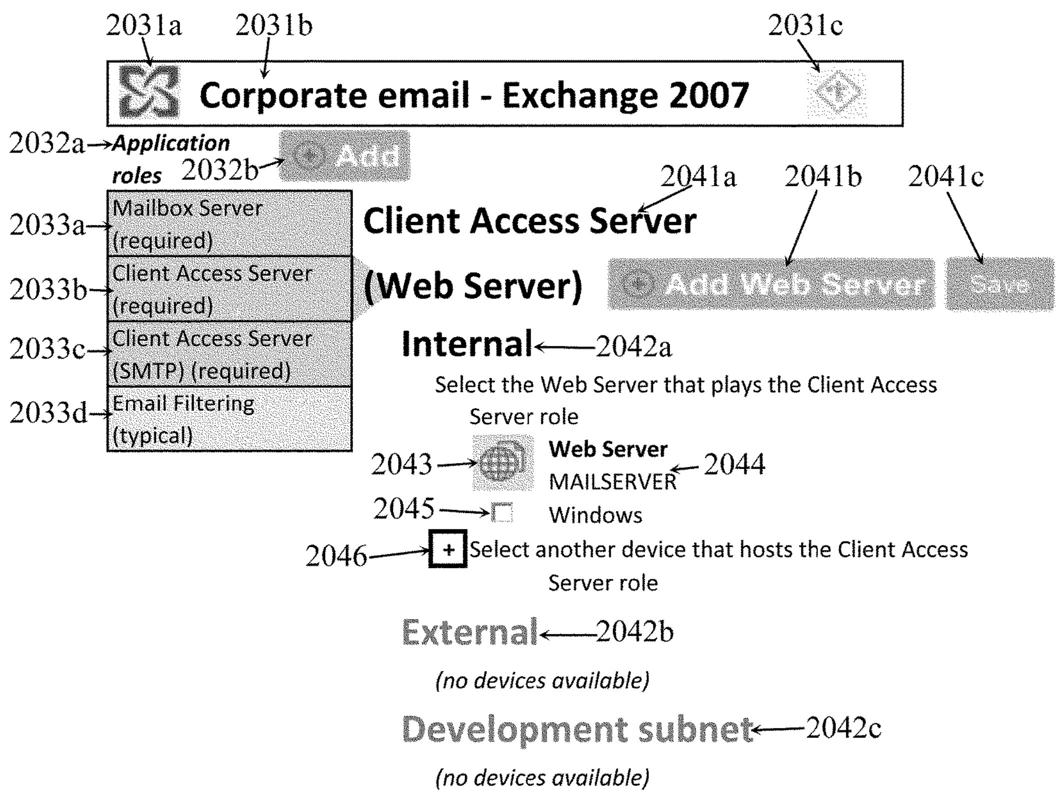
FIG. 20E is an illustrative example of an embodiment of a user interface for facilitating guiding an end user to add a client access server (web server) to the documentation for an email application, once the email application has been selected from a list of application templates that have already been partially configured.

FIG. 20E is an illustrative example of an embodiment of a user interface for facilitating guiding an end user to add a client access server (web server) to the documentation for an email application, once the email application has been selected from a list of application templates that have already been partially configured. The display in FIG. 20E can be the user interface that is displayed by selecting the application role 2033*b* as described with respect to FIG. 20D. The header section 2031*a*-2031*c*, application role header 2032*a*-2032*b*, and application roles section 2033*a*-2033*d*, can be the same as described with respect to FIG. 20D, and as seen in FIG. 20E, the selected application role, which is the Client Access Server application role 2033*b* in the example of FIG. 20E, can have a visual indicator of an arrow on the right side to indicate that this application role is selected. The initial part of the display shown in FIG. 20E can have a header 2041*a* indicating the Client Access Server application role that is selected. The Add Web Server button 2041*b* can be selected to display a user interface for adding another web server to the documentation. The Save button 2041*c* can be selected to update the documentation with changes that have been made in the user interface.

The user interface can have a separate section 2042*a*-2042*c* for each network segment in the company. In the example of FIG. 20E, the Internal section 2042*a* can represent the network segment with the name "Internal", the External section 2042*b* can represent the network segment with the name "External", and the Development subnet section 2042*c* can represent the network segment with the name "Development subnet". Each segment representing a network can have a display of the servers available to serve the application role. The display of the available servers can include a visual icon 2043 representing the type of server, the name 2044 of the server, and a checkbox 2045 indicating whether the server serves the application role. The end user may be able to use the checkbox 2045 to select or deselect a server for the application role. A control 2046 may be available to show devices other than servers and make those devices available for the application role.

In the example of FIG. 20E, the "External" network segment and the "Development subnet" network segment may not contain devices that would be suitable for the application role, so the External section 2042*b* and the Development subnet section 2042*c* can both indicate that no devices are available.

Figure 20F:
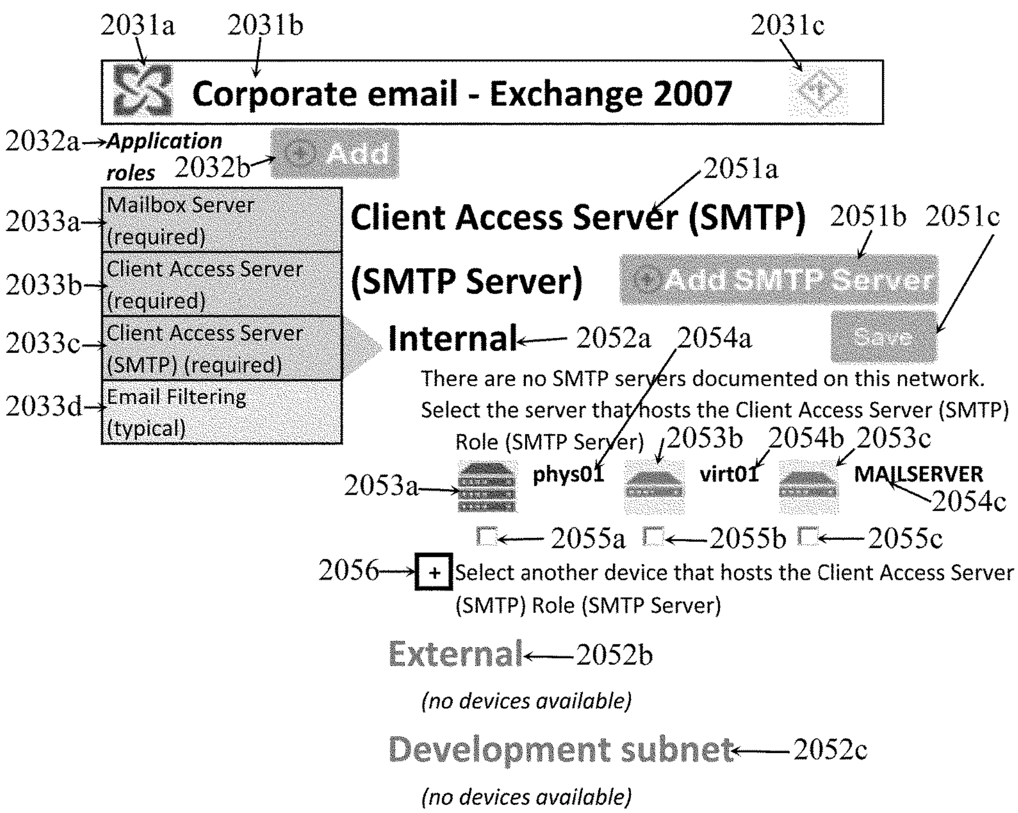
FIG. 20F is an illustrative example of an embodiment of a user interface for facilitating guiding an end user to add a client access server (Simple Mail Transfer Protocol (SMTP) server) to the documentation for an email application, once the email application has been selected from a list of application templates that have already been partially configured.

FIG. 20F is an illustrative example of an embodiment of a user interface for facilitating guiding an end user to add a client access server (Simple Mail Transfer Protocol (SMTP) server) to the documentation for an email application, once the email application has been selected from a list of application templates that have already been partially configured. The display in FIG. 20F can be the user interface that is displayed by selecting the application role 2033*c* as described with respect to FIG. 20D. The header section 2031*a*-2031*c*, application role header 2032*a*-2032*b*, and application roles section 2033*a*-2033*d*, can be the same as described with respect to FIG. 20D, and as seen in FIG. 20F, the selected application role, which is the Client Access Server (SMTP) application role 2033*c* in the example of FIG. 20F, can have a visual indicator of an arrow on the right side to indicate that this application role is selected. The initial part of the display shown in FIG. 20F can have a header 2051*a* indicating the Client Access Server (SMTP) application role that is selected. The Add SMTP Server button 2051*b* can be selected to display a user interface for adding another SMTP server to the documentation. The Save button 2051*c* can be selected to update the documentation with changes that have been made in the user interface.

The user interface can have a separate section 2052*a*-2052*c* for each network segment in the company. In the example of FIG. 20F, the Internal section 2052*a* can represent the network segment with the name "Internal", the External section 2052*b* can represent the network segment with the name "External", and the Development subnet section 2052*c* can represent the network segment with the name "Development subnet". Each segment representing a network can have a display of the servers available to serve the application role. The display of the available servers can include a visual icon 2053*a*-2053*c* representing the type of server, the name 2054*a*-2054*c* of the server, and a checkbox 2055*a*-2055*c* indicating whether the server serves the application role. The end user may be able to use the checkbox 2055*a*-2055*c* to select or deselect a server for the application role. A control 2056 may be available to show devices other than servers and make those devices available for the application role.

In the example of FIG. 20F, the "External" network segment and the "Development subnet" network segment may not contain devices that would be suitable for the application role, so the External section 2052*b* and the Development subnet section 2052*c* can both indicate that no devices are available.

Figure 20G:
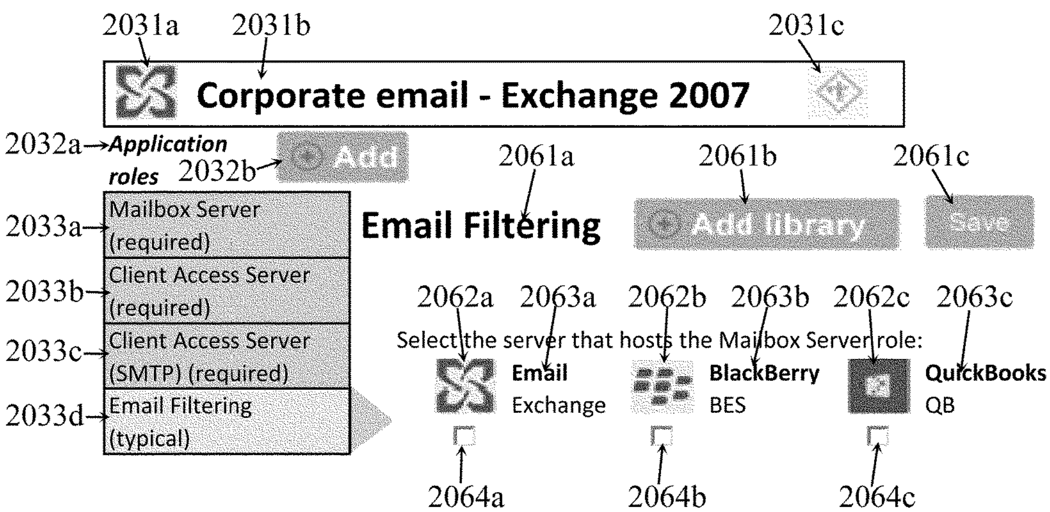
FIG. 20G is an illustrative example of an embodiment of a user interface for facilitating guiding an end user to add an email filtering application to the documentation for an email application, once the email application has been selected from a list of application templates that have already been partially configured.

FIG. 20G is an illustrative example of an embodiment of a user interface for facilitating guiding an end user to add an email filtering application to the documentation for an email application, once the email application has been selected from a list of application templates that have already been partially configured. The display in FIG. 20G can be the user interface that is displayed by selecting the application role 2033*d* as described with respect to FIG. 20D. The header section 2031*a*-2031*c*, application role header 2032*a*-2032*b*, and application roles section 2033*a*-2033*d*, can be the same as described with respect to FIG. 20D, and as seen in FIG. 20G, the selected application role, which is the Email Filtering application role 2033*d* in the example of FIG. 20G, can have a visual indicator of an arrow on the right side to indicate that this application role is selected. The Email Filtering application role 2033*d* can provide further guidance to the end user with an indication that the application role is typical, rather than required. The initial part of the display shown in FIG. 20G can have a header 2061*a* indicating the Email Filtering application role that is selected. The Add Library button 2061*b* can be selected to display a user interface for adding another application to the documentation, using a template. The Save button 2061*c* can be selected to update the documentation with changes that have been made in the user interface.

The user interface can have a display of the applications available to serve the application role. The display of the available applications can include a visual icon 2062*a*-2062*c* representing the type of application, the name 2063*a*-2063*c* of the server, and a checkbox 2064*a*-2064*c* indicating whether the application serves the application role. The end user may be able to use the checkbox 2064*a*-2064*c* to select or deselect an application for the application role.

FIG. 21A is an illustrative example of an embodiment of a user interface for facilitating guiding an end user to add an application to the documentation for a company, when the application is not already included in a list of application templates. The display in FIG. 21A may be the user interface that is displayed by selecting the Add Custom button 1601*c* as described with respect to FIG. 16A. The display in FIG. 21A may be displayed on top of an existing interface display 2101 that may be darkened or otherwise de-emphasized to indicate that the existing interface display is in the background. A close control 2102 may be provided to close the display of FIG. 21A and return to the previous display 2101. The user interface can guide an end user in adding a new application by prompting for a category 2103*a* for the application, the name 2103*b* of the application, the platform 2103*c* on which the application runs, and the version 2103*d* of the application. The category 2103*a* selected for the application can make it easier to find and use the application in further use. The user interface can further guide the end user in adding a new application by prompting whether or not the application is hosted in a cloud 2103*e*. The Add button 2104*a* can be selected to add the new application and return to the previous display 2101. The Add and Edit button 2104*b* can be selected to add the new application and open a user interface to view and edit the detailed information about the new application that was added.

FIG. 21B is an illustrative example of an embodiment of a user interface for facilitating guiding an end user to add an application to the documentation for a company, when the application is not already included in a list of application templates, by providing the end user with a selection of application categories. The display in FIG. 21B may be the user interface that is displayed by activating the pulldown control in the category control 2103*a* as described with respect to FIG. 21A. The version control 2103*d*, cloud selection 2103*e*, and action buttons 2104*a*-2104*b* can remain the same as described with respect to FIG. 21A. The category control 2103*a* can be expanded to include a list of potential categories 2105*a*-2105*e* that may be selected, and a scroll bar 2105*f* to access the entire list of potential categories.

Figure 22:
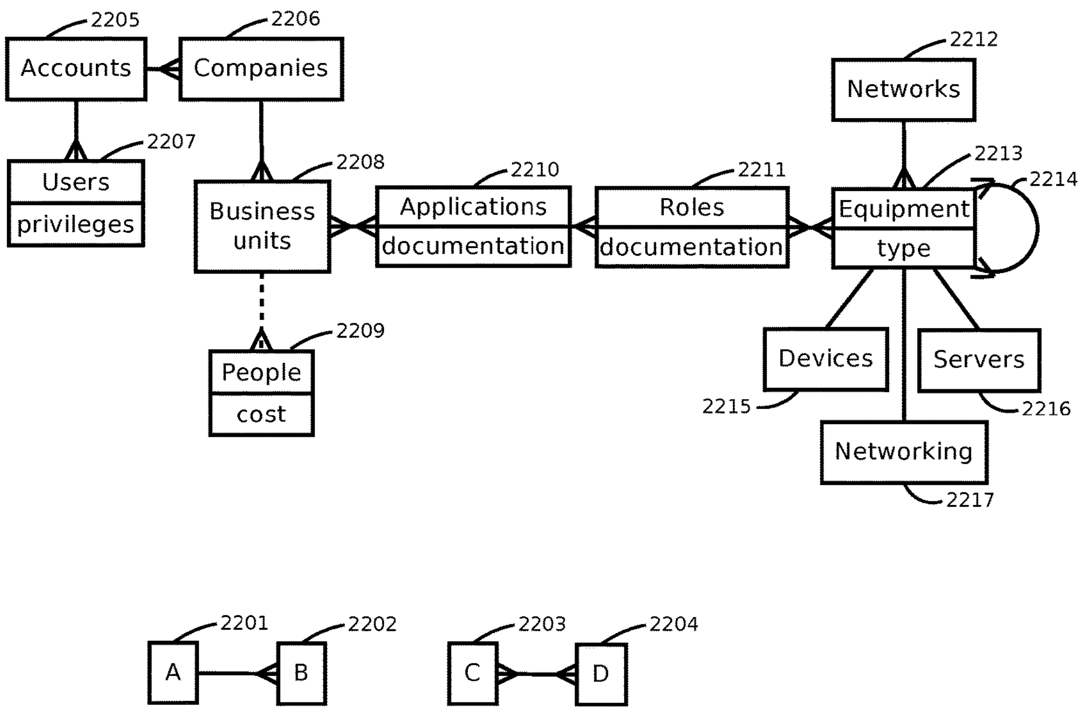
FIG. 22 is an illustrative block diagram of an example embodiment of a database schema used by a system for documenting, analyzing, and supporting information technology infrastructure.

FIG. 22 is an illustrative block diagram of an example embodiment of a database schema used by a system for documenting, analyzing, and supporting information technology infrastructure. The blocks 2205-2217 in FIG. 22 can represent database tables. In blocks 2207, 2209, 2210, 2211, and 2213, the upper label in the block can represent the main data represented by the database table, and the lower label in the block can represent some additional important data represented using additional columns in the database table. The relationship between two tables in FIG. 22 can be shown using the style of line between the two blocks representing the tables. A simple line can represent a one-to-one relationship between the tables. For example, a one-to-one relationship in a relational database may comprise placing the information from the two tables in a single table, and relating the two entries by placing the two entries in the same row. In another embodiment, a one-to-one relationship in a relational database may comprise adding a unique key to each row in both tables, using the same key value for the related rows in each table, and using a join to select the related data. A line with a branch at one end, such as the line between B 2202 and A 2201, can represent a many-to-one relationship. For example, a many-to-one relationship between B 2202 and A 2201 in a relational database may comprise adding a unique key to A 2201, adding a foreign key to B 2202 linked to the unique key in A 2201, and using a join to select the multiple rows in B 2202 that are related to a row in A 2201. A line with a branch at both ends, such as the line between C 2203 and D 2204, can represent a many-to-many relationship. For example, a many-to-many relationship between C 2203 and D 2204 in a relational database may comprise adding an auxiliary table with two unique keys, adding a foreign key to C 2203 linked to one of the keys in the auxiliary table, adding a foreign key to D 2204 linked to the other key in the auxiliary table, and using two joins to select the multiple rows from C 2203 and D 2204 that are related.

The database tables represented by FIG. 22 may correspond to the blocks in the data diagram with respect to FIG. 1C. For example, the users table 2207 may represent the data 142 for users, the accounts table 2205 may represent the data 131 for accounts, the companies table 2206 may represent the data 132 for companies, the business units table 2208 may represent the data 133 for business units, the people table 2209 may represent the data 134 for people, the applications table 2210 may represent the data 135 for applications, the roles table 2211 may represent the data 139 for roles, the equipment table 2213 may represent the data 137 for equipment, the networks table 2212 may represent the data 136 for networks, the devices table 2215 may represent the data 138*c* for devices, the networking table 2217 may represent the data 138*b* for networking, and the servers table 2216 may represent the data 138*a* for servers, as described with respect to FIG. 1C.

The users table 2207 can represent the users that have access to the system, and can contain information about privileges that determine what information the users are allowed to access and change. The accounts table 2205 can represent the accounts in the system, and can have information about customers. The companies table 2206 can represent the companies that are documented in the system, and can have additional information documenting the companies themselves. The business units table 2208 can represent business units in a company. The people table 2209 can represent people in a company, and can have contact information for the people. The people table 2209 may have cost information about the labor cost of the people to a company. The people table 2209 may represent people that are not in a company and may serve as a contact management resource. The applications table 2210 may represent applications that are used by a company, and may have additional documentation describing the applications. The roles table 2211 may represent functional units of applications that play a role for the people who use the applications, and may have additional documentation describing the roles. The networks table 2212 may represent network segments and subnets that are part of a company. The equipment table 2213 may represent equipment in the networks, and may have information about what type of equipment is represented in the table. The servers table 2216 may represent servers that are used by a company. The networking table 2217 may represent networking equipment that is used by a company. The devices table 2215 may represent other devices that are used by a company.

The users table 2207 can have a many-to-one relationship to the accounts table 2205, which may indicate that multiple users may be able to use a single account. The accounts table 2205 can have a one-to-many relationship to the companies table 2206, which may indicate that a single account can be used to manage multiple companies. The companies table 2206 may have a one-to-many relationship to the business units table 2208, which may indicate that a single company may be made up of multiple business units. The business units table 2208 may have a one-to-many relationship to the people table 2209, which may indicate that one business unit may be made up of multiple people. The relationship between the business units table 2208 and the people table 2209 may be a weak one, as indicated by the dotted line in FIG. 22, which may indicate that an entry in the people table 2209 may have no corresponding entry in the business units table 2208. The business units table 2208 may have a many-to-many relationship to the applications table 2210, which may indicate that one business unit may use multiple applications, and that one application may be used by multiple business units. The applications table 2210 may have a one-to-many relationship to the roles table 2211, which may indicate that an application may have multiple roles. The roles table 2211 may have a many-to-many relationship to the equipment table 2213, which may indicate that a single role can use multiple pieces of equipment, and a single piece of equipment can be used by multiple roles. The equipment table 2213 may have a many-to-one relationship to the networks table 2212, which may indicate that a network may have multiple pieces of equipment. The equipment table may have a special many-to-many relationship 2214 to itself, which may indicate that one piece of equipment may be connected to multiple other pieces of equipment in a network. The equipment table 2213 can have a special column indicating the type of equipment, and based on the value of that type column, a row in the equipment table 2213 may have a one-to-one relationship to one of the devices table 2215, the networking table 2217, or the servers table 2216, where additional documentation for the device represented by the row can be stored specific to the type of device.

Figure 23A:
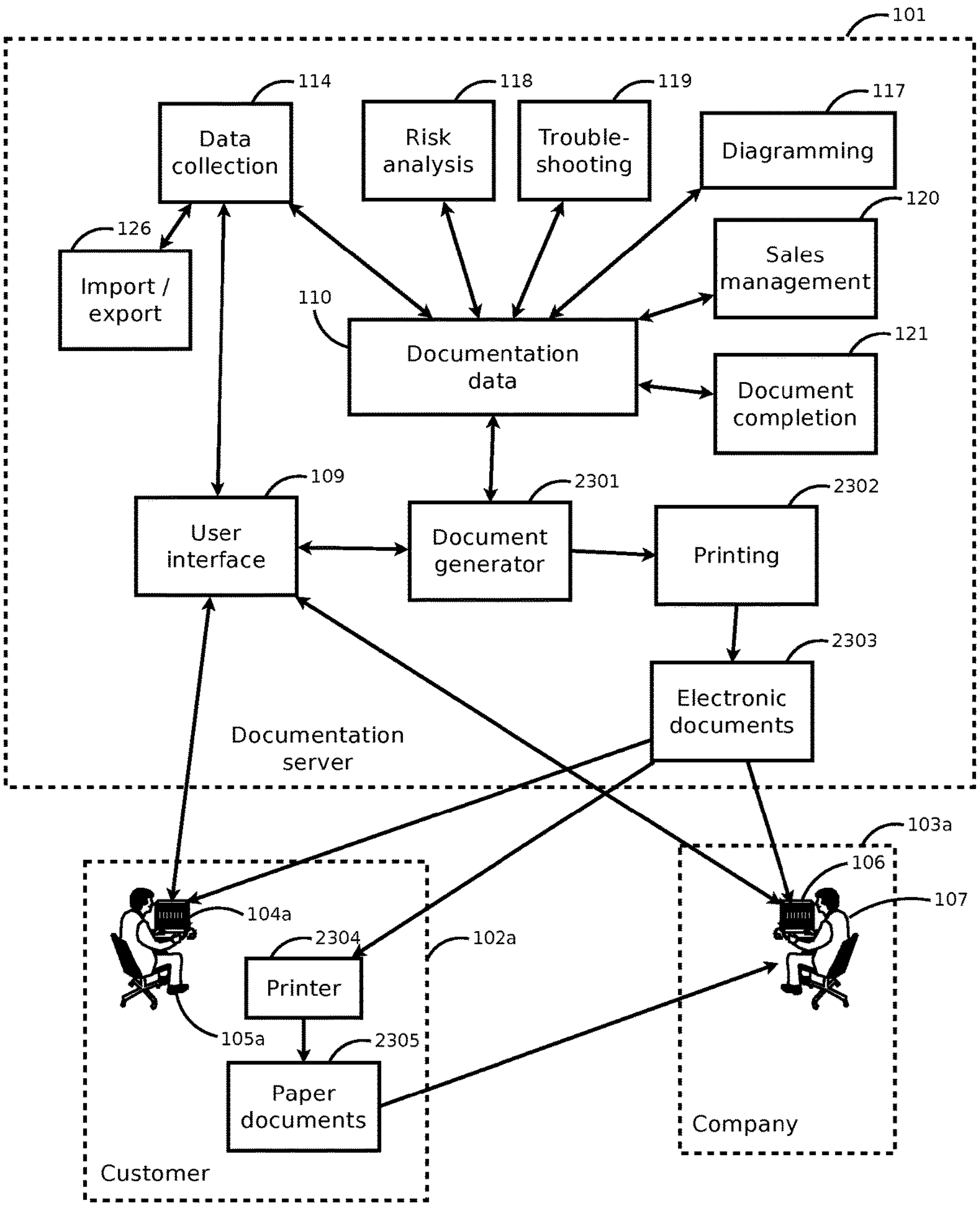
FIG. 23A is an illustrative block diagram of an example embodiment of a system for generating reports to facilitate documenting, analyzing, and supporting information technology infrastructure.

FIG. 23A is an illustrative block diagram of an example embodiment of a system for generating reports to facilitate documenting, analyzing, and supporting information technology infrastructure. A central repository of documentation data 110, as described with respect to FIG. 1A, can be used by a document generator 2301 to generate reports for a printing module 2302 that can create electronic documents 2303 representing the reports. As described with respect to FIG. 1A, other modules can update the documentation data 110 with additional information. A data collection module 114 can add and update documentation data 110; an import/export module 126 can provide data from outside the documentation server 101 to the data collection module 114; a risk analysis module 118 can use documentation data 110 to calculate costs based on risk factors and update the documentation data 110 with the results of the calculation; a troubleshooting module 119 can use documentation data 110 to determine likely candidates for causes of problems and update the documentation data 110 with the results of the determination; a diagramming module 117 can generate graphical displays of the documentation data 110 and update the documentation data 110 with the displays; a sales management module 120 can use documentation data 110 to create recommendations for goods and services desired by a company 103*a* and update the documentation data 110 with the recommendations; and a document completion module 121 can calculate the completeness of the documentation data 110 and update the documentation data 110 with the results of the calculation, as described with respect to FIG. 1A. The document generator 2301 can use the documentation data 110, which may include updates from other modules 114, 118, 119, 117, 120, and 121, to generate reports. The document generator 2301 may generate reports responsive to a request from the user interface module 109. The reports may be used by a printing module 2302 to generate electronic documents 2303, which may be retrieved by a technician 105*a* at a customer 102*a* using a device 104*a*, or may be retrieved by an individual 107 at a company 103*a* using a device 106. A customer 102*a* may choose to use a printer 2304 to produce paper documents 2305 from the electronic documents 2303 and may send the paper documents 2305 to the company 103*a*.

Figure 23B:
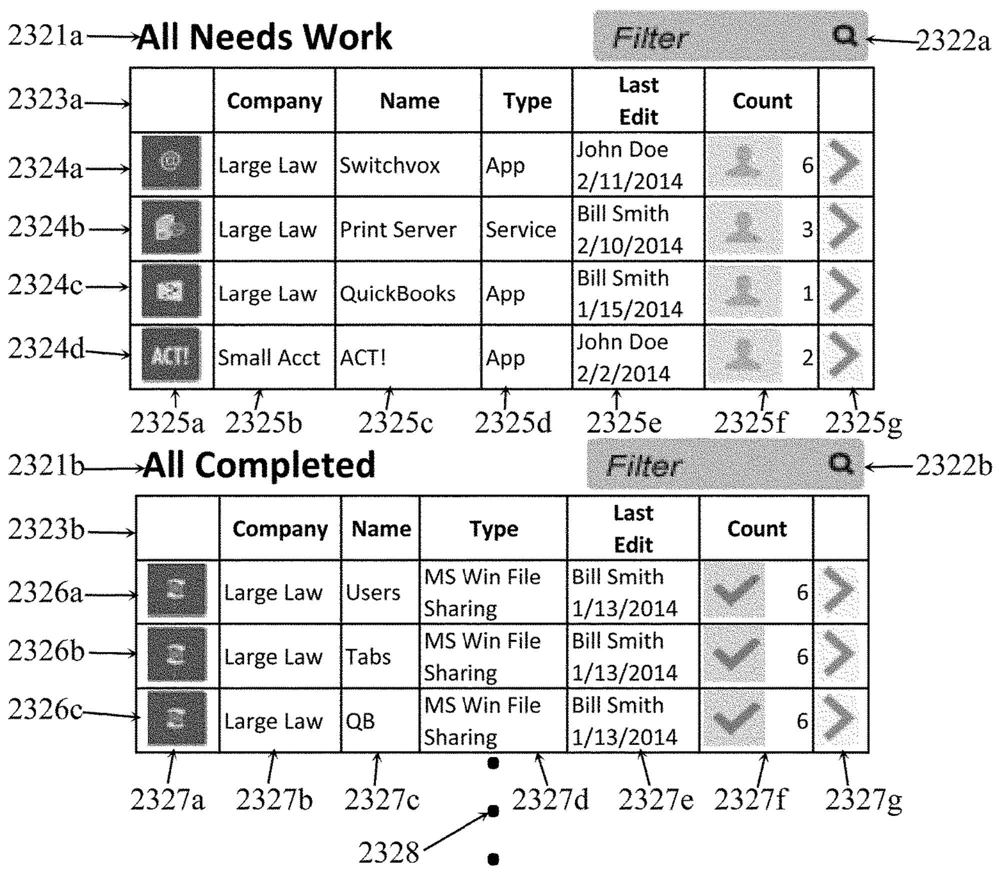
FIG. 23B is an illustrative example of an embodiment of a user interface for presenting documentation by showing information about the documentation that is incomplete, and showing information about the documentation that has been completed.

FIG. 23B is an illustrative example of an embodiment of a user interface for presenting documentation by showing information about the documentation that is incomplete, and showing information about the documentation that has been completed. The information about the documentation can be shown in two tables in FIG. 23B identified by headers 2321*a*-2321*b*. The table identified by header 2321*a* can display information about documentation that is incomplete, with descriptive column headers 2323*a*, rows 2324*a*-2324*d*, and columns 2325*a*-2325*g*. The filter tool 2322*a* can be used to specify a filter that will select a subset of the data to be displayed. Each row 2324*a*-2324*d* can represent documentation about a component. Column 2325*a* can display a visual icon showing the type of component that the documentation in each row describes. Column 2325*b* can display the name of the company to which the documentation in each row applies. Column 2325*c* can display the name of the component to which the documentation in each row applies. Column 2325*d* can display the type of the component to which the documentation in each row applies. Column 2325*e* can display the name of the person who last edited the documentation in each row, and the date of the last edit of that documentation. Column 2325*f* can display a count of the people at the company for whom the component documented in each row has a high importance, along with a visual icon indicating that those people might be affected by this incomplete documentation. Column 2325*g* can display an icon that can be selected to display a user interface to view and update the documentation in each row.

The table identified by header 2321*b* can display information about documentation that has already been completed. Since the table identified by header 2321*b* can display some or all of the documentation that has been created, the table can be large, as indicated by the ellipsis 2328. The table identified by header 2321*b* can have descriptive column headers 2323*b*, rows 2326*a*-2326*c*, and columns 2327*a*-2327*g*. The filter tool 2322*b* can be used to specify a filter that will select a subset of the data to be displayed. Each row 2326*a*-2326*c* can represent documentation about a component. Column 2327*a* can display a visual icon showing the type of component that the documentation in each row describes. Column 2327*b* can display the name of the company to which the documentation in each row applies. Column 2327*c* can display the name of the component to which the documentation in each row applies. Column 2327*d* can display the type of the component to which the documentation in each row applies. Column 2327*e* can display the name of the person who last edited the documentation in each row, and the date of the last edit of that documentation. Column 2327*f* can display a count of the people at the company for whom the component documented in each row has a high importance, along with a visual icon indicating that this documentation has been completed and should no longer cause a problem for those people. Column 2327*g* can display an icon that can be selected to display a user interface to view and update the documentation in each row.

Figure 23C:
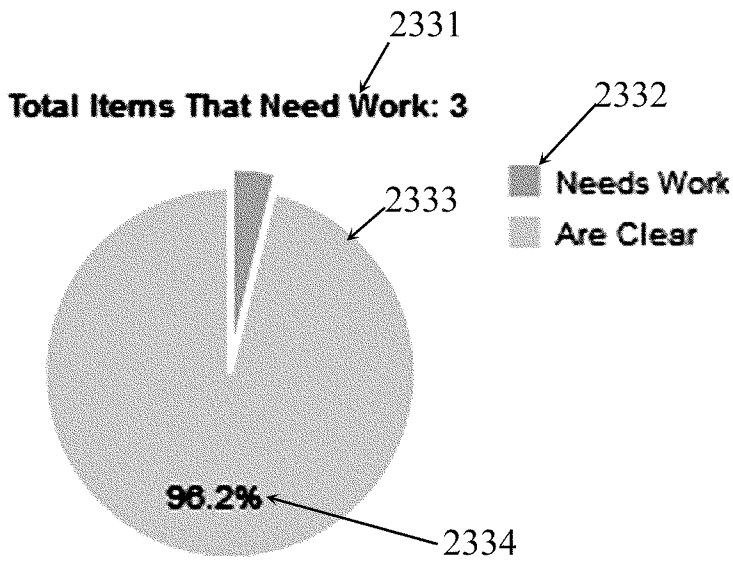
FIG. 23C is an illustrative example of an embodiment of a user interface for presenting documentation by showing an overview of how much documentation is incomplete.

FIG. 23C is an illustrative example of an embodiment of a user interface for presenting documentation by showing an overview of how much documentation is incomplete. The number of incomplete items can be shown numerically 2331, and can also be shown as a pie chart 2333 where the completed items are one section and the incomplete items are another section. The pie chart 2333 can have a legend 2332 identifying the sections, and can also have a numerical percentage 2334 indicating the completeness of the documentation.

The completeness index shown in FIG. 23C can be fairly accurate, since the completeness index is based on using a completeness indicator that is inherent in the documentation and is updated as the documentation is completed. This completeness index can facilitate understanding how much work is outstanding in the documentation effort, and can also provide a quick estimate of how useful the documentation may be in various circumstances.

Figure 23D:
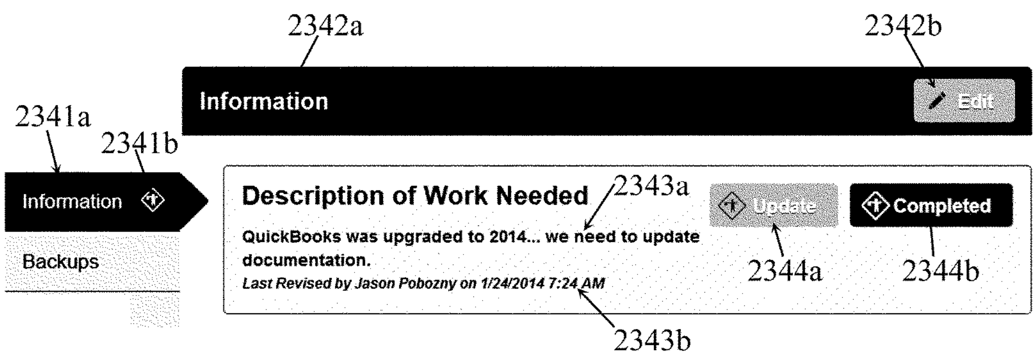
FIG. 23D is an illustrative example of an embodiment of a user interface for viewing and managing the state of incomplete documentation that has been manually marked as incomplete.

FIG. 23D is an illustrative example of an embodiment of a user interface for viewing and managing the state of incomplete documentation that has been manually marked as incomplete. The display in FIG. 23D may be the user interface that is displayed by selecting the icon in column 1613*f* for row 1612*c* as described with respect to FIG. 16A. In the example of FIG. 23D, the Information section of the QUICKBOOKS application may be marked as having incomplete documentation because the software was upgraded but the documentation was not updated to match the software upgrade. This incompleteness can be described in a text note 2343*a*, which can be displayed in the Information section 2341*a* of the documentation for the QUICKBOOKS application, where the text note may be marked with an icon 2341*b* indicating the incomplete documentation. The display can include a header 2342*a* identifying the Information section, a display 2343*b* of the name of the person who created the note 2343*a* and the date and time when the note 2343*a* was last updated, an Edit button 2342*b* that can be selected to display a user interface for updating the documentation that is marked as incomplete, an Update button 2344*a* that can be selected to display a user interface for updating the note 2343*a* on the documentation, and a Completed button 2344*b* that can be selected to remove the incomplete status from the documentation.

Figure 23E:
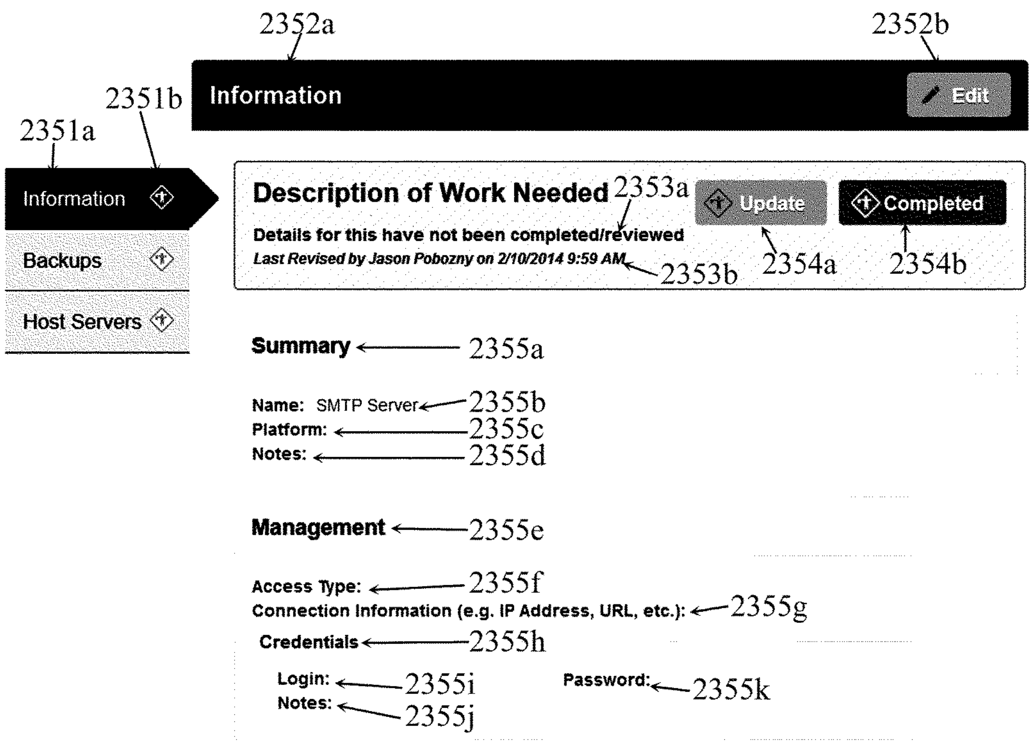
FIG. 23E is an illustrative example of an embodiment of a user interface for viewing and managing the state of incomplete documentation that has been automatically marked as incomplete.

FIG. 23E is an illustrative example of an embodiment of a user interface for viewing and managing the state of incomplete documentation that has been automatically marked as incomplete. The display in FIG. 23D may be the user interface that is displayed by selecting the Add SMTP Server button 2051*b* as described with respect to FIG. 20F. In the example of FIG. 23E, after a new SMTP server is added, the documentation for the new SMTP server can be marked as incomplete, as shown by the indicators 2351*b* on the Information, Backups, and Host Servers sections 2351*a* of the documentation, as well as other sections of documentations that may not be illustrated. The note 2353*a* can be automatically generated when the SMTP server is added, and the notation 2353*b* can indicate the name of the person who added the SMTP server, and the time and date when the SMTP server was added. The display can include a header 2352*a* identifying the Information section, an Edit button 2352*b* that can be selected to display a user interface for updating the documentation that is marked as incomplete, an Update button 2354*a* that can be selected to display a user interface for updating the note 2353*a* on the documentation, and a Completed button 2354*b* that can be selected to remove the incomplete status from the documentation. The documentation for the SMTP server can be initialized to be empty except for the name 2355*b* of the server, which may have been entered in the user interface to create the SMTP server. The documentation to be completed can include a summary section 2355*a* with the name 2355*b* and platform 2355*c* of the SMTP server, and notes 2355*d* that are specific to the SMTP server. The documentation to be completed can include a management section 2355*e* with the method 2355*f*, the address 2355*g*, and the credentials 2355*h* used for accessing the management interface of the SMTP server. The credentials 2355*h* can include a username 2355*i*, a password 2355*k*, and notes 2355*j* that are specific to the credentials.

Figure 23F:
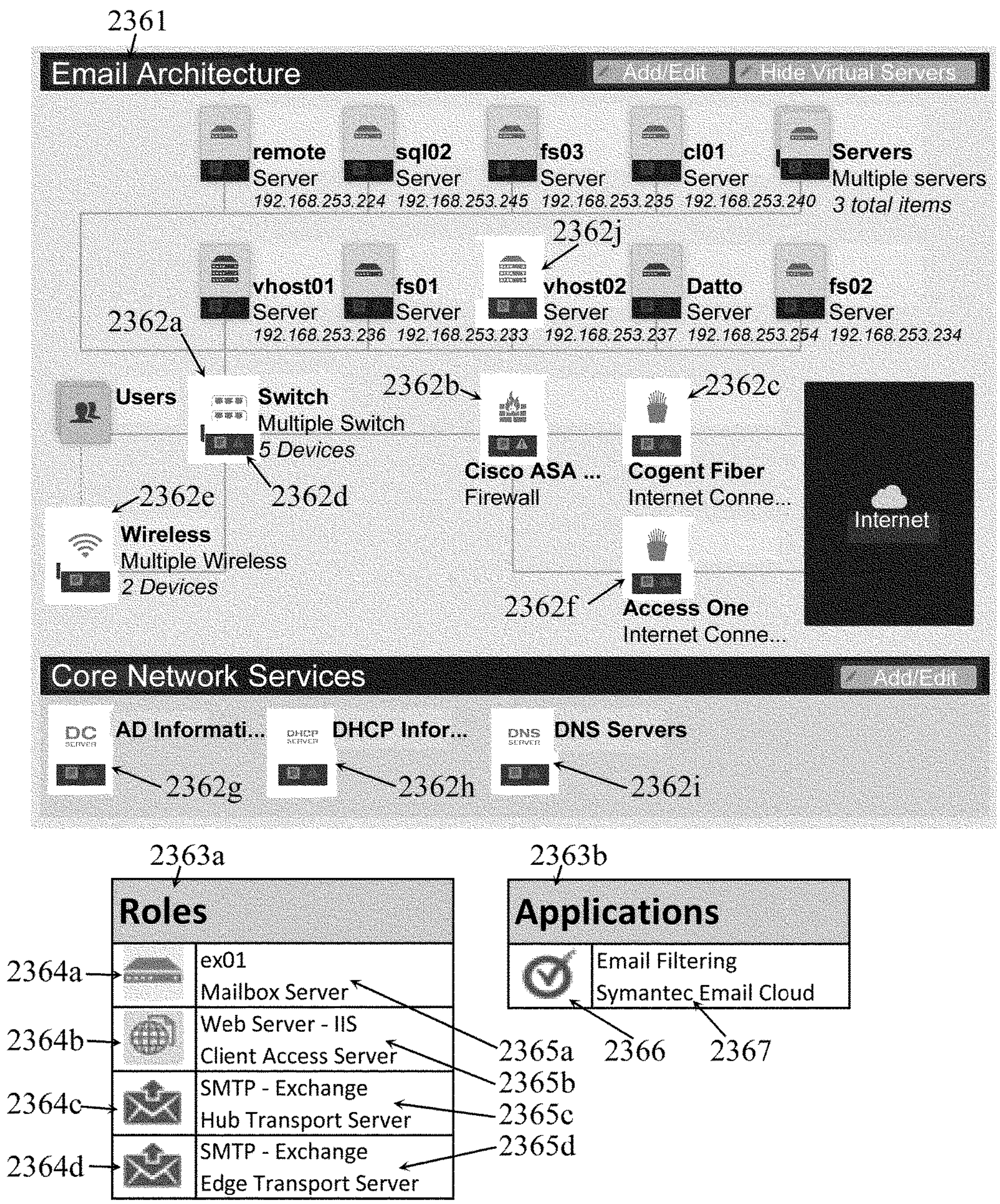
FIG. 23F is an illustrative example of an embodiment of a user interface for viewing a network and the relationship of one application with the components of the network.

FIG. 23F is an illustrative example of an embodiment of a user interface for viewing a network and the relationship of one application with the components of the network. The network display 2361 can show the components and connectivity of the network as described with respect to FIG. 6B, and can highlight the components 2362*a*-2362*j* that are associated with an application. The display can also show a graphical representation of the application roles 2363*a* associated with the application, and can show a graphical representation of the other applications 2363*b* that are associated with the application. The application roles display 2363*a* can include a visual icon 2364*a*-2364*d* that can identify the type of application role, and a listing 2365*a*-2365*d* that can identify the host server and platform of the application role. The associated applications display 2363*b* can include a visual icon 2366 that can identify the application and the name 2367 of the application.

FIG. 23G is an illustrative example of an embodiment of a report for displaying information on documentation about a company. The display in FIG. 23G can represent a report that is an electronic document 2303 as described with respect to FIG. 23A. In the example embodiment of FIG. 23G, the information in the report can represent information about the risk factors for a company as will be described with respect to FIG. 25A. The report can have a header that may include a company logo 2371*a* and a text area 2371*b* with a company name and report name. The report can have sections 2372*a*-2372*c*, where section 2372*a* can be a summary of the overall costs associated with risks, section 2372*b* can be a breakdown of the costs by business unit, and section 2372*c* can be the risks with the highest costs. Section 2372*a* can be further broken down into summary cost details 2373*a*-2373*c*, section 2372*b* can be further broken down into business unit details 2374*a*-2374*f*, and section 2372*c* can be further broken down into risk details 2375*a*-2375*b*.

Figure 24A:
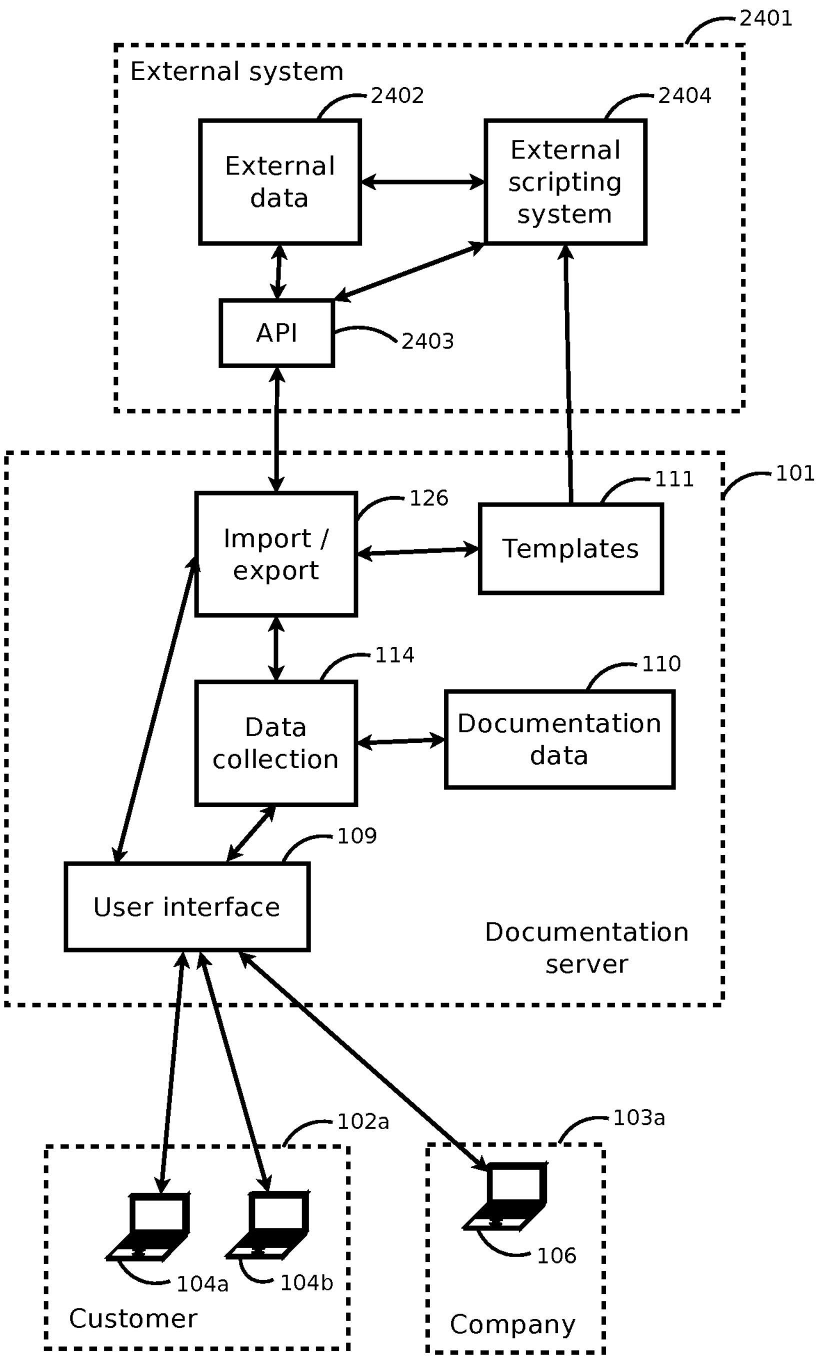
FIG. 24A is an illustrative block diagram of an example embodiment of an interface from an external system to a system for documenting, analyzing, and supporting information technology infrastructure.

FIG. 24A is an illustrative block diagram of an example embodiment of external inputs providing data to a system for documenting, analyzing, and supporting information technology infrastructure. As illustrated with respect to FIG. 1A, devices 104*a*-104*b* at a customer 102*a*, and device 106 at a company 103*a*, may be used with a user interface 109 as external inputs to provide data through a data collection module 114 into documentation data 110 on a documentation server 101. As illustrated with respect to FIG. 1A, device 106 at a company 103*a* may be used with a user interface 109 as an external input to provide data through a data collection module 114 into documentation data 110 on a documentation server 101. The devices 104*a*-104*b* and 106 can provide external input independently and asynchronously, which may allow multiple entities to create or update the same or different data at the same time.

An external system 2401, which may be an RMM system 124 or a PSA system 125 as illustrated with respect to FIG. 1A, can have external data 2404 that may be useful as documentation data 110 for the documentation server 101. The external system 2401 can have an application programming interface (API) 2403 that may be used by an import/export module 126 on the documentation server 101 to retrieve data from the external data 2402 and use the data collection module 114 to update the documentation data 110. The documentation data 110 may have additional data, or more recent data, as compared to the external data 2402, and in that case, the import/export module 126 may retrieve data from the documentation data 110 using the data collection module 114 and update the external data 2402 using the API 2403. The import/export module 126 may be controlled through the user interface 109 in order to initiate the import or export operations.

The retrieval of data from the external data 2402, and the updating of data in the external data 2402, may require the use of actions that are not supported by the API 2403. In this case, the external system 2401 may have an external scripting system 2404 that can use a script to cause the actions not supported by the API 2403 to be taken. The scripts for driving the external scripting system 2404 can reside in a templates module 111 on the documentation server 101, and the import/export module 126 may be able to use the API 2403 to set up and execute the scripts. In this way, the import/export module 126 may be able to achieve better results in importing and exporting data with the external system 2401.

FIG. 24B is an illustrative example of an embodiment of a user interface for viewing and updating configuration information for a network component on a Professional Services Automation (PSA) system. The user interface in FIG. 24B is not one that is part of the user interface module 109 of the documentation server 101, but can instead be part of a PSA system 125 as described with respect to FIG. 1A. The user interface in FIG. 24B can be used to view and edit configuration information about a component in the network, and that configuration information may be imported into the documentation server 101 from a PSA system 125 as described with respect to FIG. 1A. The user interface can have a configuration details section 2421*a*, which may contain the configuration type 2421*b*, name 2421*c*, purchase date 2421*d*, warranty expiration date 2421*e*, installation date 2421*f*, installer 2421*g*, location 2421*h*, department 2421*i*, status 2421*j*, vendor 2421*k*, manufacturer 2421*l*, model number 2421*m*, serial number 2421*n*, and tag number 2421*o* of the component in the network, and may also contain an indication 2421*p* about whether or not support activities for the component should be billed to the customer. The user interface can have a company/contact details section 2422*a* that can describe information about the company where the component is located, and may include a company name 2422*b*, a contact name 2422*c*, an address 2422*d*, a city 2422*e*, a state 2422*f*, a ZIP code 2422*g*, and a country 2422*h*. The user interface can also include notes 2423 specific to the vendor of the component and notes 2424 that may be specific to the component or the company. The user interface may also have a configuration questions section 2425*a* that can list questions asked to the company to determine more information about the component. In the example of FIG. 24B, the configuration questions 2425*a* can include a question 2425*b* about the server role and a question 2425*c* about the operating system.

FIG. 24C is an illustrative example of an embodiment of a user interface for viewing information about applications and processes on a Remote Monitoring and Management (RMM) system. The user interface in FIG. 24C is not one that is part of the user interface module 109 of the documentation server 101, but can instead be part of an RMM system 124 as described with respect to FIG. 1A. The user interface in FIG. 24C can be used to view information about installed and running applications on a component in the network, and the associated configuration information about applications may be imported into the documentation server 101 from an RMM system 124 as described with respect to FIG. 1A. The table 2431*a* can show information taken from the installation configuration on a device, and can have a descriptive header 2432 and rows 2433*a*-2433*g* that may correspond to installed applications. The columns 2436*a*-2436*d* can display the name 2436*a*, the installation date 2436*b*, the installation size 2436*c*, and the application version 2436*d* for the installed application represented by each row. The table 2431*b* can show information about applications that are currently running on a device, and can have a descriptive header 2434 and rows 2435*a*-2435*e* that may correspond to running applications. The columns 2437*a*-2437*e* can display the process name 2437*a*, the process identifier (PID) 2437*b*, the percentage processor utilization 2437*c*, the memory utilization 2437*d*, and the application title 2437*e* for the running application represented by each row.

Figure 24D:
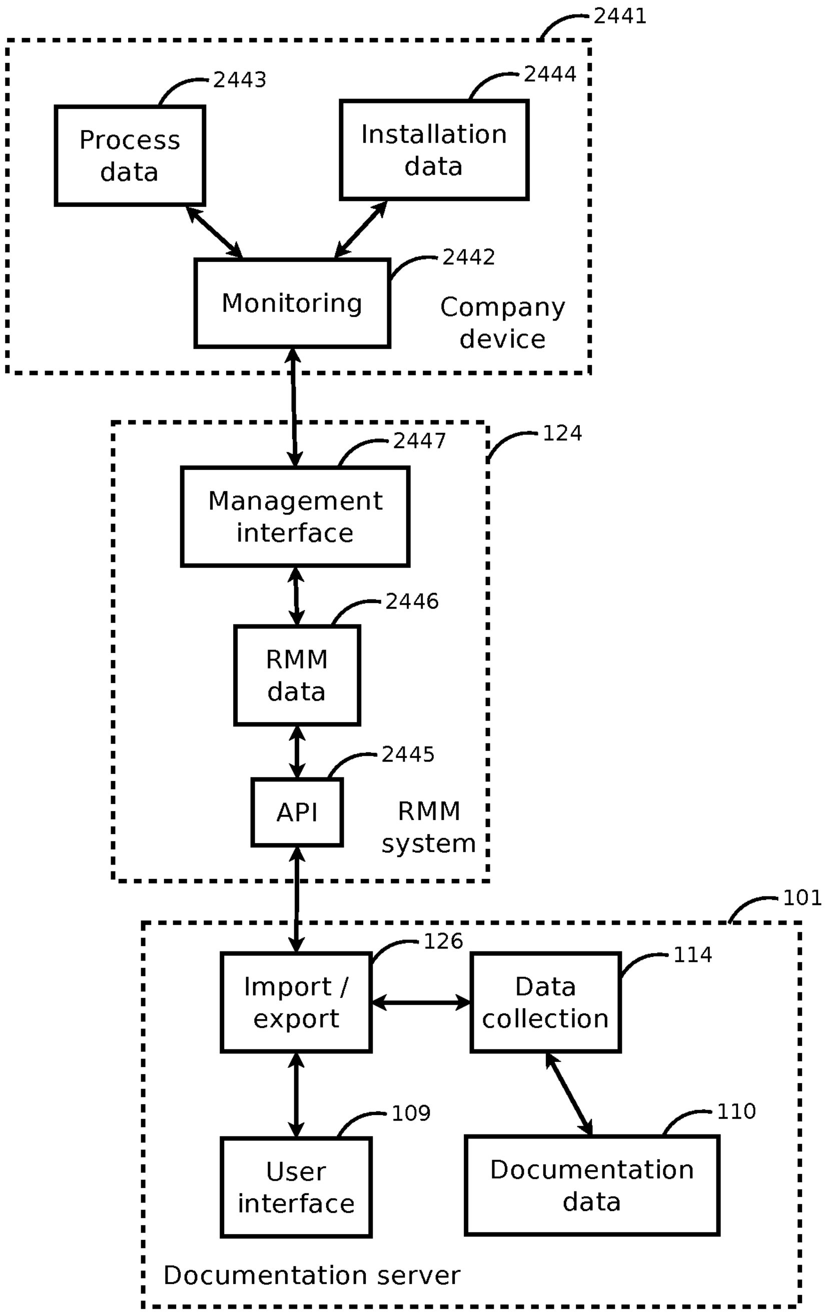
FIG. 24D is an illustrative block diagram of an example embodiment of an interface from a remote monitoring and management (RMM) system to a system for documenting, analyzing, and supporting information technology infrastructure.

FIG. 24D is an illustrative block diagram of an example embodiment of an interface from a remote monitoring and management (RMM) system to a system for documenting, analyzing, and supporting information technology infrastructure. The RMM system 124 may have a monitoring module 2442 that runs on a company device 2441. The monitoring component may be controlled by a management interface 2447 on the RMM system 124, and may be able to examine process data 2443 and installation data 2444 on the company device 2441. The process data 2443 may provide details on the applications that are currently running on the company device 2441, and the installation data 2444 may provide details on the applications that are currently installed on the company device 2441. The process data 2443 may change quickly, due to the fact that applications may start up and terminate frequently. The installation data 2444 may change slowly, since installing and removing applications is a relatively infrequent event.

The monitoring module 2442 can retrieve information from the process data 2443 and installation data 2444 and send the information to the management interface 2447 on the RMM server 124, where the information can be written into RMM data 2446. As described with respect to FIG. 24A, the import/export module 126 may retrieve data from the RMM data 2446 using an API 2445 on the RMM system 124, and may update the documentation data 110 using the data collection module 114 on the documentation server 101. The import/export module 126 may be controlled through the user interface 109 in order to initiate an import or export operation with the RMM system 124.

Figure 25A:
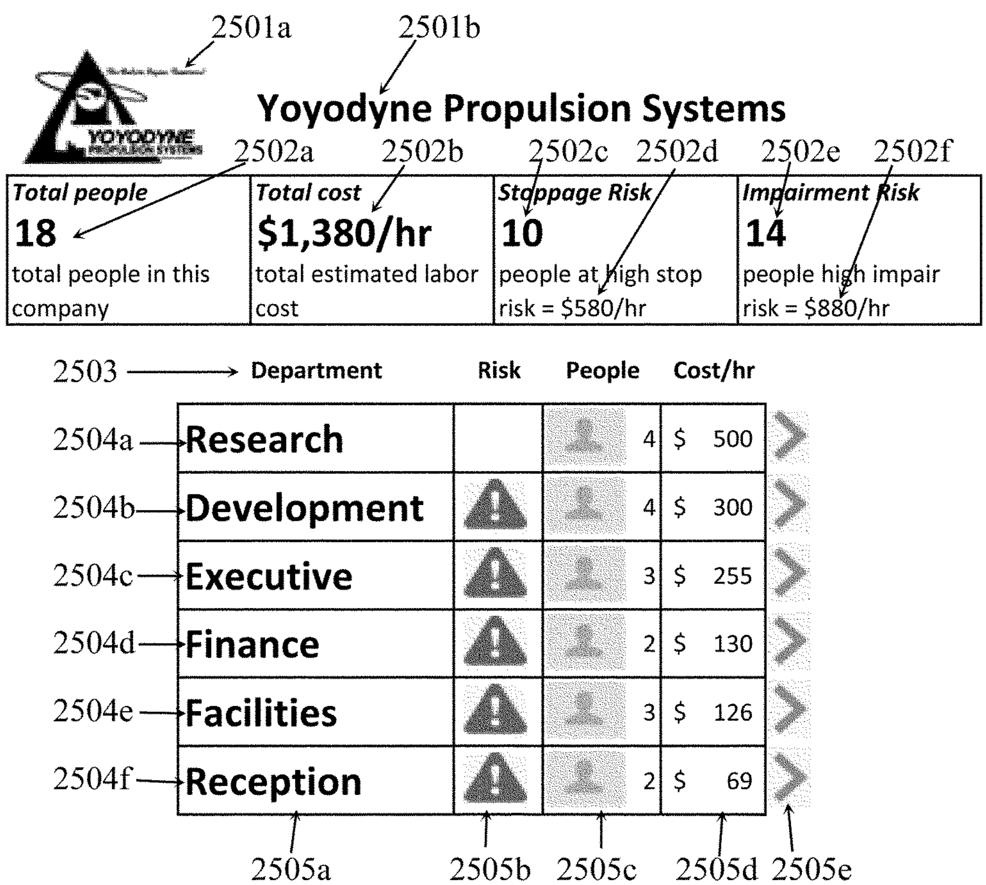
FIG. 25A is an illustrative example of an embodiment of a user interface for viewing and investigating information about the overall risk factors present for a company.

FIG. 25A is an illustrative example of an embodiment of a user interface for viewing and investigating information about the overall risk factors present for a company. The display in FIG. 25A can have a company summary section that can show the company logo 2501*a*, the company name 2501*b*, the number of people 2502*a* in the company, the total estimated hourly labor cost 2502*b* for the company, the number of people 2502*c* whose work could be completely stopped by a component failure, the estimated hourly labor cost 2502*d* of the people whose work could be completely stopped by a component failure, the number of people 2502*e* whose work could be impaired by a component failure, and the estimated hourly labor cost 2502*f* of the people whose work could be impaired by a component failure.

The display in FIG. 25A can have a breakdown by business unit in tabular form, with descriptive headers 2503 and rows 2504*a*-2504*f* that may represent business units. The columns 2505*a*-2505*e* can represent the name 2505*a* of the business unit, a graphic icon 2505*b* that can show the presence and severity of documented risks for the business unit, the number of people 2505*c* in the business unit, the estimated hourly labor cost 2505*d* of the people in the business unit, and an icon 2505*e* that can be selected to display a user interface with more information about the risk factors for the business unit.

Figure 25B:
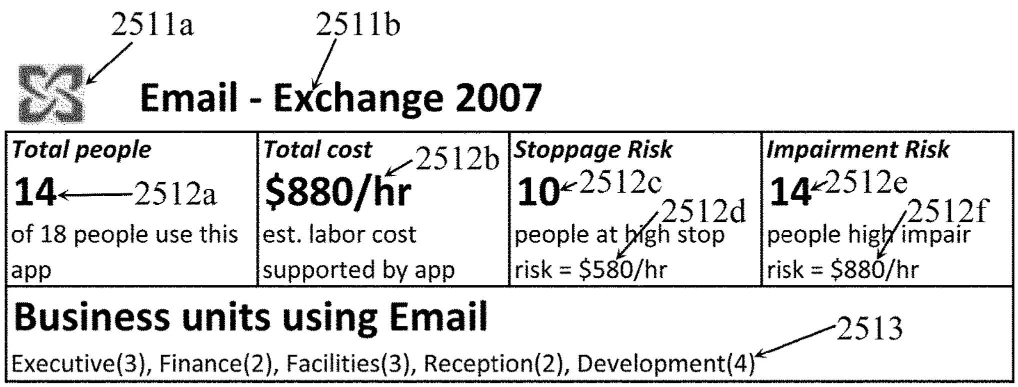
FIG. 25B is an illustrative example of an embodiment of a user interface for viewing and investigating information about the risk factors presented to a company by one application.

FIG. 25B is an illustrative example of an embodiment of a user interface for viewing and investigating information about the risk factors presented to a company by one application. The user interface can show an icon 2511*a* representing the application, the name 2511*b* of the application, the total number of people 2512*a* in the company that use the application, the estimated hourly labor cost 2512*b* of the people who use the application, the number of people 2512*c* whose work could be completely stopped by a failure of the application, the estimated hourly labor cost 2512*d* of the people whose work could be completely stopped by a failure of the application, the number of people 2512*e* whose work could be impaired by a failure of the application, and the estimated hourly labor cost 2512*f* of the people whose work could be impaired by a failure of the application. The user interface can show the business units 2513 using the application, and for each business unit, the number of people in that business unit who use the application.

Figure 25C:
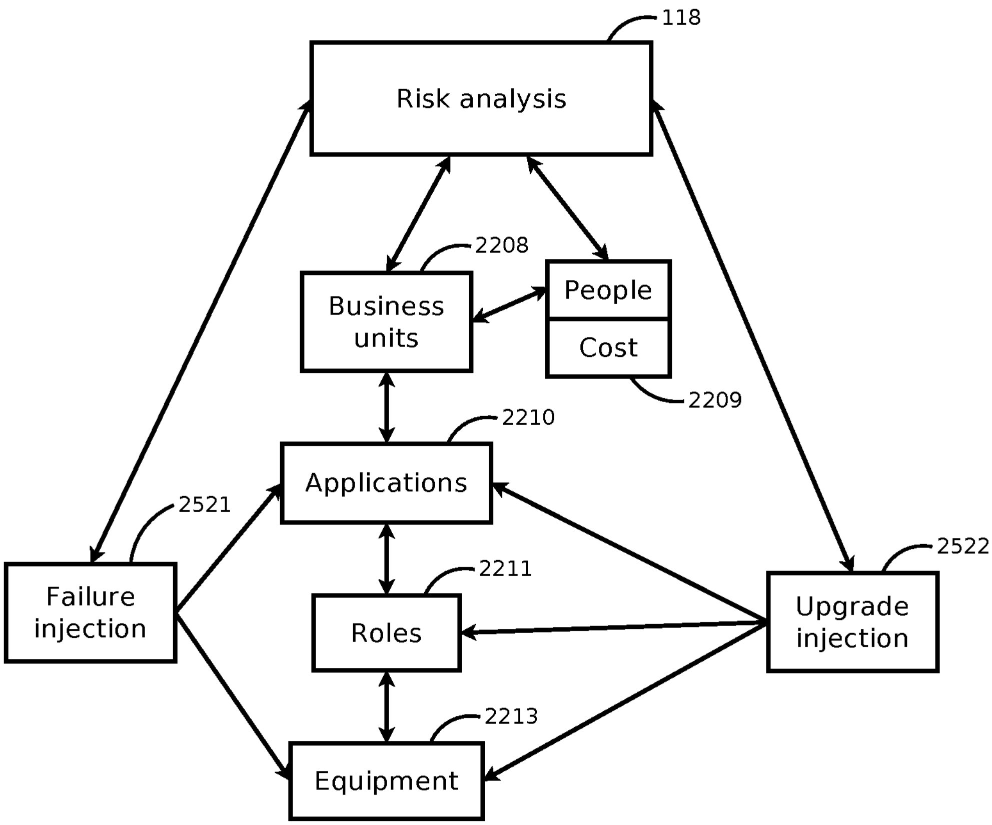
FIG. 25C is an illustrative block diagram of an example embodiment of a system to analyze risk in a company using documentation data about the company.

FIG. 25C is an illustrative block diagram of an example embodiment of a system to analyze risk in a company using documentation data about the company. A risk analysis module 118 as described with respect to FIG. 1A can access data in the business units table 2208, the people table 2209, the applications table 2210, the roles table 2211, and the equipment table 2213, as described with respect to FIG. 22. The risk analysis module 118 can use a failure injection component 2521 to simulate the failure of each application 2210 and each piece of equipment 2213 one at a time. With a failure simulated, the risk analysis module 118 can determine the equipment 2213, roles 2211, and applications 2210 that would be affected by the failure by tracing the relationships to the failed component. The risk analysis module 118 can determine which business units 2208 are affected by the simulated failure and the degree to which the business units are affected, and can use the people 2209 in each business unit and their hourly cost to the company to determine the total hourly cost of the failure. This analysis may facilitate in computing the hourly costs associated with failures in each of the applications 2210 and pieces of equipment 2213, and may facilitate determining the priority of mitigating those failures. The risk analysis can use relationships that are represented in the documentation, but may also use relationships that are not explicitly represented in the documentation, but are instead derived from other relationships. In the example of FIG. 25C, a business unit 2208 may represent the attorneys in a company. An application 2210 may represent an email application, and the documentation may indicate that the attorneys use the email application as shown by the direct link in the figure. A role 2211 may represent an email service that provides email functions to the email application, and the documentation may indicate that the email application depends on the email service as shown by the direct link in the figure. The documentation may not indicate that the attorneys depend on the email service, but the system may determine this implicit relationship based on the relationships that are in the documentation.

The risk analysis module can use an upgrade injection module 2522 to simulate upgrading an application 2210, a role 2211, or a piece of equipment 2213, and can use estimated field repair times to simulate the amount of time that the upgraded component will be unavailable. The risk analysis module 118 can trace the relationships of other applications 2210, roles 2211, and equipment 2213 to the component being upgraded, and can determine what other components will be unavailable during the upgrade. The risk analysis module 118 can determine which business units 2208 are affected, and for how long the business units are affected, by the simulated upgrade, and can use the people 2209 in each business unit and their hourly cost to the company to determine the total cost of the upgrade. This analysis may facilitate in determining whether to proceed with an upgrade, and determining when and how to schedule the upgrade. Additionally, the relationships to other applications 2210, roles 2211, and equipment 2213 may facilitate discovering other components that may require an upgrade in parallel with the desired component, and can facilitate providing a more accurate estimate in time and materials expense for the upgrade. The upgrade analysis can use relationships that are represented in the documentation, but may also use relationships that are not explicitly represented in the documentation, but are instead derived from other relationships. In the example of FIG. 25C, an application 2210 may represent an email application. A role 2211 may represent an email service that provides email functions to the email application, and the documentation may indicate that the email application depends on the email service as shown by the direct link in the figure. A piece of equipment 2213 may represent a firewall that the email service uses to access the internet, and the documentation may indicate that the email service depends on the firewall. The documentation may not indicate a relationship between the email application and the firewall, but the system may determine this implicit relationship based on the relationships that are in the documentation. The upgrade analysis may determine that the new version of the email application after the upgrade has a known incompatibility with the current version of the firewall, and may then determine that upgrading the email application will also require upgrading the firewall.

Figure 25D:
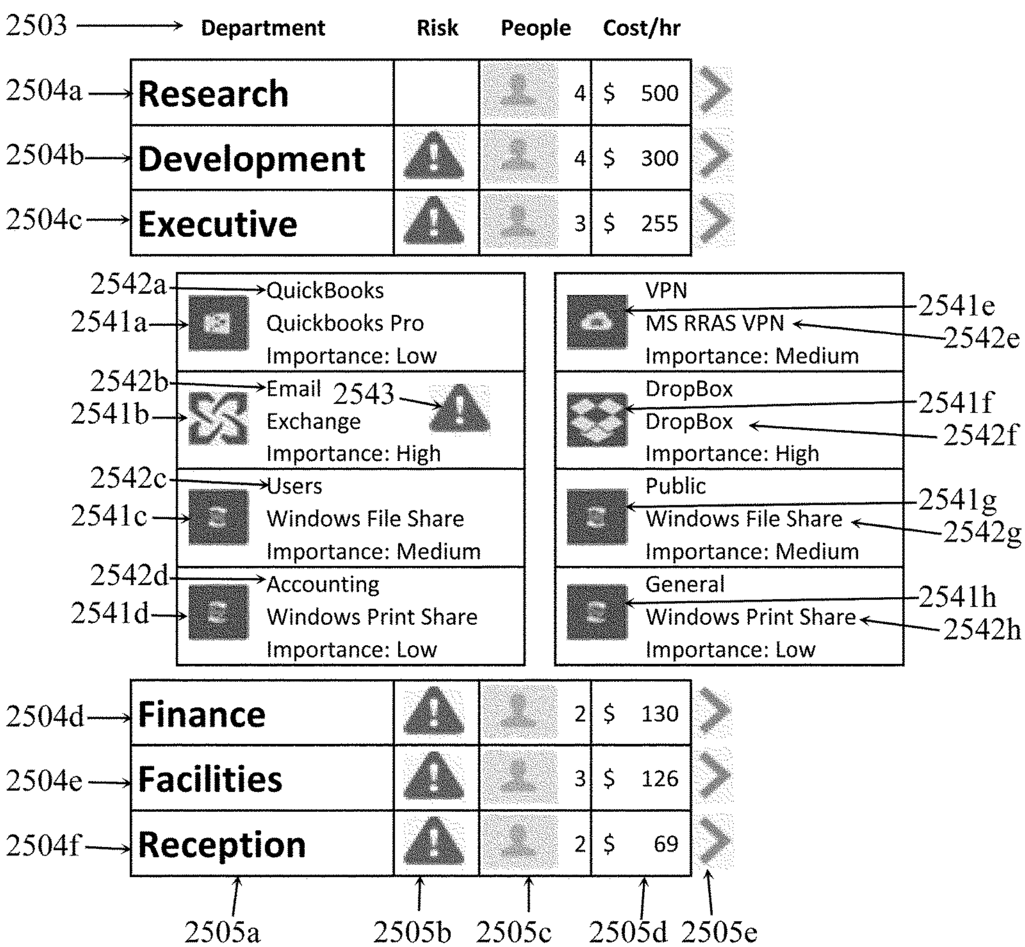
FIG. 25D is an illustrative example of an embodiment of a user interface for viewing and investigating information about the risk factors presented by applications to a business unit in a company.

FIG. 25D is an illustrative example of an embodiment of a user interface for viewing and investigating information about the risk factors presented by applications to a business unit in a company. The display in FIG. 25D may be the user interface that is displayed by selecting the icon in column 2505*e* of row 2504*c* as described with respect to FIG. 25A. The headers 2503, rows 2504*a*-2504*f*, and columns 2505*a*-2505*e* can be the same as described with respect to FIG. 25A. The user interface can show additional detailed information about the risks associated with the Executive business unit represented by row 2504*c*, including a list of some or all of the components whose failure could contribute to the risk. For each component, the display can show a visual icon 2541*a*-2541*h* representing the component and a text area 2542*a*-2542*h* listing the name, platform, and importance of the component.

Figure 26A:
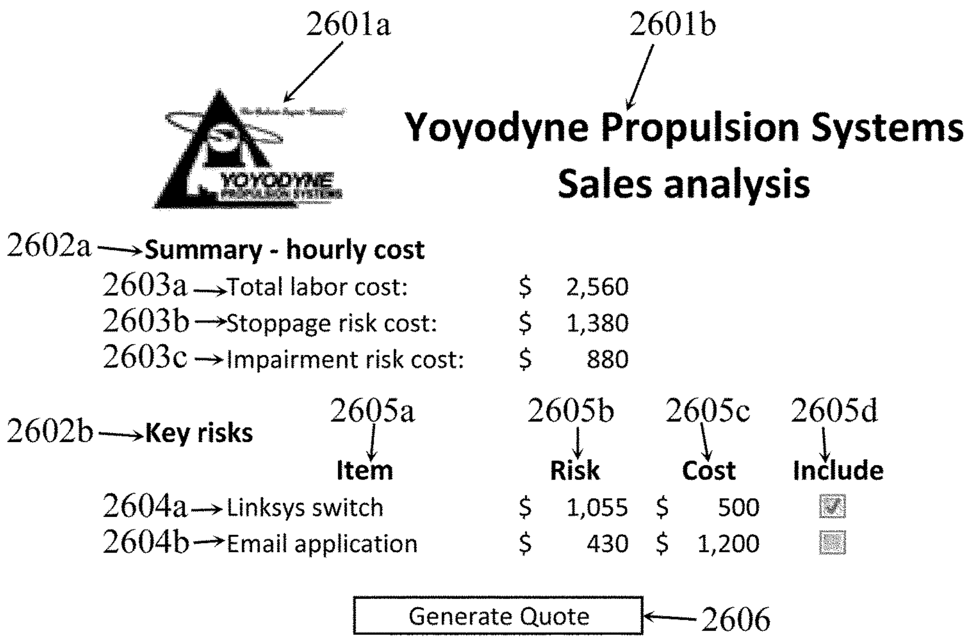
FIG. 26A is an illustrative example of an embodiment of a user interface for managing sales recommendations for a company using a system for documenting, analyzing, and supporting information technology infrastructure.

FIG. 26A is an illustrative example of an embodiment of a user interface for managing sales recommendations for a company using a system for documenting, analyzing, and supporting information technology infrastructure. The interface can have the company logo 2601*a* and a text area 2601*b* with the company name and a header identifying the interface. The interface can contain a section 2602*a* that may summarize costs and risks of the company to facilitate a discussion with company management about controlling costs and risks. The summary section 2602*a* can contain the total estimated hourly labor cost 2603*a* of the company, the estimated hourly cost 2603*b* that could be lost due to work stoppage by a failure in the IT infrastructure at the company, and the estimated hourly cost 2603*c* that could be partially lost due to work impairment by a failure in the IT infrastructure at the company.

The interface can facilitate providing concrete recommendations to the company with a section 2602*b* that can show the key risks at the company in tabular form, with rows 2604*a*-2604*b* that can represent risks at the company and columns 2605*a*-2605*c* displaying information about the risks in each row. Column 2605*a* can give the name of the item whose failure introduces the risk for each row. Column 2605*b* can give the hourly cost that could be incurred if the item in each row failed. Column 2605*c* can give the cost to mitigate the risk. The interface can facilitate presentation of this information to the company by providing column 2605*d* as a selection for items that may be included in a proposal for mitigating risk, and a Generate Quote button 2606 that can generate a proposal including the items selected in column 2605*d*.

FIG. 26B is an illustrative example of an embodiment of a quote created for a company using a system for documenting, analyzing, and supporting information technology infrastructure. The quote illustrated in FIG. 26B may be generated as a result of selecting the Generate Quote button 2606 as described with respect to FIG. 26A. The quote can contain the company logo 2611*a* and a text area 2611*b* that can contain the company name and an identifier of the quote. The quote can contain a section 2612*a* detailing the service (labor) expenses, a section 2612*b* detailing the equipment expenses, and a grand total 2612*c*. The service expense section 2612*a* can contain descriptive headers 2613, rows 2614*a*-2614*b* that list the individual service requirements, the number of hours involved, the hourly cost, and the total cost, and a total 2614*c* for the service cost. The equipment expense section 2612*b* can contain descriptive headers 2615, row 2616*a* that lists the individual equipment item, the quantity, the unit price, and the total price for the item, and a total 2616*b* for the equipment cost. The grand total section 2612*c* can list the total of the service cost 2614*c* and the equipment cost 2616*b*, to give a total cost 2612*c* for the quote.

Figure 27A:
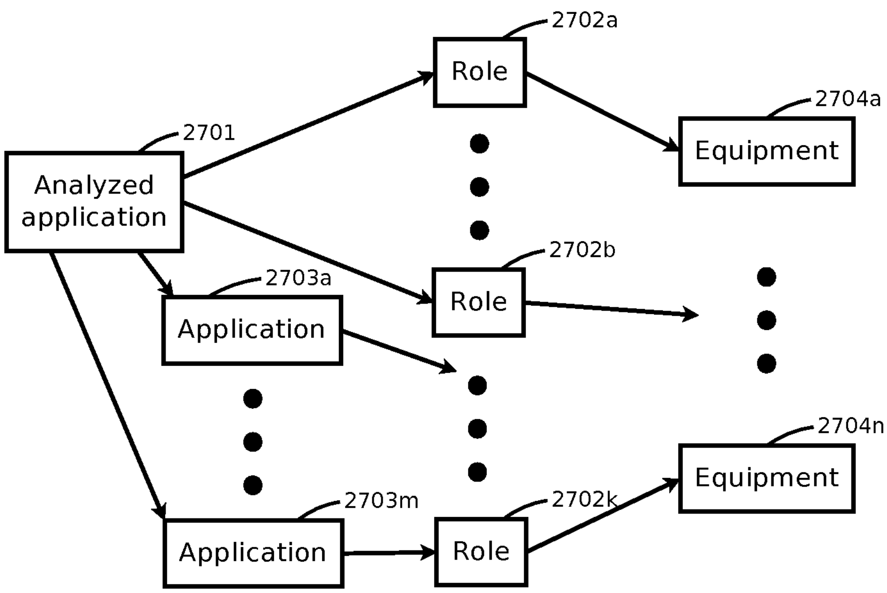
FIG. 27A is an illustrative block diagram of an example embodiment of a system to diagnose likely causes of failure in a company from the symptoms of the failure.

FIG. 27A is an illustrative block diagram of an example embodiment of a system to diagnose likely causes of failure in a company from the symptoms of the failure. If one or more applications are failing, the system can analyze the failing applications by using each failing application, one at a time, as an analyzed application 2701 and tracing its documented relationships to roles 2702*a*-2702*b* and other applications 2703*a*-2703*m*, and by tracing the documented relationships of each of the other applications 2703*a*-2703*m* to roles 2703*a*-2703*k*. Every path to a role 2702*a*-2702*k* or an application 2703*a*-2703*m* can be used to increase a probability of that component contributing to the failure. The roles 2702*a*-2702*k* can be traced through their relationships to equipment 2704*a*-2704*n*, and the equipment 2704*a*-2704*n* can similarly be indicated with an increased probability of its contribution to the failure.

The same analysis process can be applied using some or all of the non-failing applications, one at a time, as an analyzed application 2701, and indicating a decreased probability of contribution to the failure on the applications 2703*a*-2703*m*, roles 2702*a*-2702*k*, and equipment 2704*a*-2704*n* that are reached by tracing the documented relationships. The resulting probabilities can be used to present the components that are most likely to be contributing to the failure, and may facilitate finding the root cause of the failures more efficiently.

Figure 27B:
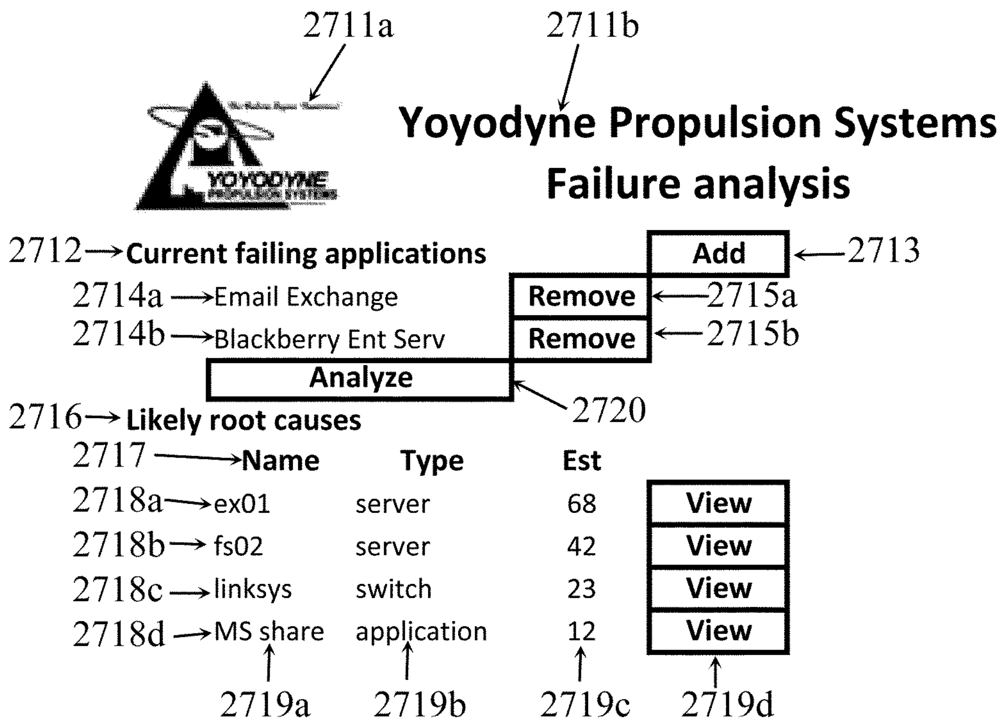
FIG. 27B is an illustrative example of an embodiment of a user interface for viewing and investigating information about the diagnosis of likely causes of failure in a company.

FIG. 27B is an illustrative example of an embodiment of a user interface for viewing and investigating information about the diagnosis of likely causes of failure in a company. The user interface can have a company logo 2711*a* and a text header 2711*b* with the company name and interface identifier. The interface can have a section 2712 identifying the currently failing applications 2714*a*-2714*b* at the company, and can provide an Add button 2713 that can select a user interface to add applications to the list of failing applications. A Remove button 2715*a*-2715*b* for each application 2714*a*-2714*b* may remove the application from the list of failing applications. An Analyze button 2720 can start the analysis process as described with respect to FIG. 27A.

A section 2716 of likely root causes can display the results of the analysis in tabular form, with descriptive headers 2717, rows 2718*a*-2718*d* that can represent the components that may be responsible for the failure, and columns 2719*a*-2719*d* that can provide information about the component in each row. The rows 2718*a*-2718*d* may be sorted by descending order of likelihood of causing the failures. Column 2719*a* can be the name of the component in each row. Column 2719*b* can be the type of component in each row. Column 2719*c* can be the likelihood that the component in each row is causing the failure, on a scale of 0 to 100. Column 2719*d* can be a View button that may be selected to display a user interface of information on the component in each row, which may facilitate checking the component and diagnosing the problem more efficiently.

Figure 28A:
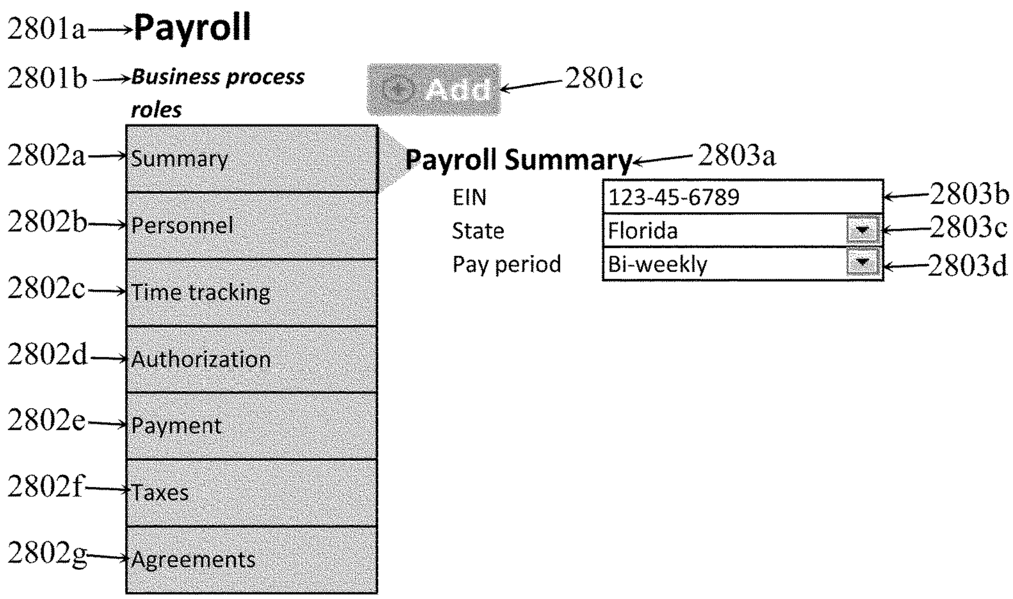
FIG. 28A is an illustrative example of an embodiment of a user interface for viewing and updating the documentation about an operations management system for payroll.

FIG. 28A is an illustrative example of an embodiment of a user interface for viewing and updating the documentation about an operations management system for payroll. A header 2801*a* can indicate that the payroll operations management interface is displayed. A sub-header 2801*b* can indicate that the operations management roles 2802*a*-2802*g* are displayed on the left. An Add button 2801*c* can be selected to display a user interface that may be used to add a new operations management role. As shown in the example of FIG. 28A, the selected operations management role, which is the Summary role 2802*a*, can have a visual indicator of an arrow on the right side to indicate that this role is selected. The initial part of the display shown in FIG. 28A can have a header 2803*a* indicating the Payroll Summary operations management role that is selected. The controls 2803*b*-2803*d* can allow viewing and updating the information in the summary. The employee identification number (EIN) control 2803*b* can allow viewing and updating the tax EIN for the company. The State control 2803*c* can allow viewing and updating the state where the company does business. The Pay Period control 2803*d* can allow viewing and updating the pay period that the company uses for payroll.

Figure 28B:
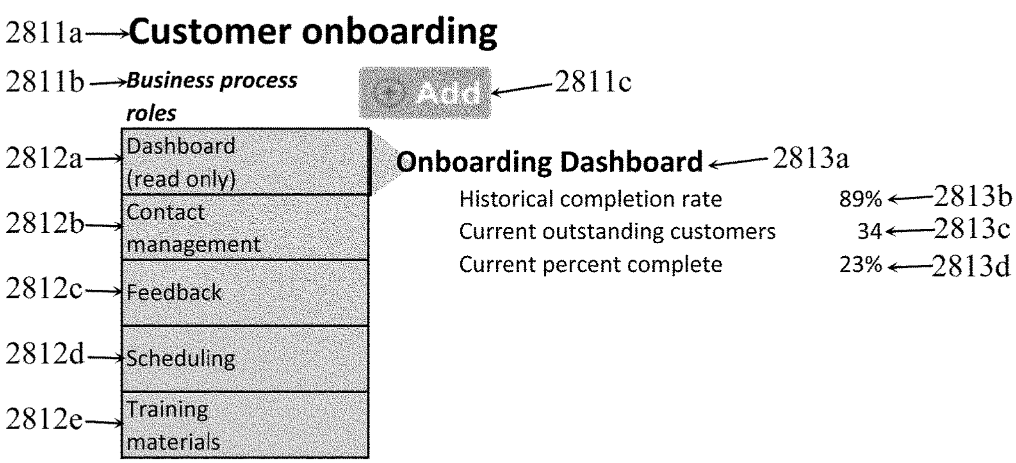
FIG. 28B is an illustrative example of an embodiment of a user interface for viewing and updating the documentation about an operations management system for customer onboarding.

FIG. 28B is an illustrative example of an embodiment of a user interface for viewing and updating the documentation about an operations management system for customer onboarding. A header 2811*a* can indicate that the customer onboarding operations management interface is displayed. A sub-header 2811*b* can indicate that the operations management roles 2812*a*-2812*e* are displayed on the left. An Add button 2811*c* can be selected to display a user interface that may be used to add a new operations management role. As shown in the example of FIG. 28B, the selected operations management role, which is the Dashboard role 2812*a*, can have a visual indicator of an arrow on the right side to indicate that this role is selected. The initial part of the display shown in FIG. 28B can have a header 2813*a* indicating the Onboarding Dashboard operations management role that is selected. The displays 2813*b*-2813*d* can allow viewing the information in the dashboard. The Historical completion rate display 2813*b* can display the total average completion rate of the onboarding process for the company. The Current outstanding customers display 2813*c* can display the number of customers that are currently in the onboarding process at the company. The Current percent complete display 2813*d* can display the average percentage of the onboarding process that the current outstanding customers have completed so far. The status information shown in the dashboard can use relationships that are represented in the documentation, but may also use relationships that are not explicitly represented in the documentation, but are instead derived from other relationships. In the example of FIG. 28B, the count of current outstanding customers 2813*c* may be determined from direct relationships in the documentation between the onboarding process and the customer data. The current percent complete 2813*d* may not be a figure that can be determined from relationships in the documentation, but may require the system to derive a new relationship about the tasks that are associated with the onboarding process, and the completion status of those tasks. The system may then be able to use that new relationship to determine the overall completion status.

Figure 28C:
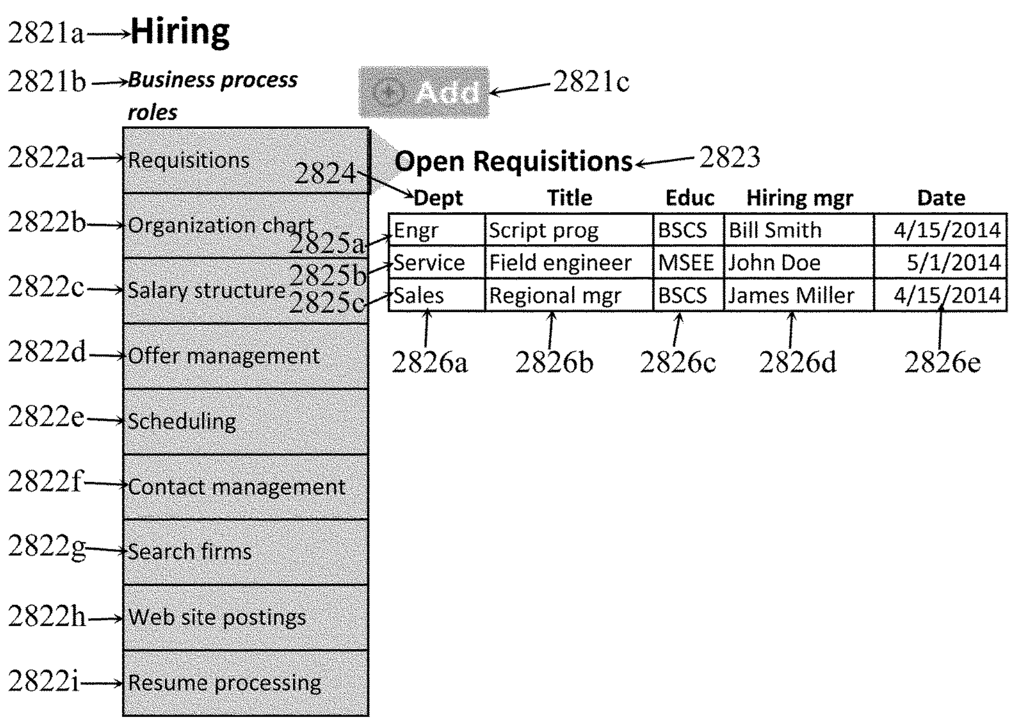
FIG. 28C is an illustrative example of an embodiment of a user interface for viewing and updating the documentation about an operations management system for hiring.

FIG. 28C is an illustrative example of an embodiment of a user interface for viewing and updating the documentation about an operations management system for hiring. A header 2821*a* can indicate that the hiring operations management interface is displayed. A sub-header 2821*b* can indicate that the operations management roles 2822*a*-2822*i* are displayed on the left. An Add button 2821*c* can be selected to display a user interface that may be used to add a new operations management role. As shown in the example of FIG. 28C, the selected operations management role, which is the Requisitions role 2822*a*, can have a visual indicator of an arrow on the right side to indicate that this role is selected. The initial part of the display shown in FIG. 28C can have a header 2823 indicating the Open Requisitions operations management role that is selected. The information about open requisitions can be displayed in a tabular format with descriptive headings 2824, rows 2825*a*-2825*c* that can represent open requisitions, and columns 2826*a*-2826*e* that can show information about the requisition in each row. Column 2826*a* can show the department doing the hiring for the requisition in each row. Column 2826*b* can show the job title for the requisition in each row. Column 2826*c* can show the required education level for the requisition in each row. Column 2826*d* can show the name of the hiring manager for the requisition in each row. Column 2826*e* can show the target hiring date for the requisition in each row.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape.

The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular embodiments of the subject matter have been described. Other embodiments are within the scope of the present disclosure. In some cases, the actions recited in the present disclosure can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

While this specification contains many specific implementation details, these should not be construed as limitations on the scope of what may be claimed, but rather as descriptions of features specific to particular implementations of the disclosure. Certain features described in this specification in the context of separate embodiments can also be implemented in combination in a single embodiment. Conversely, various features described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of managing information technology infrastructure, comprising:

identifying, by a server comprising one or more processors, via a first monitoring application executed by a first remote device, a first application version of a first application installed on the first remote device;

identifying, by the server via a second monitoring application executed by a second remote device, a second application version of a second application installed on the second remote device;

inputting, by the server for storage in a database in memory, the first application version in a first template associated with the first application installed on the first remote device, the first template comprising one or more structures of data configured to store one or more parameters associated with the first application;

inputting, by the server for storage in the database, the second application version in a second template associated with the second application installed on the second remote device, the first template having a relationship to the second template that indicates at least one of a dependency or a compatibility between versions of the first application and the second application;

receiving, by the server, an indication to upgrade the first application version of the first application to a third application version;

determining, by the server using the relationship between the first template and the second template, responsive to the indication to upgrade the first application version, an incompatibility between the third application version of the first application associated with the first remote device and the second application version of the second application associated with the second remote device;

selecting, by the server responsive to determining the incompatibility, a fourth application version of the second application associated with the second remote device that is compatible with the third application version of the first application associated with the first remote device; and providing, by the server via a network, an instruction to upgrade the second application installed on the second computing device to the fourth application version selected based on the incompatibility determined responsive to the indication to upgrade the first application executed by the first remote device to the third application version.

2. The method of claim 1, comprising:

resolving, by the server, an update requirement for the second application from the second application version to the fourth application version.

3. The method of claim 1, comprising:

recording, by the server to a list of upgrades, an upgrade requirement of the second application from the second application version to the fourth application version; and providing, by the server via the network, the list of upgrades for display on a display device.

4. The method of claim 1, comprising:

generating, by a link generator executed by the server, the relationship between the first template and the second template.

5. The method of claim 1, comprising:

determining, by the server, the incompatibility based on a table comprising incompatibilities indexed by the first application version of the first application and the second application version of the second application.

6. The method of claim 1, comprising:

selecting the first template based on at least one of:

an identifier associated with the first application, a category of the first application, a product name associated with the first application, or an indication from a user interface generated by the server based on the first application.

7. The method of claim 1, further comprising:

determining, using the relationship between the first template and the second template, that the second application uses an information technology asset to operate; and generating, by a link generator executed by the server, a second relationship between the first application and the information technology asset based on determining the second application requires the use of the information technology asset.

8. The method of claim 1, wherein the first application comprises a database application, and the second application comprises an email application.

9. The method of claim 1, comprising:

determining, by the server, the incompatibility prior to upgrading the first application to the third application version.

10. The method of claim 1, comprising:

determining, by an injection component, to update the first application; and providing, by the injection component, the indication to upgrade the first application version of the first application to a third application version.

11. A system to manage information technology infrastructure, comprising:

a server including a processor and memory configured to:

identify, via a first monitoring application executed by a first remote device, a first application version of a first application installed on the first remote device;

identify, via a second monitoring application executed by a second remote device, a second application version of a second application installed on the second remote device;

input, for storage in a database in the memory, the first application version in a first template associated with the first application installed on the first remote device, the first template comprising one or more structures of data configured to store one or more parameters associated with the first application;

input, for storage in the database, the second application version in a second template associated with the second application installed on the second remote device, the first template having a relationship to the second template that indicates at least one of a dependency or a compatibility between versions of the first application and the second application;

receive an indication to upgrade the first application version of the first application to a third application version;

determine, based on the relationship between the first template and the second template, responsive to the indication to upgrade the first application version, an incompatibility between the third application version of the first application associated with the first remote device and the second application version of the second application associated with the second remote device;

select, responsive to the determined incompatibility, a fourth application version of the second application associated with the second remote device that is compatible with the third application version of the first application associated with the first remote device; and provide, via a network, an instruction to upgrade the second application installed on the second computing device to the fourth application version selected based on the incompatibility determined responsive to the indication to upgrade the first application executed by the first remote device to the third application version.

12. The system of claim 11, wherein the server is further configured to:

resolve an update requirement for the second application from the second application version to the fourth application version.

13. The system of claim 11, wherein the server is further configured to:

record, to a list of upgrades, an upgrade requirement of the second application from the second application version to the fourth application version; and provide, via the network, the list of upgrades for display on a display device.

14. The system of claim 11, wherein the server comprises a link generator configured to:

generate the relationship between the first template and the second template.

15. The system of claim 11, wherein the server is further configured to:

determine the incompatibility based on a table comprising incompatibilities indexed by the first application version of the first application and the second application version of the second application.

16. The system of claim 11, wherein the server is further configured to:

select the first template based on at least one of:

an identifier associated with the first application, a category of the first application, a product name associated with the first application, or an indication from a user interface generated by the server based on the first application.

17. The system of claim 11, wherein the server is further configured to:

determine, based on the relationship between the first template and the second template, that the second application uses an information technology asset to operate; and generate a second relationship between the first application and the information technology asset based on determining the second application requires the use of the information technology asset.

18. The system of claim 11, wherein the first application comprises a database application, and the second application comprises an email application.

19. The system of claim 11, wherein the server is further configured to:

determine the incompatibility prior to upgrading the first application to the third application version.

20. The system of claim 11, comprises an injection component configured to:

determine to update the first application to the second application version; and provide the indication to upgrade the first application version of the first application to a third application version.

* * * * *